Aug. 2, 1960 B. A. HARRIS 2,947,817

CLOCK-CALENDAR CIRCUIT

Filed Sept. 26, 1955 24 Sheets-Sheet 1

Inventor
BEN A. HARRIS
BY Francis I. Blake
ATTORNEY

Aug. 2, 1960 B. A. HARRIS 2,947,817

CLOCK-CALENDAR CIRCUIT

Filed Sept. 26, 1955 24 Sheets-Sheet 3

Aug. 2, 1960 B. A. HARRIS 2,947,817

CLOCK-CALENDAR CIRCUIT

Filed Sept. 26, 1955 24 Sheets-Sheet 4

TRUNK CIRCUIT-126

Aug. 2, 1960 B. A. HARRIS 2,947,817

CLOCK-CALENDAR CIRCUIT

Filed Sept. 26, 1955 24 Sheets-Sheet 6

Aug. 2, 1960 B. A. HARRIS 2,947,817

CLOCK-CALENDAR CIRCUIT

Filed Sept. 26, 1955 24 Sheets-Sheet 7

MOTOR SPEED CONTROL CIRCUIT-700

TRUNK CIRCUIT-126

Aug. 2, 1960 B. A. HARRIS 2,947,817

CLOCK-CALENDAR CIRCUIT

Filed Sept. 26, 1955

24 Sheets-Sheet 9

Aug. 2, 1960 B. A. HARRIS 2,947,817

CLOCK-CALENDAR CIRCUIT

Filed Sept. 26, 1955 24 Sheets-Sheet 10

Aug. 2, 1960 B. A. HARRIS 2,947,817

CLOCK-CALENDAR CIRCUIT

Filed Sept. 26, 1955 24 Sheets-Sheet 12

TRUNK CIRCUIT
126

Aug. 2, 1960 B. A. HARRIS 2,947,817

CLOCK-CALENDAR CIRCUIT

Filed Sept. 26, 1955 24 Sheets-Sheet 13

Aug. 2, 1960 B. A. HARRIS 2,947,817

CLOCK-CALENDAR CIRCUIT

Filed Sept. 26, 1955 24 Sheets-Sheet 17

Aug. 2, 1960 B. A. HARRIS 2,947,817

CLOCK-CALENDAR CIRCUIT

Filed Sept. 26, 1955

24 Sheets-Sheet 18

Aug. 2, 1960 B. A. HARRIS 2,947,817

CLOCK-CALENDAR CIRCUIT

Filed Sept. 26, 1955 24 Sheets-Sheet 20

Aug. 2, 1960 B. A. HARRIS 2,947,817
CLOCK-CALENDAR CIRCUIT
Filed Sept. 26, 1955 24 Sheets-Sheet 21

Aug. 2, 1960 B. A. HARRIS 2,947,817

CLOCK-CALENDAR CIRCUIT

Filed Sept. 26, 1955 24 Sheets-Sheet 22

Aug. 2, 1960 B. A. HARRIS 2,947,817

CLOCK-CALENDAR CIRCUIT

Filed Sept. 26, 1955 24 Sheets-Sheet 23

United States Patent Office 2,947,817

Patented Aug. 2, 1960

2,947,817

CLOCK-CALENDAR CIRCUIT

Ben A. Harris, Rochester, N.Y., assignor to General Dynamics Corporation, a corporation of Delaware Filed Sept. 26, 1955, Ser. No. 536,577

33 Claims. (Cl. 179—7.1)

This invention relates to a telephone system, and more particularly, to a telephone system including automatic toll ticketing facilities.

In automatic toll ticketing systems, many items of information pertaining to a toll call are temporarily stored in register means and are subsequently utilized to control the operation of a recorder which provides permanent records of this information for use in preparing bills for subscribers. This information generally includes the date and time of filling a toll call to aid the subscriber in identifying each of the toll calls listed in the periodic statement. This date and time information also may be useful to the operating company in determining the distribution of the traffic of the system. In addition, in studying traffic, it may be desirable to be able to determine the calls that have been placed during the different periods, such as day, night, holiday, or Sunday, in which various rate structures are applicable. This latter information is not readily discernible from a cursory inspection of permanent records bearing conventional date and time information.

Further, the date and time of placing a toll call may be used in determining the rate structure to be applied in establishing a monetary charge when the charge is established either manually or automatically. If time and date information is provided in the register or on the permanent records in the conventional forms, it is necessary to perform one or more conversion or comparison operations in order to determine the effect of this information on the rate structure to be utilized.

Accordingly, one object of the present invention is to provide new and improved automatic toll ticketing means.

Another object is to provide an automatic toll ticketing system including new and improved means for providing date and time information.

Another object is to provide date and time register means which normally supply signals representing instant date and time but which include means for modifying said signals during selected intervals.

A further object is to provide date and time signaling means which provide signals representing the various periods during which different telephone rates are applicable.

A still further object is to provide date and time signaling means in which the signals provided are modified on holidays and Sundays.

A further object is to provide a date and time registering means in which distinctive representations are afforded for hours during which day or business rates are applicable and for hours during which night rates are applicable.

Another object is to provide a clock and calendar circuit for supplying signals to a register in accordance with instant date and time which includes visible display means interlocked with the signaling means.

Another object is to provide a new and improved clock and calendar circuit comprising means for continuously manifesting date and time information and pulsing means controlled by the manifesting means for transmitting this date and time information.

Other objects and advantages of the present invention will become apparent from the ensuing description of an illustrative embodiment thereof in the course of which reference is had to the accompanying drawings in which.

Figure 1:
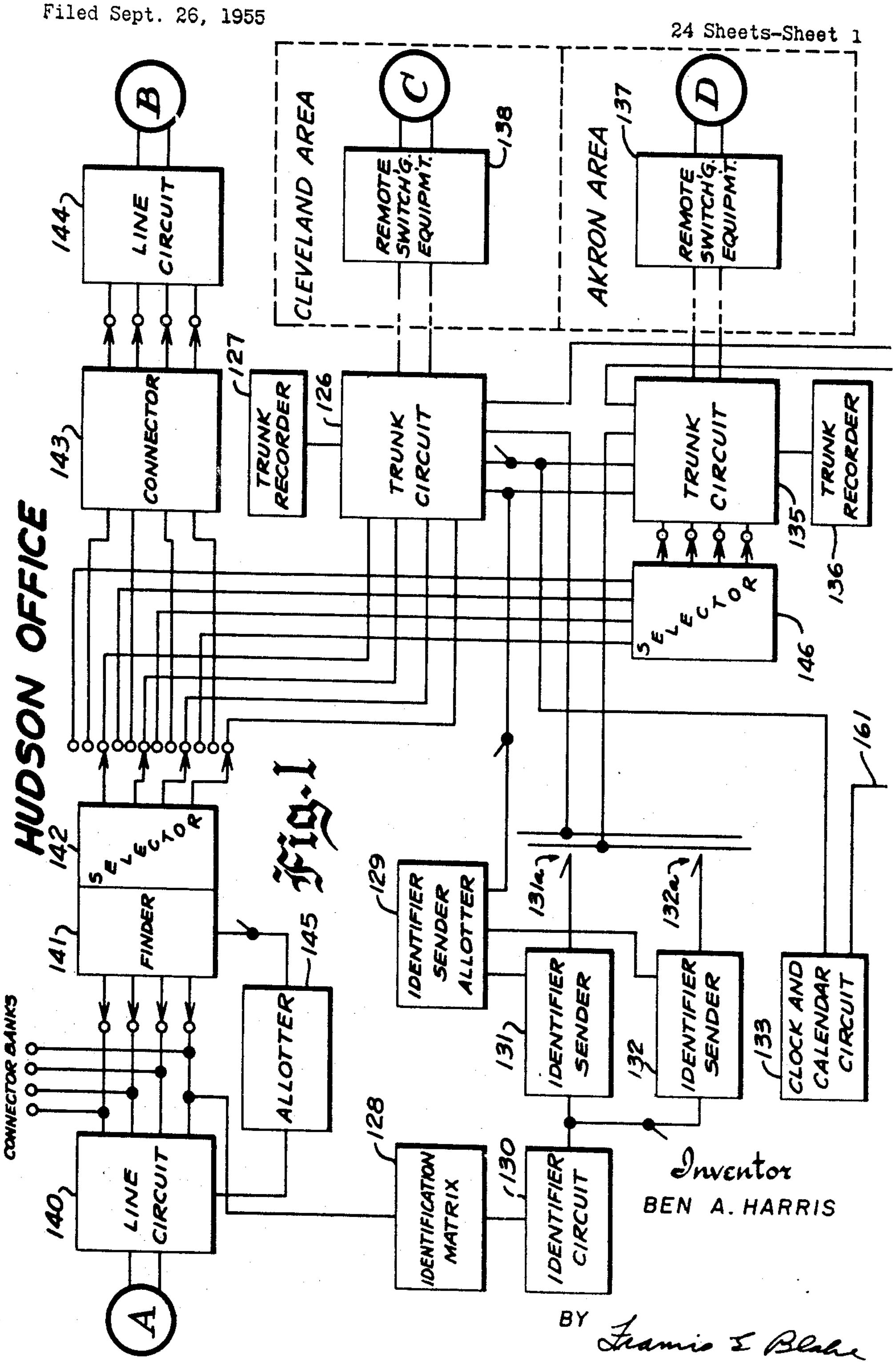
Figs. 1 and 2 are a block diagram of an automatic toll ticketing system embodying the present invention which is shown in conjunction with a conventional automatic telephone system.
Figure 2:
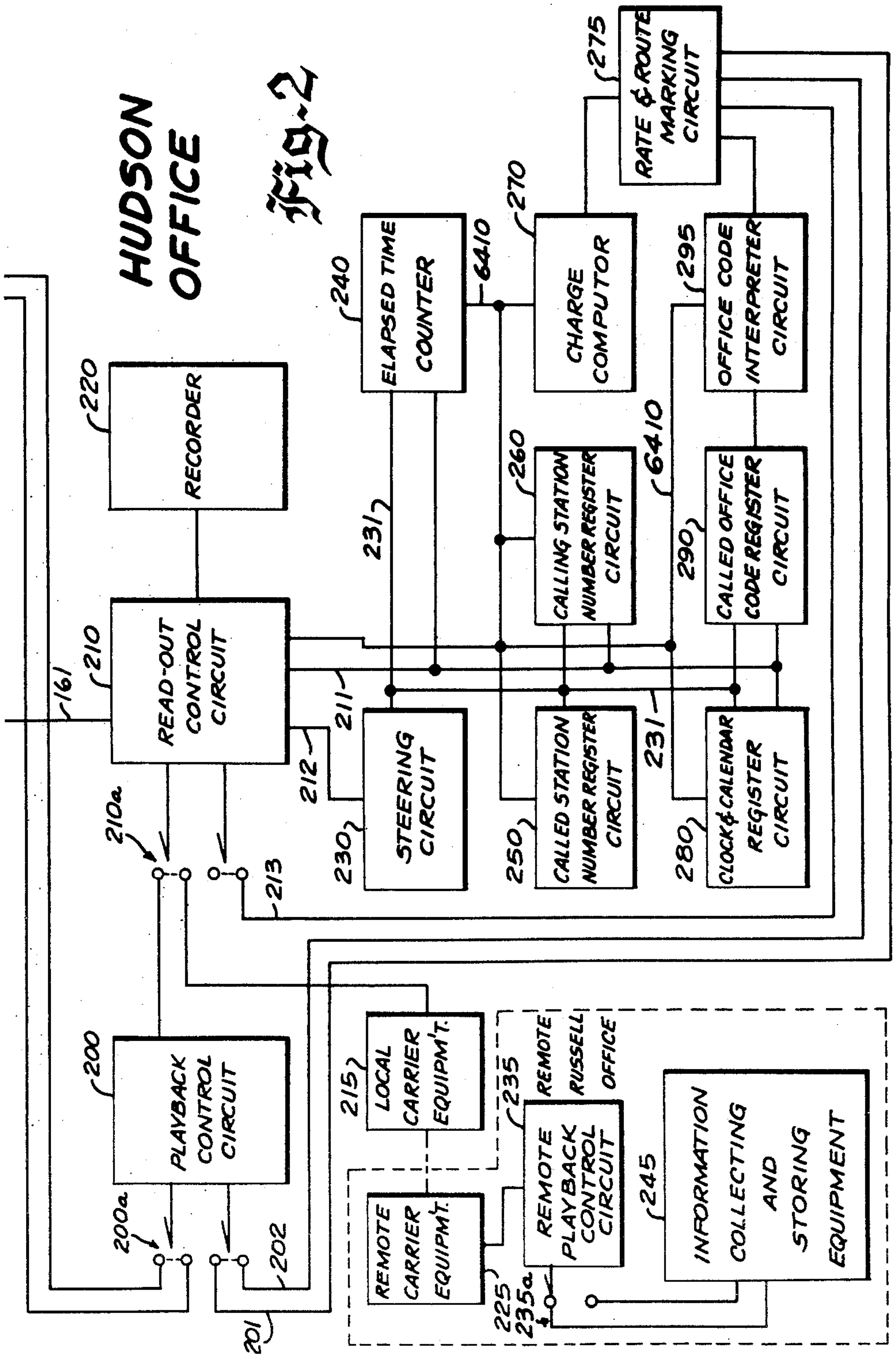
Figure 20:
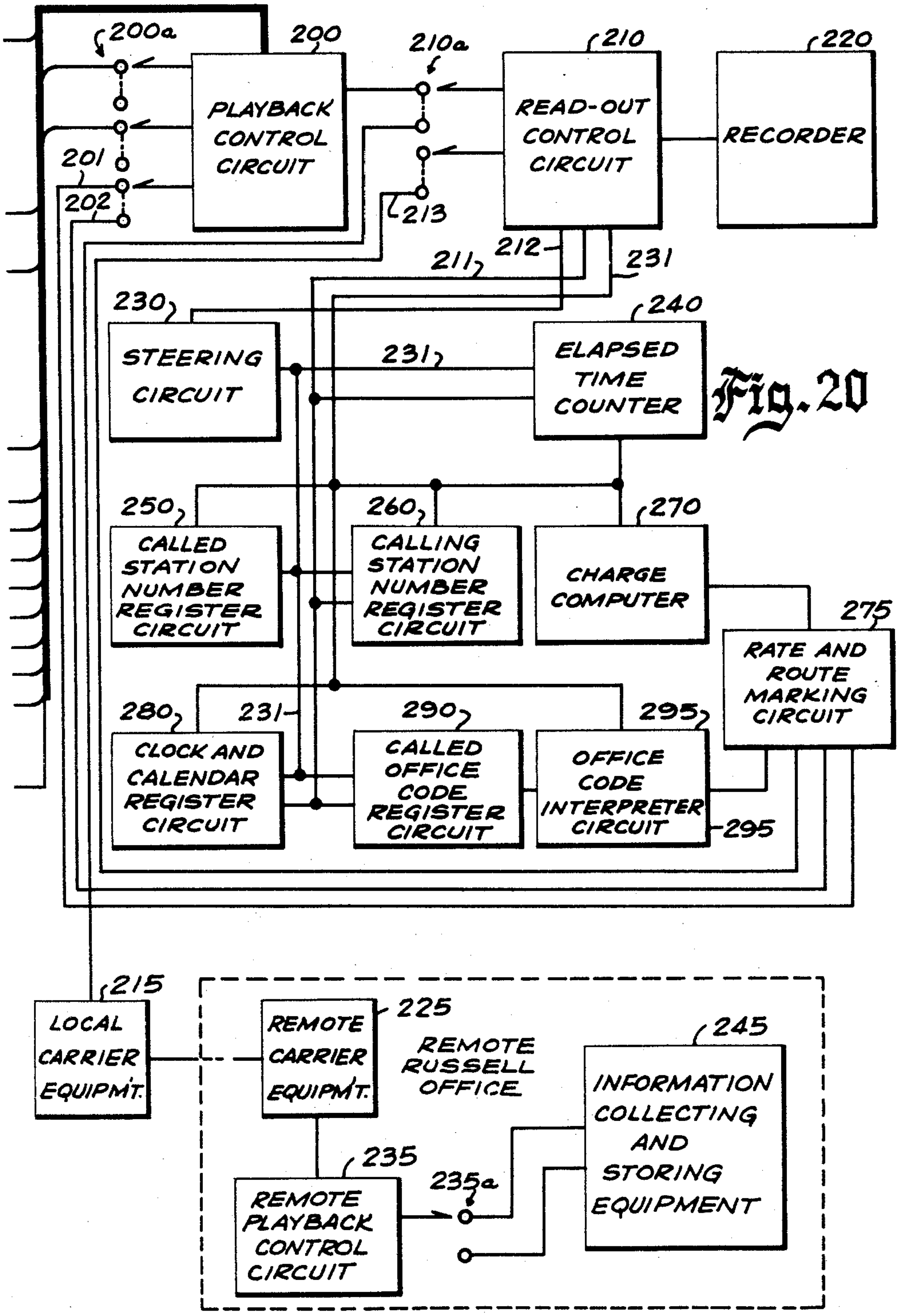
Figure 21:
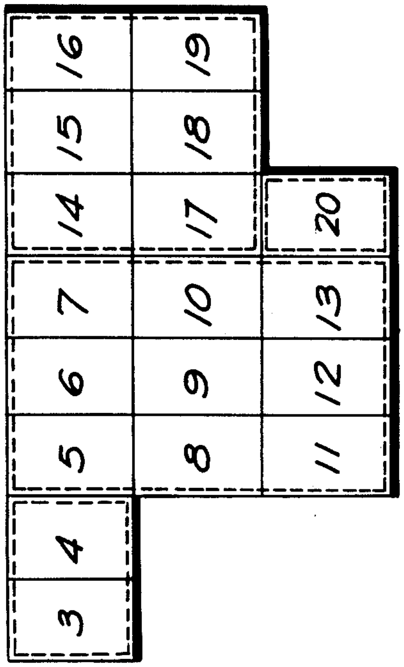
Figure 22:
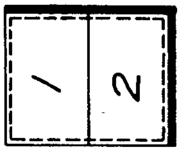

Figs. 5 to 13, inclusive, illustrate a trunk circuit comprising a portion of the automatic toll ticketing system shown in Figs. 1 and 2;

Figs. 14 to 19, inclusive, form a schematic drawing illustrating the details of a clock and calendar circuit;

Fig. 20 is a block diagram showing a recorder for producing permanent records of the items of information collected and registered by the equipment shown in Figs. 3 to 19, inclusive, together with the data register and control circuits associated therewith;

Fig. 21 is a block diagram showing the manner in which Figs. 3 to 20 are positioned adjacent each other to form a complete circuit diagram of an automatic toll ticketing system forming an embodiment of the present invention;

Fig. 22 is a block diagram disclosing the manner in which Figs. 1 and 2 are positioned adjacent each other to form a complete schematic showing of the general components of this invention;

Figs. 23A–D are schematic views of portions of a continuous magnetic tape on which are schematically indicated the items of information stored in conjunction with typical toll calls;

Figs. 24A–D illustrate toll tickets including the items of information pertaining to each of a group of typical toll calls.

Referring now to Figs. 1 and 2 of the drawings, the exchange network shown therein by way of example comprises a local Hudson office in which are terminated trunk circuits extending to geographically remote areas such as the Cleveland and Akron areas in which are located automatic switching equipment which is utilized in conjunction with equipment provided in the Hudson office for extending toll calls from the Hudson office to exchanges located in either the Cleveland or the Akron areas. In addition, the local Hudson office includes conventional switching means for extending connections to local subscribers which are not ticketed. Further, the network includes a remote office, such as the remote Russell office (Fig. 2), which is also provided with conventional switching equipment for completing nonticketed calls to local subscribers and with trunks which extend to various geographically remote areas having exchanges to which calls to be ticketed are automatically extended from the Russell office.

Since both the Hudson and Russell offices are provided with automatic dial equipment capable of extending toll calls which are to be automatically ticketed, both of these offices are provided with information collecting and storing equipment which includes common means for determining and storing, in register means comprising a plurality of trunk recorders each individual to a trunk circuit, the identification of the called station and office, the identification of the calling station, the date and time at which the call was filed or placed, and the dura-of the call. Since the Hudson and Russell offices are geographically remote from each other, the information collecting and registering means provided therein are entirely separate and independent in their operation to provide the above identified items of information. However, in view of the cost of the recording equipment and its associated control equipment, a common recording equipment is provided in the Hudson office which is capable of providing permanent records of the items of information stored in both the registering means in the Hudson office and those similar means which are provided in the remote Russell office. This recording equipment includes means for storing all of the items of information enumerated above, an office code translator for translating the called office digits into alphabetical characters, a rate and route marking circuit partially controlled by the office code translator or interpreter, a charge computer or calculator which utilizes information from the rate and route marking circuit and the duration of each call for determining the monetary charge to be assessed therefor, and a recording means in the form of either an automatically operated printer or perforator which provides permanent records individual to each toll call.

A playback operation, during which the individual tickets or permanent records are produced in accordance with the stored items of information at the various offices, is initiated at selected chronological intervals, manually, or in response to an emergency start condition caused by one of the registers becoming filled with stored information. In response to any of these starting conditions, a readout control circuit associated with the recording apparatus is rendered effective to seize one or more playback control circuits, each having access to a group of the local trunk recorders. These trunk recorders or registers are successively interconnected with the recording apparatus through the seized playback control circuits to control the production of printed or perforated tickets, each corresponding to one of the plurality of calls concerning which information has been recorded in the seized trunk recorder.

When it is desired to print tickets in accordance with items of information stored in the registers located at the remote Russell office, the readout control circuit seizes a remote playback control circuit located in the remote Russell office over a carrier link, communication between the Hudson and Russell offices over the carrier link being accomplished by a plurality of modulators and demodulators having both pulse transmitting and control functions. In this manner, the common recording equipment at the Hudson office is effective to produce printed or perforated toll tickets in accordance with the items of information stored either locally in the Hudson office or in the remote Russell office.

GENERAL OPERATION OF THE SYSTEM

*Operation of the system on local calls*

In order to place a nonticketed call from a subscriber at a substation A located in the Hudson office to another local subscriber at a substation B also located within the Hudson office, the call is initiated by the calling subscriber lifting the handset from its cradle to actuate the cradle switch at the substation A, thus closing a calling loop circuit over the line circuit 140 in the Hudson exchange. When this loop circuit is closed, the line circuit 140 applies start ground potential to the sleeve conductor of the line multiple terminating at this line circuit and thus marking the line against seizure on incoming calls. Also, incident to operation of the line circuit 140, the numerical identity of the calling line is marked in the bank contacts of the finders, including the finder 141, having access to this line, and start ground potential is applied to a common allotter start lead extending to an allotter 145. This allotter first functions to find an idle link in the group having access to the calling line and, following the seizure of an idle link comprising a finder and a selector, a finder such as the finder 141, operates in conjunction with the allotter 145 to step the wipers thereof in two directions until the wipers are moved into engagement with the contacts terminating the line multiple individual to the line circuit 140. When the line finding operation is thus completed, the allotter 145 is dismissed, and the calling loop circuit is extended through the finder 141 to a selector 142 which forms the other portion of the link. In response to this operation, the selector 142 returns dial tone to the calling subscriber at the substation A to indicate that the dialing operation can be initiated.

The first digit dialed at the calling substation produces a response in the selector 142 which results in the wipers of this selector being positioned opposite the level of bank conductors in which are terminated trunks extending to the connectors of the group having access to the called substation B and which includes a connector similar to the connector 143. Also, in response to the impulses provided by the dialing of the first digit, the selector 142 terminates the transmission of the dial tone to the calling substation A. During the interdigit pause separating the first digit and the second digit which is to be dialed, the selector 142 tests the idle or busy condition of the connectors having seizure trunks terminated in the selected contact bank level and positions its wipers on the contacts thereof terminating the seizure trunk extending to the first idle connector, such as the connector 143, in the selected group. Thereafter, upon seizure, the calling loop circuit is extended to the connector 143 in preparation for receiving the impulses of the second and succeeding digits dialed at the calling substation A.

The connector 143 responds to the impulses of the second digit by moving its wipers in one direction to position the same opposite the associated group of bank contacts terminating the subgroup of ten lines including the called line extending to the subscriber at the substation B. During the interdigit pause separating the second and third digits, the connector 143 is conditioned to drive its wipers in a second direction to select the particular desired line. Accordingly, when this third digit is dialed, the connector 143 positions its wipers on the bank contacts terminating the line multiple of a line circuit 144 to which the called substation B is connected. Thus, the calling line is selected. The fourth and final digit dialed at the calling substation A conditions the connector 143 to transmit ringing current to the called substation B after the completion of a busy test operation. However, it should be understood that, depending upon the size of the Hudson office, it may be necessary to dial more than four digits to control the operation of interposed switching equipment such as the selector 142 and the connector 143 in order to extend a local connection from the calling substation A to the called substation B.

Assuming that the line extending to the substation B tests idle, the connector 143 automatically applies ground potential to the sleeve lead of the line multiple individual to the calling line circuit 144 to guard this line against subsequent seizure by other connectors having access thereto and, substantially coincident therewith, transmits ringing current to the called substation B. Concurrently with transmission of ringing to the called line, the usual ringback tone signal is transmitted over the calling loop circuit to inform the subscriber at the substation A that the called substation is being rung.

When the call is answered at the substation B, the connector 143 is automatically shifted to a talking position in which voice currents are transmitted in either direction between the substations A and B. When the desired connection is released, either upon release by the calling party or the last party, the connector 143 removes holding ground potential from the sleeve conductor of the extended connection, thereby permitting the circuit components 140, 141, 142, 143, and 144 to be restored to a normal condition.

*Operation of the system to collect and store items of information pertaining to toll calls*

A call to a remote exchange, such as an exchange located in the Cleveland area, which is to be automatically ticketed by the system of the present invention, is initiated at the substation A in the same manner described above in conjunction with a local call by the subscriber removing the handset from the cradle thus closing the cradle switch and extending the calling line loop to the line circuit 140. Thereafter, the allotter 145 is operated to cause the extension of the calling line loop through the finder 141 to the selector 142.

The first digit to be dialed by the calling subscriber in extending a toll call to a remote area or exchange is an access digit by which the selector 142 is operated to select a bank contact level in which are terminated trunk circuits extending to the desired area. Assuming that the call is to be extended from the substation A in the Hudson office to a substation C located in an exchange in the Cleveland area, an access digit "9" is dialed. The selector 142, in responding to these impulses, positions its wipers opposite the ninth level of bank contacts in which are terminated the seizure trunks extending to the trunk circuits which terminate the interoffice trunks extending to the Cleveland area. During the interdigit pause separating the first and second digits, the selector 142 automatically moves its wipers across the bank contacts of the selected level in order successively to test the trunk circuits to determine the idle or busy condition thereof and switches through to the first trunk circuit, such as a trunk circuit 126, which tests idle.

In seizing the idle trunk circuit 126 which terminates an interoffice trunk extending to remote switching equipment 138 located in the Cleveland area, the selector 142 switches the calling loop circuit through to the trunk circuit 126 and thus conditions this circuit for receiving the next dialed digit.

The next or party digit, which is dialed by the subscriber at the substation A, is the first entry recorded in a trunk recorder 127 individually associated with the trunk circuit 126 and is not utilized for extending the connection to the called substation C. This digit has significance only in determining the directory number of a calling subscriber on a multiparty line but, since it is desirable to provide an identical number of units of information in the trunk recorder 127 in conjunction with all toll calls, even private line subscribers are required to dial the party digit which has no significance insofar as both the toll tickets for these subscribers and the extension of the connections are concerned.

In the event that the calling substation is provided with a conventional dialing device and is on a line having multiparty service provided on a terminal per line basis, the party digit which is dialed corresponds to the units or ringing digit of the calling subscriber directory number. This party digit is stored in the trunk recorder 127 and is utilized in preparing the toll ticket inasmuch as the value of this digit indicates the position of the substation on the line and forms the units digit of the calling line identification. However, as set forth above, this digit is not utilized in controlling the extension of the connection.

If the calling substation is provided with a conventional dialing device and is on a line having multiparty service provided on a terminal per station basis, the assigned party digit does not form a part of the directory number of the calling subscriber but is utilized in the automatic identification equipment to aid in determining the entire directory number of the calling substation.

In addition, if the calling substation is provided with a modified dialing device of the type shown in either Morris Patent No. 2,691,070 or MacCheyne Patent No. 2,691,071 and is on a terminal per station multiparty line, the dialed party digit has an arbitrary value and is provided merely to insure a uniform number of items of information for calls placed from different types of substations. In modified dialing devices of the above type, additional contacts are provided which are selectively controlled during windup operations to transmit ground impulses to control the operation of the trunk circuit 126 during successive dialing operations, thereby to automatically provide an indication of the position of the calling subscriber on a multiparty line.

Returning now to the general operation of the system, following the dialing of the access digit or digits, the calling line loop circuit is extended to the trunk circuit 126 to prepare a circuit for operating a stepping switch therein in accordance with the value of the party digit, to perform a test to determine if the calling substation is provided with a conventional or a modified dialing device, and to prepare a circuit for recording dialed digits in a magnetic trunk recorder 127 individual to the seized trunk circuit 126. The construction and operation of the trunk recorder 127 is fully disclosed in the copending application of Howard S. Gleason, Serial No. 378,209, filed September 3, 1953, now Patent No. 2,867,435. As set forth therein, the trunk recorder 127 comprises an endless loop of magnetic tape having mark and space pulse transducing heads disposed adjacent laterally spaced contiguous areas of the magnetic tape, thereby to provide two effective channels on the magnetic tape for receiving mark and space pulse information. The value of the digital information is recorded on the magnetic tape by providing a number of mark pulses on one of the channels of the tape which is representative thereof, and successive items of digital information are separated from each other by the interposition of a single space pulse in the other channel thereof. During recording operations, the magnetic tape is advanced step-by-step following the recording of each discrete pulse thereon.

Accordingly, the dialing of the assigned party digit by the subscriber at the calling substation A causes the trunk circuit 126 to provide a number of separate mark pulses on the magnetic tape in the trunk recorder 127 which is equal to the value of the party digit, and, thereafter, the trunk circuit 126 provides a space pulse in the space pulse channel thereof to separate the first item of information from successive items of information which are to be stored thereon. As set forth above, if the calling subscriber is on a private line, the party digit does not have any significance insofar as the identification of the calling party is concerned and, accordingly, may have any arbitrary value. The same is true if the calling substation includes a conventional or a modified dialing device and is on a line on which service is provided on a terminal per station basis. However, if the calling substation is on a line on which service is provided on a terminal per line basis, the number of pulses recorded in the magnetic trunk recorder 127 determines the value of the party or units digit of the calling subscriber directory number and is of significance in preparing a toll ticket. Accordingly, at this time the value of the dialed party digit which determines the units digit of the directory number of terminal per line subscribers is stored in the trunk recorder 127.

As indicated above, in addition to storing the party digit in the trunk recorder 127, the dialing of the party digit operates a stepping switch in the trunk circuit 126 to a position representing the value of the party digit. The wipers controlled by the stepping switch are selectively interconnected with a plurality of dialed party digit register relays so that the setting of the stepping switch selectively operates one or more of the dialed party digit register relays as an indication of the value of the dialed party digit. Since the value of the units digit of terminal per line multiparty subscribers is determined by the value of the party digit stored in the trunk recorder 127, the selective operation of the dialed party register relays on calls placed from terminal per line substations is not of any significance. However, with respect to substations on terminal per station multiparty lines in which the substation is provided with a conventional dialing device, the value of the dialed party digit, as determined by the selective operation of the dialed party register relays, partially controls the operation of the calling line identification equipment to determine the directory number of this type of subscriber. If the terminal per station multiparty subscribers are provided with modified dialing devices, the selective operation of the dialed party digit register relays is of no significance, and, as set forth above, the dialed party digit may have any arbitrary value.

The calling subscriber next dials the digits required to extend the connection to the called substation C which may comprise the seven digits forming a conventional 2–5 dialing code, i.e. three office code digits and four station number digits. The value of each of the dialed digits is directly recorded on the mangetic tape of the trunk recorder 127 in the form of seven groups of mark pulses, each including a number of pulses equal to the value of the digit in which the groups of mark pulses are separated by intervening space pulses. The stepping switch in the trunk circuit 126 is operated during the interdigit pauses separating the seven digits dialed to extend the connection to the called substation C, thereby to count the number of digits dialed. Following the counting of a selected number of digits, i.e. seven, the trunk circuit 126 prevents the recording of any additional digits on the tape of the trunk recorder 127.

As described above, when the calling loop circuit is extended to the trunk circuit 126, a test is made to determine the type of the dialing device provided at the calling substation, thereby to condition the trunk circuit 126 for different calling party identification operations. In the event that the calling substation A is provided with a modified dialing device of the type referred to above, grounded battery is applied to the trunk circuit 126 over the HS lead of the extended switch train to cause the operation of a relay in the trunk circuit 126 which conditions this circuit to count the party identification pulses automatically transmitted during the above described dialing of the conventional 2–5 dialing code. More particularly, the operation of this relay conditions a plurality of party identification relays in the trunk circuit 126 for sequential operation under the control of a party relay which is bridged across the tip and ring conductors of the extended calling loop circuit. The pulses transmitted during successive windup operations of the modified dialing device at the calling substation A intermittently operate the party relay so that after a selected number of dialing operations sufficient to provide a calling party identification, i.e. four dialing operations, a selected one of the counting relays is operated as an indication of the position of the calling substation on a multiparty line.

The stepping switch which, as described above, is successively advanced during the interdigit pauses separating the digits dialed to extend the connection to the called subscriber includes a wiper which, upon being advanced four steps, renders the party identification relays ineffective so that only the selected number of dialing operations are effective to control the setting of these relays. The pulses provided by the modified dialing device at the calling substation are only effective to control the operation of the party relay which is bridged across the tip and ring conductors and, accordingly, are not recorded on the magnetic tape of the trunk recorder 127. Accordingly, at the completion of the dialing of four of the seven digits required to extend the connection to the called subscriber, an identification of the position of the calling party on a multiparty line provided with modified dialing devices is provided by the selectively operated party identification relays in the trunk circuit 126.

Following the extension of the connection through the equipment 138 in response to the seven dialed digits, as described above, if the line of the called substation is engaged in a call or otherwise busy, busy tone is returned over the calling loop circuit to the substation A and the connection is released. However, if the called line circuit is idle and is seized, a supervisory relay in the trunk circuit 126 operates in response to the receipt of answer supervisory signals to initiate rotation of a timer cam individual to the circuit 126, to reset the stepping switch, and to connect the motor magnet thereof to a source of sixty i.p.m. signals so that the wipers thereof are stepped over the contacts associated therewith at one second intervals. Following a predetermined grace period during which the calling subscriber may release the connection without being charged for a toll call, a wiper of the stepping switch moves into engagement with a contact which is selectively strapped to the operating winding of an additional supervisory relay, thereby causing the operation of this relay.

The operation of the supervisory-assist relay associates the trunk circuit 126 and the trunk recorder 127 with a clock and calendar circuit 133, which is common to the plurality of trunk circuits located in the Hudson office. In the event that the clock and calendar circuit 133 is busy, the trunk circuit 126 holds until such time as the clock and calendar circuit is released and, following the release thereof, seizes this circuit so that a steering relay chain and a counting relay chain in the clock and calendar circuit 133 are rendered effective to sequentially transmit seven groups of mark pulses separated by space pulses to the trunk recorder 127 which represent the date and time at which the call is filed.

The clock and calendar circuit 133 includes separate units minutes, tens minutes, hours, day of week, date, and month register switches, all of which are sequentially operated under the control of one per minute impulses delivered from a timer cam and pulsing contact arrangement. In this manner the wipers of the plurality of stepping switches are continuously adjusted to marking positions representing the values of the tens and units minutes digits, the tens and units hours digits, the tens and units days digits, and a digital designation representing the month of the year. In order to distinguish calls placed during business hours from those placed during evening hours or on holidays, the circuit 133 increases the value of the tens hours digit which forms a portion of a twenty-four hour notation, i.e. "01" to "24," by an increment of "2" during business hours. In addition, the clock and calendar circuit 133 includes a calendar guard relay which prevents the seizure of the circuit 133 during either a manually initiated lamp display operation in which the settings of the circuit are visually checked or when the register switches are being advanced from a higher value digital registration to a lower value digital registration. The circuit associated with the calendar guard relay effectively stores an impulse which may be received from the cam controlled contacts during the guarded interval and subsequently utilizes this stored impulse to advance the register switches to a correct setting following the termination of either the display operation or a readout operation during which the circuit 133 transmits information to the trunk recorder.

In order to provide the series of mark and space pulses for transmission to the trunk recorder 127, the counting relay chain and the steering relay chain are provided, both of which are driven by an independent transistorized pulse generator. The steering relay chain renders the wipers associated with the plurality of register switches effective in a predetermined sequence to control different cyclic counting operations of the counting relay chain during which the mark and space impulses representing date and time information are transmitted to the trunk recorder 127.

Following the completion of the transmission of the date and time information to the trunk recorder 127, ground is applied from the trunk circuit 126 over a common allotter start lead extending to an identifier sender allotter circuit 129. The allotter circuit 129 is associated with a plurality of independent identifier sender-trunk finders, such as the elements 131 and 132, and, in response to the receipt of start ground on the allotter start lead, associates an idle one of the identifier senders, such as the identifier sender 131, with the trunk circuit by operating a trunk finder switch **131*a* to search for and seize the trunk circuit 126. In addition, the identifier sender allotter circuit 129 causes the operation of a cut-through relay individual to the seized identifier sender 131 to interconnect this circuit with an identifier circuit 130** which is common to all of the identifier sender-trunk finders.

Following the association of the seized identifier sender 131 with both the trunk circuit 126 and the identifier circuit 130, the allotter 129 operates an identification relay in the trunk circuit 126 to apply an identification tone back over the HS lead of the extended switch train to a terminal or lead individual to the calling line circuit. This lead or terminal is selectively interconnected with an identification matrix 128 in accordance with the digits forming the directory number of the calling substation.

The identification matrix 128 comprises ten individual party matrices and a terminal per line matrix. Each of the individual matrices comprises ten thousands, hundreds, tens, and units busses which are selectively interconnected with each of the individual line circuits through a plurality of resistors to provide passive element matrices. In response to the application of the alternating current identification potential to the HS terminal or lead individual to the calling line circuit 140, a voltage is applied over one each of the thousands, hundreds, tens, and units conductors in accordance with the values of the digits forming the directory number of the calling subscriber.

If the calling substation is located on a line on which party service is provided on a terminal per station basis, the HS terminals of the calling line circuit are connected to one or more of the individual party matrices in accordance with the different directory numbers of the stations on the line. The connections to the busses in each of the party matrices is determined by the values of the four digits forming the directory numbers of the substations on the line.

If the calling substation is on a line on which multiparty service is provided on a terminal per line basis, the HS terminal of the calling line circuit is connected to the busses in the terminal per line matrix in accordance with the values of the common thousands, hundreds, and tens digits of the directory number of the substation. The value of the units digit is determined by the value of the party digit dialed by the subscriber and which is recorded on the tape of the trunk recorder 127 and, accordingly, the units resistor of the four element cluster individual to a multiparty terminal per line, line circuit is connected to any arbitrary bus but preferably one representing a low value digit in order to reduce the number of the mark pulses which are subsequently stored in the trunk recorder and, accordingly, to reduce the length of the magnetic tape which is required to store this digit.

If the calling substation is located on a private line, the HS terminal of the line circuit is connected to a four element cluster in the terminal per line matrix so that single thousands, hundreds, tens, and units busses are energized in accordance with the values of the four digits forming the directory number of the calling substation.

As indicated above, a relay in the trunk circuit 126 is selectively operated upon extension of the calling line loop to this circuit to condition a counting relay chain therein for operation in accordance with station or party identification impulses transmitted by a substation having a modified dialing device. This relay is operated by a signal which is applied to the HS lead of the extended switch train by the identification matrix 128. More specifically, the HS terminals of calling line circuits having conventional dialing devices associated therewith are connected through resistors to ground in the matrix 128. On the other hand, grounded battery is connected to the HS terminals of the line circuits having modified dialing devices associated therewith. By this means, the trunk circuit 126 is provided with information indicating the type of the dialing device which is provided at the calling substation and, accordingly, conditions the trunk circuit 126 for different types of party identification operation.

Accordingly, the application of the alternating current identification potential to the HS terminal individual to the calling line circuit 140 causes the selective energization of single thousands, hundreds, tens, and units busses in accordance with the values of the digits forming the directory number of the calling substation. The common busses in the separate party matrices extend to the contacts of individually associated party matrix selection relays, and the busses in the terminal per line matrix extend directly to the input of the identifier circuit 130. Therefore, if the calling substation is located on a private line or on a line on which multiparty service is provided on a terminal per line basis, the input of the identifier circuit 130 is directly energized from the terminal per line matrix when the tone is applied thereto.

On the other hand, if the calling substation is provided with either a conventional or a modified dialing device and is on a multiparty line on which service is provided on a terminal per station basis, the selectively energized thousands, hundreds, tens, and units busses in the individual party matrices corresponding to the parties on the calling line are terminated in the contacts of the matrix selection relays individually associated therewith. One of the party matrix selection relays is selectively operated under the control of either the party digit register relays or the party identification relays in the trunk circuit 126. Therefore, since only a single one of the matrix selection relays is operated, only the energized busses in the selected party matrix are extended to the input of the identifier circuit 130. It should be noted that the dialing of an arbitrary digit by the calling subscriber when the calling substation is located on either a private line or a multiparty line on which service is provided on a terminal per line basis causes the operation of a matrix selection relay during an identification operation, but this does not provide false identifications at the input of the identifier circuit 130 inasmuch as the HS terminals of line circuits having these types of service are not connected to any of the party matrices but are connected only to the terminal per line matrix. Accordingly, the selective operation of a party matrix selection relay does not interconnect energized digit marking leads to the input of the identifier circuit 130 during the identification of other than terminal per station substations.

The identifier circuit 130 comprises four groups of ten amplifiers having thyratron tubes associated with the outputs thereof. Therefore, when the identifier circuit 130 is energized by the signals supplied over the common thousands, hundreds, tens, and units leads, a single digit manifesting thyratron tube is fired in each of the thousands, hundreds, tens, and units denominational groups of tubes, thereby causing the operation of correspondingly designated relays in the seized identifier sender circuit 131. Since the operation of these relays completes the determination of the calling line directory number, the operated identifier sender 131 signals the allotter circuit 129 to release both the common identifier circuit 130 and the identification matrix 128 so that these components are free to be associated with another identifier sender, such as the element 132, without waiting for the operated identifier sender 131 to complete the transmission of the information stored therein to the trunk recorder 127.

The identifier sender 131 includes four groups of ten register sender relays which are operated, as set forth above, to store the values of the four digits comprising the directory number of the calling subscriber. In addition to registering the values of these digits, the four groups of relays in the identifier sender provide pulsing or sending means for transmitting groups of mark pulses to the trunk recorder 127 of the seized trunk circuit 126 in accordance with the values of these stored digits. The identifier sender 131 includes a group of steering relays which sequentially permit each of the groups of relays to sequentially restore and, in doing so, to transmit four groups of mark pulses to the trunk recorder 127 with space pulses interposed therebetween. Following the transmission of the mark pulses representing the thousands, hundreds, tens, and units digits of the directory number of the calling substation, the identifier sender-trunk finder 131 is released and disconnected from the trunk circuit 126.

In the event that an adequate calling subscriber identification is not transmitted to the identifier sender 131 during a calling line identification operation, a no-identification relay in the trunk circuit 126 is operated to cause group busy tone to be applied to the tip and ring conductors of the extended connection and to also cause the trunk circuit 126 to apply an end-of-call or COE signal comprising simultaneous mark and space impulses to the magnetic tape of the trunk recorder 127. The operation of the no-identification relay also releases the extended connection, and, accordingly, the subscriber must reinitiate the call, thereby preventing the establishment of calls which must be ticketed without the provision of adequate identification information on the tape of the trunk recorder 127.

Referring back to the operation of the trunk circuit 126, the operation of the supervisory and supervisory-assist relays therein, which initiate the storage of date and time and calling line identification information in the recorder 127, also operates the timer clutch forming a portion of a timing mechanism individual to the trunk circuit 126. This timer mechanism, which is fully disclosed in the copending application of Armistead Wharton, Serial No. 430,548, filed May 18, 1954, now Patent No. 2,814,683, comprises pulsing contacts which are selectively controlled by a cam of a predetermined configuration which provides a mark pulse after a time interval of slightly more than one minute and subsequent mark pulses occurring at one minute intervals. The increased length of the original pulse provided by the individual trunk timer in the trunk circuit 126 provides a grace period corresponding to the inherent release or disconnect time of the extended switch train to prevent charging a subscriber for the time elapsed between the termination of the call by the subscriber and the completion of the release of the equipment to interrupt the storing of duration impulses in the trunk recorder.

These one minute duration impulses are applied to the trunk recorder 127 until such time as supervisory signals are received by the trunk circuit 126 indicating that the connection has been terminated. At this time the trunk circuit 126 transmits a space signal and a COE signal to the trunk recorder 127 which are recorded on the magnetic tape. Following the recording of the COE signal, the trunk circuit 126 applies a series of advance pulses to the trunk recorder 127 to provide a short tape runout, thereby to physically separate the data relating to successive calls on the tape. The termination of the call releases the switching equipment including the finder 141 and the selector 142, and also releases the trunk circuit 126 to permit this equipment to be seized for use in extending and completing additional toll calls.

At the time the trunk circuit 126 is released, the magnetic tape in the trunk recorder 127 has the following items of information recorded thereon in the form of groups of mark pulses separated from each other by space pulses:

(1) A dialed party digit.
(2) The directory number of the called subscriber.
(3) The date and time of placing the toll call in the following order:
  (*a*) Tens and units digits of the months designation as one group of mark pulses.
  (*b*) Tens and units days.
  (*c*) Tens and units hours.
  (*d*) Tens and units minutes.
(4) The directory number of the calling subscriber.
(5) The duration of the toll call in the form of a single group of mark pulses each representing a one minute interval.
(6) A COE signal representing the end of the items of information pertaining to a single toll call and comprising simultaneous mark and space pulses.

Obviously, the above information representing the items pertaining to only a single toll call can be endlessly repeated on the magnetic tape of the trunk recorder 127 within the recording capacity thereof in response to additional seizures of the trunk circuit 126.

In the event that a connection is to be extended to a substation D located in the Akron area, the subscriber initiates the call, as described above, to cause the line finder 141 to seize the calling line circuit 140 and to condition the selector 142 for operation. Assuming that, in order to reach the remote switching equipment 137 located in the Akron area, it is necessary to dial two access digits, i.e. "18." The first digit "1" dialed by the subscriber causes the wipers of the selector 142 to advance to the first level and, during the interdigit pause, to search over the first level of contacts to seize an idle selector, such as a selector 146. The calling subscriber then dials the second access digit "8" in response to the impulses of which the selector 146 advances its wipers to the eighth level of contacts. In the interdigit pause following the second dialed digit, the wipers in the selector 146 automatically test over the contacts in the eighth level to seize an idle trunk circuit, such as a trunk circuit 135, which terminates an interoffice trunk extending to the remote switching equipment 137 located in the Akron area and which has access to the line circuit of the called substation D. Incident to seizure of the trunk circuit 135, the calling loop is extended from the line circuit 140 to the trunk circuit 135 having individually associated therewith a magnetic trunk recorder 136.

Following the seizure of the trunk circuit 135, the subscriber at the substation A dials the conventional 2–5 dialing code to extend the connection through the remote switching equipment 137 to the called substation D. The trunk circuit 135 then controls the transmission of the items of information pertaining to the call to the trunk recorder 136, which items are established under the control of the clock and calendar circuit 133, the identification matrix 128, the identifier circuit 130, the identifier senders 131 and 132 and the identifier sender allotter 129, as set forth above.

Referring now to the remote Russell office shown schematically in Fig. 2 of the drawings, therein is located common information collecting and registering equipment 245 which is similar to that located in the Hudson office. More specifically, this common equipment includes an identifier circuit, a group of identifier sender-trunk finders, an identification matrix, an identifier sender allotter, a plurality of trunk circuits and associated trunk recorders, all of which operate in the manner set forth above in conjunction with the description of the similarly designated units of equipment in the Hudson office. The automatic dial equipment provided in the Russell office has access to interoffice trunks through these trunk circuits so that, in extending a call which is to be automatically ticketed, the same items of information are provided in the trunk recorders located in the Russell office as are provided in the trunk recorders 127 and 136 located in the Hudson office. Each of the trunk recorders is capable of storing items of information pertaining to a plurality of calls.

*Operation of the systems to record the stored information*

In order to provide a permanent record of the items of information stored in the Hudson and Russell offices, a common recording equipment (Fig. 2) is provided which may be located in the Hudson office. This common equipment sequentially seizes each of the individual trunk recorders such as the recorders 127 and 136 located in the Hudson office and causes the transmission of the registered information stored therein to control the operation of a recorder 220 which provides either a printed or a perforated record, each individual record containing the items of information pertaining to a single toll call. This recording equipment is also rendered effective over a carrier link extending to the Russell office to cause the transmission of the information stored in the remotely located trunk recorders in the Russell office to the Hudson office wherein individual records including the items of information stored in the trunk recorders in the Russell office are provided.

More specifically, in normal operation, a readout control circuit 210 is placed in operation under the control of a start ground signal provided by the clock and calendar circuit 133 over a start conductor 161 at a selected time, preferably in the early hours of the morning when traffic is at its lowest level. The application of start ground to the readout control circuit 210 initiates operation of a stepping switch 210*a* associated therewith to advance over a plurality of contacts associated therewith to which are connected a plurality of contacts associated therewith to which are connected a plurality of playback control circuits, such as the playback control circuit 200. Each of the playback control circuits has access to a plurality of trunk recorders, so that, in response to seizure of the playback control circuit 200, a stepping switch 200*a* is operated to search for and seize in sequence the plurality of trunk recorders to which it has access, including the recorders 127 and 136. In response to the seizure of the trunk recorder 127, the readout control circuit 210 causes a plurality of register circuits 240, 250, 260, 280, and 290, and a charge computer 270 to be reset to a normal condition to prevent an incorrect storage of information due to spurious operation of the registers by the transient voltages due to the switching operations during which the trunk recorder 127 is seized.

In addition, the playback control circuit 200, in seizing the trunk recorder 127, completes a path from the transducing heads in the trunk recorder 127 through amplifying means in the playback control circuit 200 and the readout control circuit 210 to a common mark pulse conductor 211 and a space pulse conductor 212, which latter conductor extends to a steering circuit 230. Further, as an incident to seizure, a clutch magnet in the trunk recorder 127 is energized to rapidly advance the magnetic tape therein past the transducing heads to generate mark and space pulses, and an erase head also forming a part of the trunk recorder 127 is energized to erase the magnetic tape as the stored mark and space pulse information is transmitted.

The steering circuit 230, which is energized by the space pulses applied to the conductor 212, comprises a gaseous tube counting chain which is advanced step-by-step in response to the receipt of each space pulse. Each of the tubes forming the steering chain is connected through a steering cable 231 to the input or drive tube in each of the plurality of digit registers in each of the following register groups:

(1) A clock and calendar register circuit 280;
(2) A calling station number register circuit 260;
(3) A called station number register circuit 250;
(4) A called office register circuit 290; and
(5) An elapsed time register circuit 240.

Since the items of information stored on the magnetic tape in the trunk recorder 127 are transmitted therefrom in the same order that they are recorded on this tape during an information collecting and registering operation, the interconnections between the steering circuit 230 and the plurality of register circuits are such that the groups of mark pulses representing the items of information are sequentially applied to the correct ones of the electronic registers. Accordingly, the steering circuit 230 causes the items of information pertaining to a single toll call to be sequentially applied to the corresponding register circuits provided therefor in the recording equipment.

Each of the register circuits, such as the clock and calendar register circuit 280, comprises a plurality of gaseous tube counting chains which are operated step-by-step in accordance with the number of mark pulses applied thereto. Since the number of mark pulses represents the value of the digit to be stored, the on condition of a selected tube in each of the digit counting chains represents the value of the digits stored on the magnetic tape of the seized trunk recorder 127.

Since the first item of information stored in conjunction with each toll call is the dialed units or party digit, this item is the first item to be stored in the electronic registers associated with the recording equipment located in the Hudson office. Accordingly, the input of the dialed party digit counting chain in the calling station number register circuit 260 is rendered effective by the steering circuit 230 to receive the first group of mark pulses representing the value of the dialed digit which, as set forth above, may either have an arbitrary value or may have a value representing the units digit of the directory number of a calling subscriber on a multiparty line on which multiparty service is provided on a terminal per line basis.

Following the storage of this item of information, the next three space pulses received by the steering circuit 230 sequentially render the inputs to three called office code digit counting chains forming the called office register circuit 290 responsive to the mark pulses on the common conductor 211. Accordingly, the next three groups of mark pulses operate the three sequentially conditioned digit counting chains in the called office register circuits so that the three dialed digits representing the designation of the called office are stored in the called office register circuit 290.

Since the digits identifying the called office are normally expressed as two alphabetical characters and a single numerical character, an office code interpreter circuit 295 is provided which is connected to the anode circuits of the tubes forming the counting chains in the called office register circuit 290. Following the storage of the three called office code digits, the readout control circuit 210 causes the office code interpreter circuit 295 to translate the digital information in the called office register circuit 290 into marking conditions representing two alphabetical characters and a single numerical character, which information is subsequentially utilized to provide a permanent printed or perforated record of the called office designation. In addition, a portion of the information provided by the translation of the called office code digits by the office code interpreter 295 is applied to a rate and route marking circuit 275 to establish one portion of the information needed for establishing the rate at which the monetary charge is to be established for the call.

The rate and route marking circuit 275 is also provided, by either the playback control circuit 200 or by the readout control circuit 210, with an item of information designating the office in which the calling subscriber is located. This information is utilized by the rate and route marking circuit 275 in conjunction with the information relating to the called office provided by the office code interpreter circuit 295 to establish a rate structure which is transmitted to the cost computer 270 for use therein in establishing the monetary charge to be assessed for the toll call. In addition, the rate and route marking circuit 275 utilizes the information relating to the calling office to provide information pertaining to the alphabetical and numerical designation of the calling office to the calling station number register circuit 260 so as to provide marking conditions therein representing the two alphabetical characters and the single numerical character forming the designation of the calling office.

More specifically, the rate and route marking circuit is provided with information relating to the designation of local calling offices by the playback control circuit 200. When the stepping switch 200*a* associated with the playback control circuit 200 seizes a trunk recorder, such as the trunk recorder 127, this switch marks a contact similar to the contact connected to the conductor 201 which extends to the rate and route marking circuit 275. The marking condition on the conductor 201 is representative of the calling office inasmuch as each trunk recorder and its associated trunk circuit are used in extending calls from only a single office or exchange, such as the Hudson office. Accordingly, the seizure of the trunk recorder 127 by the playback control circuit 200 provides a marking condition on the conductor 201 indicating to the rate and route marking circuit 275 that the calling station is located in a particular office. In a similar manner, when the playback control circuit 200 seizes the trunk circuit 135 and its associated trunk recorder 136 for a playback operation, a marking condition is established on a conductor 202 which indicates to the rate and route marking circuit 275 that the calling subscriber is located within a designated office.

Simultaneously with the operation of the office code interpreter circuit 295 and the rate and route marking circuit 275, the steering circuit 230 sequentially renders a thousands digit counting chain, a hundreds digit counting chain, a tens digit counting chain, and a units digit counting chain forming the called station number register circuit 250 effective so that the next four groups of mark pulses transmitted from the seized trunk recorder 127 selectively operate these counting chains to manifest the values of the thousands, hundreds, tens and units digits forming the directory number of the called substation.

Thereafter, the steering circuit 230 sequentially renders a months counting ring and chain, a tens days counting chain, a units days counting chain, a tens hours counting chain, a units hours counting chain, a tens minutes counting chain, and a units minutes counting chain sequentially effective to receive the next seven groups of mark pulses transmitted from the seized trunk recorder 127 so that tubes are selectively fired in the clock and calendar register circuit 280 to manifest the values of the digits forming the date and time information.

The steering circuit 230 next renders the elapsed time register circuit 240 effective, which circuit comprises a units minutes counting ring and a tens minutes counting chain. Accordingly, the series of mark pulses representing one minute intervals of elapsed time in the length of time that the connection was established are applied to the elapsed time register circuit 240 and are counted therein to provide an indication of the length of the toll call.

Simultaneously therewith, the mark pulses are transmitted from the elapsed time register circuit 240 to the cost computer 270. The cost computer 270 comprises a base time counting chain, a pair of binary counting stages forming a nickels or five cents counting arrangement, a ten cents or dimes counting ring, and a dollars counting chain. As set forth above, the rate and route marking circuit 275 provides the cost computer 270 with the rate structure at which the charge to be assessed for the call is to be established. This rate structure includes a minimum base time period for which a minimum charge is made, and the rate and route marking circuit 275 causes the counting means in the charge computer 270 to be primed with the predetermined minimum base charge which is to be charged for the mase time interval. The rate structure also includes an overtime charge whereby a selected increment of cost is added to the basic charge for various overtime intervals.

In operation, the duration impulses supplied from the elapsed time register circuit 240 are applied to the base time counting chain so that, following the predetermined time established by the rate structure for which the minimum charge has been established, the duration impulses are applied directly to the counting chains so that these counting chains are sequentially operated in steps of varying monetary value to vary the basic charge in accordance with the length of the overtime interval to provide thereby a monetary charge which is to be assessed for the toll call, this charge being manifested by a plurality of selectively fired tubes.

Following the transmission of the elapsed time or duration information from the seized trunk recorder 127, a COE signal comprising simultaneous mark and space pulses is transmitted to the readout control circuit 210. The receipt of this signal causes the operation of a COE relay to arrest movement of the magnetic tape in the trunk recorder 127, thereby to terminate the transmission of mark and space information from the trunk recorder 127 to the recording apparatus. In addition, the receipt of a COE signal together with the preceding operation of a call-complete relay, which indicates that the necessary amount of information has been received by the plurality of electronic registers, causes the operation of a plurality of prepare-to-read relays, the operation of these relays conditioning the plurality of tube registers for controlling the operation of the recorder 220.

In order to sequentially apply the stored items of information to the recorder 220, a readout relay counting chain is provided. The contacts of the counting chain relays sequentially interconnect the anode circuits of the tube registers with a common readout cable extending to a plurality of readout relays in the readout control circuit 210, which relays directly control the selective operation of permutation means for controlling the operation of either a conventional perforator or an automatic typewriter or printer. Therefore, as the readout relay chain is sequentially advanced, the various items of information forming a toll ticket are transmitted to the recorder 220 in accordance with the step-by-step operation of the relays forming the chain. Some of the relays do not include contacts which are interposed in the anode circuits of the tubes in the registers but include contacts which are selectively closed to ground combinations of conductors extending to the readout control circuit 210 which represent either control operations such as a carriage return or punctuation characters which are interposed between the various items of numerical and alphabetical information.

When the readout relay chain has reached the end of its cycle of operation, a plurality of relays are operated to cause successive carriage return operations of the recorder 220, thereby to space out the end of the paper web. Concurrently therewith, a reset relay in the readout control circuit 210 is operated to remove the registered items of information from the gaseous tube counting chains and rings forming the electronic register circuits. When the last relay in the counting chain is operated, a severing or cutting solenoid is energized, thereby to cause ticket severing means associated with the recorder to sever the spaced out end of the web to form a discrete ticket which is displaced by ejecting means into a receptacle adapted to receive a plurality of such tickets. The severing and ejecting means may be of the types disclosed in the copending applications of Howard S. Gleason, Serial No. 397,185, filed December 9, 1953, and of Armistead Wharton and Richard Dever, Serial No. 532,-072, filed September 1, 1955, now Patent No. 2,780,288. Concurrently with the severing of the ticket and the resetting of the gaseous tube registers, movement of the magnetic tape in the seized trunk recorder 127 is reinitiated so that mark and space pulses are again transmitted to the electronic register circuits under the control of the steering circuit 230 to provide stored items of information for controlling the next cycle of operation of the recorder 220.

In this manner, all of the items of information relating to the toll calls recorded on the tape of the trunk recorder 127 are played back to the common recording apparatus in the Hudson office to cause the production of a plurality of discrete permanent records, each containing the items of information pertaining to a single toll call. However, in the event that any of the calls relate to incomplete calls concerning which inadequate information is stored in the gaseous tube registers, the readout control circuit 210 is provided with means for clearing the registers without causing the operation of the recorder 220.

Following playback of all of the items of information stored on the tape of the seized recorder 127, the seized playback control circuit 200 is rendered effective to sequentially seize the remaining trunk recorders, such as the trunk recorder 136, so that the items of information stored therein are recorded on permanent records under the control of the readout control circuit 210. Thereafter, following a time interval during which information is not transmitted to the readout control circuit, time responsive means therein operate to cause the stepping switch 210*a* to seize the next idle playback control circuit, similar to the playback control circuit 200. Thereafter, this seized playback control circuit causes the transmission of the items of information stored in the plurality of trunk recorders to which it has access, the tape in each recorder being erased following the transmission of the items of information to the recording apparatus.

In order to transmit the items of information stored in the collecting equipment 245 located in the remote Russell office, the stepping switch 210*a* seizes local carrier equipment 215. This equipment provides a seizure signal which is transmitted over an intervening link, such as a telephone line, to remote carrier equipment 225, which seizes the playback control circuit 235. More particularly, the local carrier equipment 215 includes an erase modulator, a clutch modulator, a local hold demodulator, a space pulse demodulator, an alarm demodulator, and a mark pulse demodulator which are coupled to the carrier link through band pass filters, there being four frequencies assigned for transmitting mark, space, clutch, and erase information between the Hudson and Russell offices. The four frequencies are selected in the audio frequency range so that they are satisfactorily transmitted over a telephone line between the Hudson and Russell offices without excessive attenuation and phase shift. Further, the frequencies are so allocated in the frequency spectrum which is efficiently transmitted by a telephone line so as to leave a portion of the frequency spectrum available for use in transmitting conventional telephone signals over the line. Therefore, the conventional telephone equipment located in the Hudson and Russell offices is coupled to the line by a low pass filter which isolates the telephone signals from the carrier signals.

The Russell office is provided with a mark modulator, a space modulator, a clutch demodulator, and an erase demodulator. The mark and space modulators in the Russell office, following the seizure of a trunk recorder in the information collecting and storing equipment 245 by the playback control circuit 235, provide mark and space pulse modulated carrier signals which are demodulated by the space and mark pulse demodulators in the local carrier equipment 215 at the Hudson office, these demodulators providing mark and space pulses which control the operation of the steering circuit 230 and the electronic registers in the same manner as the mark and space pulses provided by the local trunk recorders 127 and 136. The clutch modulator in the local carrier equipment 215 is intermittently operated by the readout control circuit 210 to control the movement of the magnetic tape in the seized trunk recorder in the Russell office by transmitting a clutch carrier or tone signal to the remote carrier equipment 225 wherein it is demodulated by the clutch signal demodulator. The erase modulator in the local carrier equipment 215 transmits an erase carrier signal over the carrier link to cause the erase head associated with the seized trunk recorder to be selectively energized under the control of the erase demodulator to remove the transmitted information from the magnetic tape of the seized trunk recorder.

Following the playback of a seized trunk recorder in the equipment 245 in the Russel office, the remote playback control circuit 235 sequentially seizes the remaining trunk recorders located in the Russell office to cause the transmission of the stored information to the recorder 220 in the Hudson office. Following the playback of all of the items of information stored in the trunk recorders in the Russell office, the remote playback control circuit 235 is released by the readout control circuit 210, and the operation of the remote and local carrier equipment 225 and 215 is terminated.

As indicated above, the readout control circuit 210 provides the rate and route marking circuit 275 with information relating to the office in which the calling subscriber is located. More specifically, when the stepping switch 210*a* associated with the readout control circuit 210 is moved into engagement with the contacts to which is connected the local carrier equipment 215, an additional wiper of the stepping switch marks a conductor 213 which extends to the rate and route marking circuit 275. Since all of the information transmitted from the Russell office relates to toll calls placed from the remote Russell office, movement of the switch 210*a* into a position in which the local carrier equipment 215 is seized indicates to the rate and route circuit 275, by means of the conductor 213, that all of the data next to be stored in the electronic registers relates to calls placed from the Russell office. This information, as set forth above, is utilized not only to provide a portion of the rate structure which is supplied to the charge computer 270 but is also utilized to provide calling office designation information to the calling station number register circuit 260.

Following the playback of all of the stored items of information in both the Hudson and the Russell offices, operation of the readout control circuit 210 is terminated until such time as it is next initiated under the control of the clock and calendar circuit 133.

In order to prevent a trunk recorder, such as the recorder 127, from holding its associated trunk circuit, such as the circuit 126, out of service when the magnetic tape in the trunk recorder 127 becomes filled with items of information, operation of the readout control circuit 210 may be initiated in response to this emergency condition. In the case of the trunk recorders 127 and 136 which are located in the Hudson office, ground is applied to an emergency start lead by the filled trunk recorder which initiates operation of the readout control circuit 210 to seize only the playback control circuit having access to the filled recorder and operation of the seized playback control circuit to seize only the filled trunk recorder. Following the transmission of all of the items of information stored on the tape of the filled recorder, the readout control circuit 210 and the seized playback control circuit are returned to a normal condition. In a like manner, the filled condition of a trunk recorder located in the Russell office is signified by a tone frequency or carrier signal which is transmitted over the carrier link by the remote carrier equipment 225 and demodulated by the local carrier equipment 215 to cause the application of an emergency start condition to the readout control circuit 210. This emergency start signal initiates a cycle of operation of the readout control circuit 210 during which the remote playback control circuit 235 is seized and the filled trunk recorder is seized and played back. Following the readout of the filled recorders, the system is returned to a normal condition.

To facilitate an easy understanding of the detached contact type of drawings utilized in the following description of an illustrated embodiment of the invention, a combined numerical and alphabetical designation has been utilized to identify many of the relay structures and manually operated keys forming the schematic circuit diagram of the automatic toll ticketing system. The windings of the relays are identified by one or more numerical digits indicating the figure of the drawings on which the relay winding is to be found followed by a group of alphabetical characters designating the relay. The contact pairs of the various relays in the schematic circuit diagram are also designated by a composite alphabetical and numerical designation in which one or more numerical characters identifying the figure of the drawings on which the contact pair is located is followed by a group of alphabetical characters indicating the relay of which the contacts form a part. One or more numerical characters are added to this designation to individually designate the different contacts of the same relay appearing in a single figure of the drawings.

Figure 11:
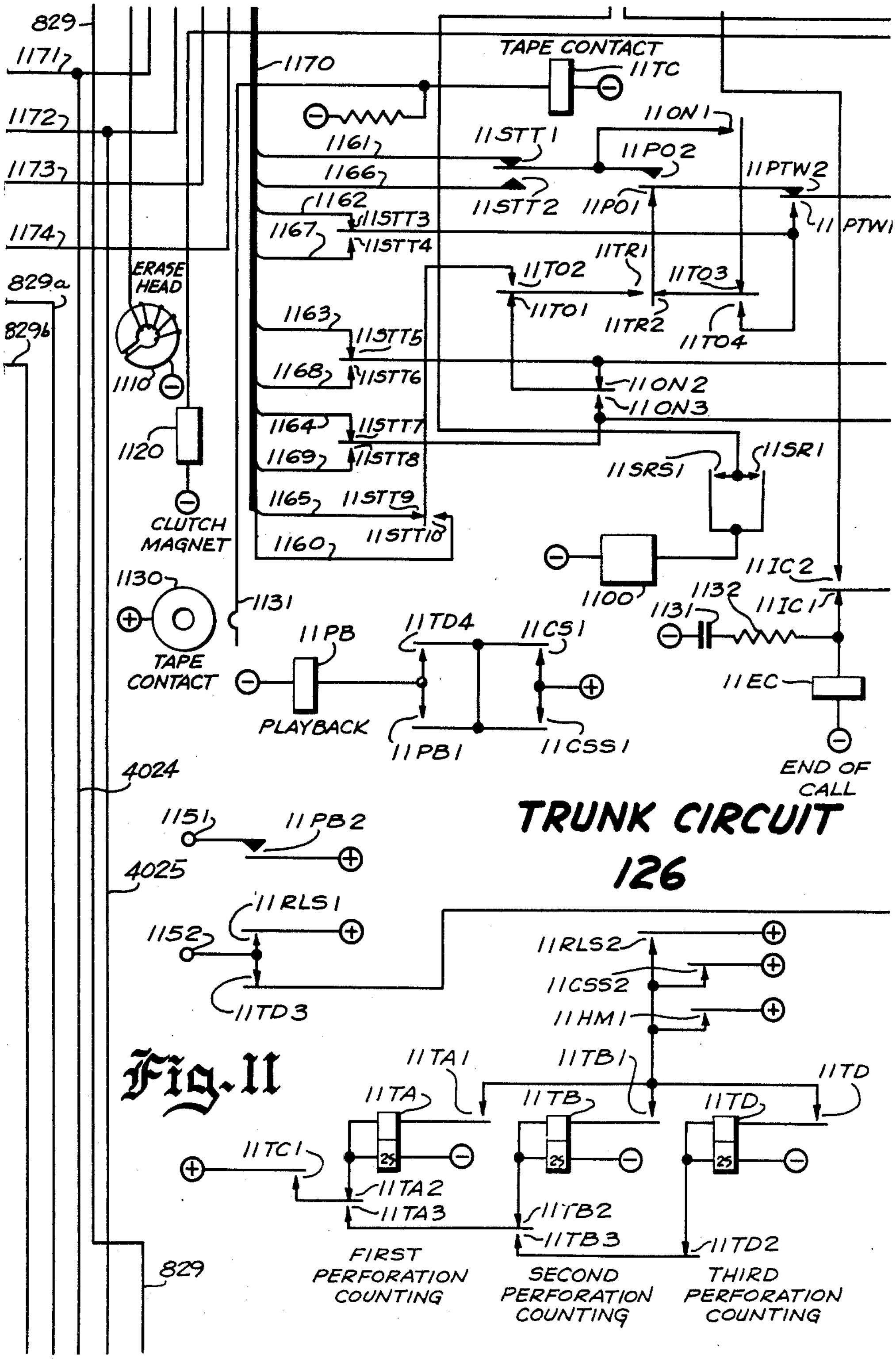
Figure 12:
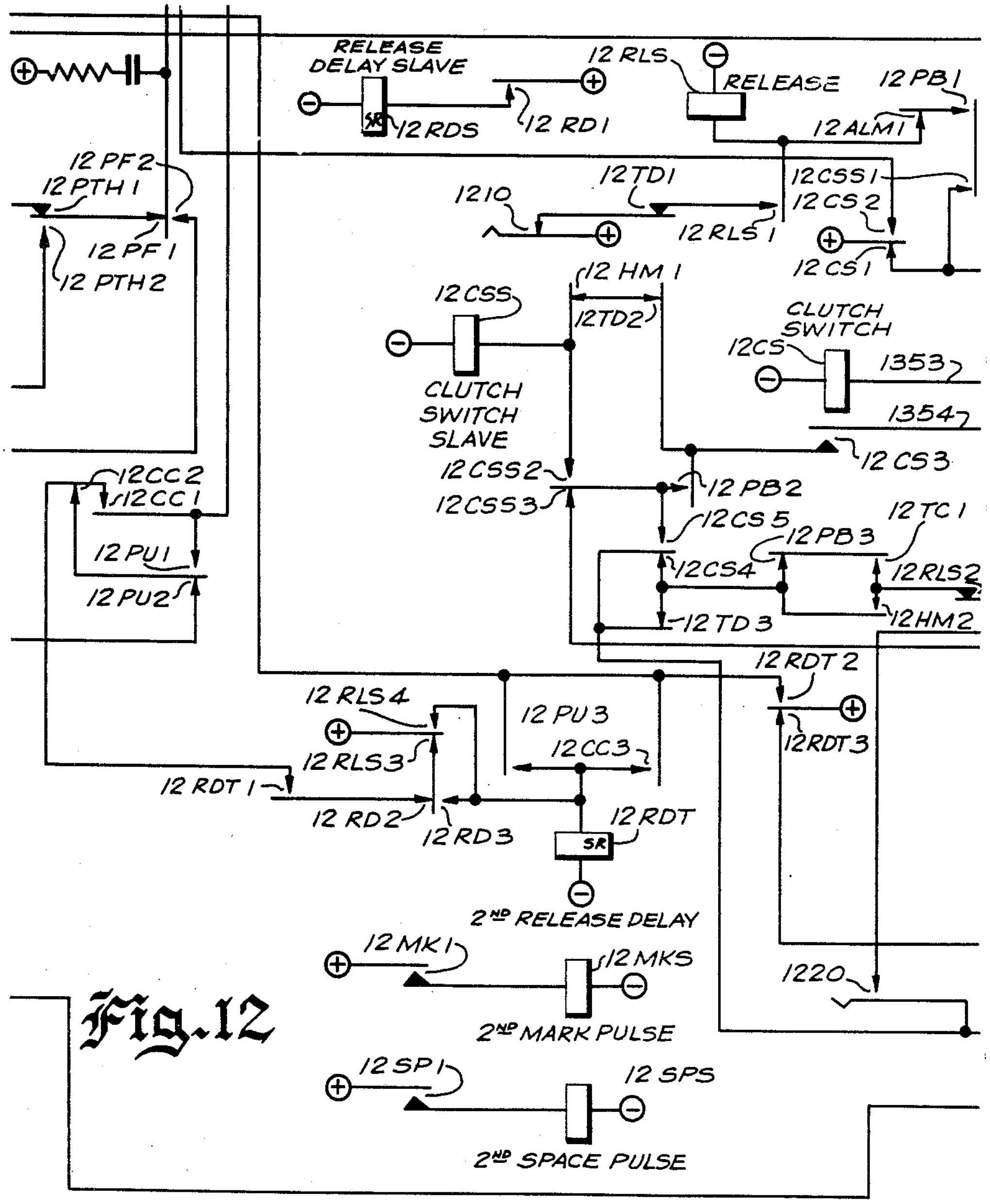
Figure 13:
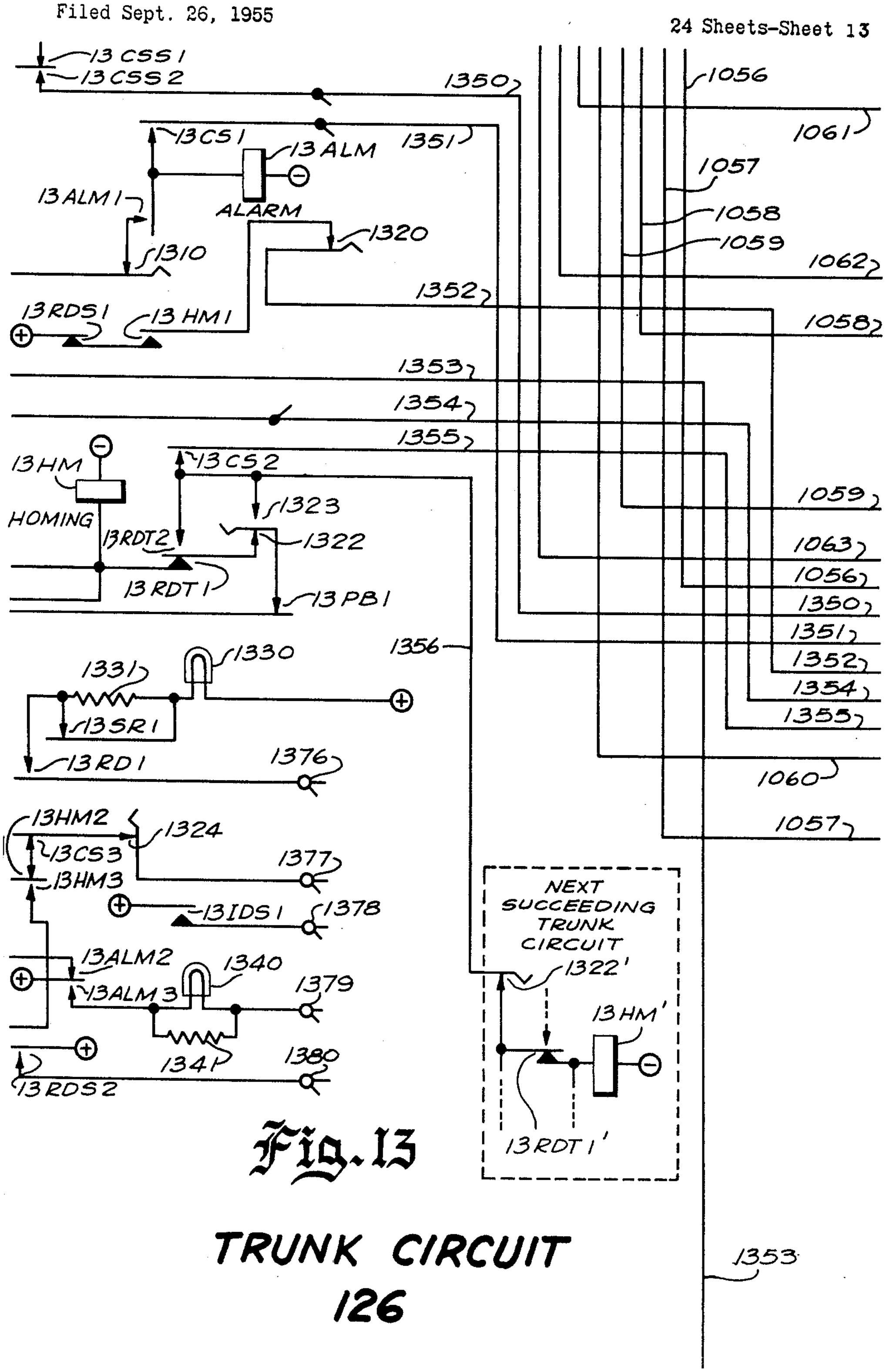

As an example, a clutch switch slave relay having an operating winding located on Fig. 12 of the drawings is designated 12CSS, and the contacts of this relay which are also located in Fig. 12 of the drawings are designated 12CSS1, 12CSS2, and 12CSS3. A single contact pair forming a part of this relay also appears in Fig. 11 of the drawings and, accordingly, is designated 11CSS1, to indicate the first contact pair of the CSS relay located in Fig. 11.

In addition, certain of the keys forming a part of the schematic diagram and which may be either automatically or manually operated are designated by one or more alphabetical characters identifying the key. The contacts on the key are designated by one or more numerical characters indicating the figure of the drawings on which the contacts are located followed by the alphabetical characters identifying the key and one or more numerical characters individually designating the different contact pairs of the key which appear in the same figure of the drawings. For instance, a months key MOK includes contacts 14MOK1, 14MOK2, 14MOK3, 17MOK1, and 17MOK2 located in Figs. 14 and 17 of the drawings, a group of contact pairs of this key being provided in each of these figures.

The remaining components in the schematic diagram are identified by solely numerical designations in which the digits other than the last two designate the figure of the drawings on which the element is located. For instance, a jack located in Fig. 5 of the drawings is designated as 500.

To aid in locating the alphabetically designated relays and keys of the automatic toll ticketing system in the figures of the drawings forming a schematic illustration thereof, the following table lists, in alphabetical order, the circuit components together wtih the figure of the drawings in which the relay winding is located and the figure or figures of the drawings in which the various listed contacts controlled thereby are provided.

| Component | The Relay Winding Is In Figure— | The Contacts Are In Figure or Figures— |
|---|---|---|
| ADK | ---- | 15-1 |
| ALC | 18 | 18-1<br>18-2<br>18-3 |
| ALK | ---- | 18-1 |
| ALM | 13 | 5-1<br>10-1<br>12-1<br>13-1<br>13-2<br>13-3 |
| ALO | 18 | 17-1 |
| ALT | 18 | 18-1<br>18-2<br>19-1 |
| BC | 5 | 5-1<br>9-1 |
| CB | 5 | 7-1<br>7-2<br>10-1<br>10-2 |
| CC | 9 | 8-1<br>9-1<br>9-2<br>10-1<br>12-1<br>12-2<br>12-3 |
| CG | 14 | 14-1<br>17-1 |
| CS | 12 | 9-1<br>9-2<br>9-3<br>9-4<br>9-5<br>9-6<br>9-7<br>9-8<br>9-9<br>10-1<br>10-2<br>11-1<br>12-1<br>12-2<br>12-3<br>12-4<br>12-5<br>13-1<br>13-2<br>13-3 |
| CSS | 12 | 9-1<br>11-1<br>11-2<br>12-1<br>12-2<br>12-3<br>13-1<br>13-2 |
| DA | 15 | 15-1<br>15-2<br>15-3<br>15-4<br>15-5 |
| DAK | ---- | 15-1<br>15-2<br>15-3<br>15-4 |
| DH | 14 | 14-1<br>14-2<br>14-3<br>14-4<br>14-5<br>14-6<br>14-7 |
| DR | 14 | 14-1<br>14-2<br>15-1<br>15-2<br>15-3<br>15-4 |
| DS | 14 | 15-1<br>15-2<br>15-3<br>15-4<br>17-1<br>17-2<br>17-3<br>17-4<br>17-5<br>17-6<br>17-7<br>17-8<br>17-9<br>17-10<br>17-11<br>17-12 |
| DST | 14 | 14-1<br>14-2<br>14-3<br>15-1<br>17-1<br>17-2 |

| Component | The Relay Winding Is In Figure— | The Contacts Are In Figure or Figures— |
|---|---|---|
| DT | 14 | 14-1<br>14-2<br>15-1<br>15-2<br>17-1<br>17-2<br>17-3<br>17-4 |
| DTTK | ---------- | 14-1<br>17-1<br>17-2 |
| DTUK | ---------- | 14-1<br>14-2<br>14-3<br>17-1<br>17-2 |
| DUK | ---------- | 14-1 |
| EC | 11 | 5-1<br>9-1<br>9-2<br>9-3<br>9-4<br>10-1 |
| HI | 7 | 7-1<br>7-2<br>7-3 |
| HM | 13 | 5-1<br>10-1<br>10-2<br>11-1<br>12-1<br>12-2<br>13-1<br>13-2<br>13-3 |
| HM' | 13 | ---------- |
| HR | 14 | 14-1<br>14-2<br>14-3<br>14-4<br>17-1 |
| HRTK | ---------- | 14-1<br>17-1<br>17-2 |
| HRUK | ---------- | 14-1<br>14-2<br>14-3<br>14-4<br>17-1<br>17-2 |
| HY | 15 | 15-1<br>15-2<br>15-3<br>15-4<br>15-5 |
| IC | 10 | 5-1<br>9-1<br>9-2<br>9-3<br>10-1<br>10-2<br>10-3<br>10-4<br>11-1<br>11-2 |
| IDF | 8 | 8-1<br>8-2<br>9-1<br>9-2<br>9-3<br>9-4<br>9-5<br>9-6<br>9-7<br>9-8<br>9-9<br>9-10<br>10-1 |
| IDS | 9 | 5-1<br>5-2<br>8-1<br>9-1<br>13-1 |
| LD | 5 | 5-1<br>5-2<br>5-3<br>5-4<br>7-1<br>7-2<br>8-1<br>9-1<br>9-2<br>9-3<br>10-1<br>10-2<br>10-3 |
| LO | 7 | 7-1<br>7-2<br>7-3<br>7-4<br>7-5 |
| MHS | 7 | 7-1<br>7-2 |
| MK | ---------- | 9-1<br>12-1 |
| MKJ | ---------- | 53-1 |

| Component | The Relay Winding Is In Figure— | The Contacts Are In Figure or Figures— |
|---|---|---|
| MKS | ---------- | 9-1<br>9-2 |
| MLS | 7 | 7-1<br>7-2 |
| MO | 14 | 14-1<br>14-2<br>14-3<br>14-4<br>14-5<br>15-1<br>15-2<br>17-1<br>17-2<br>17-3<br>17-4 |
| MOK | ---------- | 14-1<br>14-2<br>14-3<br>17-1<br>17-2 |
| MT | 14 | 14-1<br>14-2<br>14-3<br>14-4<br>17-1 |
| MTK | ---------- | 14-1<br>14-2<br>14-3<br>17-1<br>17-2 |
| MU | 14 | 14-1<br>14-2<br>17-1 |
| MUK | ---------- | 14-1<br>14-2<br>14-3<br>17-1<br>17-2 |
| NI | 8 | 5-1<br>7-1<br>7-2<br>8-1 |
| ON | 6 | 5-1<br>6-1<br>6-2<br>9-1<br>11-1<br>11-2<br>11-3 |
| PAT | 9 | 8-1<br>9-1 |
| PB | 11 | 11-1<br>11-2<br>12-1<br>12-2<br>12-3<br>13-1 |
| PC | 18 | 15-1<br>18-1<br>18-2<br>18-3<br>18-4 |
| PCS | 18 | 15-1<br>17-1<br>18-1<br>18-2<br>18-3<br>18-4 |
| PF | 8 | 8-1<br>8-2<br>12-1<br>12-2 |
| PG | 16 | 15-1<br>15-2<br>15-3<br>15-4 |
| PO | 9 | 9-1<br>9-2<br>9-3<br>11-1<br>11-2 |
| PT | 10 | 5-1<br>5-2<br>6-1<br>8-1<br>9-1<br>9-2<br>9-3<br>10-1<br>10-2<br>10-3<br>10-4<br>10-5 |
| PTH | 8 | 8-1<br>8-2<br>8-3<br>12-1<br>12-2 |
| PTW | 9 | 9-1<br>9-2<br>9-3<br>11-1<br>11-2 |

| Component | The Relay Winding Is In Figure— | The Contacts Are In Figure or Figures— |
|---|---|---|
| PU | 10 | 9-1, 9-2, 9-3, 10-1, 10-2, 10-3, 10-4, 10-5, 12-1, 12-2, 12-3 |
| PY | 5 | 5-1, 9-1 |
| RD | 10 | 5-1, 5-2, 5-3, 10-1, 12-1, 12-2, 12-3, 13-1 |
| RDS | 12 | 7-1, 7-2, 10-1, 10-2, 10-3, 10-4, 13-1, 13-2 |
| RDT | 12 | 5-1, 5-2, 5-3, 10-1, 10-2, 12-1, 12-2, 12-3, 13-1, 13-2 |
| RLS | 12 | 10-1, 11-1, 11-2, 12-1, 12-2, 12-3, 12-4 |
| SA | 18 | 17-1, 17-2, 18-1, 19-1, 19-2 |
| SB | 19 | 17-1, 17-2, 19-1, 19-2, 19-3 |
| SC | 19 | 17-1, 17-2, 18-1, 19-1, 19-2 |
| SD | 18 | 17-1, 17-2, 18-1, 19-1 |
| SE | 19 | 17-1, 17-2, 19-1, 19-2, 19-3 |
| SF | 19 | 17-1, 17-2, 18-1, 19-1, 19-2 |
| SG | 18 | 17-1, 18-1, 18-2, 19-1, 19-2 |
| SH | 10 | 5-1, 5-2, 9-1, 9-2, 9-3 |
| SHS | 9 | 9-1, 9-2 |
| SP | 8 | 9-1, 12-1 |
| SPS | 12 | 9-1, 9-2 |
| SR | 7 | 7-1, 9-1, 9-2, 10-1, 10-2, 11-1, 13-1 |
| SRS | 8 | 8-1, 8-2, 10-1, 10-2, 11-1 |
| SRST | 6 | 6-1, 9-1, 9-2, 10-1, 10-2 |
| SS | 15 | 15-1, 15-2, 17-1, 18-1, 18-2, 18-3, 18-4, 18-5, 19-1, 19-2 |
| STO | 19 | 15-1, 17-1, 17-2, 17-3, 17-4, 18-1, 18-2, 18-3, 18-4, 18-5 |
| STT | 5 | 5-1, 5-2, 11-1, 11-2, 11-3, 11-4, 11-5, 11-6, 11-7, 11-8, 11-9, 11-10 |
| SX | 18 | 17-1, 18-1, 18-2, 19-1, 19-2, 19-3, 19-4 |
| SY | 18 | 18-1, 18-2, 18-3, 18-4, 19-1, 19-2 |
| SZ | 19 | 18-1, 18-2, 18-3, 19-1, 19-2, 19-3 |
| TA | 11 | 11-1, 11-2, 11-3 |
| TB | 11 | 5-1, 11-1, 11-2, 11-3 |
| TC | 11 | 11-1, 12-1 |
| TD | 11 | 9-1, 10-1, 11-1, 11-2, 11-3, 11-4, 12-1, 12-2, 12-3 |
| TO | 6 | 5-1, 6-1, 6-2, 9-1, 11-1, 11-2, 11-3, 11-4 |
| TR | 6 | 5-1, 6-1, 6-2, 9-1, 11-1, 11-2 |
| XA | 16 | 15-1, 16-1, 16-2, 18-1 |
| XB | 18 | 15-1, 18-1, 18-2, 18-3 |
| XC | 18 | 15-1, 16-1, 16-2, 18-1 |
| XD | 16 | 15-1, 16-1, 16-2, 18-1 |

| Component | The Relay Winding Is In Figure— | The Contacts Are In Figure or Figures— |
|---|---|---|
| XE | 18 | 15-1<br>18-1<br>18-2<br>18-3 |
| XF | 18 | 15-1<br>16-1<br>18-1<br>19-1 |
| XG | 19 | 15-1<br>16-1<br>18-1<br>19-1 |
| XH | 18 | 15-1<br>18-1<br>18-2<br>18-3 |
| XI | 18 | 15-1<br>16-1<br>18-1<br>19-1 |
| XJ | 19 | 15-1<br>16-1<br>18-1<br>19-1 |
| XK | ------ | 15-1<br>18-1<br>18-2<br>18-3 |
| XL | 18 | 15-1<br>16-1<br>18-1<br>19-1 |
| XM | 19 | 16-1<br>18-1<br>18-2<br>19-1 |
| XX | 16 | 15-1<br>16-1<br>16-2<br>18-1<br>18-2<br>18-3 |
| XY | 16 | 15-1<br>16-1<br>16-2<br>16-3<br>16-4<br>18-1 |
| XZ | 18 | 15-1<br>18-1<br>18-2<br>18-3<br>18-4<br>19-1 |
| YRK | ------ | 14-1<br>17-1 |

TRUNK RECORDERS

As indicated above, the trunk recorders 127 and 136 and the trunk recorders located in the remote Russell office may be of the type disclosed in the above identified Gleason patent. In general, each of the recorders comprises a base plate on which is detachably mounted a magazine containing an endless loop of magnetic tape, such as the tape 12000 fragmentarily shown in Fig. 23A, which is stored in random layer fashion. A portion of the magnetic tape 12000, which is disposed outside of the magazine, is moved relative to a pair of transducing heads by one of a pair of driving means. The transducing heads comprise a record-reproduce head, shown as a space pulse head 810 and a mark pulse head 800 (Fig. 8), including two magnetic gaps which are disposed adjacent contiguous portions of the magnetic tape 12000, thereby to define two separate channels for receiving the mark and space pulse information. The other transducing assembly comprises an erase head, shown schematically as an erase head 1110 (Fig. 11), having a single gap which is adapted to erase the entire width or both channels of the magnetic tape. During recording operations, the magnetic tape 12000 is stationary, and the first advancing means comprises a step-by-step advancing mechanism including a pawl and ratchet arrangement driven by an advance magnet, shown as 820 in Fig. 8, for advancing the magnetic tape through a very small distance following the recording of each pulse. In order to provide high speed playback operations, a continuous drive mechanism is provided. This drive mechanism comprises a solenoid, indicated as 1120 in Fig. 11, which moves a clutching idler into a position interposed between a driving roller and a pinch roller capstan arrangement which directly drives the magnetic tape 12000. In this manner, during playback operation, the magnetic tape in the trunk recorder 127 is rapidly advanced to cause the production of mark and space impulses which are transmitted to the recording equipment.

In order to provide a means for returning the magnetic tape 12000 in the recorder 127 to a fixed point or home position prior to recording and reproducing operations, and in order to provide an alarm indication when the magnetic tape in a trunk recorder is filled with items of information, tape controlled contacts are provided which are so located in the length of tape as to define the effective beginning and end thereof. As disclosed in the above identified Gleason application, the tape contact structure may comprise conductive portions carried on the tape which selectively bridge contact fingers held in engagement with one surface of the magnetic tape. Alternatively, the tape contact arrangement may comprise spaced perforations in the magnetic tape 12000, such as 12001, 12002, and 12003 (Fig. 23A), which are sensed by a wire brush 1131 (Fig. 11) adapted to extend through the perforations to engage a grounded conductive roller 1130.

TELEPHONE EQUIPMENT IN THE HUDSON OFFICE

The automatic toll ticketing system of the present invention is adapted to be utilized in conjunction with central office equipment providing various types of subscriber service and, more specifically, the calling subscriber identifying means provided in conjunction with the automatic toll ticketing facilities are capable of determining the directory number of the calling subscriber when the calling substation is on either a private line or a multiparty line in which multiparty service is provided on either a terminal per line or terminal per station basis.

Figure 3:
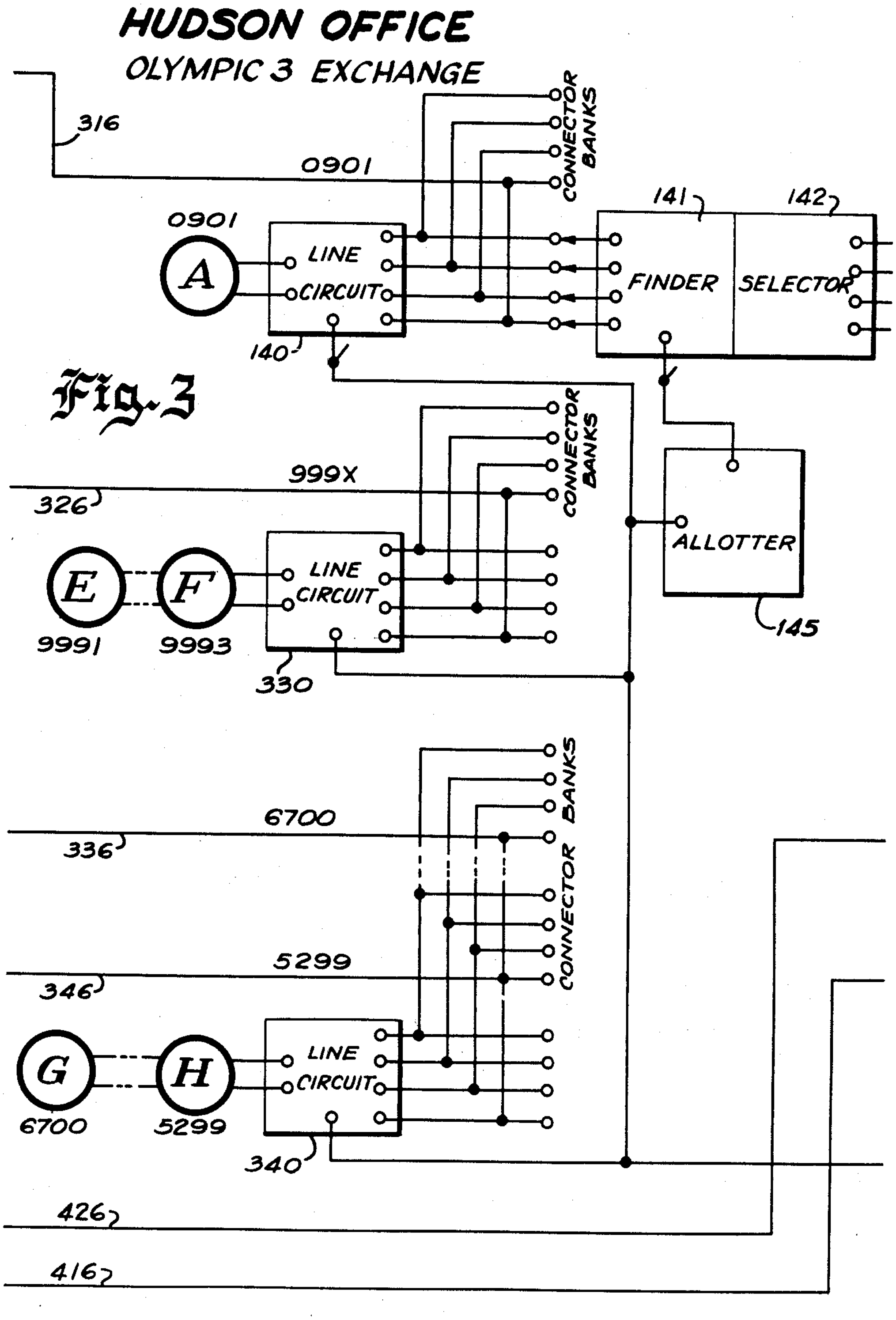
Figs. 3 and 4 are a block diagram showing certain components of the telephone system illustrated in Fig. 1.
Figure 4:
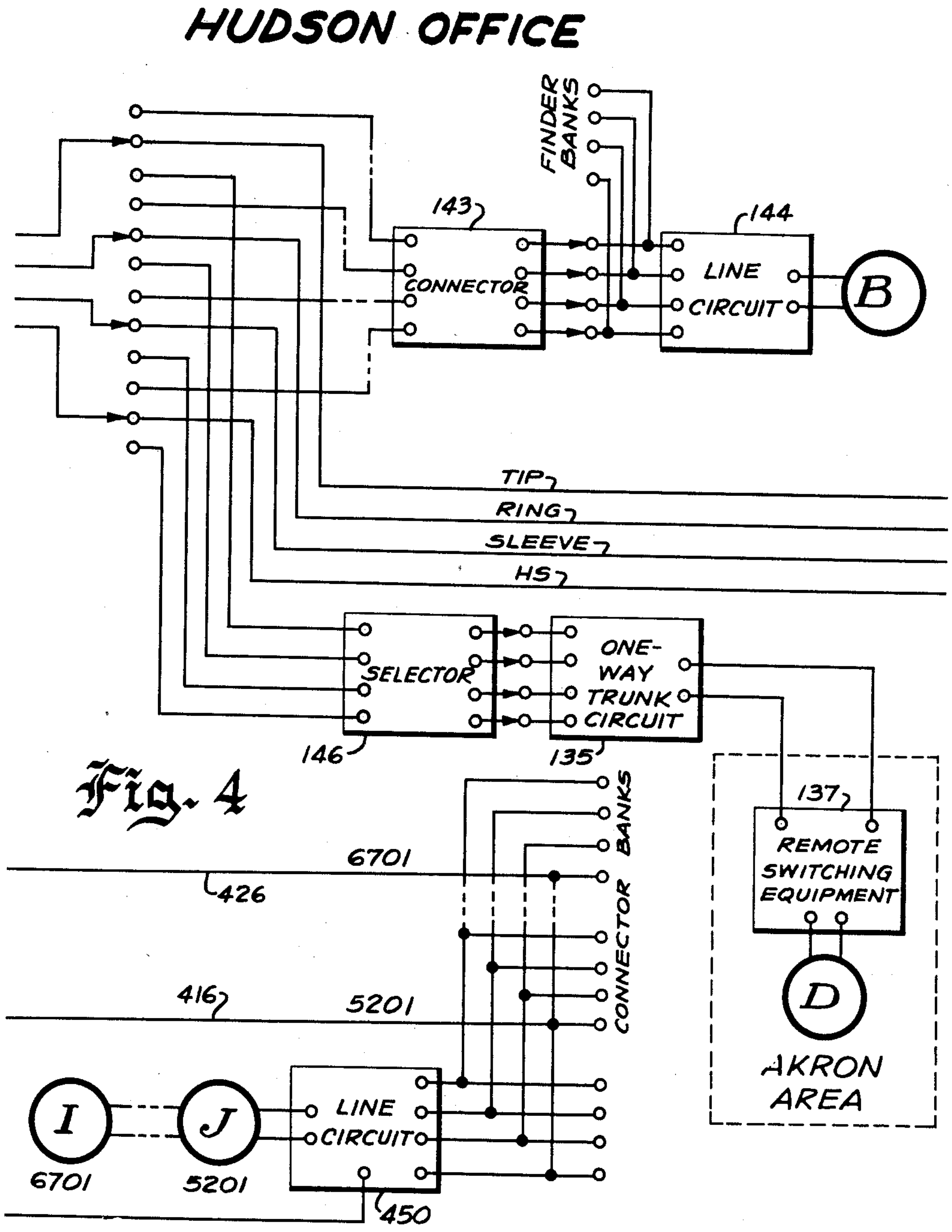
Figure 5:
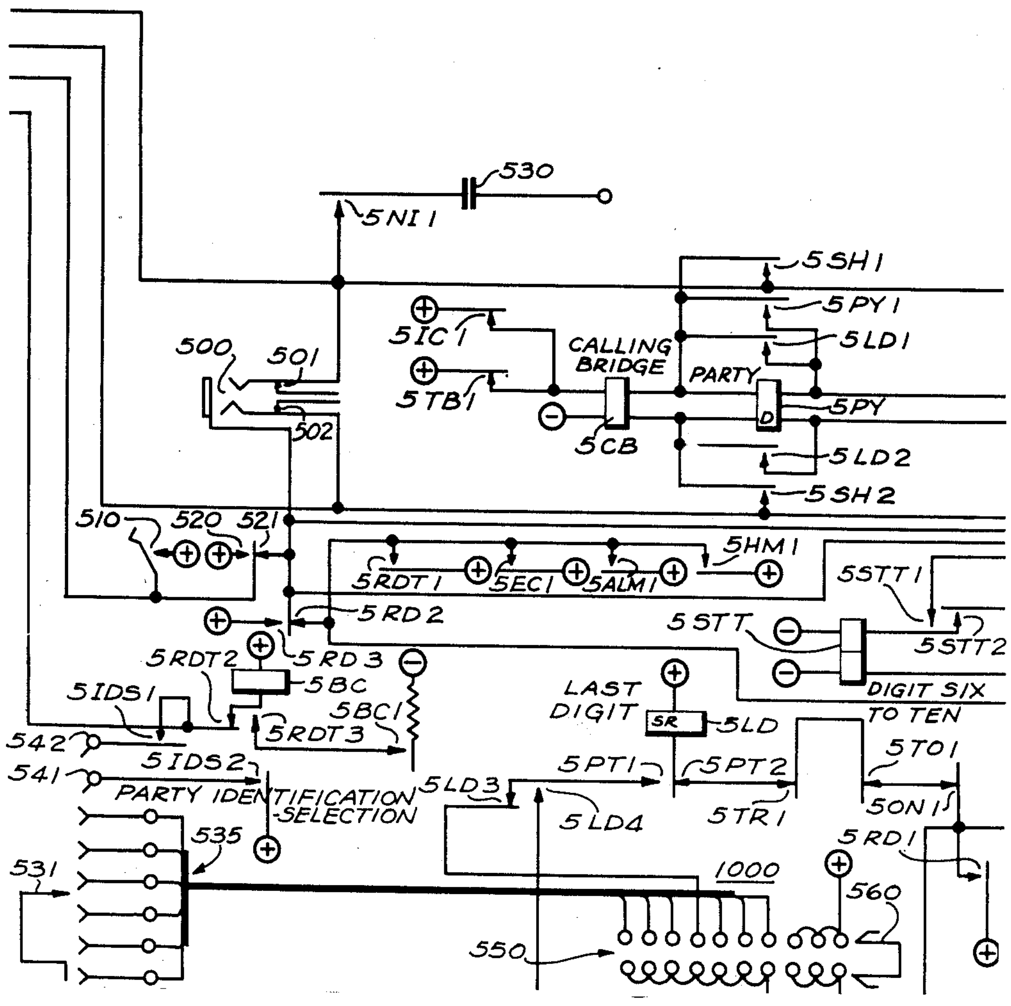
Figure 6:
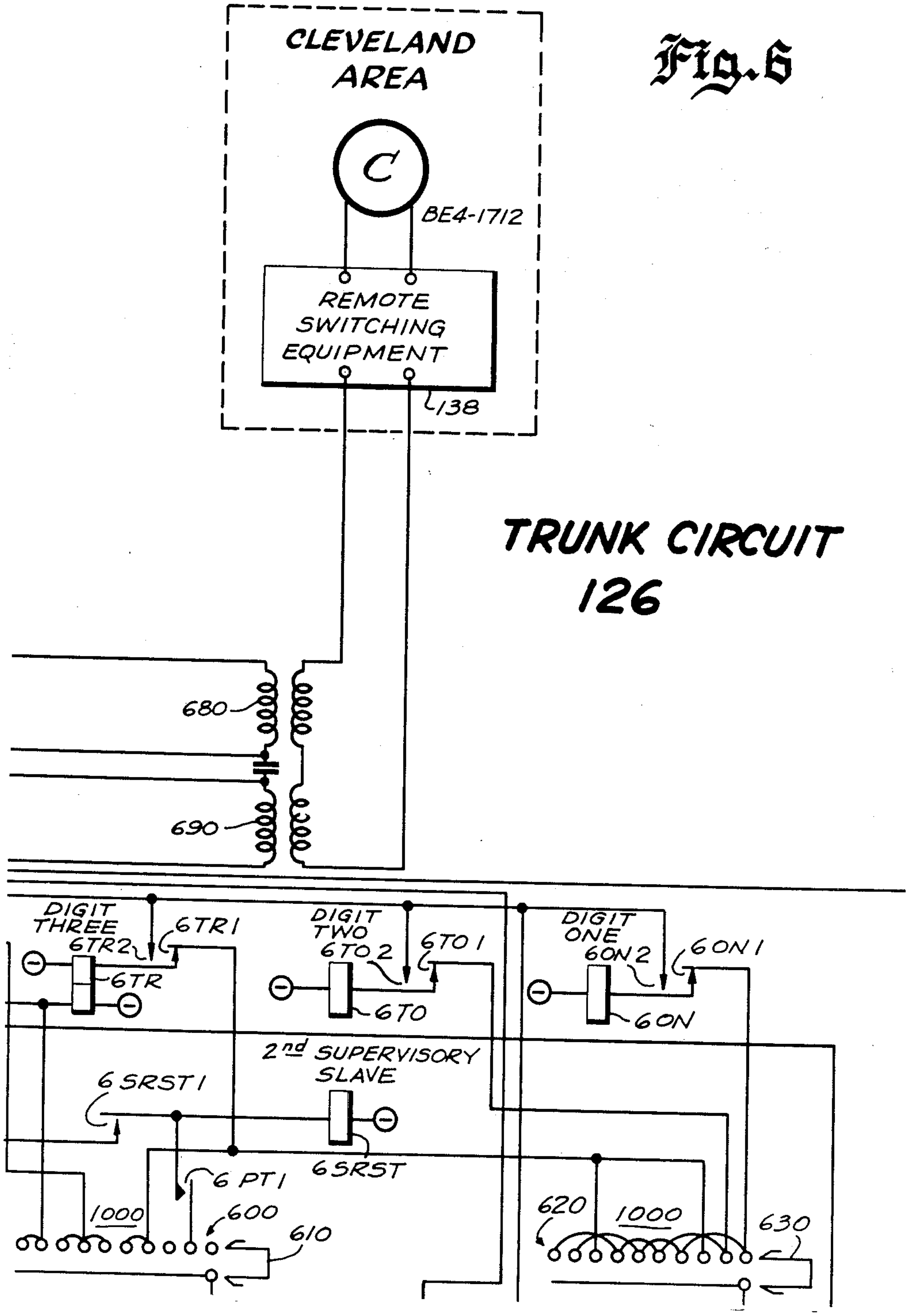
Figure 7:
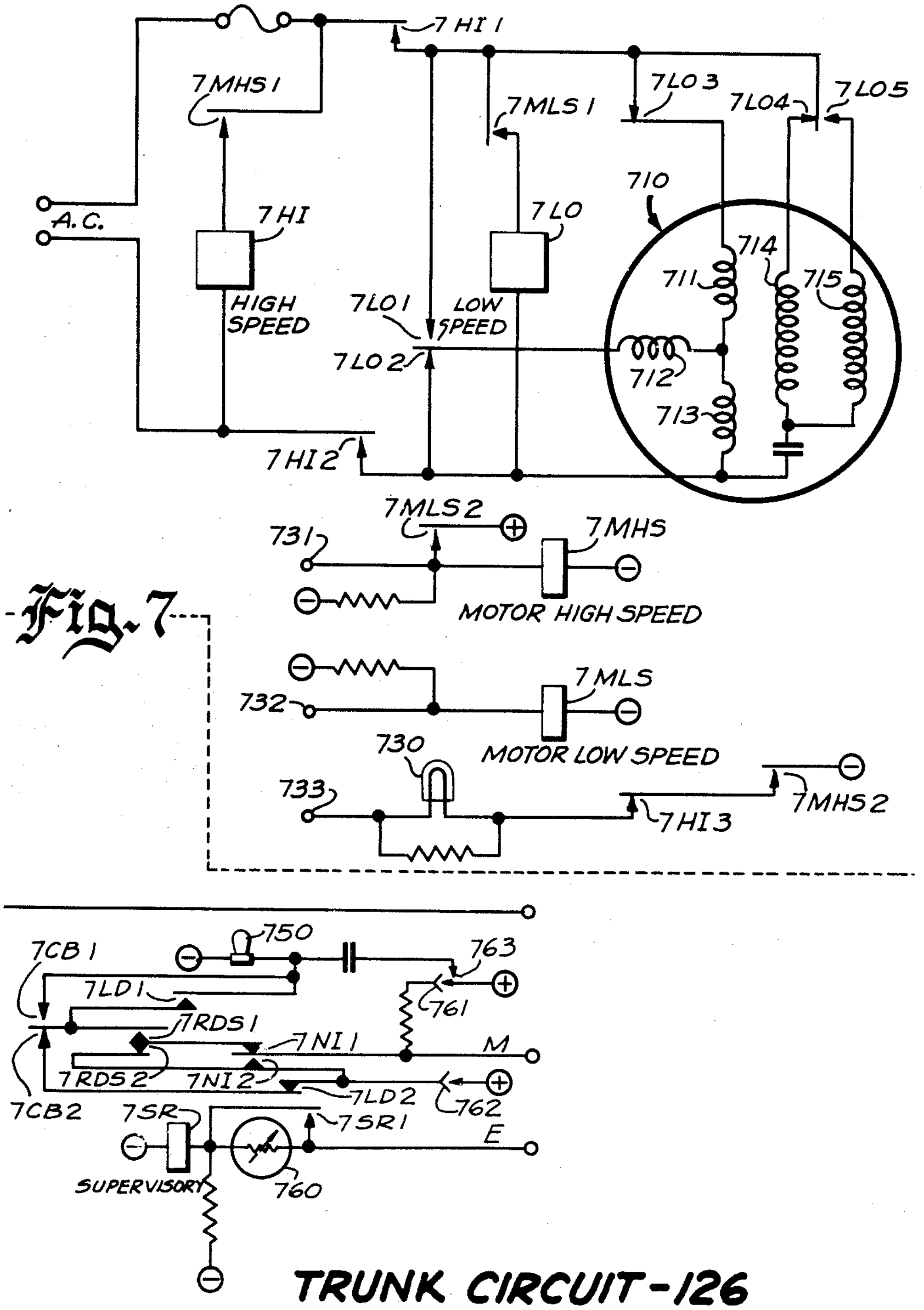
Figure 8:
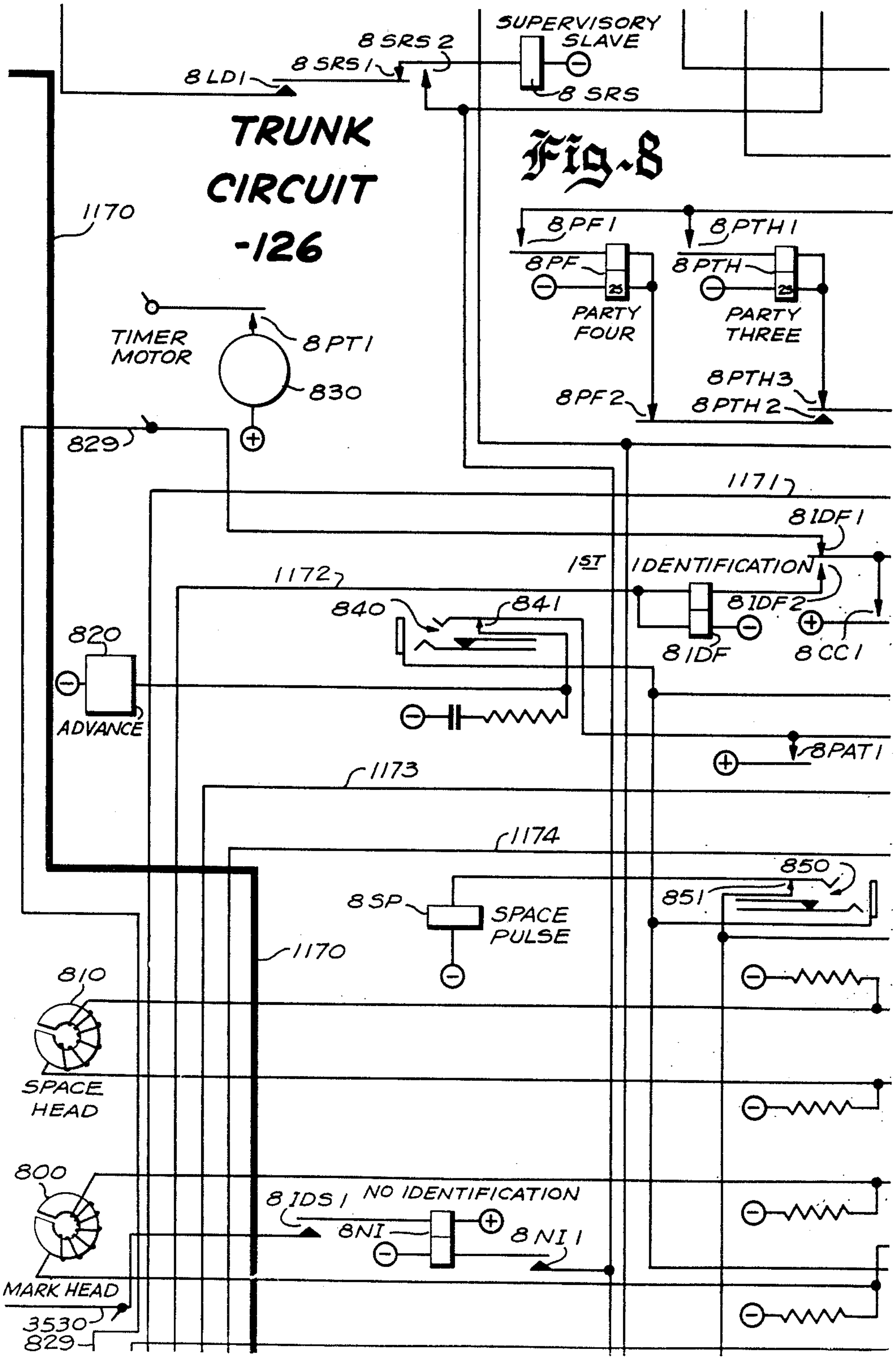
Figure 9:
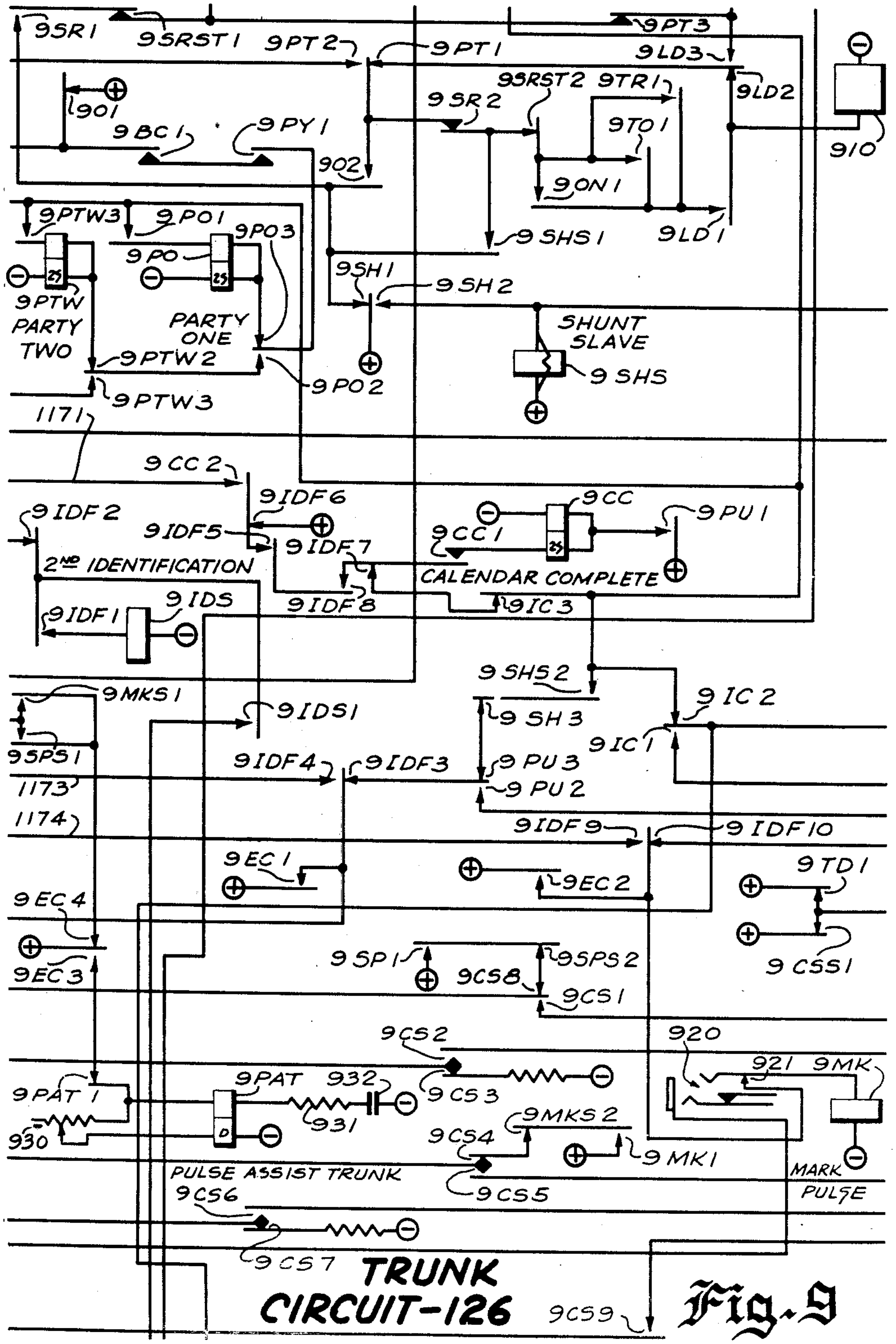
Figure 10:
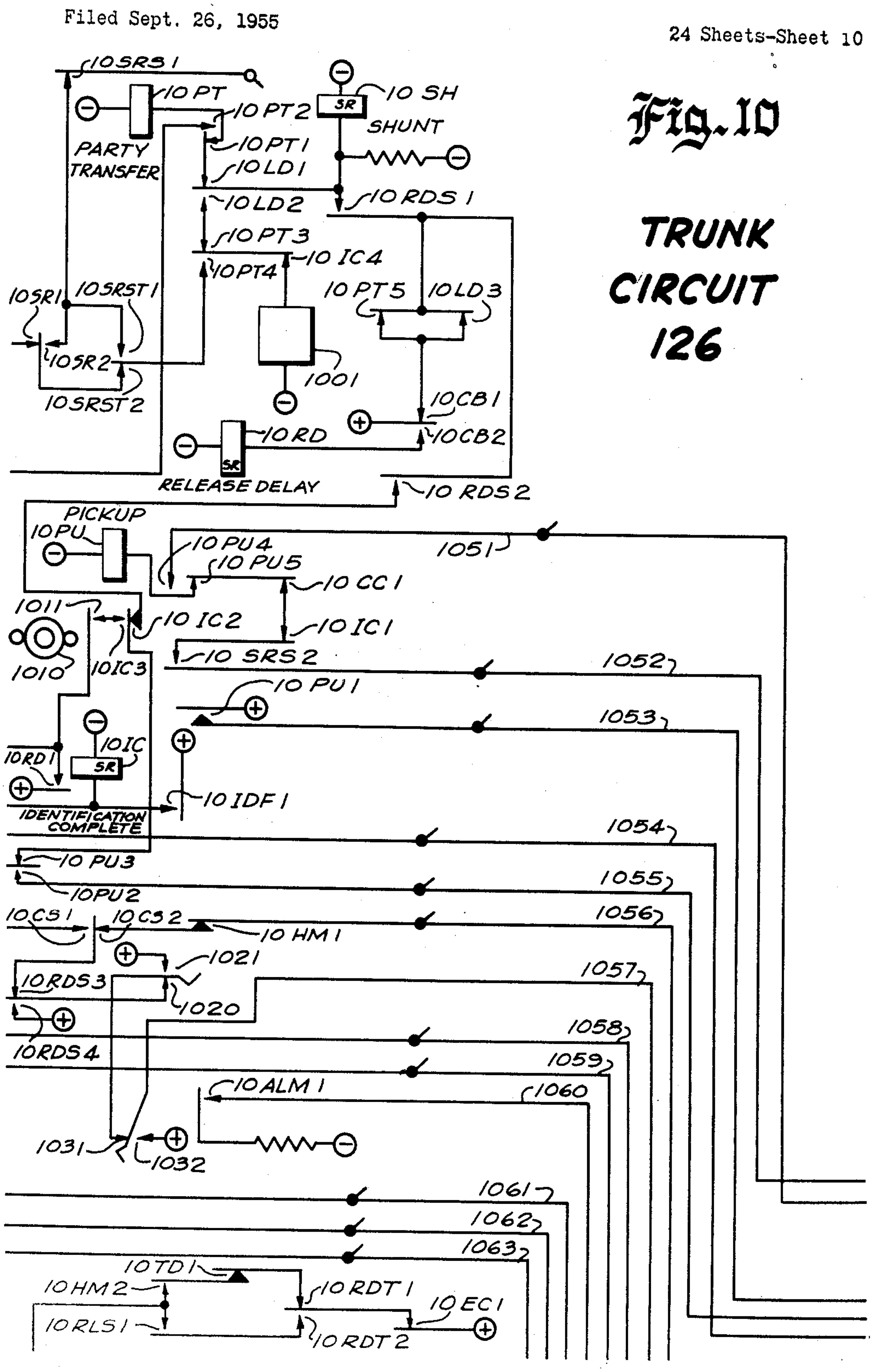

Referring now specifically to Figs. 3 and 4 of the drawings, the substation A is shown therein as being located on a private line which terminates in the line circuit 140 and is assumed to be designated by the directory number "0901." Further, the equipment located in the Hudson office is assumed to include an exchange designated as Olympic 3 and, accordingly, the complet directory number of the substation A is OL 3-0901. Since only a single substation A is provided on the line terminated in the line circuit 140, the determination of the line circuit in which the calling line is terminated provides a direct indication of the directory number of the calling subscriber.

In addition, the Olympic 3 exchange in the Hudson office may include multiparty lines having multiparty service provided on a terminal per line basis in which the directory number of the plurality of substations on a line may comprise a four digit designation in which the thousands, hundreds, and tens digits are identical for all of the stations on the line and in which the units or party digit varies in accordance with the position of the calling substation on the line. More specifically, a first party substation E, designated OL 3-9991, and a third party substation F, designated OL 3-9993, are provided on a line which terminates in a line circuit 330 on which multiparty srevice is provided on a terminal per line basis. The line circuit 330 includes finder terminals which are accessible to line finding equipment, such as the finder 141, and connector multiples which are capable of being seized by an incoming connector in response to the dialing of the common thousands, hundreds, and tens digits. Accordingly, the determination of the line circuit 330 to which the calling line extends is capable of providing information relating only to the first three digits of the directory number of the calling station but is not capable of providing information relating to the units or party digit identifying the locations of the calling stations E and F on the calling line.

Further, the Olympic 3 exchange in the Hudson office may include a terminal per station multiparty line. More specifically, a pair of substations G and H are provided on a calling line terminating in a line circuit 340 on which the multiparty service is provided on a terminal per station basis. In this type of service, the directory number of one substation on the line may be entirely different from the directory number of any other substation on the party line. For instance, the first party substation G is assumed to be designated as OL 3–6700 whereas the third party substation H on the same line is assumed to be designated as OL 3–5299. Accordingly, the determination of the line circuit 340 as being a calling line circuit does not provide any information relative to the directory number of the calling substation.

A line circuit 45 terminates a line on which multiparty service is also provided on a terminal per station basis. However, a first party substation I, designated as OL 3–6701, and a third party substation J, designated as OL 3–5201, provided on this line do not include conventional dialing devices, as in the case of the substations A, E, F, G, and H, but are provided with modified dialing devices which, during dialing operations, automatically provide party identification signals which are utilized to control the operation of automatic calling party identification equipment. As set forth hereinabove, these modified dialing devices may be of the type disclosed in either Morris Patent No. 2,691,070 or MacCheyne Patent No. 2,691,071. In general, party identification dialing devices of this type apply varying numbers of ground impulses to the tip and ring conductors of the calling loop circuit during a selected number of successive windup operations of the dial, and the number of ground pulses transmitted during this interval is representative of the position of the calling substation on the calling line. These dialing devices are also capable of applying permutations of ground pulses to the calling loop circuit during a selected number of successive windup operations, thereby to provide calling station identification on a permutation basis. In the present system, the trunk circuit 126 performs a calling station identification operation in accordance with the number rather than the permutation of ground impulses transmitted during successive windup operations.

Accordingly, the Olympic 3 exchange in the Hudson office includes subscriber lines of either a private or multiparty type in which multiparty service is provided on either a terminal per line or a terminal per station basis. Further, the dialing devices on the terminal per station lines terminating in the line circuits 340 and 450 may be provided with either conventional dialing devices, i.e., at substations G and H, or with modified automatic party identification dialing devices, i.e., substations I and J.

TRUNK CIRCUIT 126

The trunk circuit (Figs. 5 to 13) is seized upon extension of a connection from a calling substation when the call is to be extended to a selected area, such as the Cleveland area, for which automatic toll ticketing is to be provided. Following its seizure, the trunk circuit 126 controls the sequential application of items of information to the magnetic tape 12000 in the trunk recorder 127 individually associated with the trunk circuit. More specifically, during a recording operation, the trunk circuit 126 first simultaneously registers the value of the dialed party digit, records this digit on the magnetic tape of the trunk recorder 127, while preventing the transmission of this dialed party digit to the line extending means, and performs a test to determine the nature of the dialing device associated with the calling substation. Thereafter, the trunk circuit 126 receives the digits dialed for extending the connection and repeats the seized digits over an interoffice trunk to control the operation of the remote switching equipment 138 located in the Cleveland area and which has access to the called substation C. Simultaneously with repeating these digits to the interoffice trunk, the trunk circuit 126 causes the recording thereof on the magnetic tape 12000 of the trunk recorder 127 in the form of groups of mark pulses separated by interposed space pulses and also operates the party identification relay if the dialing device is of the modified party identification type. The receipt of answering supervisory signals associates the common clock and calendar circuit 133 with the trunk circuit 126 so that a series of groups of mark pulses are transmitted to the trunk recorder 127 representing the date and time at which the call was completed or filed. Following the transmission of the date and time information, the trunk circuit 126 operates the identifier sender allotter 129 to associate an idle identifier sender 131 or 132 with the trunk circuit 126, this association causing the application of an identification potential to the HS lead of the extended connection to cause the identification matrix 128, the identifier circuit 130, and the seized identifier sender to provide a series of signals which are recorded in the trunk recorder 127 to provide a record of the directory number of the calling subscriber.

Further, the receipt of answering supervisory signals initiates the operation of a timer mechanism individual to the trunk circuit 126 so that impulses are applied to the magnetic tape 1200 of the trunk recorder 127 at one minute intervals, thereby to provide an indication of the duration of the toll call. Following the release of the connection, the trunk circuit 126 transmit a COE signal to the trunk recorder 127, thus indicating that all of the items of information pertaining to a single call have been stored in the recorder 127. The trunk circuit thereafter releases the extended switch train to permit the trunk circuit 126 to be seized for use in extending subsequent connections.

The trunk circuit 126 also includes means for releasing the connection in the event that signals representing the designation of the calling subscriber are not provided by one of the plurality of identifier senders 131 or 132, thus preventing the extension of a toll call without adequate information to provide for charging the call. The trunk circuit 126 further includes means providing a grace time period following the receipt of answer supervisory signals during which the subscriber may release the connection without being charged for the call, and means to insure the recording of the necessary information if the connection is released following the grace time period.

During playback operations in which the items of information stored in the trunk recorder 127 are transmitted to control the recorder 220, the trunk circuit 126 advances the magnetic tape 12000 in the trunk recorder 127 to the home position or effective beginning thereof and, thereafter, switches the heads 800 and 810 through to the playback control circuit 200 thereby to permit the items of information to be transmitted to the electronic registers in the recording equipment under the control of the readout control circuit 210. Following the playback of the items of information stored in the trunk recorder 127, the trunk circuit 126 automatically returns the magnetic tape 12000 to the home position, records a COE signal thereon, and restores the trunk recorder 127 to a normal condition. In addition to cutting through the trunk recorder 127 to the readout control circuit 210 in response to the initiation of a playback or readout operation by the readout control circuit 210, the trunk circuit 126, when the trunk recorder 127 becomes filled with items of information and unable to accept and store additional items, initiates an emergency playback operation in which the readout control circuit 210 and the playback control circuit 200 search for and seize the trunk recorder 127. This playback operation causes the production of permanent records of the items of information stored in the trunk recorder 127 and, concurrently therewith, erases the stored items so that the trunk recorder 127 is again conditioned for receiving items of information pertaining to succeeding calls.

*Operation of the trunk circuit* 126 *during the extension of a call from a substation on a private line*

1. SEIZURE OF THE TRUNK CIRCUIT 126

Assuming that a call is to be extended from the substation A, which is designated by the directory number OL3–0901 and which is on the private line terminated in the line circuit 140, to a called subscriber at the substation C (Fig. 6), which is located in a Belmont 4 exchange in the Cleveland area and which is designated by the directory number BE 4–1712, the call is initiated, as described in detail above, to cause the allotter 145 to associated a link comprising the line finder 141 and the selector 142 with the line circuit 140 in which is terminated the line associated with the calling substation A. Thereafter, the subscriber at the substation A dials the access digit "9" which causes the wipers of the selector 142 to advance to the ninth level of the contacts associated therewith and, during the interdigit pause, to search over the contacts in this level and find an idle trunk circuit extending to the Cleveland area. If the trunk circuit 126 is the first idle trunk tested by the wipers of the selector 142, the selector 142 switches the calling loop circuit through to this trunk circuit.

The extension of the calling loop circuit to the tip and ring conductors of the trunk circuit 126 completes an energizing circuit for a calling bridge relay 5CB. This circuit extends from grounded battery, which is connected to one of the operating windings of the calling bridge relay 5CB, through one of the windings of a party relay 5PY, a repeater coil 690, the ring conductor of the extended connection, the contacts closed by the cradle switch at the substation A, the tip conductor of the extended switch train, a repeater coil 680, a second winding of the party relay 5PY, a second winding of the calling bridge relay 5CB, and thence to ground through a pair of parallel connected contacts 5IC1 and 5TB1. The completion of this circuit operates the calling bridge relay 5CB but does not operate the party relay 5PY, which is a differential relay. The operation of the relay 5CB opens a plurality of contacts 7CB2 and 10CB1 and closes a plurality of contacts 7CB1 and 10CB2. The closure of the contacts 7CB1 and the opening of the contacts 7CB2, which form a portion of a conventional signaling circuit for extending a connection from the trunk circuit 126 over the interoffice trunk to the remote switching equipment 138 in the Cleveland area perform no useful function at this time.

The opening of the contacts 10CB1 also performs no useful function but the closure of the contacts 10CB2 completes an obvious operating circuit for a release delay relay 10RD. The operation of the release delay relay 10RD closes a plurality of contacts 5RD1, 5RD3, 10RD1, 12RD1, 12RD3, and 13RD1 and opens a plurality of contacts 5RD2 and 12RD2. The closure of the contacts 10RD1 provides one source of main ground for the trunk circuit 126, and the closure of the contacts 13RD1 provides a bright illumination supervisory signal at a lamp 1330 by completing a circuit extending from grounded battery through a pair of contacts 13SR1 and the now closed contacts 13RD1 to a terminal 1376 which is connected to grounded battery in a supervisory circuit. The bright illumination of the lamp 1330 indicates the seizure of the trunk circuit 126. The opening of the contacts 12RD2 interrupts, at a second place, an open operating circuit for an end-of-call relay 11EC, and the closure of the contacts 12RD3 completes an operating path extending from a pair of grounded and closed contacts 12RLS3 to the operating winding of a second release delay relay 12RDT. The closure of the contacts 12RD1 completes an obvious energizing path for the operating winding of a release delay slave relay 12RDS. The closure of the contacts 5RD3 connects ground to the sleeve conductor of the extended connection through a pair of contacts 521 to provide holding ground for the switch train and to prevent seizure of the trunk circuit 126 by additional selectors similar to the selector 142. The opening of the contacts 5RD2 disconnects this sleeve conductor from additional circuits which are capable of providing holding ground therefor. A manually operated busy key including the pair of normally closed contacts 521 and a pair of normally open contacts 520 is also provided for grounding the sleeve conductor extending to the trunk circuit 126 so as to provide means for busying this trunk circuit and preventing its seizure.

The closure of the contacts 5RD1 provides an additional source of ground for the trunk circuit 126 and, in addition, completes an energizing circuit extending through a plurality of contacts 5ON1, 5TO1, 5TR1, and 5PT2 for operating a last digit relay 5LD. Accordingly, the operation of the release delay relay 10RD in response to the operation of the calling bridge relay 5CB completes the energizing circuits for the release delay slave relay 12RDS, the second release delay relay 12RDT, and the last digit relay 5LD, in addition to providing supervisory signals, ground on the sleeve lead for holding up the extended switch train, and conditioning certain other portions of the circuit for subsequent operation.

The operation of the release delay slave relay 12RDS opens a plurality of contacts 7RDS2, 10RDS3 and 13RDS1 and closes a plurality of contacts 7RDS1, 10RDS1, 10RDS2, 10RDS4, and 13RDS2. The closure of the contacts 13RDS2 applies ground to a terminal which is connected to a common supervisory circuit and the opening of the contacts 13RDS1 interrupts a normally open circuit for applying ground to an emergency start conductor 1352. The closure of the contacts 7RDS1 and the opening of the contacts 7RDS2 condition the signaling circuit for operation in accordance with the subsequently dialed connection extending digits.

The closure of the contacts 10RDS2 prepares an operating path for a mark relay 9MK, and the opening of the contacts 10RDS3 opens a normally completed path extending between a pair of conductors 1056 and 1057 which are connected to the playback control circuit 200, thereby preventing the trunk circuit 126 from being seized by the circuit 200. The accompanying closure of the contacts 10RDS4 applies ground to the conductor 1056, thereby to indicate that the trunk circuit 126 is engaged in recording items of information pertaining to a toll call and, consequently, busies the trunk circuit. The closure of the contacts 10RDS1 prepares an operating path for a shunt relay 10SH.

The operation of the second release delay relay 12RDT opens a plurality of contacts 5RDT2, 10RDT1, 12RDT3, and 13RDT1 and closes a plurality of contacts 5RDT1, 5RDT3, 10RDT2, 12RDT1, 12RDT2, and 13RDT2. The closure of the contacts 5RDT1 provides busying and holding ground for the sleeve conductor of the extended switch train, but this ground is not effective at this time due to the prior operation of the release delay relay 10RD. The closure of the contacts 5RDT3 and the opening of the contacts 5RDT2, which form a make-before-break arrangement, interrupt an operating circuit and prepare a holding circuit for a party identification selection relay 5BC. Since resistance ground is connected to the HS lead by the identification matrix 128 when the calling substation is provided with a conventional dialing device, the party identification selection relay 5BC is not operated. Accordingly, operation of the contacts 5RDT2 and 5RDT3, does not perform a useful function at this time.

The opening of the contacts 10RDT1 interrupts, at an additional point, a normally open operating circuit extending to the clutch magnet 1120 in the trunk recorder 127, and the closure of the contacts 10RDT2 prepares one point in another normally open operating circuit extending thereto.

The closure of the contacts 12RDT1 prepares an operating path for the end-of-call relay 11EC and the closure of the contacts 12RDT2 provides holding ground for the last digit relay 5LD and also prepares a holding circuit for a party transfer relay 10PT. The opening of the contact 12RDT3 removes ground from a terminal 1377 which is connected to an all trunks busy conductor of a shelf supervisory circuit, the path to this terminal extending through a plurality of normally closed contacts 13HM2, 13CS3, and 1324.

The opening of the contacts 13RDT1 interrupts one operating path extending to the winding of a homing relay 13HM, and the closure of the contacts 13RDT2 prepares an operating path for a homing relay 13HM' which is located in a succeeding trunk circuit similar to the trunk circuit 126.

The operation of the last digit relay 5LD in response to the closure of the contacts 5RD1 closes a plurality of contacts 5LD1, 5LD2, 5LD4, 7LD1, 8LD1, 9LD1, 9LD3, and 10LD2, and opens a plurality of contacts 5LD3, 7LD2, 9LD2, 10LD1, and 10LD3. The contacts 7LD2 are preliminary breech type contacts and are opened prior to the closure of the contacts 7LD1. The opening of the contacts 7LD2 prevents the application of direct ground to the signaling circuit under the control of the calling bridge relay 5CB. The closure of the contacts 7LD1 provides a shunt around the contacts 7CB1 of the calling bridge relay 5CB to maintain a steady source of resistance battery on the M lead of the signaling circuit, which path extends through the closed contacts 7RDS1 and a pair of normally closed contacts 7NI1. Accordingly, if the signaling circuit is arranged for either neutral relay operation by the insertion of a plug 763 into a jack 761 or for polar duplex operation by supplying direct ground to the jack 761 and a jack 762, the closure of the contacts 7LD1 and the opening of the contacts 7LD2 prevent successive operations of the contacts 7CB1 and 7CB2 from transmitting switch directing signals to the signaling lead M, thereby effectively preventing extension of the connection through the remote switching equipment 138 during the intervals that the last digit relay 5LD is operated.

The closure of the contacts 5LD1 and 5LD2 provides a shunt around both windings of the party relay 5PY to not only remove the resistance of these windings from the calling loop circuit but also to prevent operation of the party relay under the control of impulses transmitted by a modified dialing device, such as those provided at the substations I and J, during the period that the last digit relay 5LD is operated. The closure of the contacts 5LD4 and the opening of the contacts 5LD3, which form a make-before-break contact arrangement, prepare a holding circuit for the relay 5LD but the completion of the holding circuit is not of any effect inasmuch as this circuit is interrupted at the normally open contacts 5PT1. The closure of the contacts 8LD1, in preparing an operating path for a supervisory slave relay 8SRS, performs no useful function at this time.

The closure of the contacts 9LD1 prepares an operating circuit for a release magnet 910 forming a portion of a stepping switch 1000. The opening of the contacts 9LD2 opens another operating circuit for the release magnet 910, and the closure of the contacts 9LD3 prepares a circuit for applying ground to a wiper 610 of the switch 1000.

The opening of the contacts 10LD1 opens a normally open operating path extending to the operating winding of the party transfer relay 10PT, and the closure of the contacts 10LD2 prepares an operating path for a motor magnet 1001 of the switch 1000. The opening of the contacts 10LD3 interrupts one branch of a pulsing path controlled by the contacts 10CB1 of the calling bridge relay 5CB.

Accordingly, in response to seizure, the trunk circuit 126 locks out the party relay 5PY to prevent its operation during the dialing of the subsequent dialed party digit, locks out the signaling circuit to prevent the dialed party digit from being transmitted to the remote switching equipment 138, prepares an operating path for the shunt relay 10SH, prepares a pulsing path to the mark pulse relay 9MK, and conditions the minor switch 1000 for operation in accordance with the dialed party digit by preparing an operating path to the motor magnet 1001 thereof.

2. STORAGE OF THE DIALED PARTY DIGIT

The first digit dialed by the calling subscriber in extending a toll call which is to be automatically ticketed is an assigned party digit, which is stored both in the trunk circuit 126 and in the trunk recorder 127 but which is not utilized in extending the connection. As set forth hereinabove, in the case of subscribers on multiparty lines in which multiparty service is provided on a terminal per station basis with conventional dialing devices, the stored party digit is utilized to control the operation of the identification equipment to provide the directory number of the calling subscriber. However, in the case of subscribers on private lines or subscribers on multiparty lines on which service is provided on a terminal per station basis with modified dialing devices, the assigned party digit which is to be dialed may have any arbitrary value since it is not utilized either in controlling the operation of the identification apparatus or in providing the value of the units digit of the directory number. Since the calling substation A is located on a private line, the party digit which is next to be dialed may have any arbitrary value which may be assumed to be the digit "2."

Accordingly, upon receipt of dial tone from the selector 142, the subscriber at the substation A operates the dial to cause the transmission of two impulses to the seized trunk circuit 126, these impulses consisting of two separate open circuit intervals in which the calling loop circuit extending to the calling bridge relay 5CB is interrupted.

The first interruption in the circuit extending over the tip and ring conductors to the two operating windings of the calling bridge relay 5CB permits this relay to release and thus to close the plurality of contacts 7CB2 and 10CB1 and to open the contacts 7CB1 and 10CB2. The opening of the contact 7CB1 and the closing of the contact 7CB2 normally provide pulses for the signaling circuit, but, in view of the prior operation of the last digit relay 5LD, the operations of the contacts 7CB1 and 7CB2 has no effect. The opening of the contacts 10CB2 opens the operating circuit for the release delay relay 10RD but this relay, in being slow-to-release, does not release at this time.

The closure of the contacts 10CB1 completes the previously prepared operating circuits extending to the shunt relay 10SH, to the mark pulse relay 9MK and to the motor magnet 1001 of the stepping switch 1000. The operation of the shunt relay 10SH closes a plurality of contacts 5SH1, 5SH2, and 9SH2, and opens a plurality of contacts 9SH1 and 9SH3. The closure of the contacts 5SH1 and 5SH2 connects the operating windings of the calling bridge relay 5CB directly to the tip and ring conductors and thus shunts out the repeater coils 680 and 690, the operating windings of the party relay 5PY having previously been shunted out by the prior operation of the last digit relay 5LD. By removing the repeater coils 680 and 690 from the calling loop circuit the resistance of the pulsing path to the calling bridge relay 5CB is reduced, thus improving the response of the calling bridge relay to the impulses provided by the dialing device at the substation A.

The opening of the contacts 9SH1, in removing holding and operating ground from a plurality of circuits, performs no useful function at this time. The opening of the contacts 9SH3 interrupts a point in an operating path for a space pulse relay 8SP. The closure of the contacts 9SH2, however, completes an operating path for a shunt slave relay 9SHS. The operation of the shunt slave relay 9SHS closes a plurality of contacts 9SHS1 and 9SHS2. The closure of the contacts 9SHS1 prepares an operating circuit for the release magnet 910 of the stepping switch 1000, which operating circuit is open at a plurality of other points. The closure of the contacts 9SHS2 prepares an operating path for the space pulse relay 8SP, the operating path for this relay being interrupted at the previously opened contacts 9SH3 of the shunt relay 10SH.

Referring back to the preceding closure of the contacts 10CB1 to complete an energizing path for the motor magnet 1001 of the stepping switch 1000, this path extends through the closed contacts 10PT5, 10RDS1, 10LD2, 10PT3 and 10IC4 to the operating winding of the motor magnet 1001. Operation of the magnet 1001 conditions a plurality of wipers 560, 610 and 630 controlled thereby for movement over a plurality of banks of contacts 550, 600 and 620 associated therewith.

Figure 23A:
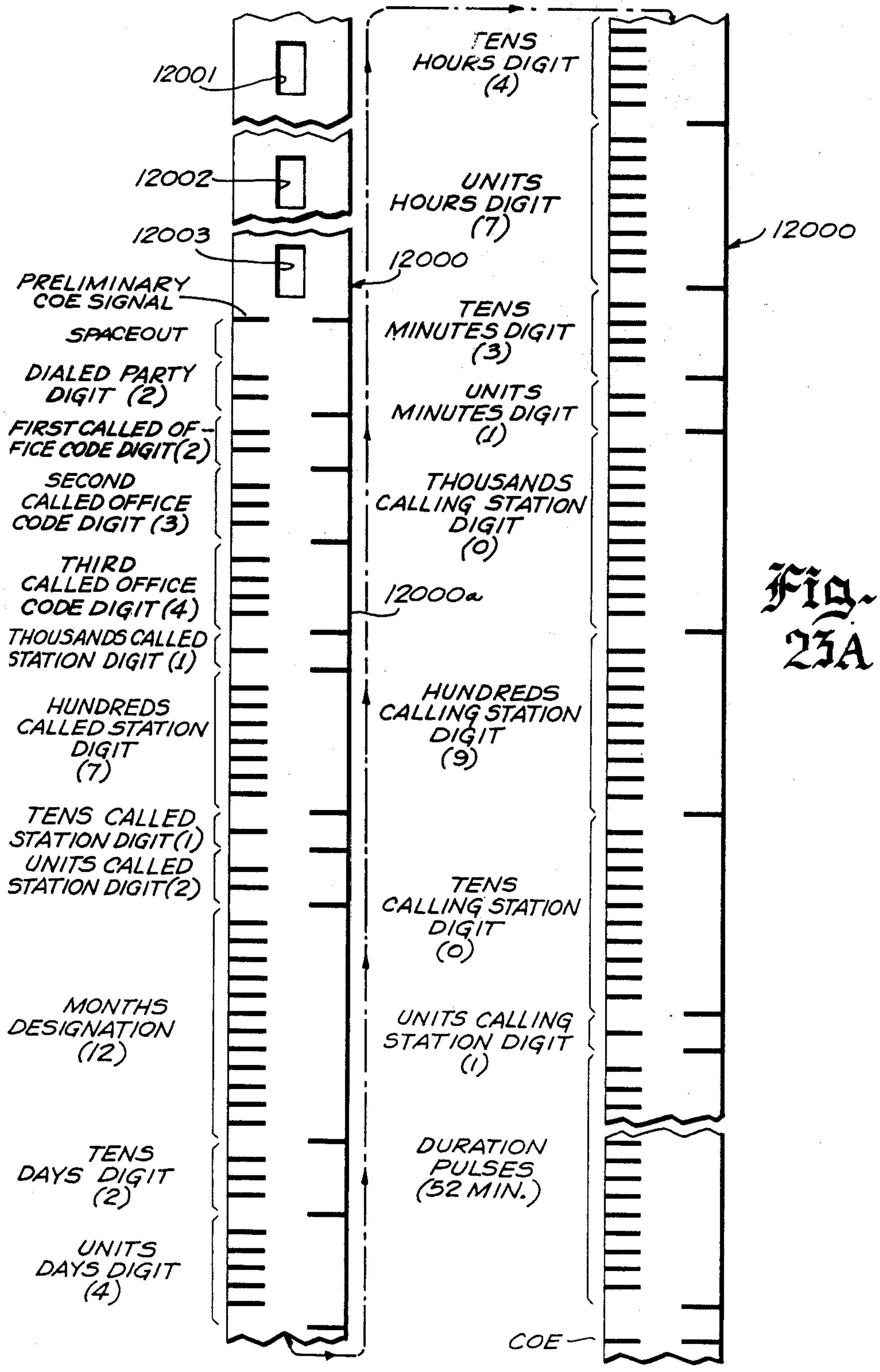

The preceding closure of the contacts 10CB1 also completes an energizing path for a first mark pulse relay 9MK, this path extending from grounded and closed contacts 10CB1 through closed contacts 10PT5, 10RDS2, 10IC2, 10PU3, 9IDF10, to the operating winding of the mark pulse relay 9MK through a pair of contacts 921 on a mark pulse monitoring jack 920. The operation of the first mark pulse relay 9MK closes a plurality of contacts 9MK1 and 12MK1. The closure of the contacts 9MK1, which are of a pulsing type, completes a path extending to one side of the winding of the mark pulse head 800 in the trunk recorder 127. This path extends from ground through the closed contacts 9MK1, and a plurality of closed contacts 9MKS2 and 9CS4. The other side of the winding of the mark pulse head 800 is connected to grounded battery through a pair of parallel paths, one of which includes a pair of closed contacts 9CS7. Accordingly, the operation of the first mark pulse relay 9MK energizes the mark head 800 to record a single mark pulse on the magnetic tape 12000 of the trunk recorder 127 as shown in Fig. 23A of the drawings.

The closure of the contacts 12MK1, upon operation of the first mark pulse relay 9MK, completes an obvious energizing circuit for a second mark pulse relay 12MKS. The operation of this relay closes a pair of contacts 9MKS1 and opens the pair of contacts 9MKS2. The opening of the contacts 9MKS2 terminates the energization of the mark head 800 and thus completes the recording of a single mark pulse on the tape 12000 representing the first impulse of the dialed party digit "2."

The closure of the contacts 9MKS1 completes a path extending from a grounded and normally closed pair of contacts 9EC4 through a pair of contacts 841 in an advance pulse monitoring jack 840 to the advance magnet 820 in the trunk recorder 127. The energization of the advance magnet 820 operates the step-by-step driving mechanism in the trunk recorder to advance the magnetic tape 12000 therein following the recording of the first mark pulse thereon.

At the end of the first open circuit interval representing the first impulse of the two impulses caused by dialing the assigned party digit "2," the calling loop circuit is again completed to cause the operation of the calling bridge relay 5CB. The operation of this relay opens the plurality of contacts 10CB1 and 7CB2 and closes the plurality of contacts 10CB2 and 7CB1. The operation of the contacts 7CB1 and 7CB2 again does not affect the operation of the signaling circuit due to the operated condition of the last digit relay 5LD. The closure of the contacts 10CB2 again completes the energizing path for the release delay relay 10RD. However, the open circuit interval during which the calling bridge relay 5CB is released is shorter than the slow-to-release time of the release delay relay 10RD, and, accordingly, this relay remains operated until such time as the energizing path therefor is again completed by the closure of the contacts 10CB2.

The opening of the contacts 10CB1 opens the previously described energizing paths extending to the operating magnet 1001 of the minor switch 1000, to the operating winding of the shunt relay 10SH, and to the operating winding of the first mark pulse relay 9MK. The opening of the operating path for the shunt relay 10SH does not release this relay at this time inasmuch as the shunt relay is slow-to-release.

The opening of the energizing path extending to the operating winding of the first mark pulse relay 9MK permits this relay to release and, in doing so, to open the plurality of contacts 9MK1 and 12MK1. The opening of the contacts 9MK1 opens, at a second point, the previously described energizing path for the mark head 800 of the trunk recorder 127. The opening of the contacts 12MK1 opens the operating circuit for the second mark pulse relay 12MKS so that this relay in releasing closes the pair of contacts 9MKS2 and opens the pair of contacts 9MKS1. The closure of the contacts 9MKS2 prepares the operating path for the mark head 800, and the opening of the contacts 9MKS1 opens the operating path for the advance magnet 820 in the trunk recorder 127.

The opening of the operating path of the motor magnet 1001 of the stepping switch 1000 permits the plurality of wipers 560, 610 and 630 to be advanced into engagement with the first contacts in the contact banks 550, 600, and 620 associated therewith, the prior energization of the motor magnet 1001 conditioning these wipers for the one step advancement. The movement of the wipers 560 and 610 produces no useful function at this time, but the movement of the wiper 630 into engagement with the first contact in the contact bank 620 prepares an operating circuit for a digit one relay 6ON forming one of the plurality of dialed party digit register relays which store the value of the dialed party digit. The remaining register relays comprise a digit two relay 6TO, a digit three relay 6TR, and a digit six to ten relay 5STT. Accordingly, at the termination of the first impulse transmitted in accordance with the dialing of the assigned party digit, a single mark pulse has been recorded on the magnetic tape 12000 of the trunk recorder 127 by the mark head 800, the magnetic tape has been advanced a single step by the advance magnet 820, and the stepping switch 1000 in the trunk circuit 126 has been advanced a single step to condition one of the plurality of dialed party digit register relays for operation.

In addition to selecting one of the dialed party digit register relays, the first step of the wipers 560, 610 and 630 opens a pair of off-normal contacts 901 and closes a pair of off-normal contacts 902. The opening of the contacts 901 serves no useful function at this time. However, the closure of the contacts 902 prepares a path, which is interrupted at the open contacts 9SH1, for applying ground to one or more dialed party digit register relays 5STT, 6TR, 6TO, or 6ON, which are selected by the wiper 630 of the switch 1000 when the dialed party digit pulsing is completed.

Thereafter, the calling loop circuit is again interrupted at the pulsing contacts of the dialing device at the substation A so that the calling bridge relay 5CB is again released. The release of this relay operates the contacts 7CB2 and 7CB1 in the signaling circuit, but, as set forth above, this does not transmit signaling impulses. The release of this relay also opens the contacts 10CB2, but the release delay relay 10RD, in being slow-to-release, is maintained operated. The closure of the contacts 10CB2 again completes the operating circuits of the motor magnet 1001, the shunt relay 10SH, and the mark pulse relay 9MK. Since the shunt relay 10SH is slow-to-release, this relay has not released in the interval separating the first and second impulses of the dialed digit "2." However, the completion of the operating circuit of the mark pulse relay 9MK causes the energization of the mark head 800 to record a second mark pulse on the magnetic tape 12000, the operation of the second mark pulse relay 12MKS to terminate the energization of the mark head 800, and the energization of the advance magnet 820 to step the magnetic tape 12000 following the recording of the second mark pulse forming the complete recorded representation of the dialed party digit "2."

The completion of the energizing path extending to the motor magnet 1001 conditions the wipers 560, 610, and 630 for movement into engagement with the contacts in the second stepping position of the switch 1000.

Following the open circuit interval forming the second and last impulse of the dialed party digit "2," the calling bridge relay 5CB is again operated to close the contacts 10CB2 to reestablish the energizing circuit for the release delay relay 10RD and to open the contacts 10CB1 to interrupt the operating circuits for the shunt relay 10SH, the motor magnet 1001, and the mark pulse relay 9MK. The opening of the operating circuit for the first mark pulse relay 9MK releases this relay to cause the subsequent release of the second mark pulse relay 10MKS and the advance magnet 820 in the trunk recorder 127.

Opening the operating circuit to the motor magnet 1001 steps the wipers 560, 610, and 630 into engagement with the contacts in the second stepping positions of the banks 560, 600 and 620. The movement of the wipers 560 and 610, as set forth above, does not produce any useful function at this time. However, the movement of the wiper 630 interrupts the previously prepared circuit extending to the digit one relay 6ON and prepares an operating path extending to the operating winding of the digit two relay 6TO.

In the interdigit interval following the termination of the pulsing of the party digit "2," the shunt relay 10SH, which is slow-to-release, releases to close the plurality of contacts 9SH1 and 9SH3 and to open the plurality of contacts 9SH2, 5SH1, and 5SH2. The opening of the contacts 5SH1 and 5SH2 removes the shunt around the repeater coils 680 and 690 so that the calling loop circuit for energizing the calling bridge relay 5CB is extended therethrough.

To provide a space pulse following the group of mark pulses representing the value of the dialed party digit, the closure of the contacts 9SH3 completes an energizing path for the space pulse relay 8SP which extends thereto from the closed and grounded contacts 10RD1 through a plurality of closed contacts 9IC2, 9SHS2, 9SH3, 9PU3, 9IDF3, and a pair of contacts 851 on a space pulse monitor jack 850. The operation of the space pulse relay 8SP closes a plurality of contacts 9SP1 and 12SP1. The closure of the contacts 9SP1 completes a path extending from ground through a plurality of closed contacts 9SPS2, 9CS8, the winding of the space pulse head 810 and thence to grounded battery through a pair of parallel paths, one of which includes a pair of normally closed contacts 9CS3. The energization of the space pulse head 810 in the trunk recorder 127 records a space pulse on the magnetic tape therein immediately following the two mark pulses representing the dialed party digit "2" as shown in Fig. 23A.

The closure of the contacts 12SP1 completes an energizing path for a second space pulse relay 12SPS. The operation of this relay closes a pair of contacts 9SPS1 and opens the pair of contacts 9SPS2. The opening of the contacts 9SPS2 opens the previously described energizing path for the space pulse head 810 and thus terminates the recording of the space pulse thereon. The closure of the contacts 9SPS1 completes an energizing path for the advance magnet 820, thus advancing the magnetic tape 12000 following the recording of the space pulse thereon.

Referring now to the preceding release of the shunt relay 10SH, the closure of the contacts 9SH1 completes the previously prepared path for operating one of the dialed party digit register relays. More specifically, the closure of the grounded contacts 9SH1 completes an energizing path extending through the closed contacts 902, a pair of normally closed contacts 9PT1, the closed contacts 9LD3, the wiper 630, the second contact in the contact bank 620, and a pair of normally closed contacts 6TO1 to the operating winding of the digit two relay 6TO. The completion of this circuit operates the relay 6TO to open a plurality of contacts 5TO1, 6TO1, 11TO1, and 11TO3, and to close a plurality of contacts 6TO2, 9TO1, 11TO2, and 11TO4. The contacts 6TO1 and 6TO2 form a make-before-break contact arrangement so that a holding circuit for the digit two relay 6TO is completed through the closed contacts 6TO2 and a pair of normally closed contacts 9IC2 to the holding ground provided by the closed contacts 10RD1 prior to the opening of the above described operating circuit.

The selective opening of the contacts 11TO1 and 11TO3 and the closing of the contacts 11TO2 and 11TO4 prepare a path for applying ground to a party two conductor 1162 which extends through a cable 1170 to a plurality of matrix selection relays in the identification matrix 128. As set forth above, this information is utilized in selecting a party matrix when multiparty service is provided on a terminal per station basis, but, since the calling substation A is on a private line, this information does not serve a useful function.

The closure of the contacts 9TO1 completes an energizing circuit for the release magnet 910 of the stepping switch 1000, which circuit extends from grounded and closed contacts 9SH1 through parallel paths including either the closed contacts 9SHS1 or the closed contacts 902 and a pair of closed contacts 9SR2, a pair of normally closed contacts 9SRST2, the closed contacts 9TO1, and the closed contacts 9LD1 to the operating winding of the release magnet 910. The energization of this magnet returns the wipers 560, 610, and 630 to a normal home position and also opens the off-normal contacts 902 while closing the off-normal contacts 901. Accordingly, the operation of the release magnet 910 restores the stepping switch 1000 to a normal position in which it is conditioned for subsequent operation under the control of the trunk circuit 126.

The opening of the contacts 5TO1 interrupts the operating circuit for the last digit relay 5LD, but, since this relay is slow-to-release, the relay remains operated for a selected period of time.

Referring again to the above described release of the shunt relay 10SH, the opening of the contacts 9SH2 interrupts the operating circuit for the shunt slave relay 9SHS. Since this relay is slow-to-release, after a selected time interval long enough to provide for the recording of a space pulse by the operation of the space pulse relays 8SP and 12SPS and the advance of the magnetic tape 12000, the shunt slave relay 9SHS releases to open the plurality of contacts 9SHS1 and 9SHS2. The opening of the contacts 9SHS1 interrupts one of the parallel paths for energizing the release magnet 910 of the stepping switch 1000, but, since the other parallel path is maintained closed by the off-normal contacts 902 of the switch 1000, the energizing path for the release magnet 910 is maintained until such time as the wipers thereof are reset, as indicated by the opening of the off-normal contacts 902.

The opening of the contacts 9SHS2 opens the previously described energizing path extending to the operating winding of the space pulse relay 8SP so that this relay releases to close the pair of contacts 9SP1 and to open the pair of contacts 12SP1. The opening of the contacts 9SP1 interrupts, at a second point, the energizing path for the space pulse head 810. The opening of the contacts 12SP1 opens the operating circuit for the second space pulse relay 12SPS so that this relay releases to open the pair of contacts 9SPS1 and to close the pair of contacts 9SPS2. The closure of the contacts 9SPS2 completes the preparation of the pulsing path extending to the space pulse head 810, and the opening of the contacts 9SPS1 interrupts the energizing path for the advance magnet 820.

As set forth above, the operation of a selected one of the dialed party digit register relays, such as the digit two relay 6TO, opens a pair of contacts, such as the contacts 5TO1, in the energizing circuit of the last digit relay 5LD. This relay is slow-to-release so that, following the completion of the above described operations, this relay releases to open the plurality of contacts 5LD1, 5LD2, 5LD4, 7LD1, 9LD1, 9LD3, 8LD1, and 10LD2 and to close the plurality of contacts 5LD3, 7LD2, 9LD2, 10LD1, and 10LD3. The opening of the contacts 5LD1 and 5LD2 removes the shunt around the operating windings of the differential party relay 5PY so that this relay is now rendered responsive to receive party identification impulses from a modified dialing device at a calling substation.

The closure of the contacts 5LD3 and the opening of the contacts 5LD4 prepare a portion of an operating path for the last digit relay 5LD controlled by the bank of contacts 550 and the wiper 560 of the stepping switch 1000.

The opening of the contacts 7LD1 and 7LD2 in the signaling circuit conditions this circuit for repeating pulses to the remote switching equipment 138 in accordance with subsequent digits dialed at the calling substation A. The opening of the contacts 8LD1 interrupts an operating path for a supervisory slave relay 8SRS.

The opening of the contacts 9LD1 interrupts the previously utilized operating path for the release magnet 910 of the stepping switch 1000 and the closure of the contacts 9LD2 prepares another operating circuit for this magnet. The opening of the contacts 9LD3 interrupts the previously described path for selectively operating one of the dialed party digit register relays 5STT, 6TR, 6TO, or 6ON.

The opening of the contacts 10LD2 interrupts the previously utilized path for pulsing the motor magnet 1001 of the stepping switch 1000, and the concurrent closure of the contacts 10LD1 prepares an operating path for a party transfer relay 10PT. The closure of the contacts 10LD3 prepares a path controlled by the calling bridge relay contacts 10CB1 for pulsing the various relays in the trunk circuit 126 in accordance with dialed digits.

Accordingly, in response to the dialing of the assigned party digit from a subscriber on a private line, the dialed digit is stored on the tape of the magnetic trunk recorder 127 in the form of a group of mark pulses equal in number to the value of the dialed digit followed by a space pulse (Fig. 23A), and the value of this party digit is also registered in the trunk circuit 126 by the selective operation of one of a plurality of dialed party digit register relays which are selectively operated under the control of the stepping switch 1000. Following this registration, the stepping switch 1000 is returned to a normal position and, in the interdigit pause following the dialing of this digit, the signaling circuit is conditioned for repeatng switch directly impulses to the remote switching equipment 138 and the party relay 5PY is returned to the calling loop circuit.

3. RECORDING THE CALLED SUBSCRIBER DIRECTORY NUMBER

As set forth above, it is assumed that the called substation C is located in the Cleveland area and is located in a Belmont 4 exchange, and is provided with a station number of "1712." Therefore, to call the substation C, the subscriber sequentially dials the called office code digits "234" followed by the station number digit "1712." During these dialing operations, the trunk circuit 126 repeats the switch directing signals over interoffice trunks to the remote switching equipment 138 so that the digits are utilized in selectively extending the connection to the substation C. Simultaneously therewith, this information is recorded on the magnetic tape 12000 of the trunk recorder 127 under the control of the trunk circuit 126.

When the subscriber at the substation A dials the first digit "2," representing the alphabetical character "B," the first open circuit interval causes the release of the bridge relay 5CB to close the plurality of contacts 7CB2 and 10CB1 and to open the plurality of contacts 7CB1 and 10CB2. The opening of the contacts 7CB1 removes resistance battery from the signaling conductor M and the simultaneous closure of the contact 7CB2 connects direct ground to this conductor, assuming that the signaling circuit is strapped to provide polar duplex operation.

The opening of the contacts 10CB2 interrupts the energizing circuit for the release delay relay 10RD, but, since this relay is slow-to-release, it remains operated. The closure of the contacts 10CB1 simultaneously completes the above described operating circuits extending to the shunt relay 10SH and the mark pulse relay 9MK, and, in addition thereto, completes an operating circuit for the party transfer relay 10PT extending through the closed contacts 10LD3, 10RDS1, 10LD1, and 10PT1.

The operation of the party transfer relay 10PT closes a plurality of contacts 5PT1, 6PT1, 8PT1, 9PT2, 10PT2, and 10PT4, and opens a plurality of contacts 5PT2, 9PT1, 9PT3, 10PT1, 10PT3, and 10PT5. The contacts 10PT1 and 10PT2 form a make-before-break contact arrangement so that a holding circuit for the party transfer relay 10PT is completed at the closed contacts 10PT2 extending to the closed contacts 12RDT2 prior to the interruption of the operating circuit by the opening of the contacts 10PT1.

The opening of the contacts 5PT2 interrupts at another point the previously interrupted operating circuit for the last digit relay 5LD, and the closure of the contacts 5PT1 prepares an additional operating circuit for the last digit relay 5LD extending to the seventh contact in the contact bank 550 of the stepping switch 1000. The closure of the contacts 6PT1 prepares an operating path for a second supervisory slave relay 6SRST which is connected to the second contact in the contact bank 600 of the stepping switch 1000. The closure of the contacts 8PT1 energizes a timer motor 830 so that this motor is placed in operation. However, since the operation of the trunk timer disclosed in the above identified Wharton application is controlled by a timer clutch 1100, the closure of the contacts 8PT1 merely places the motor 830 in operation to condition it for subsequent operation in providing duration impulses.

The opening of the contacts 9PT1 interrupts, at an additional point, an operating circuit for the release magnet 910 of the stepping switch 1000, and the opening of the contacts 9PT3 interrupts a circuit for applying ground to the wiper 610. The closure of the contacts 9PT2 prepares a circuit for applying ground to a portion of the contacts in the contact bank 550.

The opening of the contacts 10PT3 interrupts, at an adidtional point, the previously described operating circuit for the motor magnet 1001 of the stepping switch 1000, and the simultaneous closure of the contacts 10PT4 prepares an additional operating circuit for this motor magnet. The opening of the contacts 10PT5 interrupts one of the parallel pulsing paths controlled by the contacts 10CB1 of the calling bridge relay 10CB, this path being maintained completed by the normally closed contacts 10LD3.

As indicated above, simultaneously with the operation of the party transfer relay 10PT, the first mark pulse relay 9MK is operated to close the plurality of contacts 9MK1 and 12MK1. As described hereinabove, the closure of these contacts sequentially causes the energization of the mark pulse head 800 and the operation of the second mark pulse relay 12MKS, the operation of which interrupts the energization of the mark pulse head 800 and causes the operation of the advance magnet 820 whereby the magnetic tape 12000 in the trunk recorder 127 is advanced a single step.

Concurrently with operating the party transfer relay 10PT and the first mark pulse relay 9MK, the shunt relay 10SH is operated to close the plurality of contacts 5SH1, 5SH2, and 9SH2, and to open the plurality of contacts 9SH1 and 9SH3. As above, the closure of the contacts 5SH1 and 5SH2 shunts out the repeater coils 680 and 690 of the calling loop circuit and also shunts out the operating windings of the party relay 5PY since these windings are now in the calling loop circuit. The opening of the contacts 9SH3 interrupts, at an additional point, the operating path for the space pulse relay 8SP and the opening of the contacts 9SH1 removes ground from a plurality of partially prepared paths. The closure of the contacts 9SH2 simultaneously completes operating paths extending to the motor magnet 1001 of the stepping switch 1000 and the shunt slave relay 9SHS.

The completion of the energizing circuit through a plurality of closed contacts 10SR1, 10SRST2, and 10PT4 for the motor magnet 1001 conditions the wipers 560, 610, and 630 for movement into engagement with the first contacts in the contact banks 550, 600, and 620. The operation of the shunt slave relay 9SHS closes the plurality of contacts 9SHS1 and 9SHS2. The closure of the contacts 9SHS1 prepares an additional parallel path extending to the closed contacts 9PT2 for applying ground to some of the contacts in the contact bank 550, and the closure of the contacts 9SHS2 prepares a path in the above circuit for operating the first space pulse relay 8SP.

At the end of the first open circuit interval defining the first impulse of the two impulses provided by dialing the first called office code digit "2," the calling loop circuit is again completed to cause the operation of the calling bridge relay 5CB. The operation of this relay closes the contacts 7CB1 and 10CB2 and opens the plurality of contacts 7CB2 and 10CB1. The operation of the contacts 7CB1 and 7CB2 removes the direct ground applied to the conductor M of the signaling circuit and applies a resistance battery potential thereto. The closure of the contacts 10CB2 reestablishes the energizing circuit for the release delay relay 10RD which remained operated due to the slow-to-release characteristic thereof. The opening of the contacts 10CB1 opens the energizing circuit for the shunt relay 10SH and the first mark pulse relay 9MK. The shunt relay 10SH remains operated due to its slow-to-release characteristic, but the mark pulse relay 9MK is released, thereby causing the subsequent release of the second mark pulse relay 10MKS and the advance magnet 820.

In a similar manner, the next release of the calling bridge relay 5CB, in response to the second impulse of the pulse train provided by the digit "2" causes a pulse to be applied from the signaling circuit to the remote switching equipment 138 to control the operation thereof. This second release of the calling bridge relay 5CB also causes the operation of the first and second mark pulse relays 9MK and 12MKS and of the advance magnet 820 in the trunk recorder 127 so that a second mark pulse is recorded by the mark pulse head 800 on the magnetic tape 12000, following which the magnetic tape is advanced by the advance magnet 820. Since the first code digit "2" representing the first alphabetical character "B" of the office code of the directory number of the called substation includes only two impulses, the recording of the second mark pulse completes the recording of the second group of pulses, as shown in Fig. 23A.

Accordingly, in the following interdigit pause, during which the mark pulse relays 9MK and 12MKS and the advance magnet 820 are released, the shunt relay 10SH, after a suitable time delay, also releases to close the contacts 9SH1 and 9SH3 and to open the contacts 5SH1, 5SH2, and 9SH2. The opening of the contacts 5SH1 and 5SH2 removes the shunt around the operating windings of the party relay 5PY and the repeat coils 680 and 690, thereby placing these components in the calling loop circuit. The closure of the contacts 9SH1 performs no useful function at this time.

The closure of the contacts 9SH3 completes the previously described energizing path for the space pulse relay 8SP which, in operating, closes the contacts 12SP1 and opens the contacts 9SP1. The closure of the contacts 9SP1 energizes the space pulse head 810, thereby to record a single space pulse on the magnetic tape to indicate the completion of the recording of the mark pulses relating to the value of the first called office code digit. The closure of the contacts 12SP1 energizes the second space pulse relay 12SPS to open the contacts SPS2 and to close the contacts 9SPS1. The opening of the contacts 9SPS1 terminates the energization of the space pulse head 810 and the closure of the contacts 9SPS1 energizes the advance magnet 820 so that the magnetic tape 12000 is advanced a single step.

The opening of the contacts 9SH2 interrupts the operating circuits for the shunt slave relay 9SHS and the motor magnet 1001. The release of the motor magnet 1001 advances the wipers 560, 610, and 630 into engagement with the first contacts in the contact banks 550, 600, and 620 in addition to closing the off-normal contacts 902 and opening the off-normal contacts 901. Accordingly, the release of the shunt relay 10SH in the interdigit pause following the dialing of the first called office code digit steps the switch 1000 a single step to indicate that the first digit of the directory number has been dialed.

The release of the shunt slave relay 9SHS in response to the release of the shunt relay 10SH opens the contacts 9SH1 and 9SH2. The opening of the contacts 9SHS1 performs no useful function at this time. The opening of the contacts 9SHS2 opens the operating circuit of the first space pulse relay 8SP and, consequently, releases the second space pulse relay 12SPS and the advance magnet 820.

Thereafter, the calling subscriber at the substation A dials the digits "341712" forming the remainder of the directory number of the called subscriber at the substation C. The pulses provided by these dialing operations are transmitted by the signaling circuit to the remote switching equipment 138, thereby to extend the connection to the line circuit of the substation C. Simultaneously with repeating the digits to the remote switching equipment 138, these digits are stored on the magnetic tape 12000 of the trunk recorder 127, as shown in Fig. 23A, in the form of six groups of mark pulses separated from each other by space pulses, each group of mark pulses including a number of pulses equal in value to the digit dialed. Further, during the recording of the six digits dialed for completing the extension of the connection, the wipers 560, 610, and 630 of the stepping switch 1000 are advanced during the interdigit interval separating each of the dialed digits so that upon operation of the calling bridge relay 5CB at the termination of the pulsing of the seventh or last digit forming the directory number of the called subscriber, the motor magnet 1001 of the stepping switch is in an operated condition in preparation for moving the wipers 560, 610, and 630 into engagement with the contacts in the seventh stepping positions of the contact banks 550, 600, and 620.

The operating of the calling bridge relay 5CB at this time opens the energizing paths extending to the shunt relay 10SH and the mark pulse relay 9MK. The release of the mark pulse relay 9MK causes the subsequent release of the second mark pulse relay 12MKS and the advance magnet 820 to complete the recording of the last pulse in the group of two mark pulses forming the stored representation of the units digit of the called subscriber directory number.

After a suitable time delay sufficient to complete the above described operations, the shunt relay 10SH is released to close the contacts 9SH1 and 9SH3 and to open the contacts 5SH1, 5SH2, and 9SH2. Opening the contacts 5SH1 and 5SH2 removes the shunt around the repeater coils 680 and 690, thereby to condition the trunk circuit 126 for repeating voice frequency signals to the called subscriber at the substation C.

The closure of the contacts 9SH3 completes the above described operating path for the space pulse relay 8SP which, in operating, causes the subsequent operation of the second space pulse relay 12SPS and of the advance magnet 820 whereby a space pulse is recorded on the magnetic tape 12000 to indicate the termination of the group of mark pulses representing the units digit of the directory number of the called subscriber.

The opening of the contacts 9SH2 simultaneously interrupts the energizing circuit for the motor magnet 1001 and for the shunt slave relay 9SHS which, in being slow-to-release, does not release at this time. The release of the motor magnet 1001 moves the wipers 560, 610, and 630 into engagement with the contacts forming the seventh stepping position of the switch 1000. The movements of the wipers 610 and 630 produce no useful function at this time, but the movement of the wiper 560 into engagement with the seventh contacts in the bank 620 prepares an operating circuit for the last digit relay 5LD.

The closure of the contacts 9SH1 completes an energizing path for operating the last digit relay 5LD which extends from grounded and closed contacts 9SH1 through either the off-normal contacts 902 or the closed contacts 9SHS1 and 9SR2, the closed contacts 9PT2, the wiper 560, and the contacts forming the seventh stepping position in the contact bank 550, and the closed contacts 5LD3 and 5PT1 to the operating winding of the last digit relay, thereby causing the operation of this relay. The operation of the relay 5LD closes the plurality of contacts 5LD1, 5LD2, 5LD4, 7LD1, 8LD1, 9LD1, 9LD3, and 10LD2 and opens the plurality of contacts 5LD3, 7LD2, 9LD2, 10LD1, and 10LD3. The closure of the contacts 5LD1 and 5LD2 to provide a shunt around the differential operating windings of the party relay 5PY does not produce any useful function at this time. The closure of the contacts 5LD4 and the subsequent opening of the contacts 5LD2, which contacts form a make-before-break contact arrangement, completes a holding circuit for the last digit relay which extends to the closed and grounded contacts 12RDT2, thereby to maintain the last digit relay operated when the contacts 5LD3 are opened to interrupt the operating circuit for this relay.

The closure of the contacts 7LD1 and 7LD2 render the signaling circuit ineffective to transmit further switch directing impulses to the remote switching equipment 138, thereby preventing the dialing of an excessive number of switch directing digits.

The closure of the contacts 9LD1 completes an energizing path for the release magnet 910 of the stepping switch 1000 so that the wipers 560, 610, and 630 are returned to their normal home positions, this path being the same as that described hereinabove in conjunction with the previous operation of the release magnet 910. The opening of the contacts 9LD2 opens a previously prepared operating circuit for the release magnet 910 and the closure of the contact 9LD3 prepares a circuit for applying ground to the contact banks 600 and 620. The closure of the contacts 8LD1 prepares an operating path extending to the supervisory slave relay 8SRS, the completion of which is subsequently controlled by the contacts in the bank 550 and the wiper 560.

The opening of the contacts 10LD1 interrupts the previously opened operating circuit for the party transfer relay 10PT and the closure of the contacts 10LD2 prepares an operating path, interrupted at the contacts 10PT3, for operating the motor magnet 1001 of the stepping switch 1000. The opening of the contacts 10LD3 opens the other parallel branch of the pulsing path controlled by the contacts 10CB1 of the calling bridge relay 5CB to prevent response of the trunk circuit 126 to additional operations of the dialing device at the calling subscriber. Means are provided for interrupting the pulsing path to the first mark pulse relay 9MK following the receipt of the pulses forming the seventh line extending digit to positively prevent the recording of extra digital information in the magnetic trunk recorder 127, since additional mark pulses on the magnetic tape 12000 would cause incorrect operation of the recording equipment during the playback of the trunk recorder 127.

The slow-to-release shunt slave relay 9SHS, the operating circuit for which was interrupted by the preceding opening of the contacts 9SHS2, now releases to open the plurality of contacts 9SHS1 and 9SHS2. The opening of the contacts 9SHS1 interrupts one of the parallel energizing paths for the release magnet 910, the other parallel path being opened by the off-normal contacts 902. The opening of the contacts 9SHS2 breaks the energizing circuit for the space pulse relay 8SP, thus causing the release of the advance magnet 820 and the second space pulse relay 12SPS, thereby to terminate the recording of the space pulse following the group of mark pulses representing the value of the dialed units digit of the directory number of the called subscriber.

4. RELEASE OF THE TRUNK CIRCUIT 126 WHEN THE CALL CANNOT BE COMPLETED

In the event that the called line is engaged in a call or otherwise busy, the signaling circuit causes the application of a busy tone to the line to inform the subscriber that access may not be had to the called substation C and that the connection must be terminated. Release of the connection by the subscriber at the substation A causes the trunk circuit 126 to be restored to normal and prevents the further recording of items of information on the tape of the trunk recorder 127. The trunk circuit 126 further records a COE signal on the tape 12000 to indicate that no further items of information pertaining to this call are to be expected during a readout or playback operation.

To prevent the trunk circuit 126 from proceeding with its normal cycle of operation in the event that the connection to called substation C cannot be completed, sixty i.p.m. flashing is applied to the E lead of the signaling circuit, which lead is connected to the operating winding of a supervisory relay 7SR through a thermistor 760. Accordingly, following adequate heating of thermistor 760, the supervisory relay 7SR is intermittently operated at a rate of sixty operations per minute. The operation of the supervisory relay 7SR closes a plurality of contacts 7SR1, 9SR1, 11SR1, and 10SR2 and opens a plurality of contacts 9SR2, 10SR1, and 13SR1.

The closure of the contacts 7SR1 completes a shunting circuit around the thermistor 760 so that pulsing direct ground is applied to the operating winding of the relay 7SR. The opening of the contacts 13SR1 opens the shunt around the resistor 1331 connected in series with the monitor lamp 1330 so that this lamp becomes less brightly illuminated. The closure of contacts 11SR1 applies ground to a timer clutch 1100 so that a timer cam 1010 in the timer individual to the trunk circuit 126 is placed into rotation. The closure of the contacts 9SR1 prepares an operating circuit for a second supervisory slave relay 6SRST, which circuit is controlled by the wiper 610 and the contacts forming the bank 600 of the stepping switch 1000. The opening of the contacts 9SR2 interrupts a previously opened circuit for energizing the release magnet 910 of the stepping switch 1000.

The opening of the contacts 10SR1 interrupts a previously opened operating path for the motor magnet 1001, and the simultaneous closure of the contacts 10SR2 interconnects this operating winding through a pair of normally closed contacts 10SRS1 to a terminal to which is supplied sixty i.p.m. signals. The completion of this circuit applies a sixty i.p.m. signal to the operating motor magnet 1001 of the stepping switch 1000 so that the motor magnet 1001 is operated and released, thereby to cause the wipers 560, 610, and 630 to move into engagement with the first contacts in the contact banks 550, 600, and 620, and also to open the off-normal contacts 901 and to close the off-normal contacts 902.

However, following a single step of advancement by the stepping switch 1000, the supervisory relay 7SR, which is supplied with sixty i.p.m. signals, is released to open the plurality of contacts 7SR1, 9SR1, 10SR2, and 11SR1, and to close the plurality of contacts 9SR2, 10SR1, and 13SR1. The opening of the contacts 7SR1 removes the shunt around the termistor 760 so that when the next sixty i.p.m. signal is applied to the conductor E, the thermistor 760 must again be heated prior to operation of the supervisory relay 7SR. The closure of the contacts 13SR1 again provides bright supervision at the monitor lamp 1330 which, when considered with the dim supervision provided by the prior opening of these contacts, provides flashing of lamp 1330, thus indicating that a busy condition has been encountered in extending the call.

The opening of the contacts 9SR1 and the closure of the contacts 10SR1 produces no useful function at this time. The opening of the contacts 11SR1 opens the circuit to the timer clutch 1100, thereby terminating rotation of the cam 1010 and causing this cam to be mechanically returned to its normal position.

The opening of the contacts 10SR2 disconnects the motor magnet 1001 of the stepping switch 1000 from the source of sixty i.p.m. signals so that the stepping switch 1000 is not advanced following its first stepping operation. The closure of the contacts 9SR2 completes an operating path for the reset or release magnet 910 of the stepping switch 1000, which path extends from grounded and closed contacts 9SH1 through the closed off-normal contacts 902 and the closed contacts 9SR2, 9ON1, and 9LD1 to the operating winding of the magnet 910. Operation of the magnet 910 restores the wipers 560, 610, and 630 to their normal position and opens the off-normal contacts 902 while closing the off-normal contacts 901. The opening of the contacts 902 interrupts the previously described path for energizing the reset magnet 910 so that this magnet is released.

Accordingly, in response to the receipt of sixty i.p.m. flashing on the signaling lead E, the supervisory relay 7SR is alternately operated and released, thereby to cause the operation of the stepping switch 1000 through a single step followed immediately by a reset operation and to cause flashing of the lamp 1330. This intermittent operation of the stepping switch 1000 and the supervisory relay 7SR continues for as long as the sixty i.p.m. flashing is provided on the E lead of the signaling circuit.

During this alternate operation and release of the supervisory relay 7SR and the concurrent intermittent operation of the stepping switch 1000, the subscriber at the calling substation A, in response to the receipt of busy tone, replaces the handset on the cradle, thus opening the cradle switch and opening the calling loop circuit extending to the calling bridge relay 5CB. The interruption of this circuit releases the calling bridge relay 5CB to close the plurality of contacts 7CB2 and 10CB1 and to open the plurality of contacts 7CB1 and 10CB2. Following a suitable time delay, the slow-to-release release delay relay 10RD is released to close the plurality of contacts 5RD2 and 12RD2 and to open the plurality of contacts 5RD1, 5RD3, 10RD1, 12RD1, 12RD3, and 13RD1.

The opening of the contacts 5RD3 removes holding and busying ground from the sleeve conductor of the extended connection to release the switch train, but the simultaneous closure of the contacts 5RD2 applies busying ground thereto from the closed contacts 5RDT1 to prevent seizure of the trunk circuit 126. The opening of the contacts 5RD1 removes one source of holding ground for the trunk circuit 126. The opening of the contacts 13RD1 removes grounded battery from the monitor lamp 1330, thus extinguishing this lamp to indicate that the trunk circuit 126 is released. The opening of the contacts 10RD1 removes another source of main ground for the trunk circuit 126 and, in doing so, opens the holding circuit for the operated digit two relay 6TO, which relay, in releasing, interrupts the partial conditioned path to the party two conductor 1162 and, in opening the contacts 9TO1, opens the above described path for operating the reset magnet 910 during the intermittent operation of the switch 1000 under the control of the sixty i.p.m. signal. The opening of the contacts 12RD3 interrupts the energizing circuit for the second release delay relay 12RDT and the opening of the contacts 12RD1 opens the operating circuit for the release delay slave relay 12RDS, both of these relays remaining operated, however, due to the slow-to-release characteristics thereof.

The closure of the contacts 12RD2 completes an operating path for the end-of-call relay 11EC which extends from grounded and closed contacts 12RLS3 through closed contacts 12RD2, 12RDT1, 12CC2, 12PU2, and 11IC1. The operation of the end-of-call relay 11EC closes a plurality of contacts 5EC1, 9EC1, 9EC2, and 9EC3, and opens a plurality of contacts 9EC4 and 10EC1. The opening of the contacts 10EC1 performs no useful function at this time. The closure of the contacts 5EC1 provides an additional source of busying ground for the trunk circuit 126.

The closure of the contacts 9EC2 completes an energizing circuit extending through the contacts 921 for operating the mark pulse relay 9MK, and the closure of the contacts 9EC1 completes an energizing path extending through the closed contacts 851 for operating the space pulse relay 8SP. The operation of the space pulse relay 8SP and the mark pulse relay 9MK simultaneously energizes the space pulse head 810 and the mark pulse head 800 in the trunk recorder 127, thereby recording a COE signal comprising simultaneous mark and space pulses on the tape 12000. The operation of the space pulse relay 8SP and the mark pulse relay 9MK causes the accompanying operation of the second space pulse relay 12SPS and the second mark pulse relay 12MKS, thereby terminating the energization of the mark and space heads 800 and 810.

However, the opening of the contacts 9EC4 simultaneously with operating the space pulse relay 8SP and the mark pulse relay 9MK prevents the energization of the advance magnet 820 under the control of the second mark pulse relay 12MKS and the second space pulse relay 12SPS. The closure of the contacts 9EC3 completes an energizing circuit for a pulse-assist trunk relay 9PAT which extends through a pair of normally closed conductors 9PAT1, the pulse-assist trunk relay 9PAT being of a differential type.

Accordingly, when the contacts 9EC3 are closed to apply ground to the two differential windings of the relay 9PAT, current flows through the uppermost of these windings and a resistor 931 to charge a condenser 932. The current flow through this upper winding is in opposition to the current flow through the lower of the windings, and, accordingly, the relay 9PAT does not operate. After a predetermined time interval during which the condenser 932 becomes fully charged, the current flow through the upper winding of the relay 9PAT falls to a low enough value that the current flow through the lower of the differential windings is effective to operate this relay. The operation of the relay 9PAT opens the contacts 9PAT1 and closes a pair of pulsing contacts 8PAT1. The closure of the contacts 8PAT1 applies ground to the operating winding of the advance magnet 820. Operation of the advance magnet advances the magnetic tape 12000 a single step to space the concurrently recorded mark and space pulses forming the COE signal from the recording position.

The opening of the contacts 9PAT1 removes ground from the operating windings of the relay 9PAT, but this relay does not release at this time inasmuch as the condenser 932 now discharges in series with a variable resistance 930 through the two windings of this relay in such a sense that the flux in the two windings aids in maintaining the relay operated. After a predetermined time interval determined by the charge on the condenser 932 and the values of the two resistances 930 and 931, the current approaches a low enough value that the relay 9PAT releases to close the contacts 9PAT1 and to open the contacts 8PAT1. Opening the contacts 8PAT1 releases the advance magnet 820, and the closing of the contacts 9PAT1 completes again the energizing circuit for the pulse-assist trunk relay 9PAT.

Thereafter, the pulse-assist trunk relay 9PAT is intermittently operated and released, as described above, to sequentially operate and release the advance magnet 820, thereby providing a runout of the magnetic tape 12000 so as to effectively provide a space following the COE signal signifying the completion of the recording of the items of information pertaining to the incomplete call.

As set forth above, the release of the release delay relay 10RD interrupts the operating circuit for the release delay slave relay 12RDS which, in being slow-to-release, releases after a suitable time delay. The release of this relay closes the plurality of contacts 10RDS3 and 13RDS1 and opens the plurality of contacts 7RDS1, 7RDS2, 10RDS1, 10RDS2, and 13RDS2. The opening of the contacts 7RDS1 disconnects the M lead of the signaling circuit from the pulsing contacts controlled by the calling bridge relay and the simultaneous closure of the contacts 7RDS2 applies direct ground to the M lead. The closure of the contacts 13RDS1 prepares a circuit for applying ground to an emergency start conductor 1352 which extends to the playback control circuit 200. The opening of the contacts 13RDS2 removes ground from a signaling lead extending to the common supervisory circuit.

The opening of the contacts 10RDS1 and 10RDS2 prepares the trunk circuit 126 for operation upon subsequent seizure thereof, and the opening of the contacts 10RDS4 and the closure of the contacts 10RDS3 prepares circuits for permitting the trunk circuit 126 to be seized by the playback control circuit 200.

The second release delay relay 12RDT, the operating circuit for which is also interrupted by the prior release of the release delay relay 10RD, releases after a suitable time delay to close the plurality of contacts 5RDT2, 10RDT1, 12RDT3, and 13RDT1, and to open the plurality of contacts 5RDT1, 5RDT3, 10RDT2, 12RDT1, 12RDT2, and 13RDT2. The opening of the contacts 5RDT3 and the closure of the contacts 5RDT2 condition the party identification selection relay 5BC for subsequent operation under the control of signals applied to the HS lead of the conductors incoming to the trunk circuit 126. The opening of the contacts 5RDT1 removes one source of holding and busying ground for the sleeve conductor of the extended connection, but, due to the operation of the end-of-call relay, ground is maintained on the sleeve conductor by the closed contacts 5EC1.

The closure of the contacts 10RDT1 and 13RDT1 and the simultaneous opening of the contacts 10RDT2 and 13RDT2 merely aids in restoring the circuit 126 to normal. The closure of the contacts 12RDT3 applies ground to the terminal 1377, thus indicating that the trunk circuit 126 is idle. The opening of the contacts 12RDT1 interrupts the operating circuit for the end-of-call relay 11EC, but due to the provision of a condenser 1131 and a series resistor 1132, this relay is rendered slow-to-release and, accordingly, does not release in response to the opening of the contacts 12RDT1. The opening of the contacts 12RDT2 removes holding ground from the slow-to-release last digit relay 5LD and the party transfer relay 10PT so that these relays sequentially release.

The release of the party transfer relay 10PT closes the plurality of contacts 5PT2, 9PT1, 9PT3, 10PT1, 10PT3, and 10PT5 and opens the plurality of contacts 5PT1, 6PT1, 8PT1, 9PT2, 10PT2, and 10PT4. The selective opening and closing of the above identified contacts controlled by the party transfer relay 10PT perform no functions at this time other than to aid in returning the trunk circuit 126 to a normal condition, the opening of the contacts 10PT4 interrupting the supply of sixty i.p.m. signals to the motor magnet 1001 and the closing of the contacts 9PT1 preparing an operating path for the magnet 910.

The release of the last digit relay 5LD opens the plurality of contacts 5LD1, 5LD2, 5LD4, 7LD1, 8LD1, 9LD1, 9LD3, and 10LD2 and closes the plurality of contacts 5LD3, 7LD2, 9LD2, 10LD1, and 10LD3. The opening of the contacts 5LD1 and 5LD2 removes the shunt around the party relay 5PY, and the opening of the contacts 5LD4 together with the closure of the contacts 5LD3 prepares a circuit for subsequently operating the last digit relay 5LD. The opening of the contacts 7LD1 and the closure of the contacts 7LD2 returns the signaling circuit to its normal condition. The opening of the contacts 8LD1 interrupts the prepared circuit for operating the supervisory slave relay 8SRS, and the opening of the contacts 9LD1 and 9LD3 merely aid in restoring the trunk circuit 126 to a normal condition. The closure of the contacts 9LD2 completes an operating circuit for the release magnet 910 if the stepping switch 1000 is left in an off-normal position, as indicated by the contacts 902, when the release of relay 5LD terminated the application of impulsing signals to the motor magnet 1001. The closure of the contacts 10LD1, 10LD3 and the opening of the contacts 10LD2 merely restore the trunk circuit 126 to a normal condition.

Following a suitable time delay, the end-of-call relay 11EC is released, the operating circuit therefor being interrupted by the prior release of the second release delay relay 12RDT. The release of this relay closes the plurality of contacts 9EC4 and 10EC1 and opens the plurality of contacts 5EC1, 9EC1, 9EC2, and 9EC3. Opening the contacts 9EC1 and 9EC2 releases the first space pulse relay 8SP and the first mark pulse relay 9MK, respectively, and the release of these two relays causes the subsequent release of the second space pulse relay 12SPS and the second mark pulse relay 12MKS. The closure of the contacts 9EC4 prepares the previously described circuit for operating the advance magnet 820, and the opening of the contacts 9EC3 removes ground from the operating circuit for the pulse-assist trunk relay 9PAT. This relay intermittently operates and releases, as described, hereinabove, during the release of the last digit relay 5LD and the party transfer relay 10PT to space out the magnetic tape 12000 following the recording of the COE signal. The interruption of the energizing circuit for the pulse-assist trunk relay 9PAT terminates movement of the magnetic tape 12000 with the portion thereof located beneath the mark and space pulse heads 800 and 810 spaced from the recorded pulses pertaining to the preceding call. The opening of the contacts 5EC1 removes ground from the sleeve conductor of the extended switch train, thus permitting the trunk circuit 126 to be seized. This terminates the recording of the items of information on an incomplete call which, as assumed above, is terminated because of the busy condition of called substation C.

Accordingly, when a call is terminated due to the called line being unavailable for one reason or another, the magnetic tape 12000 in the trunk recorder 127 includes eight groups of mark pulses representing the dialed party digit and the seven digits dialed for extending the connection to the called subscriber, each of said groups being followed by a space pulse. The trunk circuit 126 automatically records a COE signal following the last space pulse and then automatically spaces out the tape 12000 to provide a physical separation on the tape between the COE signal pertaining to the incomplete call and the first item of information to be recorded relating to the next successive call placed through the trunk circuit 126.

5. OPERATION OF THE TRUNK CIRCUIT 126 IN RESPONSE TO COMPLETION OF THE CONNECTION TO THE CALLED SUBSTATION

In response to completion of the extension of the connection to the called substation C, the trunk circuit 126 initiates operation of the trunk timer to time the duration of the call and starts the automatic timing of a grace period during which the connection can be released without a toll charge being assessed for the call. This grace period affords the calling subscriber an opportunity to release the connection in the event of obtaining a wrong number without being charged for a completed toll connection. Further, following the expiration of the grace period, the trunk circuit 126 initiates operation of the clock and calendar circuit 133 to provide the trunk recorder 127 with items of information pertaining to the date and time at which the call was completed.

As described hereinabove, following the dialing of the seven digits forming the directory number of the called substation C, which digits are simultaneously recorded in the trunk recorder 127 and utilized to control the operation of the remote switching equipment 138, the stepping switch 1000 is returned to a normal position, and calling bridge relay 5CB, the last digit relay 5LD, the party transfer relay 10PT, the release delay relay 10RD, the release delay slave relay 12RDS, and the second release delay relay 12RDT are in an operated condition in addition to the selectively operated one of the dialed party digit register relays, such as the digit two relay 6TO.

In response to answering the call at the called substation C, the signaling circuit is provided with continuous ground on the E conductor which, as described above, following a suitable interval for heating the thermistor 760, causes the operation of the supervisory relay 7SR. The operation of this relay closes the plurality of contacts 7SR1, 9SR1, 10SR2, and 11SR1 and opens the contacts 9SR2, 10SR1, and 13SR1. The selective opening and closing of these contacts provide the same functions described hereinabove, which function includes the application of impulses occurring at one second intervals to the motor magnet 1001 of the stepping switch 1000. These impulses cause the wipers 560, 610, and 630 to be advanced at one second intervals over the contacts forming the contact banks 550, 600, and 620, respectively. When the wiper 610 is moved into engagement with the second contact in the contact bank 600, thus indicating that steady and not flashing ground is supplied to relay 7SR, a circuit is completed for operating a second supervisory slave relay 6SRST, this circuit extending from grounded and closed contacts 9SH1 through the closed contacts 9SR1, 9SRST1, the wiper 610, and the closed contacts 6PT1 to the operating winding of the second supervisory slave relay 6SRST.

The operation of this relay opens a plurality of contacts 9SRST1, 9SRST2, and 10SRST2 and closes a plurality of contacts 6SRST1 and 9SRST2. The closure of the contacts 6SRST1, which are of a preliminary make type, completes a holding circuit extending from the closed and grounded contacts 5RD1 for maintaining the second supervisory slave relay operated when the contacts 9SRST1 are opened to interrupt the operating circuit therefor.

The opening of the contacts 9SRST2 interrupts an operating circuit for the reset or release magnet 910 of the stepping switch 1000, thereby to prevent the single step operation of the switch 1000 described above during the busy condition in the event that the E lead of the signaling circuit is subsequently flashed. The opening of the contact 10SRST2 interrupts the previously described operating path for applying sixty i.p.m. signals to the motor magnet 1001, but the simultaneous closure of the contacts 10SRST1 completes a path for continuing the application of these impulses to the motor magnet 1001. The closure of the contacts 10SRST1 effectively provides a shunt around the contacts controlled by the supervisory relay 7SR to insure the continued operation of the stepping switch 1000 in the event that the E lead is subsequently flashed. Accordingly, the operation of the relay 9SRST indicates the completion of the busy test and insures the initiation of the grace period timing.

In order to provide for an adjustable grace time interval during which the connection may be released without causing the calling subscriber to be charged for a toll call, the fourth to tenth contacts in the contact bank 550 of the stepping switch 1000 are strapped to individual terminals in a terminal group 535. Assuming that an eight second grace time interval is desired, a conductor 531 is strapped to the terminal group 535 to be connected to the eighth contact in the contact bank 550. Since the wipers 560, 610, and 630 are advanced a single step per second under the control of the sixty i.p.m. impulses supplied to the motor magnet 1001, at the end of the eighth second, a circuit is completed for operating the supervisory slave relay 8SRS. This circuit extends from grounded and closed contacts 9SH1 through the closed off-normal contacts 902 of the switch 1000, the closed contacts 9PT2, the wiper 560, the eighth contact in the contact bank 550, the conductor 531, and the closed contacts 8LD1 and 8SRS1 to the operating winding of the supervisory slave relay 8SRS.

The operation of this relay opens the plurality of contacts 8SRS1 and 10SRS1 and closes a plurality of contacts 8SRS2, 10SRS2, and 11SRS1. The contacts 8SRS1 and 8RS2 form a make-before-break contacts arrangement in which the contacts 8SRS2 are closed to complete a holding circuit extending to the closed and grounded contacts 5RD1 prior to the opening of the contacts 8SRS1. The opening of the contacts 10SRS1 opens the path for applying sixty i.p.m. signals to the motor magnet 1001 of the stepping switch 1000 and, accordingly, terminates stepping of the switch 1000. The closure of the contacts 11SRS1 completes a parallel circuit shunting the contact 11SR1 on the supervisory relay 7SR for maintaining the timer clutch 1100 engaged so that the cam 1010 controlled thereby is continuously rotated in the event that the supervisory relay 7SR is released. The closure of the contacts 10SRS2 prepares a circuit for seizing the clock and calendar circuit 133 and for causing the transmission of impulses representing the date and time of completing the call from the clock and calendar circuit to the trunk recorder 127.

Assuming that answering supervisory signals are received, as indicated by the operation of the second supervisory slave relay 6SRST due to the wipers being advanced to the second stepping position, as distinguished from the receipt of flashing on the E lead which causes the wipers to be stepped to the first contact and then reset, and further assuming that the subscriber, for any reason, such as ascertaining that an incorrect number has been dialed, desires to release the connection, this must be done within the above described eight second grace interval in order to avoid being charged for a toll call. In addition, not only must the call be terminated, but the disconnection of the extended connection must be completed to the extent that the trunk circuit 126 is virtually restored to a normal condition within this eight second interval.

As described above, the release of the connection causes the sequential release of the calling bridge relay 5CB, the release delay relay 10RD, the operation of the end-of-call relay 11EC, the space pulse relay 8SP, the first mark pulse relay 9MK, the second space pulse relay 12SPS, the second mark pulse relay 12MKS, and the pulse-assist trunk relay 9PAT and the subsequent release of these relays together with the release of the release delay slave relay 12RDS, the second release-delay relay 12RDT, the party transfer relay 10PT, and the last digit relay 5LD. The sequential release and operation of the above described components of the trunk circuit 126 causes the release of the switch train, the recording of a COE signal on the magnetic tape 12000 following the last space pulse, and an advance of the magnetic tape 12000 to space the COE signal from the next item to be recorded. This operation is described in detail above under subtitle "4. Release of the trunk circuit 126 when the call cannot be completed."

However, the release of the trunk circuit 126 following the receipt of answering sulpervisory signals is somewhat different from that described above due to the operation of the second supervisory slave relay 6SRST. This first difference arises out of the closure of the contacts 10SRST1 which interconnect the motor magnet 1001 with the source of sixty i.p.m. signals, thus causing the stepping switch 1000 to be continuously advanced until the termination of the related grace period. When the stepping switch 1000 is operated under the control of flashing ground on the E lead of the signaling circuit, the stepping switch is advanced to the first position and subsequently returned to the home position in repeated cycles until such time as the connection is released. However, the operation of the second supervisory slave relay to open the contacts 9SRST2 opens the circuit for operating the reset or release magnet 910 of the switch 1000. Accordingly, a release of the supervisory relay cannot reset the stepping switch 1000, but rather this switch continues to step until such time as the party transfer relay 10PT and the last digit relay 5LD are released. At this time, a circuit is completed from the closed and grounded contacts 9SH1 through the closed off-normal contacts 902 and the closed contacts 9PT1 and 9LD2 to cause the operation of the reset magnet 910. Operation of this magnet returns the wipers 560, 610, and 630 to their normal home position.

However, in order to prevent the recording of the clock and calendar information and the other items of information which are utilized to control the production of a toll ticket for the call and which result in the assessment of a charge for the call, the relays 10PT and 5LD must be released prior to the time that the wiper 630 moves into engagement with the eighth contact in the bank 550 which signifies the end of the grace time interval, since the attainment of this stepping position by the switch 1000 causes the operation of the supervisory slave relay 8SRS and, accordingly, the initiation of the recording of the clock and calendar information. In all other respects, however, the release of the trunk circuit 126 following the receipt of answering supervisory signals and during the grace period is the same as that described hereinabove under subtitle "4. Release of the trunk circuit 126 when the call cannot be completed," the relay 6SRST being released by the opening of the contacts 5RD1.

Accordingly, following the receipt of answering supervisory signals, the trunk circuit 126 tests whether the supervisory signals received by the trunk circuit 126 indicate a busy condition or indicate the completion of the call and, following completion of the flashing supervisory or busy test, initiates the timing of a grace time interval during which the completed connection may be released by the subscriber to avoid the assessment of a charge for the call. At the end of this grace time interval, even if the connection is subsequently released, the trunk circuit 126 is conditioned to cause the recording of all of the items of information necessary for making a permanent record of the toll call.

6. RECORDING THE CLOCK AND CALENDAR INFORMATION

In controlling the recording of date and time information on the magnetic tape 12000 of the trunk recorder 127, the trunk circuit 126 first seizes the common clock and calendar circuit 133 and interconnects the mark and space pulse heads of the trunk recorder 127 with the pulse sending means in this circuit. Thereafter, seven groups of mark and space pulses are transmitted to the mark pulse head 800 and the space pulse head 810 to record the date and time of filing or completing the connection. Following the recording of this information, the trunk circuit 126 dismisses the common clock and calendar circuit 133.

More specifically, as described above, the operation of the supervisory slave relay 8SRS, at the termination of the grace time period, closes the contacts 10SRS2 to interconnect the operating winding of a pickup relay 10PU with a common conductor 1052 which extends to the clock and calendar circuit 133. If the clock and calendar circuit is idle at this time, ground is standing on the conductor 1052 to cause the operation of the pickup relay through a path including the closed contacts 10SRS2, 10IC1, 10CC1, and 10PU5. Alternatively, if the clock and calendar circuit 133 is engaged in providing items of information to another trunk circuit, the trunk circuit 126 holds until such time as ground is applied to the conductor 1052, thus indicating that the common clock and calendar circuit 133 is available.

Assuming that this circuit is idle, ground is applied to the conductor 1052 to cause the operation of the pickup relay 10PU through the above described circuit. The operation of this relay closes a plurality of contacts 9PU1, 9PU2, 10PU1, 10PU2, 10PU4, 12PU1, and 12PU3 and opens a plurality of contacts 9PU3, 10PU3, 10PU5, and 12PU2. The contacts 12PU1 and 12PU2, which are of a preliminary operate type, open the previously described operating circuit for the relay 11EC at an additional point and prepare other circuits. The contacts 10PU4 and 10PU5 form a make-before-break contact arrangement in which the closure of the contacts 10PU4 provides a holding circuit for extending the relay 10PU to a hold conductor 1052 which is grounded by the circuit 133 prior to the opening of the contacts 10PU5 to interrupt the operating circuit therefor.

The closure of the contacts 12PU3 completes an alternative holding path for the second release delay relay 12RDT which extends to the closed and grounded contacts 12RDT2 of this relay, thereby to provide means for maintaining this relay operated in the event that the release delay relay 10RD is released due to releasing the connection during the time that the clock and calendar information is being supplied to the trunk recorder 127.

The closure of the contacts 10PU2 interconnects the operating winding of the mark pulse relay 9MK with a mark pulse conductor 1055 which extends to mark pulse generating means in the clock and calendar circuit 133. The simultaneous opening of the contacts 10PU3 disconnects the mark pulse relay 9MK from pulsing means in the trunk circuit 126. The closure of the contacts 9PU2 interconnects the operating winding of the space pulse relay 8SP with a space pulse conductor 1054 which extends to space pulse generating means in the common clock and calendar circuit 133. The simultaneous opening of the contacts 9PU3 disconnects the space pulse relay 8SP from pulsing means in the trunk circuit 126.

The closure of the contacts 9PU1 completes an energizing circuit for a two-step calendar-complete relay 9CC, thereby causing this relay to operate its preliminary make contacts 9CC1. The closure of these contacts connects ground through one side of the lower winding of the calendar-complete relay 9CC through a path extending from closed and grounded contacts 10RD1 through a plurality of closed contacts 9IC2, 9IC3, 9IDF7, and 9CC1, the other side of this winding being connected to ground at the closed contacts 9PU1. The calendar-complete relay 9CC remains in this partially operated condition until such time as ground is removed by the opening of the contacts 9PU1.

The closure of the contacts 10PU1 applies ground to a clock and calendar start lead 1053 which extends to the common clock and calendar circuit 133. The application of ground to this conductor signifies to the clock and calendar circuit that the trunk circuit 126 has completed the preparations necessary for the receipt of mark and space pulse information representing the date and time of completing the call, and, accordingly, causes the clock and calendar circuit 133 to initiate the transmission of this information.

The mark pulse information supplied by the common clock and calendar circuit 133 consists of ground pulses which are applied to the conductor 1055. These ground pulses are transmitted through the contacts 10PU2, 9IDF-10, and 921 to cause operation of the mark pulse relay 9MK. The operation of this relay, as described above, causes the operation of the second mark pulse relay 12 MKS and the advance magnet 820 whereby the mark pulse head 800 is briefly energized to record a mark pulse on the tape 12000 and, thereafter, the tape is advanced a single step under the control of the advance magnet 820. In the same manner, space pulse information consisting of periodic ground pulses applied to the conductor 1054 causes the operation of the space pulse relay 8SP through a circuit including the closed contacts 851, 9IDF3, and 9PU2. The operation of the space pulse relay 8SP causes the consequent operation of the second space pulse relay 12SPS and of the advance magnet 820, whereby the space pulse head 810 is briefly energized to a space pulse and the advance magnet 820 is operated to step the magnetic tape 12000.

Since the grace period has elapsed prior to initiating the transmission of the date and time information to the trunk recorder 127 from the common clock and calendar circuit 133, it is necessary to insure that this information is transmitted to the trunk recorder 126 in the event that the subscriber releases the connection during the transmission of this data. More specifically, as set forth in detail above in the description in subtitle "4. Release of the trunk circuit 126 when the call cannot be completed," the release of the connection causes the sequential release of the calling bridge relay 5CB, the release delay relay 10RD, the last digit relay 5LD, the party transfer relay 10PT, the second release delay relay 12RDT, and the release delay slave relay 12RDS together with the operation and release of the mark pulse relay 9MK, the space pulse relay 8SP, the second mark pulse relay 12MKS, the second space pulse relay 12SPS, the pulse-assist trunk relay 9PAT, and the end-of-call relay 11EC. However, the release of the connection during the transmission of the clock and calendar information only causes the release of the calling bridge relay 5CB, the release delay relay 10RD, and the release delay slave relay 12RDS, as described above, and also the release of the supervisory relays 7SR, 8SRS, and 6SRST which have been operated at this time. The additional release of the relays 7SR, 8SRS, and 6SRST aids in returning the circuit 126 to normal, and in conjunction with the opening of the contacts 5RD1, stops the timer cam 1010 by releasing the clutch magnet 1100.

Inasmuch as the prior closure of the contacts 12PU3 provides a holding circuit for the second release delay relay 12RDT, this relay remains operated to provide holding ground for the last digit relay 5LD and the party transfer relay 10PT so that these relays do not release. Further, the prior opening of the contacts 12PU2 interrupts the operating circuit for the end-of-call relay 11EC so that this relay is not operated to record a COE signal and to space out the magnetic tape. The closed contacts 12PU1, together with the release of the relay 10RD to close the contacts 12RD2, provides holding ground for maintaining the selected party digit register relays operated, i.e., the digit two relay 6TO. Accordingly, the operation of the pickup relay 10PU insures that the trunk circuit 126 is maintained in a condition in which all of the date and time information can be transmitted to the trunk recorder 127 even if the connection is released during the transmission of this data.

Assuming that the call is not terminated during the transmission of the date and time data, following the completion thereof ground is removed from the holding conductor 1051 by the clock and calendar circuit 133 so that the pickup relay 10PU is released. The release of this relay closes the plurality of contacts 9PU3, 10PU3, 10PU5, and 12PU2 and opens the contacts 9PU1, 9PU2, 10PU1, 10PU2, 10PU4 and 12PU1.

The opening of the contacts 9PU1 removes the ground shunt from the two-step calendar-complete relay 9CC so that this relay now quickly operates fully. In operating fully, the relay 9CC closes a plurality of contacts 8CC1, 9CC1, 12CC1, and 12CC3, and opens a plurality of contacts 10CC1 and 12CC2. The opening of the contacts 10CC1 interrupts the above described operating path for the pickup relay 10PU so that this relay is not operated by the ground provided in the clock and calendar circuit 133. The opening of the contacts 12CC2 opens the operating path for the end-of-call relay 11EC, and the closure of the contacts 12CC1, which together with the contacts 12CC2 form a make-before-break contact arrangement, completes a circuit for holding ground for the trunk circuit 126 in the event that the connection is released during the subsequent provision of calling line identification information or for continuing the provision of holding ground in the event that the connection has been released during the transmission of date and time information, as described above. The closure of the contacts 12CC3 provides an alternative holding circuit for the second release delay relay 12RDT for the purpose of maintaining this relay operated to provide holding ground for a number of the components in the trunk circuit 126 if the connection extending to this trunk circuit is released during the transmission and the recording of calling line identification information or if the connection has been previously released as described above, thereby to insure the completion of the transmission of the date to the recorder 127.

The closure of the contacts 9CC2 applies ground to a conductor 1171 from closed and grounded contacts 9IDF6. This conductor is connected to contacts or bare wire multiples of trunk finder switches, such as the switches 131*a* and 132*a*, to mark the trunk circuit 126. More specifically, the application of ground to the conductor 1171 marks a stepping position in the contact banks of the trunk finder switches 131*a* and 132*a* so that a selected one of the identifier senders 131 or 132 may be associated with the trunk circuit 126. The closure of the contacts 8CC1 applies ground to an allotter start conductor 829 which extends to the identifier sender allotter 129 to cause this allotter to search for and seize an idle one of the identifier senders 131 or 132 and to subsequently cause the trunk finder switches 131*a* and 132*a* of the seized identifier sender to search for and seize the trunk circuit 126.

Referring back to the preceding release of the relay 10PU, the release of the contacts 12PU1 and 12PU2 open the above described holding ground circuit and prepare a circuit for operating the end-of-call relay 11EC, respectively, the holding ground circuit being maintained complete by the closed contacts 12CC1. The opening of the contacts 12PU3 opens the alternative holding circuit for the second release delay relay 12RDT described above, which circuit is maintained completed by the closed contacts 12CC3.

The opening of the contacts 9PU2 disconnects the space pulse relay 8SP from the space pulse conductor 1054, and the concurrent closure of the contacts 9PU3 connects this relay to the pulsing circuit provided in the trunk circuit 126. The opening of the contacts 10PU2 disconnects the mark pulse relay 9MK from the mark pulse conductor 1055, and the concurrent closure of the contacts 10PU3 connects this relay to pulsing circuits provided in the trunk circuit 126.

The opening of the contacts 10PU1 removes ground from the start conductor 1053 extending to the common clock and calendar circuit 133. The opening of the contacts 10PU4 opens the holding circuit for the pickup relay 10PU and the closure of the contacts 10PU5 prepares an operating circuit for this relay. However, this circuit is not completed due to opening of the contacts 10CC1.

Accordingly, to record the date and time of filing a call in the trunk recorder 127, the trunk circuit 126 seizes the common clock and calendar circuit 133 and, thereafter, cuts through pulsing paths from the common clock and calendar circuit 133 to the mark pulse relay 9MK and the space pulse relay 8SP, thereby to condition these relays for operation under the control of information sent from the clock and calendar circuit 133. The trunk circuit 126 further includes means for insuring the completion of the transmission of this information to the trunk recorder 127 in the event that the connection is released during the transmission interval. Further, as an incident to the completion of the transmission of the date and time information, the calendar-complete relay 9CC is operated to prepare the trunk circuit 126 for controlling the application of calling line or calling subscriber identification information to the trunk recorder 127 and to close contacts for preserving the holding ground paths provided to insure completion of the data recording if the connection is released.

7. RECORDING THE DESIGNATION OF THE CALLING SUBSTATION

In order to provide the trunk recorder 127 with data pertaining to the digital designation of the calling substation A, the trunk circuit 126 places the identifier sender allotter 129 in operation to seize an idle one of a plurality of identifier senders, such as the component 131 or 132, and, thereafter, causes the trunk finder switches 131*a* or 132*a* associated therewith to search for and seize the trunk circuit 126. Thereafter, the trunk circuit 126 renders a power supply circuit 11700 effective to supply an identification tone to the HS lead of the extended connection, which tone is transmitted over the extended connection to be applied to the identification matrix 128, thereby to selectively energize a group of thousands, hundreds, tens, and units marking conductors in accordance with the digital designation of the calling substation A. The identifier circuit 130 is energized by the selectively marking conductors to operate a group of register sender relays in the seized identifier sender in accordance with the values of the thousands, hundreds, tens, and units digits of the calling substation directory number. Thereafter, the identifier sender allotter 129, the common identification matrix 128, and the identifier circuit 130 are released to permit these components to be utilized in performing other calling line identification operations. Concurrently with the release of these components, the seized identifier sender, such as the identifier sender 131, transmits four groups of mark pulses separated by space pulses to the trunk circuit 126, this circuit previously having conditioned the space pulse relay 8SP and the mark pulse relay 9MK for operation under the control of the impulses transmitted from the seized identifier sender. Following the recording of this information, the trunk circuit 126 dismisses the identifier sender 131 and prepares the trunk recorder 127 for receiving impulses representing the duration of the toll call.

More specifically, as described above, the closure of the contacts 9CC2 provides marking ground on contacts or bare wire multiples individual to the trunk circuit 126, thereby to mark this circuit for interconnection with a seized one of a plurality of idle identifier senders 131 or 132. Further, the closure of the contacts 8CC1 applies ground to a common allotter start lead 829 which places the identifier sender allotter 129 in operation to seize an idle identifier sender, such as the sender 131, and to cause the trunk finder switch 131*a* associated therewith to select the terminals individual to the trunk circuit 126 in accordance with the marking conditions provided thereon. Following the completion of these operations in which the identifier sender 131 is seized and associated with the terminals individual to the trunk circuit 126, ground is applied to a conductor 1172 to cause the partial operation of a first identification relay 8IDF which is of the two-step type. The operation of this relay through its first step opens the pair of contacts 8IDF1 and closes a plurality of contacts 8IDF2 and 9IDF1, all of these contacts being of the preliminary operate type. The opening of the contacts 8IDF1 removes start ground from the common allotter start lead 829, thereby to permit this circuit to be returned to a normal condition. The closure of the contacts 8IDF2 applies a ground shunt around the upper operating winding of the two-step first identification relay 8IDF2 so that this relay is not fully operated until ground is removed from the conductor 1172.

The closure of the contacts 9IDF1 completes an energizing circuit for a second identification relay 9IDS which extends from closed and grounded contacts 8CC1 through the closed contacts 9IDS2 and 9IDF1. The operation of this relay closes a plurality of contacts 5IDS1, 5IDS2, 8IDS1, 9IDS1, and 13IDS1. The closure of the contacts 13IDS1 applies ground to a terminal 1378 which is connected to the shelf supervisory circuit, thereby to provide an indication that the calling line identification operation has been initiated. The closure of the contacts 8IDS1 prepares an operating circuit for a no-identification relay 8NI which extends to a common conductor 3530 which is terminated in the identifier senders.

In order to cause the selective operation of one of these party matrix selection relays in the identification matrix 128, the closure of the contacts 9IDS1 applies ground through a path including the closed and grounded contacts 8CC1, the contacts 9IDF2, 9IDS1, 12PF1, 12PTH1, 11PTW2, 11PO1, 11TR2, the contacts 11TO4 which are closed by the operation of the dialed party digit register relay 6TO, and the normally closed contacts 11STT3, thereby to ground the conductor 1162 which extends to the second party identification matrix in the identification matrix 128 through the cable 1170. Accordingly, the seizure of the identifier sender 131 causes the application of ground to a selected one of the party matrix selection relays in the identification matrix 128, thereby to condition this matrix for applying a marking potential to the input of the identifier circuit 130 in accordance with the digital designation forming the directory number of the calling substation. However, as set forth above, the substation A is located on a private line and none of the party matrices, accordingly, are utilized in controlling the determination of the directory number thereof.

In order to apply an alternating current identification potential over the extended switch train to selectively energize the identification matrix 128 in accordance with the digits forming the directory number of the calling substation A, the closure of the contacts 5IDS2 applies ground to a terminal 541 which is connected to a power supply circuit. In response to the application of ground the power supply circuit applies a sixty cycle potential to a terminal 542 in the trunk circuit 126. The potential supplied to the terminal 542 is applied through the closed contacts 5IDS1 to the HS conductor of the extended switch train.

This potential is returned over the switch train extended to the trunk circuit 126 and is applied by an identification conductor individual to the line circuit 140 to the identification matrix 128. The selective application of this potential causes the matrix 128 to selectively energize the identifier circuit 130 to provide an indication of the values of the thousands, hundreds, tens, and units digits forming the directory number of the calling substation A. The identifier circuit 130 selectively operates a group of register sender relays in the seized identifier sender 131.

When the register relays in the seized identifier sender 131 have been operated by the identifier circuit 130, the identifier sender removes ground from the conductor 1172, thereby to cause the first identification relay 8IDF to operate fully to close a plurality of contacts 9IDF4, 9IDF5, 9IDF8, 9IDF9, and 10IDF1, and to open a plurality of contacts 9IDF2, 9IDF3, 9IDF6, 9IDF7, and 9IDF10. The opening of the contacts 9IDF3 disconnects the space pulse relay 8SP from a pulsing circuit provided in the trunk circuit 126, and the simultaneous closure of the contacts 9IDF4 completes a circuit for interconnecting the operating winding of the space pulse relay 8SP with a conductor 1173 which extend to the seized identifier sender 131 and on which ground pulses representing space pulses are applied by the identifier sender 131 during the transmission of the items of information pertaining to the directory number of the calling subscriber. In a like manner, the opening of the contacts 9IDF10 disconnects the mark pulse relay 9MK from the pulsing circuits provided in the trunk circuit 126 and interconnects this relay with a conductor 1174 which extends to the seized identifier sender 31 and which is provided with ground pulses representing the mark pulse information which is to be transmitted by the identifier sender 131.

The closure of the contacts 9IDF5 and the subsequent opening of the contacts 9IDS6, which contacts provide a make-before-break arrangement, prepare a holding circuit for the calendar-complete relay 9CC and remove ground from the marking conductor 1171 which extends to the seized identifier sender 131, respectively. However, at this time, resistance ground is applied to the conductor 1171 by the identifier sender 131 but this ground is not sufficient to stop a trunk finder switch at the terminal of the trunk circuit 126. Simultaneously therewith, the contacts 9IDF8 are closed, and the contacts 9IDF7 are opened, these contacts also forming a make-before-break arrangement. The opening of the contacts 9IDF7 opens the previously described holding path for the calendar-complete relay 9CC, but the prior closure of the contacts 9IDF8 completes a holding circuit for this relay which extends from grounded battery through the two operating windings of the two-step relay 9CC and the closed contacts 9CC1, 9IDF8, 9IDF5, 9CC2 to the conductor 1171. As set forth above, this conductor is provided with resistance ground by the seized identifier sender 131, which resistance ground is sufficient to maintain the calendar-complete relay 9CC operated.

The opening of the contacts 9IDF2 interrupts the previously described paths for operating the second identification relay 9IDS and for applying ground to the selected party matrix selection relay under the control of the contacts operated by the digit two dialed party digit register relay 6TO. Accordingly, the selectively operated party matrix selection relay in the identification matrix 128 is released. Concurrently therewith, the second identification relay 9IDS is released to open the plurality of contacts 5IDS1, 5IDS2, 8IDS1, 9IDS1, and 13IDS1. The opening of the contacts 5IDS2 removes start ground from the power supply circuit, and the opening of the contacts 5IDS1 removes the identification potential from the HS lead of the switch train extended to the trunk circuit 126, thereby terminating the selective energization of marking conductors in the identification matrix 128 and by permitting both this circuit component and the identifier circuit 130 to be seized and utilized to perform additional identification operations.

The opening of the contacts 8IDS1 interrupts the operating circuit for the no-identification relay 8NI, and the opening of the contacts 13IDS1 indicates that the identification operation has been completed. The opening of the contacts 9IDS1 opens, at an additional point, the previously described circuit for operating a party matrix selection relay in the identification matrix 128.

Referring to the previously described complete operation of the first identification relay 8IDF, the closure of the contacts 10IDF1 completes an obvious energizing circuit for an identification-complete relay 10IC, which relay is slow-to-release. Operation of the identification-complete relay 10IC opens a plurality of contacts 5IC1, 9IC2, 9IC3, 10IC1, 10IC2, 10IC4 and 11IC1, and closes a plurality of contacts 9IC1, 11IC2, and 10IC3. The opening of the contacts 9IC3 and 9IC2 opens, at additional points, the previously described holding circuit for the calendar-complete relay 9CC, which remains operated due to the resistance ground on the conductor 1171. The opening of the contacts 9IC2 also opens the holding circuit for the dialed party digit register relays so that the relay 6TO releases. The release of the relay 6TO produces no useful function at this time. The closure of the contacts 9IC1 completes a holding circuit for the identification-complete relay 10IC extending from the closed and grounded contacts 10RD1.

The opening of the contacts 10IC2 interrupts the above described pulsing path for the mark pulse relay 9MK at an additional point and prepares, by the closure of the contacts 10IC3, a path for pulsing this relay under the control of the timer cam 1010 following the release of the first identification relay 8IDF.

The opening of the contacts 5IC1 interrupts one of a pair of parallel paths for applying ground to the calling loop circuit extending through the calling bridge relay CB, but this relay is maintained operated by the ground provided at the closed and grounded contacts 5TB1. The opening of the contacts 10IC4 interrupts a point in the operating path for the motor magnet 1001 of the stepping switch 1000, which circuit has previously been interrupted at a number of points. The opening of the contacts 10IC1 interrupts, at an additional point, the above described circuit for operating the pickup relay 10PU.

The opening of the contacts 11IC1 interrupts an operating circuit for the end-of-call relay 11EC, which circuit is open at the contacts 12CC2. The concurrent closure of the contacts 11IC2 prepares an operating circuit for the space pulse relay 8SP, which circuit is also interrupted at the contacts 12CC2.

By the completion of the above described pulsing paths for the mark pulse relay 9MK and the space pulse relay 8SP, the trunk recorder 127 is condiitoned for receiving four groups of mark pulses, each followed by a space pulse from the identifier sender 131 representing the thousands, hundreds, tens, and units digits of the directory number of the calling substation A. This sender transmits mark pulses by applying ground to the conductor 1174 and space pulses by applying ground to the conductor 1173, thereby to operate the space pulse relays 8SP and 12SPS, and the mark pulse relays 9MK and 12 MKS. Concurrently with these operations, the advance magnet 820 is operated and released to cause step-by-step movement of the magnetic tape 12000. Upon the completion of the transmission of this information to the trunk recorder 127, the seized identifier sender 131 is released and, in doing so, removes resistance ground from the conductor 1171.

The removal of ground from the conductor 1171, thus signifying the completion of the transmission of the calling line identification information to the trunk recorder 127, releases the calendar-complete relay 9CC. The release of this relay opens the plurality of contacts 8CC1, 9CC1, 9CC2, 12CC1, and 12CC3, and closes the contacts 10CC1 and 12CC2. The opening of the contacts 9CC1 opens one of the operating circuits for the calendar-complete relay 9CC. The opening of the contacts 12CC3 opens the auxiliary holding circuit for the second release-delay relay 12RDT, and the opening of the contact 12CC1 opens one of the paths for providing holding ground for maintaining the trunk circuit 126 in an operative condition to permit the recording of the calling line identification information in the event that the connection has been released prior to the completion of the transmission of the necessary data for ticketing the call. The closure of the contacts 12CC2 prepares a portion of an operating circuit for the space pulse relay 8SP. The closure of the contacts 10CC1 prepares a portion of the operating circuit for the pickup relay 10PU, but this circuit is maintained open at the contacts 10IC1. The opening of the contacts 9CC2 opens the previously described circuit for applying marking ground to the conductor 1171.

The opening of the contacts 8CC1 opens the operating circuit for the first identification relay 8IDF so that this relay releases to close the contacts 8IDF1, 9IDF2, 9IDF3, 9IDF6, 9IDF7, and 9IDF10 and to open the contacts 8IDF2, 9IDF1, 9IDF4, 9IDF5, 9IDF8, 9IDF9, and 10IDF1. The opening of the contacts 10IDF1 opens the operating circuit for the identification-complete relay 10IC, but this relay is maintained operated by the holding circuit completed by the prior closure of the contacts 9IC1. The opening of the contacts 9IDF4 disconnects the space pulse relay 8SP from the conductor 1174 and the closure of the contacts 9IDS3 prepares pulsing paths to circuits in the trunk circuit 126. The opening of the contacts 9IDS9 disconnects the mark pulse relay 9MK from the conductor 1174, and the closure of the contacts 9IDF10 prepares an operating circuit for this relay which extends to the pulsing contacts 1011 controlled by the cam 1010 of the trunk timer, which circuit is previously prepared by the closure of the contacts 10IC3. The closure and opening of the remainder of the contacts controlled by the first identification relay 8IDF merely aids in returning the trunk circuit 126 to a normal condition.

Accordingly, the trunk circuit 126, following the completion of the recording of the date and time information under the control of the common clock and calendar circuit 133, applies start ground to the identifier sender allotter 129 to cause the seizure of an idle identifier sender such as the identifier sender 131 and causes the trunk finder switch 131*a* associated with this sender to search for and seize the calling trunk circuit 126. In response to the association of the identifier sender 131 with the trunk circuit 126, the trunk circuit operates the power supply circuit 11700 to apply an identification potential to the identification matrix 128, thereby causing the identifier circuit 130 to selectively operate a group of register relays in the identifier sender 131. Concurrently with applying the identification potential to the switch train extended to the trunk circuit 126, this trunk circuit operates one of the party matrix selection relays, thereby to interconnect a selected one of the party matrices with the identifier circuit 130. In addition, following the establishment of the necessary information in the seized identifier sender 131, an identification-complete relay 10IC in the trunk circuit is operated to indicate that all of the necessary items of information have been stored in the sender 131 in preparation for the transmission thereof to the trunk recorder 127. Further, the operation of the first identification relay 8IDF in the trunk circuit 126 cuts through the pulsing leads of the identifier sender 131 to the space pulse relay 8SP and the mark pulse relay 9MK in the trunk circuit 126, thereby to control the recording of the items of information on the magnetic tape 12000 of the trunk recorder 127.

Following the transmission of the four groups of mark pulses representing the thousands, hundreds, tens, and units digits of the directory number of the calling subscriber, the trunk circuit 126 is disassociated from the identifier sender 131, and a pulsing path is prepared whereby the mark pulse relay 9MK is adapted to be controlled by impulses transmitted under the control of the cam 1010 of the trunk timer individual to the trunk circuit 126, thereby to provide duration information.

Since it is necessary to provide the calling subscriber identification information if the call extends beyond the grace time period, means are provided for insuring the transmission of the information from the identifier sender 131 to the trunk recorder 127 in the event that the connection is released during the transmission of this data or has been released prior thereto. More specifically, as set forth above, the operation of the calendar-complete relay, in closing the contacts 12CC3, provides a holding circuit for the second release delay relay 12RDT extending to the closed and grounded contacts 12RDT2 thereof. In addition, the closure of the contacts 12CC1 controlled by the calendar-complete relay 9CC provides an alternative path for applying holding ground for the last digit relay 5LD and the party transfer relay 10PT in the event that the connection is released.

More specifically, as described in detail hereinabove under subtitle "4. Release of the trunk circuit 126 when the call cannot be completed," the release of the connection causes the sequential release of the release delay relay 10RD, the release delay slave relay 12RDS, the supervisory slave relay 8SRS, the supervisory relay 7SR, and the second supervisory slave relay 6SRST. However, the holding circuit for the second release delay relay 12RDT maintains this relay operated to provide holding ground for the last digit relay 5LD and for the party transfer relay 10PT, this ground being provided by the closed contacts 12RDT2. Further, as described above, upon release of the release delay relay 10RD, the contacts 12RD2 are closed to apply ground to the closed contacts 12CC1 to provide holding ground for the selectively operated dialed party digit register relays, such as the digit two relay 6TO.

Further, during the transmission of the calling line identification information, the first identification relay 8IDF and the calendar-complete relay 9CC are operated. The first identification relay 8IDF is held operated under the control of the contacts 8CC1 of the calendar-complete relay 9CC, and, as described above, this relay is maintained operated prior to the operation of the identification-complete relay 10IC by the ground supplied through the closed contacts 12CC1. When the first identification relay 8IDF operates completely to interrupt the normal holding circuit for the calendar-complete relay 9CC, the control over the operation of this relay is transferred to the conductor 1171. which conductor is supplied with resistance ground by the seized identifier sender 131. Accordingly, the calendar-complete relay is maintained operated under the control of the identifier sender 131 even if the connection established from the calling substation A is released. In this manner, the calendar-complete relay 9CC and the first identification relay 8IDF are maintained operated under the control of the resistance ground provided by the identifier sender 131 and the identification-complete relay 10IC is maintained operated under the control of the ground provided through the closed contacts 12CC1 or 10IDF1 to insure that all of the items of information pertaining to the directory number of the calling subscriber are transmitted to the trunk recorder 127 in the event that the connection is released during the transmission of this information or has been previously released during the transmission of the date and time information. Following the transmission of this information by the seized identifier sender 131, resistance ground is removed from the conductor 1171 to cause the sequential release of the calendar-complete relay 9CC, and the first identification relay 8IDF as described in detail above.

The closure of the contacts 12CC2 completes an energizing circuit for the space pulse relay 8SP extending from the closed and grounded contacts 12RLS3 through the closed contacts 12RD2, 12RDT1, 12CC2, 12CU2, 11IC2, and 851. The operation of the space pulse relay 8SP together with the subsequent operation of the second space pulse relay 12SPS and of the advance magnet 820, records a space pulse on the magnetic tape 12000 which represents the space pulse which would have been recorded on the tape 12000 following the group of mark pulses representing the duration of the toll connection if the toll connection had not been released during the recording of either the date and time information or the calling subscriber identification information. Accordingly, in this manner, even though the connection had been released prior to the recording of duration impulses in the trunk recorder 127, the trunk circuit 126 automatically provides a space pulse on the magnetic tape 12000 to insure correct operation of the playback facilities during a playback or readout operation.

The release of the calendar-complete relay 9CC to open the contacts 12CC1 opens the holding circuit for the identification-complete relay 10IC, which in being slow-to-release, releases after a predetermined time delay. Further, the opening of the contacts 12CC3 opens the holding circuit for the slow-to-release second release delay relay 12RDT.

The identification-complete relay 10IC is first to release, and, in doing so, closes the plurality of contacts 5IC1, 10IC1, 10IC2, 10IC4, 9IC2, 9IC3, and 11IC1, and opens the plurality of contacts 9IC1, 10IC3, and 11IC2. The opening of the contacts 10IC3 disconnects the mark pulse relay 9MK from the contacts 1011 controlled by the timer cam 1010 to prevent the recording of duration mark pulses and the opening of the contacts 11IC2 interrupts the operating circuit for the space pulse relay 8SP. The closure of the contacts 11IC1 interconnects the operating winding of the end-of-call relay 11EC with ground through a path including the closed contacts 12RLS3, 12RD2, 12RDT1, 12CC2, 12PU2, and 11IC1 so that this relay is operated. The closing and the opening of the remainder of the contacts controlled by the identification-complete relay 10IC merely aids in restoring the trunk circuit 126 to a normal condition.

The operation of the end-of-call relay 11EC records a COE signal on the magnetic tape 12000 following the duration space pulse provided by the preceding operation of the relay 8SP. The pulse-assist trunk relay 9PAT is next intermittently operated and released, as described above, to space out the magnetic tape 12000 following the recording of the COE signal. The release of the second release delay relay 12RDT performs the same functions described in subtitle "4. Release of the trunk circuit 126 when the call cannot be completed" of the specification to restore the trunk circuit 126 to a normal condition.

Accordingly, in the event that the connection is released following the grace period and during or prior to the recording of the calling substation identification information in the trunk recorder 127, the trunk circuit 126 is maintained operative to insure the completion of the transmission of this information to the trunk recorder 127 and to record a duration space pulse and a COE signal on the magnetic tape 12000. Thereafter, the trunk circuit 126 is restored to a normal condition.

8. OPERATION OF THE TRUNK CIRCUIT 126 WHEN THE CALLING LINE IS NOT IDENTIFIED

When, for any reason, the seized identifier sender 131 is not provided with any items of information pertaining to the designation of the calling substation A, the trunk circuit 126 forcibly releases the connection extending to the remote switching equipment 138 and applies group busy tone to the tip and ring conductors of the extended switch train, thereby to indicate that the call cannot be completed since the absence of this information prevents the assessment of a toll charge for the call. However, even though the identifier sender 131 is not capable of providing mark pulse information designating the values of the digits of the directory number of the calling substation, four space pulses are transmitted to the trunk circuit 126 by the identifier sender 131. Upon receipt of the busy tone, the calling subscriber releases the extended connection and makes an additional attempt to secure the called substation C.

As described above, following the completion of the transmission of the date and time information to the trunk recorder 127, the calendar-complete relay 9CC is operated to apply a trunk marking potential to the conductor 1171 and to apply ground to the allotter start conductor 829, thereby to cause the allotter to select the idle identifier sender 131 and to operate the trunk finder switch 131*a* to search for and seize the trunk circuit 126. The completion of these functions partially operates the first identification relay 8IBF to close the preliminary make type contacts 9IDF1. The closure of the contacts 8IDF1 causes the operation of the second identification relay 9IDS.

The operation of the relay 9IDS applies the identification potential to the identification matrix 128, and causes the operation of the identifier circuit 130. In the event that none of the register relays in the identifier sender 131 are operated under the control of the identifier circuit 130, thus indicating that an identification of the calling line has not been provided, grounded battery is applied to the conductor 3530 by the identifier sender 131. This conductor is connected in series with the upper operating winding of the no-identification relay 8NI through a path including the closed contacts 8IDS1 which are closed by the operation of the second identification relay 9IDS. Since the other side of the upper operating winding of the relay 8NI is connected directly to ground, the no-identification relay is operated to close a plurality of contacts 5NI1, 7NI2, and 8NI1 and to open a pair of contacts 7NI1.

The closure of the contacts 8NI1 completes a holding circuit for maintaining the no-identification relay 8NI operated, which circuit extends to the closed and grounded contacts 5RD1. The opening of the contacts 7NI1 and the closure of the contacts 7NI2 removes the resistance battery provided at the closed contacts 7CB1 and applies direct ground to the M lead of the signaling circuit. The removal of resistance battery and the application of direct ground to the M signaling lead indicates that the remote switching equipment 138 is to be released. The closure of the contacts 5NI1 applies group busy tone through a condenser 530 to the tip and ring conductors of the switch train extended to the trunk circuit 126 and, thereby, informs the subscriber at the calling substation A that the connection may not be completed.

Next, the seized identifier sender 131 removes ground from the conductor 1172 causing the first identification relay 8IDF to operate fully. As described above under subtitle "7. Recording the designation of the calling substation," the operation of this relay connects the space pulse relay 8SP and the mark pulse relay 9MK with the pulsing leads 1173 and 1174 extending to the identifier sender 131, thereby to condition the trunk recorder 127 for receiving four space pulses in place of the normal mark and space pulse information. In addition, the operation of the first identification relay 8IDF causes the operation of the identification-complete relay 10IC, the operation of which relay prepares an additional circuit for operating the space pulse relay 8SP and interrupts the operating circuit for the end-of-call relay 11EC. The operation of the first identification relay 8IDF also releases the second identification relay 9IDS to terminate the application of the identification potential or tone to the HS conductor of the extended switch train, thereby permitting the identification matrix 128 and the identifier circuit 130 to be operated under the control of an additional trunk circuit to identify another calling substation.

Following the operation of the first identification relay

8IDF, the identifier sender 131 transmits four ground pulses on the space pulse conductor 1173 to cause four sequential operations and releases of the space pulse relay 8SP and the second space pulse relay 12SPS together with an operation and release of the advance magnet 820 following the recording of each of the space pulses. In this manner, four separate space pulses are provided on the magnetic tape 12000 in place of the mark pulses which cannot be transmitted since the identifier sender 131 has not been provided with any information relating to the values of the digits forming the directory number of the calling subscriber.

Referring to the above described application of direct ground to the M lead of the signaling circuit, thereby to cause the release of the remote switch train, this operation removes steady ground from the E signaling lead, thereby causing the release of the supervisory relay 7SR. Concurrently therewith, the connection is released at the calling substation A because of the application of group busy tone to the tip and ring conductors of the extended switch train. The release of this connection causes the sequential release of the calling bridge relay 5CB, the release delay relay 10RD, the supervisory slave relays 6SRST and 8SRS, the relay 8NI and the release delay slave relay 12 RDS, and also causes the resetting of the timer including the cam 1010 to a normal position. However, since the second release delay relay 12RDT is maintained operated through the holding circuit provided by the closed contacts 12CC3, this relay does not release and holding ground is provided for maintaining the last digit relay 5LD and the party transfer relay 10PT operated. The functions and operations performed by the sequential release of the above identified relays are described in detail above.

The identifier sender 131 next removes resistance ground from the conductor 1171, thus indicating that the four space pulses have been transmitted to the trunk recorder 127, and the removal of this ground releases the calendar-complete relay 9CC. The release of the calendar-complete relay 9CC, in addition to aiding in restoring the trunk circuit 126 to a normal condition, releases the first identification relay 8IDF to restore control over the space pulse relay 8SP, and the mark pulse relay 9MK to the pulsing circuits provided in the trunk circuit 126, opens the holding circuit for identification-complete relay 10IC which, in being slow-to-release, does not release at this time, and operates the space pulse relay 8SP to provide a single space pulse on the magnetic tape 12000 following the four space pulses provided by the identifier sender 131. As set forth above, this space pulse normally follows the group of mark pulses representing the duration of call information.

Following a suitable time delay, the identification-complete relay 10IC releases to complete an energizing circuit for the end-of-call relay 11EC which, in operating, causes the simultaneous operation of the space pulse relay 8SP and the mark pulse relay 9MK to record a COE signal on the magnetic tape 12000. In addition, the operation of the end-of-call relay 11EC causes the intermittent operation and release of the pulse-assist trunk relay 9PAT to space the recorded COE signal from the space and mark pulse heads 810 and 800. The prior release of the calendar-complete relay 9CC also interrupts the holding circuit for the second release delay relay 12RDT so that, following a suitable time interval, this relay releases to release the end-of-call relay 11EC. The release of the second release delay relay 12RDT also causes the sequential release of the party transfer relay 10PT and the last digit relay 5LD. The release of these two relays completes the return of the trunk circuit 126 to a normal condition as described above.

Accordingly, when the identifier sender 131 is not provided with any information pertaining to the digits forming the directory number of the calling substation, the no-identification relay 8NI is operated to apply group busy tone to the tip and ring conductors of the extended connection and to forcibly release the switch train extended from the trunk circuit 126. Thereafter, the identifier sender 131 sends four space pulses which are recorded in the trunk recorder 127, and the trunk circuit automatically records an additional space pulse and a COE signal on the tape 12000 followed by a tape space out operation. The trunk circuit 126 is then returned to a normal condition. Accordingly, the failure of the identification matrix 128 and the identifier circuit 130 to provide adequate information to the identifier sender 131 representing the designation of the calling substation releases the connection and terminates the recording operations of the trunk recorder 127 inasmuch as it is necessary to prevent calls from being extended if calling line identification information is not provided to permit charges for the call to be properly assessed to a subscriber.

9. RECORDING THE DURATION INFORMATION

To provide a record indicating the duration or length of the toll call, the trunk circuit 126 records separate mark pulses on the magnetic tape 12000 of the trunk recorder 127 at one minute intervals during the duration of the call. Following the recording of this group of mark pulses, the trunk circuit 126 records a space pulse and a COE signal on the magnetic tape 12000 followed by a tape space out operation. At the termination of these operations, the trunk circuit 126 is restored to a normal condition in which it is capable of being seized for controlling the recording of items of information pertaining to successive calls placed therethrough. As described above under subtitle "7. Recording the designation of the calling substation," at the termination of the recording of the items of information pertaining to the designation of the called substation A, the calendar-complete relay 9CC and the first identification relay 8IDF are sequentially released so that, at the time at which duration information is to be recorded in the trunk recorder 127, the following relays in the trunk circuit 126 are operated; the calling bridge relay 5CB, the supervisory relay 7SR, the supervisory slave relay 8SRS, the second supervisory slave relay 6SRST, the last digit relay 5LD, the party transfer relay 10PT, the release delay relay 10RD, the identification-complete relay 10IC, the release delay slave relay 12RDS, and the second release delay relay 12RDT. Further, the wipers 560, 610, and 630 of the stepping switch 1000 are in engagement with the contacts forming the eighth stepping positions thereof.

Referring back to the preceding description of the preliminary operation of the trunk circuit 126, the operation of the party transfer relay 10PT immediately following the dialing of the seven digits utilized in extending the connection to the called substation C completes, at the contacts 8PT1, a circuit for energizing the timer motor 830 to permit the motor to reach operating speed. Thereafter, in response to the application of direct ground to the E signaling lead, the supervisory relay 7SR is operated to close the contacts 11SR1. This circuit applies ground to a timer clutch 1100 so that the timer motor 830 is rendered effective to rotate the timer cam 1010 at a speed of one revolution per minute, thereby closing the pulsing contacts 1011 at one minute intervals.

However, as disclosed in the above identified copending Wharton application, the cam 1010 may be of such a configuration that the contacts 1011 are first closed after the timer clutch 1100 has been energized for slightly more than one minute. Since, when the connection is released following the end of the call, there is a certain inherent time delay in disconnecting the connection to inform the trunk circuit 126 that the timing of the call is to be terminated, it is desirable to provide a short delay before recording the first one minute impulse on the magnetic tape of the trunk recorder 127 in order to avoid charging the subscriber for the disconnect time of the switch train.

Accordingly, at a timed interval usually a few seconds longer than one minute following the operation of the supervisory relay 7SR, the cam 1010 closes the pulsing contacts 1011 to complete a circuit for energizing the mark pulse relay 9MK. This path extends from grounded and closed contacts 10RD1 through the pulsing contacts 1011 and the closed contacts 10IC3, 10PU3, 9IDF10, and 921. The operation of the mark pulse relay 9MK energizes the mark pulse head 800 and operates the second mark pulse relay 12MKS, the operation of which terminates the energization of the mark pulse head 800 and operates the advance magnet 820, thereby to advance the magnetic tape in the trunk recorder 127 a single step. Upon opening the contacts 1011, the operating circuit for the mark pulse relay 9MK and, accordingly, those of the second mark pulse relay 12MKS and the advance magnet 820 are sequentially opened, thereby permitting these components to release.

This intermittent operation and release of the mark pulse relay 9MK, the second mark pulse relay 12MKS, and the advance magnet 820 continues throughout the duration of the call so that a single mark pulse is recorded on the magnetic tape of the trunk recorder 127 following each elapsed time interval of one minute so that, at the termination of the call, a group of mark pulses is provided on the magnetic tape, which pulses are equal in number to the number of one minute intervals forming the length of the call. Assuming that the above described connection between the calling substation A and the called substation C is maintained for more than fifty-one but less than fifty-two minutes prior to release of the connection, fifty-one individual mark pulses are recorded on the magnetic tape 12000, as fragmentarily indicated in Fig. 23A of the drawings.

The release of the connection removes ground from the E lead of the signaling circuit, thereby opening the operating circuit for the supervisory relay 7SR. The release of this relay opens the contacts 7SR1, 9SR1, 10SR2, and 11SR1 and closes the contacts 9SR2, 10SR1, and 13SR1. The opening of the contacts 7SR1 removes the shunt around the thermistor 760 so that this component is again placed in series with the operating winding of the supervisory relay 7SR. The opening of the contacts 9SR1 and 10SR2, and the closing of the contacts 9SR2 and 10SR1 merely aids in returning the trunk circuit 126 to a normal condition. The opening of the contacts 11SR1 opens one of two parallel paths for maintaining the timer clutch 1100 energized, but the clutch is maintained operated by the ground path provided by the closed contacts 11SRS1. The closure of the contacts 13SR1 closes the shunt around the resistor 1331 to provide bright illumination of the lamp 1330.

The release of the connection at the calling substation A, thereby opening the calling loop circuit, causes the calling bridge relay 5CB to release to perform the same functions described hereinabove which include the opening of the operating circuit for the release delay relay 10RD. This relay releases following a suitable time delay and, in doing so, completes an energizing circuit for the space pulse relay 8SP which extends from the closed and grounded contacts 12RLS3 through the closed contacts 12RD2, 12RDT1, 12CC2, 12PU2, 11IC2, and 851 to the operating winding of the space pulse relay. The operation of this relay energizes the space pulse head 810 and operates the second space pulse relay 12SPS to simultaneously remove the energization from the space pulse head 810 and operate the advance magnet 820, whereby the magnetic tape 12000 is advanced a single step following the recording of the space at the end of the group of mark pulses representing the duration of the connection (Fig. 23A).

The release of the relay 10RD also resets the timer including the cam 1010 to normal and opens the holding and operating circuits for the last digit relay 5LD, the party transfer relay 10PT, the supervisory slave relay 8SRS, the second supervisory slave relay 6SRST, the identification-complete relay 10IC, the release delay slave relay 12RDS and the second release delay relay 12RDT. The last digit relay 5LD, the second release delay relay 12RDT, the release delay slave relay 12RDS, and the identification-complete realay 10IC are slow-to-release so that these relays do not release immediately. The release of the above relays aids in restoring the trunk circuit 126 to normal as described above.

The identification-complete relay 10IC is next to release and, in addition to aiding in restoring the trunk circuit 126 to a normal condition as described above, closes the contacts 11IC1 and opens the contacts 11IC2. The opening of the contacts 11IC2 opens the energizing path for the space pulse relay 8SP, thereby causing the release of this relay and of the second mark pulse relay 12SPS and the advance magnet 820. The closure of the contacts 11IC1 completes an energizing path for the end-of-call relay 11EC. The operation of this relay simultaneously operates the space pulse relay 8SP and the mark pulse relay 9MK to record a COE signal on the magnet tape 12000. Thereafter, the second mark pulse relay 12MKS and the second space pulse relay 12SPS are simultaneously operated to terminate the energization of the mark pulse head 800 and the space pulse head 810. The operation of the end-of-call relay 11EC also causes intermittent operation of the pulse-assist trunk relay 9PAT to advance the magnetic tape 12000 following the recording of the COE signal thereon, thereby indicating the termination of the recording of all of the items of information pertaining to the toll call placed between the substations A and C.

The release-delay slave relay 12RDS, the last digit relay 5LD, and the second release delay relay 12RDT are thereafter released to restore the trunk circuit 126 to a normal condition, as described above, thereby to permit this circuit to be seized and used in extending toll calls between the Hudson office and the Cleveland area. The closure of the contacts 9LD2 completes a circuit through the off-normal contacts 902 for operating the magnet 910 to reset the switch 1000 to a normal position in which the contacts 902 are opened and the contacts 901 are closed.

Accordingly, in response to the receipt of the necessary items of information from the identifier sender 131 representing the directory number of the calling substation, the trunk circuit 126 records a series of mark pulses on the magnetic tape 12000, the number of which represents the duration of the toll call. Following the recording of this duration information and in response to the release of the connection, a single space pulse is recorded on the magnetic tape followed by a COE signal and a space out operation. Thereafter, the trunk circuit 126 is restored to a normal condition in which it is capable of being seized and utilized in completing subsequent connections. The recording of the COE signal signifies the end of the call and thus indicates to the playback facilities that no further items of information should be expected relating to the preceding call.

*Operation of the trunk circuit 126 during the extension of a call from a substation on a terminal per line multiparty line to a called subscriber*

If a call is extended from the substation F located on a multiparty line having terminal per line party service, the trunk circuit 126 operates in the manner described above under the title "Operation of the trunk circuit 126 during the extension of a call from a substation on a private line," the information provided by the dialing of the assigned party digit being utilized in a playback operation to control the determination of the units digit of the directory number of the substation F. More particularly, the directory number of the substation F is assumed to be OL 3–9993 in which the units digit "3" represents the position of the substation F on the multiparty line terminating in the line circuit 330.

Figures 23B, 23C, 23D:
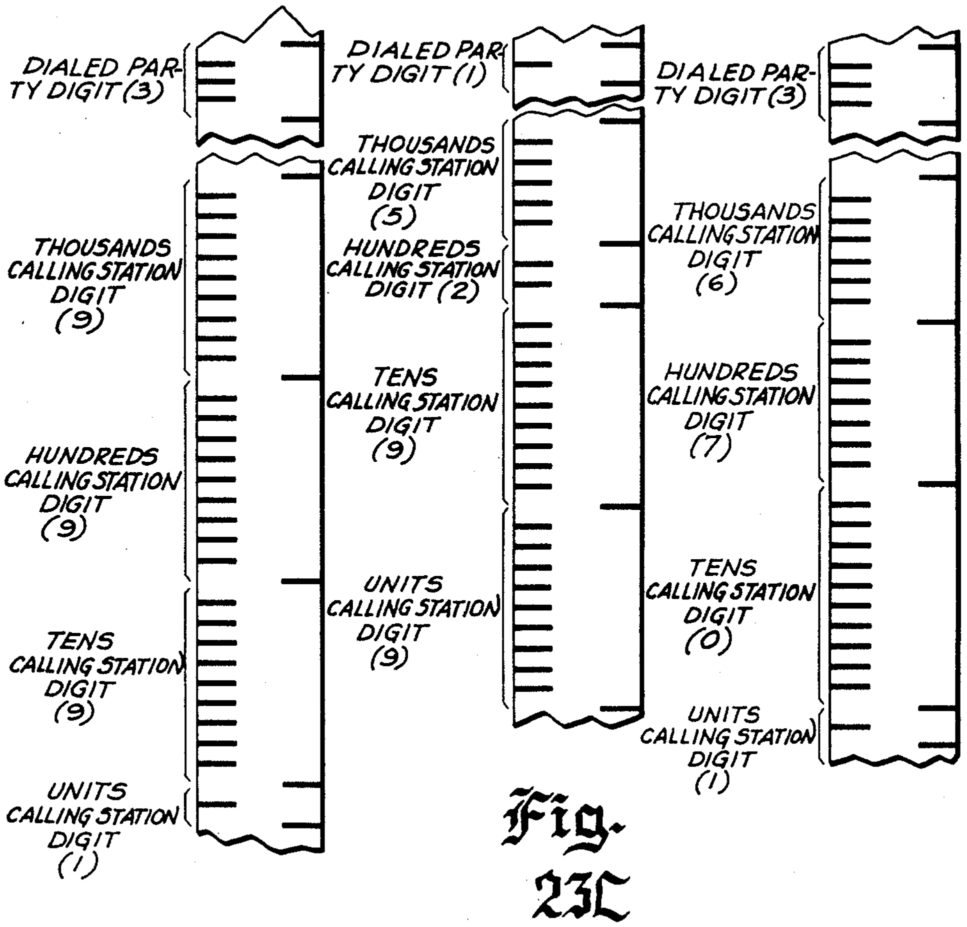
Figure 24A:
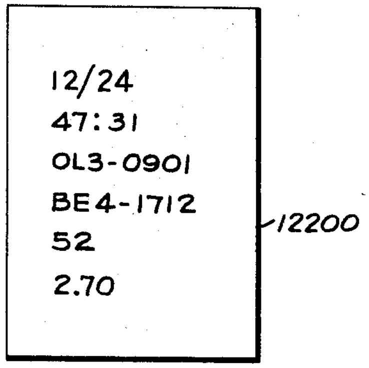
Figure 24B:
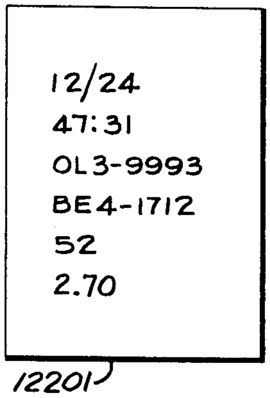
Figure 24C:
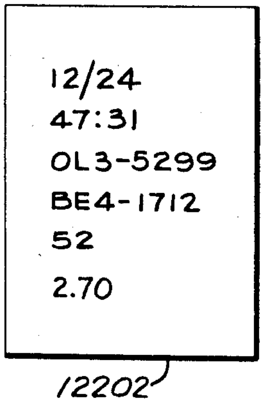
Figure 24D:
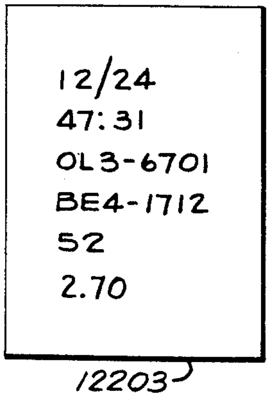

To initiate the extension of the connection to the called substation C from the calling substation F, the trunk circuit 126 operates in the manner set forth under subtitle "1. Seizure of the trunk circuit 126," so that the calling loop circuit is extended to the trunk circuit 126, and this circuit is conditioned for receiving the impulses provided by dialing the party digit. This party digit, in the case of the substation A on a private line, had an arbitrary value. However, in the case of the substation F, the assigned party digit which is first to be dialed by the calling subscriber corresponds with the units digit of the directory number of the substation F. Accordingly, in response to the dialing of the digit "3," the trunk circuit 126 operates as described in detail hereinabove in subtitle "2. Storage of the dialed party digit," to record three mark pulses followed by a single space pulse on the magnetic tape 12000 in the trunk recorder 127, as illustrated in Fig. 23B of the drawings, and, further, to operate the digit three relay 6TR in the plurality of dialed party digit register relays 5STT, 6TR, 6TO, and 6ON. The selective operation of the digit three relay 6TR closes a pair of contacts 11TR2 to prepare a path for applying ground to a conductor 1163, which conductor extends to the identification matrix 128 through the cable 1170. However, the establishment of this path to a party matrix selection relay in the identification matrix 128 does not serve any useful function inasmuch as the units digit of the directory number of the calling substation F is determined by the value of the dialed party digit.

Thereafter, the trunk circuit 126, in response to the dialing of the directory number of the called subscriber, i.e., digits "2341712," records seven groups of mark pulses separated by space pulses on the magnetic tape 12000, thereby to provide a record of the designation of the called substation. This recording takes place as described above in subtitle "3. Recording the called subscriber directory number." Following the recording of this information and in the event that answering supervisory signals are received from the remote switching equipment 138, the trunk circuit 126 operates as described in subtitles 5, 6, 7, and 9 above to record groups of mark pulses on the magnetic tape of the trunk recorder 127 representing the date and time at which the call was completed, the designation of the calling substation F (Fig. 23B), and the duration of the connection. Following this, the trunk recorder 127 and the trunk circuit 126 are restored to a normal condition.

In the event that the call cannot be completed to the called substation C, the trunk circuit operates as described above in subtitle "4. Release of the trunk circuit 126 when the call cannot be completed," and, in the event that an identification of the calling substation F cannot be provided, the trunk circuit 126 operates as described in subtitle "8. Operation of the trunk circuit 126 when the calling line is not identified," to forcibly release the connection and to record four space pulses on the magnetic tape of the trunk recorder 127 immediately following the clock and calendar information, these four space pulses being followed, as described above, by a space pulse, a COE signal, and a space out operation.

Incident to the operation of the second identification relay 9IDS during the determination of the directory number of the calling substation F, the contacts 5IDS1 are closed to apply the identification potential to the HS conductor of the extended switch train. As shown in Fig. 3 of the drawings, applying the identification potential to this conductor of the extended switch train causes the application of the identification potential to a conductor 326 which extends to the identification matrix 128. This conductor is terminated in the private line matrix in accordance with the directory number of the calling substation F. Since, as set forth above, the line circuit 330 terminates a multiparty line on which service is provided on a terminal per line basis, the application of potential to the conductor 326 represents the values of the thousands, hundreds, and tens digits of the directory number of the calling substation F, i.e., digits "999." The units or party digit of the designation cannot be indicated by the application of a potential to the conductor 326 inasmuch as a number of different calling substations, such as the substations E and F, are common to the single line circuit 330. The value of the units or party digit is determined by the dialed party digit which, as described hereinabove, is stored on the magnetic tape of the trunk recorder 127.

Accordingly, upon the extension of a call from the substation F on a terminal per line multiparty line, the trunk circuit 126 operates in the same manner as described above in conjunction with the extension of a call from a substation on a private line with the exception that the value of the dialed party digit is not arbitrary but rather represents the units digit of the directory number of the calling substation F.

*Operation of the trunk circuit 126 during the extension of a call from a substation on a terminal per station multiparty line provided with a conventional dialing device*

The substation G, as set forth above, is one of a plurality of substations on a party line terminating in the line circuit 340 on which multiparty service is provided on a terminal per station basis. Accordingly, the designation of the substation G, i.e., OL 3–6700 may be completely different from the directory numbers of the other substations on the same line, such as the substation H whose directory number is OL 3–5299. To provide the identification matrix 128 with information relating to each of these directory numbers, a plurality of separate conductors such as the conductors 346 and 336 corresponding to the substations H and G, respectively, are provided for extending the identification potential supplied to the HS lead by the trunk circuit 126 to different party matrices. Although the tone is simultaneously applied to the plurality of separate party matrices in which the conductors 336 and 346 are terminated due to the fact that all of the conductors 336, 346 are common to the finder terminals of the line circuit 340, only a selected one thereof is cut through by the trunk circuit 126 in accordance with the value of the dialed party digit. Accordingly, the values of the party digits assigned to the substations G and H are determined by the location of the substations on the line.

Therefore, when a call is extended from the substation H, which is the first party station on the line terminating in the line circuit 340 and which is designated by the directory number OL 3–5299, the trunk circuit 126 is seized as described in subtitle "1. Seizure of the trunk circuit 126," above, and the subscriber at the substation H then dials the party digit "1" which is assigned to the first party substation H. The dialing of this digit operates the trunk circuit 126 as described above in subtitle "2. Storage of the dialed party digit" so that the digit one relay 6ON is operated. The operation of this relay closes a pair of contacts 11ON1 to prepare a path extending to a conductor 1161. This conductor extends to the identification matrix 128 through the cable 1170 and is connected to the party selection relay in the party one matrix, thereby preparing a path for operating this matrix selection relay during an identification operation.

Concurrently with operating the digit one relay 6ON, the trunk circuit 126 stores a single mark pulse on the magnetic tape 12000, as shown in Fig. 23C, to represent the value of the dialed party digit. However, as explained above, the value of the digit recorded on the tape 12000 does not enter into the calling subscriber designation printed on the toll ticket.

The subscriber at the substation H then dials the seven digits identifying the called substation C, i.e., "2341712" which are recorded on the magnetic tape 12000 in the manner described above under subtitle "3. Recording the called subscriber directory number."

In response to the receipt of answering supervisory signals, the trunk circuit 126 operates as described in subtitles "5. Operation of the trunk circuit 126 in response to completion of the connection to the called substation," and "6. Recording the clock and calendar information," to record the date and time at which the call is completed on the magnetic tape 12000, and, thereafter, the second identification relay 9IDS is operated as described in subtitle "7. Recording the designation of the calling substation." The operation of this relay closes the contacts 5IDS1 to apply the identification potential to the HS conductor of the extended switch train so that the identification potential is simultaneously applied to the conductors 336 and 346, as showin in Fig. 3 of the drawings. These two conductors terminate in the party one and party three matrices in the identification matrix 128, thereby to energize the thousands, hundreds, tens, and units conductors in accordance with the designations of both of the substations G and H and all of the other substations on the multiparty line terminating in the line circuit 340. In the party three matrix corresponding to the party three substation G, conductors are selectively marked in accordance with the designation "6700," whereas in the party one matrix, corresponding to the H substation, conductors are marked corresponding to the digital designation "5299."

The operation of the second identification relay 9IDS also closes the contacts 9IDS1 so that ground is applied over the path previously prepared by the operation of the digit one relay 6ON to cause the selective operation of the party one matrix selection relay. This path extends from ground at closed contacts 8CC1 through the closed contacts 9IDF2, 9IDS1, 12PF1, 12PTH1, 11PTW2, 11PO1, 11TR2, 11TO3, 11ON1, and 11STT1, and thence to the operating winding of the party one matrix selection relay through the conductor 1161 in the cable 1170. The selective operation of the party one matrix selection relay interconnects the marked conductors in the party one matrix, representing the digital designation "5299," with the identifier circuit 130, thereby causing the seized identifier sender 131 to transmit four groups of mark pulses separated by space pulses to the trunk recorder 127, thereby to provide a stored representation of the thousands, hundreds, tens, and units digits of the directory number of the calling substation H, as shown in Fig. 23C. Accordingly, the selective operation of a dialed party digit register relay during the extension of a call from a substation H on a terminal per station multiparty line associates only a single one of the individual party matrices with the identifier circuit 130, thereby to cause the identifier sender 131 to send group of mark and space pulses to the trunk recorder 127 in accordance with the digital designation of only the calling substation on the multiparty line. The selective application of identification potential to the HS conductor of the extended switch train causes a plurality of party matrices to be selectively energized but only a single party matrix is selected by the operation of its associated party matrix selection relay to render this matrix effective to control the operation of the identifier circuit 130 and the identifier sender 131.

Following the recording of the designation of the calling station, the trunk circuit 126 operates as described in subtitle "9. Recording the duration information," to record the duration information followed by a COE signal and a space out operation, and following which the trunk circuit 126 is restored to a normal condition.

Accordingly, in extension of a call from a substation located on a terminal per station multiparty line, the trunk circuit 126 operates in the same manner as when the call is extended from a substation on either a private line or a terminal per line multiparty line to record the calling and called substation information, date and time information, and duration information. However, the dialing of the dialed party digit to cause the selective operation of one of the plurality of dialed party digit register relays prepares a path which is subsequently completed, upon initiation of the identification operation, to select one of a plurality of separate party matrices, thereby to provide information to the identifier circuit 130 of only the digital designation of the substation from which the call originated.

*Operation of the trunk circuit 126 during the extension of a call from a substation on a terminal per station multiparty line having a modified dialing device*

The trunk circuit 126, in extending a call from a terminal per station multiparty line having modified dialing devices provided thereon, in addition to performing all of the functions provided during the extension of a call from a private line, also conditions a plurality of party identification relays for selective operation under the control of ground impulses transmitted over the extended switch train by the modified dialing device during the dialing of the digits utilized for extending the connection to the called subscriber. The selective operation of one or more of the party identification relays prepares a path for causing the selective operation of one of the plurality of party matrix selection relays in the identification matrix 128, thereby to render effective the particular party matrix in which is terminated the identification conductor individual to the calling substation on the calling party line.

Since the party matrix is automatically selected, as contrasted with the operation of the terminal per station multiparty lines on which conventional dialing devices are provided, there is no need for dialing a party digit to control the selection of the party matrix selection relay. However, since the trunk circuit 126 is adapted to perform either type of identification operation, a dialed party digit is also assigned to those subscribers on terminal per station lines which have modified dialing devices, thereby to provide a uniform number of items of information on the magnetic tape of the trunk recorders pertaining to all different types of calls.

As described above, the substations I and J, among others, are located on a terminal per station multiparty line terminating in the line circuit 450 and, further, are provided with modified dialing devices of the type disclosed in the above identified Morris and MacCheyne patents. The substation I is identified by the directory number OL 3–6701, and the substation J is identified by the directory number OL 3–5201, and these substations are provided with individual identification conductors 426 and 416, respectively. Upon application of the identification potential to the HS terminal of the line circuit 450, both of these conductors are selectively energized, thereby to mark conductors in both the party one matrix, in which is terminated the conductor 416, and the party three matrix, in which is terminated the conductor 426, in accordance with the directory numbers of the substations I and J.

Assuming that a call is extended from the substation J, the trunk circuit 126 is seized as described above under the subtitle "1. Seizure of the trunk circuit 126," to condition this trunk circuit for receiving a dialed party digit. However, upon extension of the switch train to the trunk circuit 126, the operating winding of the party identification selection relay 5BC is connected to the HS terminal of the line circuit 450 through the HS level. This terminal is connected through both of the conductors 416 and 426, and any other conductors provided for additional stations on the calling line terminating on the line circuit 450, to resistance battery in the identification matrix 128. This circuit operates the party identification selection relay 5BC to close a plurality of contacts 5BC1 and 9BC1. The closure of the contacts 5BC1 prepares a holding path for the party identification selection relay 5BC, and the closure of the contacts 9BC1 prepares an operating path for a plurality of party identification relays 8PF, 8PTH, 9PTW, and 9PO.

Incident to seizure of the trunk circuit 126, the second release delay relay 12RDT is operated following the operation of the release delay relay 10RD to open the contacts 5RDT2 and to close the pair of contacts 5RDT3, these contacts forming a make-before-break contact arrangement. Accordingly, the closure of the contacts 5RDT3 prior to the opening of the contacts 5RDT2 completes a holding circuit for the party identification selection relay 5BC which extends from resistance battery through the closed contacts 5BC1.

Next, the subscriber at the calling substation I dials an assigned party digit, which may have any arbitrary value such as "2." The dialing of this digit operates the trunk circuit 126 to record two mark pulses and a single space pulse on the magnetic tape 12000 of the trunk recorder 127, as shown in Fig. 23D, to represent the value of the dialed partly digit. Concurrently therewith, the digit two relay 6TO is operated as described in detail above under the subtitle "2. Storage of the dialed party digit." This dialed party digit is not utilized in any manner in determining the directory number of the calling substation I but is provided to insure a uniform number of items of information on the tape 12000 of the trunk recorder 127. The dialing of the party digit may cause the transmission of a party identification impulse during the windup operation but this impulse does not operate the party relay due to the shunt around the operating windings thereof provided by the closed contacts 5LD1 and 5LD2. The release of the relay 5LD following the dialing of the party digit, as described above, removes the shunt and permits the relay 5PY to be operated.

The subscriber at the calling substation I then dials the seven digits forming the directory number of the called substation C so that the call is extended through the remote switching equipment 138, these operations being performed in the manner described above under the subtitle "3. Recording the called subscriber directory number."

However, during the dialing of these digits, the trunk circuit 126 performs an additional function, i.e., the automatic determination of the location of the calling substation I on the multiparty line in accordance with the station identification impulses automatically transmitted during successive windup operations of the modified dialing device at the substation I. More particularly, as described in detail in Morris Patent No. 2,691,070 and MacCheyne Patent No. 2,691,071, the modified dialing device includes a pair of contacts for applying ground to the tip and ring conductors of the extended switch train during windup operations of the dial. Each of the dialing devices at different stations on the line is provided with a cam for closing this additional pair of impulsing contacts a selected number of times during a selected number of successive dial operations.

Since the substation I is the third party on the line terminating in the line circuit 450, the control cam in the dialing device at this station is provided with a number of projections such that, during every four successive windup operations of this dialing device, three ground impulses are applied to the tip and ring conductors, thereby to designate that the substation I is the third substation on the line. In the same manner, the dialing device provided at the substation J, which is the first party on the line, is provided with a cam which transmits a ground impulse during only one of any four successive windup operations of the dialing device. These ground impulses may be applied to the tip and ring conductors during the dialing of any selected digits and need not occur in any particular order or permutation, inasmuch as the number of impulses transmitted during a selected number of dialing impulses provides the identification of the calling substation.

Assuming that the cam in the dialing device at the substation I is in such a position as to transmit a ground impulse to the tip and ring conductors during the windup operations forming a part of the dialing of the first, third, and fourth digits of the directory number of the called substation C, when the subscriber at the substation I rotates the dial in dialing the digit "2" corresponding to the alphabetical character "B" in the directory number of the called substation C, the impulsing contacts controlled by the cam therein are closed to apply ground to the tip and ring conductors. This ground operates the differential party relay 5PY by providing a ground shunt around the upper operating winding thereof. However, this application of ground to the tip and ring conductors does not release the calling bridge relay 5CB. The operation of the party relay 5PY closes a plurality of contacts 5PY1 and 9PY1.

Since the party relay 5PY is operated by the application of ground to the tip and ring conductors during a windup operation of the dial, and since inadvertent manual dial manipulation may result in partial windup operations, thereby resulting in the transmission of additional ground impulses to afford false party identification, the closure of the contacts 5PY1 provides a holding circuit for maintaining the party relay 5PY operated until such time as dial impulses are applied to the tip and ring conductors of the trunk circuit 126 following each windup operation. More specifically, the closure of the contacts 5PY1 provides a shunt around the upper operating winding of the party relay 5PY, thereby preventing this relay from being released until such time as the lower operating winding of this relay is deenergized due to opening the calling loop circuit incident to the transmission of switch directing impulses.

The closure of the contacts 9PY1 completes the crcuit previously prepared by the operation of the party identification selection relay 5BC for operating a first one of the party identification relays. More specifically, the closure of the contacts 9PY1 completes a circuit extending from the grounded and closed off-normal contacts 901 of the stepping switch 1000 through the closed contacts 9BC1, 9PY1, and 9PO3 for partially operating a party one relay 9PO, which is of the two-step type. The partial or preliminary operation of the party one relay 9PO closes a pair of preliminary make type contacts 9PO1. The closure of these contacts connects ground to the upper operating winding of the relay 9PO, thereby providing a complete operating and holding circuit for this relay extending to the closed and grounded contacts 10RD1.

When the calling loop circuit is first opened to transmit the first of the two impulses provided by dialing the digit "2," the party relay 5PY and the calling bridge relay 5CB are released. As described above, the release of the calling bridge relay 5CB operates the shunt relay 10SH and the party transfer relay 10PT in addition to recording the first mark pulse on the magnetic tape 12000. The release of the party relay 5PY opens the shunt provided by the contacts 5PY1 by opening these contacts and, in opening the contacts 9PY1, removes the ground shunt for the party one identification relay 9PO, thereby permitting this relay to fully operate.

In operating fully, the relay 9PO opens a plurality of contacts 9PO3 and 11PO1 and closes a plurality of contacts 9PO2 and 11PO2. The opening of the contacts 9PO3 interrupts the previously described operating circuit for the relay 9PO, at a second point, and the simultaneous closure of the contacts 9PO2 prepares an operating circuit extending to the party two identification relay 9PTW. The opening of the contacts 11PO1 and the closure of the contacts 11PO2 prepares a path for applying ground to the party one conductor 1161 which, as described above, extends through the cable 1170 to the party one matrix selection relay in the identification matrix 128.

The transmission of the single impulse remaining in the group of two impulses representing the dialed digit "2," operates the trunk circuit 126 to record a second mark impulse on the tape 12000 in the trunk recorder 127 followed by a space pulse, and to release the shunt relay 10SH during the interdigit interval. The release of shunt relay 10SH steps the switch 1000 to open the off-normal contacts 901, to close the off-normal contacts 902, and to move the wipers 560, 610, and 630 into engagement with the contacts forming the first stepping position of the switch 1000. These operations produce the same functions as described hereinabove with the exception that the opening of the off-normal contacts 901 removes the above source of ground for operating the party identification relays. However, ground is now provided by movement of the wiper 560 into engagement with the contact forming the first stepping position of the contact bank 550.

The subscriber at the calling substation I next dials the second called office code digit "3" but, as assumed above, a ground impulse is not applied to the tip and ring conductors of the trunk circuit 126 during the windup operation preceding the transmission of these three impulses. Accordingly, the trunk circuit 126 operates as described above to record three mark pulses followed by a single space pulse on the magnetic tape 1200. In the interdigit interval following the dialing of the second digit, the shunt relay 10SH and the motor magnet 1001 are released, thereby to advance the wipers to the second stepping position of the switch 1000.

In advancing the dial prior to the transmission of the third group of impulses forming the third called office code digit, ground is again applied to the tip and ring conductors of the extended switch train, thereby to cause the operation of the party relay 5PY. The operation of this relay again closes the contacts 5PY1 and 9PY1, the contacts 5PY1 providing a holding circuit for the differential party relay 5PY. The closure of the contacts 9PY1, however, completes a partial operating circuit for the two-step party two identification relay 9PTW, which circuit extends from ground through the wiper 560 and the closed contacts 9BC1, 9PY1, 9PO2, and 9PTW2. In partially operating, the relay 9PTW closes a pair of preliminary make type contacts 9PTW3.

The relay 5PY remains operated until such time as the calling loop circuit is again opened by the return movement of the dial during the pulsing of the line. The release of the party relay 5PY permits the party two identification relay to operate fully and to close a plurality of contacts 9PTW3 and 11PTW1 and to open a plurality of contacts 9PTW2 and 11PTW2. The opening of the contacts 9PTW2 interrupts the previously interrupted operating circuit for the party two identification relay 9PTW and, in closing the contacts 9PTW1, prepares an operating circuit for the party three identification relay 8PTH.

The operation of the contacts 11PTW1 and 11PTW2 prepares a circuit for applying ground to the conductor 1162 which is connected to the party two matrix selection relay in the identification matrix 128.

In the interdigit interval following the dialing of the third digit, the stepping switch 1000 is advanced so that the wipers 560, 610, and 630 engage the contacts in the third stepping position thereof so that, as assumed above, during the windup operation preceding the dialing of the first called station digit, the party relay 5PY is operated for the third time to close the contacts 9PY1, thereby completing a preliminary operating circuit for the party three identification relay 8PTH, which is also of the two-step type. In being partially operated, the relay 8PTH closes a pair of preliminary make type contacts 8PTH1. The release of the party relay 5PY permits the party three identification relay to fully operate and, accordingly, to close a plurality of contacts 8PTH2 and 12PTH2, and to open a plurality of contacts 8PTH3 and 12PTH1.

The opening of the contacts 8PTH3 interrupts the operating circuit for the party three identification relay 8PTH, but this relay is maintained operated by the holding ground provided at the closed contacts 8PTH1. The closure of the contacts 8PTH2 prepares a path for operating the party four identification relay 8PF. The opening of the contacts 12PTH1 interrupts the previously conditioned path for applying ground to the conductor 1162, described above, and the simultaneous closure of the contacts 12PTH2 prepares a path for applying ground to a conductor 1163, which conductor is connected to the party three matrix selection relay in the identification matrix 128 by the cable 1170.

In the interdigit interval following the dialing of the fourth digit, the shunt relay 10SH and the motor magnet 1001 of the stepping switch 1000 are again sequentially released to move the wipers 560, 610 and 630 into engagement with the contacts forming the fourth stepping position of the switch 1000. In the fourth stepping position, the wiper 560 is not in engagement with a contact which is strapped to ground, and, accordingly, ground is removed from the path for causing sequential operation of the party identification relays. Accordingly, additional windup operations of the modified dialing device at the calling substation I to cause the transmission of ground impulses to the tip and ring conductors of the extended switch train will cause the intermittent operation and release of the party relay 5PY, but the operation and release thereof will not be effective to control the sequential operation of the party identification relays 8PF, 8PTH, 9PTW, and 9PO. Therefore, the trunk circuit 126 is only conditioned for receiving and utilizing automatically transmitted station identification impulses during the dialing of the first four digits used for extending the connection to the called substation C. By the use of these four digits, it is possible to identify the calling substation on a line when four substations are provided thereon, inasmuch as one, two, three, or four ground impulses may be utilized by the trunk circuit 126 to cause the operation of one, two, three, or four of the party identification relays therein. If more than four substations having modified dialing devices are provided on a terminal per station multiparty line, additional party identification relays, such as the relays 8PF, 8PTH, 9PTW, or 9PO are provided, and the contact bank 550 is arranged to apply operating ground to the pulsing circuit including the contacts 9PY1 in more than the first three stepping positions of the switch 1000.

The subscriber at the calling substation I then dials the three called station digits necessary for completing the extension of the connection to the called substation C through the remote switching equipment 138, as described above in the subtitle "3. Recording the called subscriber directory number." In the event that the called substation C is available, the trunk circuit 126 operates as described in the subtitle "5. Operation of the trunk circuit 126 in response to the completion of the connection to the called substation," and in the subtitle "6. Recording the clock and calendar information," to record seven groups of mark pulses separated by space pulses on the tape 12000 representing the date and time at which the call was completed.

Thereafter, the trunk circuit 126 initiates the recording of the designation of the calling substation I on the tape of the trunk recorder 127, as described in the subtitle "7. Recording the designation of the calling substation." More specifically, when the second identification relay 9IDS operates to close the contacts 9IDS1, ground is applied to the contact tree controlled by the dialed party digit register relays and the party identification relays. As set forth above, the dialing of the dialed party digit "2," upon initiation of the call from the substation I, operates the digit two relay 6TO to close the contacts 11TO4, thus conditioning a path for applying ground to the conductor 1162 which extends to the party two matrix selection relay in the identification matrix 128. However, the party three identification relay 8PTH as well as the party two identification relay 9PTW and the party one identification relay 9PTO are also operated, as described above. The opening of the contacts 11PO1, 11PTW2, and 12PTH1 controlled by these relays opens the previously described path for applying ground to the conductor 1162, and the closure of the contacts 12PTH2 prepares a path for applying ground to the conductor 1163 which is connected to the party three matrix selection relay in the identification matrix 128. As explained above, the dialed party digit does not have any significance in controlling the determination of the directory number of the calling substation I inasmuch as, since this station is provided with a modified dialing device, the party identification relay which is automatically operated under the control of the station identification impulses provided by the modified dialing device automatically selects the matrix in which is terminated the identification conductor individual to the calling substation.

A consideration of the contact tree controlled by the relays 5STT, 6TR, 6TO, 6ON, 8PF, 8PTH, 9PTW, and 9PO shown in Figs. 11 and 12 of the drawings and which is effective to condition paths for applying ground to the conductors 1160 to 1169, inclusive, reveals that, in the event that one of the party identification relays is operated, the conductor which is conditioned for supplying ground through the party matrix selection relays is determined solely by the operated party identification relay and not by one of the dialed party digit register relays. In this manner, although a dialed party digit register relay is operated due to the necessity of providing dialed party digit information on calls extended from substations having modified dialing devices to insure the uniform number of items in the trunk recorder 127 pertaining to each call, the operation of a dialed party digit register does not cause the operation of an improper matrix selection relay in the identification matrix 128. In other words, the contact arrangement controlled by the party identification relays exercises a primary control over the conditioning of the paths extending through the cable 1170 to the party matrix selection relays.

Accordingly, when the contacts 9IDS1 are closed, ground is applied over the conductor 1163 to cause the operation of the party three matrix selection relay. The calling substation I is the third party on the line terminating in the line circuit 450 and the party three matrix is the matrix in which is terminated the identification conductor 426. Accordingly, the identifier circuit 130 is selectively energized under the control of the party three matrix in the identification matrix 128. The seized identifier sender 131 is thus rendered effective to transmit items of information to the trunk recorder 127 representing the value of the thousands, hundreds, tens, and units digits forming the directory number of the calling substation I. This information is recorded, as shown in Fig. 23D, as four groups of mark pulses followed by space pulses.

Following the recording of this information, the trunk circuit 126 operates as described in subtitle "9. Recording the duration information," to record duration information in the trunk recorder 127 and the trunk circuit 126 is released and returned to a normal condition in which it is capable of being seized during the extension of additional calls.

In being released, the trunk circuit causes the release of the operated party identification relays by removing holding ground from the operating windings thereof in response to the release of the release delay relay 10RD to open the contacts 10RD1 and further causes the release of the party identification selection relay 5BC in response to the release of the second release delay relay 12RDT to open the contacts 5RDT3. The release of the party identification selection relay restores the trunk circuit 126 to a normal condition in which this relay is capable of being operated in accordance with the nature of the identification operation which is required when the trunk circuit 126 is next seized. The release of the operated party identification relays merely opens the previously conditioned path for applying ground to one of the conductors 1160 to 1169.

Accordingly, the trunk circuit 126, in extending a call from the substation I which is provided with a modified dialing device and which is located on a terminal per station multiparty line, causes the operation of the party identification selection relay 5BC to condition the plurality of party identification relays 8PF, 8PTH, 9PTW, and 9PO for selective operation during the dialing of the first four digits utilized in extending the connection to the called substation C under the control of the party relay 5PY. Further, the trunk circuit 126 includes means for maintaining the party relay 5PY operated after each dial windup until such time as conventional switch directing impulses are transmitted over the extended connection, thereby to prevent false identification operations due to improper manipulation of the modified dialing device. The contact tree in the trunk circuit 126 is further so arranged that even though a dialed party digit register relay is operated in accordance with the dialed party digit, the party identification relays are effective to apply ground to the operating winding of the proper matrix selection relay in the identification matrix 128. In other respects, the operation of the trunk circuit 126 is similar to that described above in conjunction with the operation of this circuit during the extension of a call from a substation located on a private line.

*Operation of the trunk circuit 126 during a routine playback operation*

In a routine playback operation, the trunk circuit 126 together with other similar trunk circuits are sequentially seized by switching means, such as a switch 200*a* forming a part of the playback control circuit 200, so that each of the trunk recorders is sequentially associated with the readout control circuit 210 and the recorder 220 through one of the playback control circuits to cause the items of information stored therein to be transmitted to the recorder 220, whereby permanent records of the stored items of information are produced.

More specifically, the readout control circuit 210 seizes the playback control circuit 200, and, thereafter, the switching means 200*a* is operated to seize the idle trunk circuit 126. In the event that the trunk circuit 126 is engaged in recording items of information pertaining to a call or is otherwise busy, this trunk circuit is not seized and, accordingly, is not played back until the next playback operation is initiated. In response to seizure, the trunk circuit 126 cuts through the space pulse head 810 and the mark pulse head 800 to amplifying means provided in the playback control circuit 200, busies itself to prevent seizure, and initiates movement of the magnetic tape in the trunk recorder 127 so that this tape is returned to a position in which the items of information pertaining to the first call recorded on the tape are in position to be moved adjacent the space pulse head 810 and the mark pulse head 800.

At this time, the trunk recorder 127 is conditioned for transmitting information through the playback control circuit 200 to the recording facilities. Thereafter, control over movement of the tape in the seized recorder is transferred to the readout control circuit 210 so that the tape is thereafter advanced to transmit the items of information pertaining to a single call to the readout facilities. In response to the sensing of the COE signal following the items of information pertaining to the first call, the readout control circuit 210 interrupts tape movement until such time as the recording facilities either are cleared or are operated to produce a permanent record of the stored items of information. Thereafter, the readout control circuit intermittently causes tape movement in the trunk recorder 127 to transmit all of the items of information stored on this tape to control the operation of the recorder 220.

Following the transmission of all of the stored items on the tape, these items being erased concurrently with their transmission to the recording facilities, the readout control circuit 210 signals the playback control circuit 200 that the next subsequent trunk circuit similar to the trunk circuit 126 is to be seized and played back. As an incident to seizure of the trunk circuit 126, an advancing circuit has been operated to cause the magnetic tape in the next succeeding trunk recorder to be advanced to the position at which the items of information pertaining to the first call recorded thereon are in a position to be sensed by the mark and space pulse heads of this subsequent tape recorder. In this manner, the time delay inherent in returning the magnetic tape in each of the successively played back trunk recorders to their effective beginning or home positions is avoided by causing the tape in the next trunk recorder to be seized to be advanced to its beginning point as an incident to the seizure of the next preceding trunk circuit. When the trunk circuit 126 is released by the playback control circuit 200, it is restored to a normal condition in which it is capable of being utilized in controlling the recording of items of information pertaining to subsequent calls.

1. ASSOCIATION OF THE TRUNK CIRCUIT 126 WITH THE PLAYBACK CONTROL CIRCUIT AND THE READOUT CONTROL CIRCUIT 210

In response to seizure of the playback control circuit 200 by the readout control circuit 210, the stepping switch 200*a* is operated to advance the wipers thereof over the contact banks to which are connected conductors individual to the trunk circuits, similar to the trunk circuit 126. More specifically, a pair of conductors 1057 and 1353, which are individual to the trunk circuit 126, terminate in like positioned contacts in the contact banks of the stepping switch 200*a*. When the wipers of the switch 200*a* are moved into engagement with the contacts to which these conductors are connected, a busy test is performed over the conductor 1057. In the event that the trunk circuit 126 is engaged in a call or otherwise busy, ground is applied to the conductor 1057, this ground causing the playback control circuit 200 to advance the stepping switch 200*a* into engagement with the contacts forming the next stepping position. Assuming, however, that the trunk circuit 126 is idle, the stepping switch 200*a* encounters an open circuit on the path including the following closed pairs of contacts 1031, 1020, 10RDS3, 10CS2, and 10HM1, this path also including a conductor 1056 which is common to all of the plurality of trunk circuits accessible to the switching means 200*a* and which is normally connected to an open circuit in the playback control circuit 200. Accordingly, stepping action of the switch 200*a* is terminated and, in response to the termination of the stepping action of the switch 200*a*, the playback control circuit 200 applies ground to the conductor 1353, which is individual to the trunk circuit 126, through one of the wipers of the stepping switch 200*a*. The application of ground to the conductor 1353 operates a clutch switch relay 12CS.

The operation of this relay closes a plurality of contacts 9CS1, 9CS2, 9CS5, 9CS6, 9CS9, 10CS1, 11CS1, 12CS2, 12CS3, 12CS5, 13CS1, and 13CS2 and opens a plurality of contacts 9CS3, 9CS4, 9CS7, 9CS8, 10CS2, 12CS1, 12CS4, and 13CS3. The opening of the contacts 10CS2 opens the path in the trunk circuit 126 for interconnecting the conductors 1056 and 1057 extending to the playback control circuit 200 and the simultaneous closure of the contacts 10CS1 applies ground to the conductor 1057 which is utilized as a holding ground in the playback control circuit 200, thereby to cause this circuit to maintain ground on the conductor 1353 to hold the clutch switch relay 12CS operated. The opening of the contacts 12CS1 interrupts, at an additional point, a holding circuit for an alarm relay 13ALM and the concurrent closure of the contacts 12CS2 applies ground to the sleeve lead of the extended switch train through the closed contacts 5RD2 and 521, thereby to prevent seizure of the trunk circuit 126 during a playback operation. The closure of the contacts 13CS1 prepares an operating path for the alarm relay 13ALM, which path is completed under the control of the playback control circuit 200. The opening of the contacts 13CS3 removes ground from the terminal 1377, which is connected to a supervisory circuit, thereby to indicate that the trunk circuit 126 is in use. The closure of the contacts 11CS1 prepares a path for opening a playback relay 11PB. The closure of the contacts 12CS3 prepares a path for applying ground to a conductor 1354, which is common to the plurality of trunk recorders accessible to the switch 200*a* and which terminates in the playback control circuit 200.

In order to interconnect the space pulse head 810 and the mark pulse head 800 with the amplifying means provided in the playback control circuit 200, and in order to disconnect these heads from local pulsing sources in the trunk circuit 126, the opening of the contacts 9CS8 disconnects one side of the space pulse head 810 from a local pulsing source and the simultaneous closure of the contacts 9CS1 interconnects this side of the head with a conductor 1058 which extends to the amplifying means in the playback control circuit 200, the conductor 1058 being common to all of the trunk circuits accessible to the playback control circuit 200. The opening of the contacts 9CS3 disconnects the other side of the space pulse head 810 from resistance battery, and the concurrent closure of the contacts 9CS2 interconnects this other side of the space pulse head 810 with a common conductor 1059 which extends to the amplifying means in the playback control circuit 200. The opening of the contacts 9CS4 disconnects one side of the winding of the mark pulse head 800 from the local pulsing circuit in the trunk circuit 126, and the concurrent closure of the contacts 9CS5 interconnects this side with a common conductor 1061 which is connected to the amplifying means in the playback control circuit 200. The opening of the contacts 9CS7 disconnects the other side of the mark pulse head 800 from resistance battery, and the concurrent closure of the contacts 9CS6 interconnects this other side of the head 800 with a common conductor 1062 which extends to the amplifying means in the playback control circuit 200. The closure of the contacts 9CS9 interconnects the erase head 1110 in the trunk recorder 127 with an erase conductor 1063 which extends to the playback control circuit 200 and which is also common to all of the trunk recorders associated with trunk circuits which are accessible to the switching means 200*a*. However, the erase head 1110 is not energized at this time inasmuch as the conductor 1063 terminates in an open circuit in the playback control circuit 200.

The opening of the contacts 12CS4 interrupts one operating circuit for the homing relay 13 HM, which circuit is open at another point, and the concurrent closure of the contacts 12CS5 completes another operating circuit for the homing relay 13HM so that this relay operates. This operating circuit extends from a pair of closed and grounded contacts 13ALM2 through the closed contacts 12CS5, 12CSS3, 13PB1, 1322, and 13RDT1 to the operating winding of the homing relay 13HM. The operation of this relay closes a plurality of contacts 5HM1, 10HM2, 11HM1, 12HM2, 13HM1 and 13HM3 and opens a plurality of contacts 10HM1, 12HM1, and 13HM2. The closure of the contacts 12HM2 completes a holding path for the homing relay 13HM which extends from ground at closed contacts 13ALM2 through the closed contacts 12TD3, 12HM2, and 12RLS2. The closure of the contacts 5HM1 provides an additional source of busy ground for the sleeve conductor of the extended switch train.

The opening of the contacts 10HM1 interrupts, at a second point, the previously described circuit for interconnecting the conductors 1056 and 1057 extending to the playback control circuit 200. The opening of the contacts 12HM1 interrupts one operating circuit for a clutch switch slave relay 12CSS, which circuit is open at additional points. The closure of the contacts 11HM1 provides a source of operating and holding ground for a plurality of perforation counting relays 11TA, 11TB and 11TC. The closure of the contacts 13HM1 applies ground to an emergency start conductor 1352, which is common to all of the trunk circuits accessible to the switching device 200a and which extends to the playback control circuit 200. However, the application of ground to the conductor 1352 does not produce any useful function at this time. The opening of the contacts 13HM2 interrupts the circuit previously opened at the contacts 13CS3 for applying ground to the terminal 1377.

The closure of the contacts 13HM2 completes a circuit for applying ground to a terminal 1152, which circuit extends through a pair of closed contacts 11TD3. The terminal 1152 is connected to a terminal 731 in a motor speed control circuit 700. The application of ground to the terminal 731 completes an obvious operating circuit for a motor high speed relay 7MHS.

The motor speed control circuit 700 provides means for controlling a drive motor 710 for rotating the common drive roller or shaft for the plurality of trunk recorders, such as the trunk recorder 127, at either a high speed for advancing the magnetic tape 12000 to the beginning point or home position thereof or for rotating the common drive shaft at a low speed suitable for transducing operations. Accordingly, when the trunk circuit 126 is seized during a playback operation, the motor high speed relay 7MHS is operated to drive the common shaft at a high speed so that the magnetic tape 12000 is returned to its home position at high speed, thereby to reduce the holding time of the trunk circuit 126.

More specifically, the operation of the motor high speed relay 7MHS closes a pair of contacts 7MHS1 and 7MHS2. The closure of the contacts 7MHS2 completes a circuit extending through a pair of normally closed contacts 7HI3 for illuminating a lamp 730, the other end of the filament of which is connected to grounded battery by a supervisory circuit at a terminal 733. The illumination of the lamp 730 indicates a failure to provide power at the terminals across which the operating windings of the motor 710 are bridged, thereby to indicate that the common drive shaft is not placed in rotation in response to the operation of the motor high speed relay 7MHS.

The closure of the contacts 7MHS1 completes an operating circuit for an alternating current type high speed relay 7HI which operates to close a plurality of contacts 7HI1 and 7HI2 and to open the pair of contacts 7HI3. Opening the contacts 7HI3 terminates illumination of the lamp 730 to indicate that the high speed relay 7HI has been operated and, accordingly, to indicate the presence of power for operating the motor 710. The closure of the contacts 7HI1 and 7HI2 energizes a starting winding 714 in the motor 710 through a path including both of the closed contacts 7HI1 and 7HI2 and a normally closed pair of contacts 7LO4. In addition, the closure of the contacts 7HI1 and 7HI2 energizes a plurality of motor windings 711, 712, and 713 through paths including a plurality of normally closed contacts 7LO3 and 7LO1. Accordingly, in response to operation of the motor high speed relay 7MHS, the motor 710 is placed in operation at a high speed so that the drive shaft common to the plurality of trunk recorders, such as the trunk recorder 127, is rotated at high speed in condition for being rendered effective to drive the magnetic tape in the trunk recorders to a normal starting position at a high speed in accordance with the selective energization of the clutch magnet 1120 associated with the individual trunk recorders.

Referring back to the above operation of the homing relay 13HM, the closure of the contacts 10HM2 completes a path for operating the clutch magnet 1120 in the trunk recorder 127, this path extending through the closed contacts 10EC1, 10RDT1, 10TD1, 10HM2, and 13CSS1. Operation of the clutch magnet 1120 interposes an idler roller between the drive capstan in the trunk recorder 127 and the common drive shaft which is rotating at a high speed as described above. Accordingly, the magnetic tape 12000 in the trunk recorder 127 is rapidly advanced toward its home position.

Referring now to the preceding operation of the clutch switch relay 12CS, the closure of the contacts 13CS2 controlled thereby connects an advance conductor 1355, which is common to all of the trunk circuits to which the switch 200a has access and which is connected to the playback control circuit 200, with a conductor 1356 which extends to the operating winding of a homing relay 13HM' in the next succeeding trunk circuit to which the switch 200a has access. This path extends through a plurality of normally closed contacts 1322' and 13RDT1', both of which contacts correspond to the similarly designated contacts in the trunk circuit 126. The conductor 1355 is connected to ground in the playback control circuit 200 so that the closure of the contacts 13CS2 causes the operation of the homing relay 13HM' if this next trunk is idle, as indicated by the closed contacts 13RDT1'.

As set forth hereinabove, the operation of the homing relay in one of the trunk circuits operates the motor high speed relay 7MHS in the motor speed control circuit 700 and energizes the clutch magnet in the trunk recorder which is associated with the trunk circuit in which the homing relay is operated. Accordingly, the operation of the homing relay 13HM' causes the magnetic tape in the trunk recorder associated with the trunk circuit to which the switch 200a next has access to be advanced toward its home position. By advancing the magnetic tape in this trunk recorder toward its home position simultaneously with the seizure of the trunk circuit 126, the holding time of the next succeeding trunk circuit is materially reduced inasmuch as, when this circuit is associated with the playback control circuit 200, the magnetic tape therein has previously been advanced to its effective beginning. In this connection, it should be noted that, since the trunk circuit 126 is connected to the contacts forming the first stepping position of the switch 200a, no means are provided for pre-operating the homing relay 13HM prior to its seizure by the switch 200a. For a like reason, the trunk circuit which is connected to the contacts forming the last stepping position of the switch 200a is now provided with a conductor similar to the conductor 1356.

As described above, the energization and operation of the clutch magnet 1120 in the trunk recorder 127 causes the magnetic tape 12000 therein to be advanced at a high speed due to the high speed operation of the common drive motor 710. This tape advance continues until such time as the perforation 12001 is interposed between the sensing finger 1131 and the grounded roller 1130. This perforation completes a path for applying ground to the operating winding of a tape contact relay 11TC, thereby causing this relay to operate. The operation of the tape contact relay 11TC closes a plurality of contacts 11TC1 and 12TC1. The closure of the contacts 12TC1 completes an additional holding path for the homing relay 13HM, but, since this relay is held operated at this time, the closure of the contacts 12TC1 does not produce a useful function. On the other hand, the closure of the contacts 11TC1 applies ground through a pair of normally closed contacts 11TA2 to operate a first perforation counting relay 11TA through its first step, thereby to close a pair of preliminary make type contacts 11TA1. Closure of the contacts 11TA1 prepares a path for causing the relay 11TA to become fully operated and for thereafter maintaining this relay operated. Ground is applied to the closed contacts 11TA1 from the closed contacts 11HM1 which are previously closed in response to the operation of the homing relay 13HM.

Continuing movement of the magnetic tape 12000 moves the perforation 12001 out of engagement with the wiper 1131 so that the operating circuit for the tape contact relay 11TC is opened, thereby permitting this relay to release to open the contacts 9TC1 and 12TC1. The opening of the contacts 12TC1 produces no useful function, but the opening of the contacts 9TC1 permits the relay 11TA to operate fully.

In operating fully, the relay 11TA opens the contacts TA2 and closes a pair of contacts 11TA3. The opening of the contacts 11TA2 interrupts the previously described operating circuit for the relay 11TA, and the concurrent closure of the contacts 11TA3 prepares a circuit for operating a second perforation counting relay 11TB when the tape contact relay 11TC is next operated.

After a short time delay, continuing movement of the magnetic tape 12000 in the trunk recorder 127 moves the perforation 12002 between the grounded roller 1130 and the tape sensing finger 1131, thereby causing the second operation of the tape contact relay 11TC to close the contacts 11TC1 and 12TC1. The closure of the contacts 12TC1 produces no useful function, and the closure of the contacts 11TC1 causes the two-step relay 11TB to operate over its first step to close a pair of preliminary make type contacts 11TB1, thereby preparing a circuit for causing the complete operation of this relay and for maintaining this relay operated following the complete operation thereof. When the magnetic tape 12000 is further advanced, the operating circuit for the tape contact relay 11TC is interrupted, thereby to open the contacts 11TC1 and 12TC1. The opening of the contacts 11TC1 permits the relay 11TB to operate fully and, in doing so, to close a pair of contacts 11TB3 and to open a plurality of contacts 5TB1 and 11TB2. The opening of the contacts 11TB2 interrupts the operating circuit for the relay 11TB and the concurrent closure of the contacts 11TB3 prepares an operating circuit for a third perforation counting relay 11TD. The opening of the contacts 5TB1 removes one source of ground for the calling bridge relay 5CB and, accordingly, for the calling loop circuit, but, inasmuch as the trunk circuit 126 is now busied by the application of ground to the sleeve conductor, the opening of the contacts 5TB1 produces no useful function at this time.

Continuing movement of the magnetic tape 12000 next moves the perforation 12003 between the grounded roller 1130 and the tape sensing finger 1131 so that the tape contact relay 11TC is operated to close the contacts 11TC1 and 12TC1. The closure of the contacts 12TC1 again produces no useful function whereas the closure of the contacts 9TC1 causes the two-step third perforation counting relay 11TD to operate through its first step to close the preliminary make type contacts 11TD1, thereby to prepare an operating and holding path for this relay. As the perforation 12003 is moved out of an interposed position between the roller 1130 and the tape sensing finger 1131, the tape contact relay 11TC is released, thereby to open the contacts 12TC1 and 11TC1. The opening of the contacts 11TC1 permits the relay 11TD to operate fully and, accordingly, to close a pair of contacts 11TD4 and to open a plurality of contacts 9TD1, 10TD1, 11TD2, 11TD3, 12TD1, 12TD2, and 12TD3. The opening of the contacts 11TD2 opens the operating circuit for the relay 11TD.

The opening of the contacts 9TD1 disconnects one source of ground from the conductor 1057, but the normally closed contacts 9CSS1 continue to provide ground to this conductor to provide holding ground for the playback control circuit 200. The opening of the contacts 10TD1 disconnects ground from the operating winding of the clutch magnet 1120 so that the drive capstan in the trunk recorder 127 is disconnected from the common drive shaft and, accordingly, the magnetic tape 12000 is no longer advanced. The opening of the contacts 11TD3 removes ground from the terminal 731 in the motor speed control circuit 700 so as to release the motor high speed relay 7MHS. However, this relay does not release in the event that ground is applied to the terminal 731 by any other of the trunk circuits similar to the trunk circuit 126. For instance, as described above, the homing relay 13HM' in the next succeeding trunk circuit is operated in response to the seizure of the trunk circuit 126 and, in the event that the tape therein has not been advanced to its effective beginning point, as defined by the three perforations, the motor high speed relay 7MHS remains operated. However, in the event that ground is not applied thereto by any other trunk circuit, the motor high speed relay 7MHS is released to open the contacts 7MHS1 and 7MHS2, and, accordingly, to release the high speed relay 7HI and remove energization from the motor 710, thereby terminating rotation of the common drive shaft.

The opening of the contacts 12TD2 interrupts, at a second point, an operating circuit for the clutch switch slave relay 12CSS, and the opening of the contacts 12TD1 interrupts an open holding circuit for a release relay 12RLS. The opening of the contacts 12TD3 interrupts the above described holding circuit for the homing relay 13HM, but this relay is maintained operated through the above described operating circuit including the contacts 13PB1 and 13CSS3.

The closure of the contacts 11TD4 completes an operating circuit for the playback relay 11PB, which circuit extends from the grounded and closed contacts 11CS1 through the closed contacts 11TD4. The operation of the playback relay 11PB closes a plurality of contacts 11PB1, 11PB2, 12PB1 and 12PB2 and opens a plurality of contacts 12PB3 and 13PB1. The closure of the contacts 11PB1 provides a holding circuit for the playback relay 11PB which shunts the contacts 11TD4. The closure of the contacts 12PB2 prepares an operating path for the clutch slave switch slave relay 12CSS and also applies ground to a playback conductor 1354 which extends to the playback control circuit 200, thereby to advise this circuit that the tape 12000 has been moved to its home position. The opening of the contacts 12PB3 interrupts an additional holding path for the homing relay 13HM. The closure of the contacts 12PB1 prepares an operating path for the relase relay RLS, which path is open at the open contacts 12CSS1 and 12CS1.

The closure of the contacts 11PB2 applies ground to a terminal 1151 which is connected to a terminal 732 in the motor speed control circuit 700. The application of ground to this terminal causes the operation of a motor low speed relay 7MLS to close a plurality of contacts 7MLS1 and 7MLS2. Since the trunk circuit 126 has advanced the magnetic tape 12000 to the effective beginning or home position thereof, the trunk recorder 127 is conditioned for transmitting the items of information stored thereon to the recording facilities including the recorder 220. During the transmission of this information the mark and space pulse data recorded on the magnetic tape 12000 is reproduced by the space pulse head 810 and the mark pulse head 800, and, accordingly, it is desirable that the magnetic tape 12000 be advanced at the slower transducing speed. To this end, the closure of the contacts 7MLS2 completes an energizing circuit for the motor high speed relay 7MHS, thereby causing the closure of the contacts 7MHS1 and 7MHS2. The closure of the contacts 7MHS2 prepares the above described circuit for illuminating the monitoring lamp 730, and the closure of the contacts 7MHS1 energizes the high speed relay 7HI, the operation thereof closing the contacts 7HI1 and 7HI2 and opening the contacts 7HI3. The closure of the contacts 7HI1 and 7HI2 interconnects the alternating current power with a portion of the motor control circuit.

Referring to the preceding operation of the motor low speed relay 7MLS to close the contacts 7MLS1, the closure of these contacts completes an operating circuit for an alternating current type low speed relay 7LO, which circuit includes the closed contacts 7HI1 and 7HI2 controlled by the high speed relay 7HI. The operation of the low speed relay 7LO closes a plurality of contacts 7LO1 and 7LO5 and opens a plurality of contacts 7LO2, 7LO3, and 7LO4. The opening of the contacts 7LO4 disconnects the high speed starting winding 714 of the motor 710 from the power supply lines, and the concurrent closure of the contacts 7LO5 connects a low speed starting winding 715 across the source of alternating current power. The opening of the contacts 7LO3 disconnects the motor winding 711 from the source of power, and the closure of the contacts 7LO1 together with the opening of the contacts 7LO2 completes a circuit for energizing the motor windings 712 and 713 in series, thereby to provide rotation of the common drive shaft at a low speed suitable for reproducing the information recorded on the magnetic tape 12000.

In this connection it should be noted that in the event that trunk circuits other than the trunk circuit 126 have applied ground to the terminal 731, thereby to cause the operation of the motor high speed relay 7MHS, the motor 710 is not operated at this high speed but rather is operated at the low speed selected by the operation of the motor low speed relay 7MLS. This is true inasmuch as it is necessary to drive the tape 12000 in the trunk recorder 127 which is engaged in transmitting information to the recording facilities at a low speed, and, during these time intervals, those trunk recorders associated with trunk circuits similar to the trunk circuit 126 which are being advanced to their effective beginning point are advanced at only the slow speed. In other words, although the motor speed control circuit 700 can be simultaneously provided with information requiring both high speed and low speed operation of the common drive shaft, this control circuit is so arranged that during the existence of these two different speed control conditions, the motor 710 is held at a low speed to insure proper reproduction of the information from the magnetic tape 12000 inasmuch as this operation is the most inportant function to be performed. Further, although not performed at high speed, the magnetic tape in the trunk recorder and trunk circuit causing the operation of the motor high speed relay 7MHS is still advanced at a low speed toward the effective beginning thereof, thereby to prepare this trunk recorder for a readout or playback operation.

Referring back to the preceding operation of the playback relay 11PB, the opening of the contacts 13PB1 controlled thereby interrupts the operating circuit for the homing relay 13HM so that this relay releases. In releasing, the relay 13HM opens the plurality of contacts 5HM1, 10HM2, 11HM1, 12HM2, 13HM1 and 13HM3 and closes the plurality of contacts 10HM1, 12HM1, and 13HM2. The opening of the contacts 12HM2 interrupts, at an additional point, an operating circuit for the homing relay 13HM, and the opening of the contacts 5HM1 disconnects one source of busy ground from the sleeve conductor of the extended switch train, although ground continues to be applied thereto by the closed and grounded contacts 12CS2. The closure of the contacts 12HM1 prepares an operating path for the clutch switch slave relay 12CSS which is open at the open contacts 12TD2.

The opening of the contacts 13HM3 interrupts, at an additional point, the previously opened circuit for applying ground to the terminal 1152. The opening of the contacts 13HM1 interrupts the previously described circuit for applying ground to the emergency start conductor 1352. The closure of the contacts 13HM2 closes one point in an open circuit extending to the terminal 1377. The closure of the contacts 10HM1 merely aids in returning the trunk circuit 126 to a normal condition in preparing a path extending to the conductor 1056. The opening of the contacts 10HM2 interrupts, at a second point, the previously described circuit for operating the clutch magnet 1120.

The opening of the 11HM1 removes the source of holding ground for the operated first, second, and third perforation counting relays 11TA, 11TB, and 11TD so that these relays release. The release of the relays 11TA and 11TB merely aids in restoring the trunk circuit 126 to a normal condition, but the release of the relay 811TD opens the contacts 11TD1 and 11TD4, and closes the contacts 9TD1, 10TD1, 11TD2, 11TD3, 12TD1, 12TD2 and 12TD3. The contacts 9TD1, 10TD1, 11TD1, 11TD2 and 11TD3, in restoring, perform no useful function except in returning the trunk circuit to a normal condition. The opening of the contacts 11TD4 opens one operating path for the playback relay 11PB, but this relay is maintained operated through the closed contacts 11PB1. The closure of the contacts 12TD1 prepares a holding circuit for the release relay 12RLS, and the closure of the contacts 12TD3 prepares a holding circuit for the homing relay 13HM.

The closure of the contacts 12TD2 completes an energizing path for the clutch switch slave relay 12CSS which extends from closed and grounded contacts 13ALM2 through the closed contacts 12CS5, 12PB2, 12TD2, and 12HM1. The operation of the clutch switch slave relay 12CSS closes a plurality of contacts 11CSS1, 11CSS2, 12CSS1, 12CSS2, and 13CSS2 and opens a plurality of contacts 9CSS1, 12CSS3 and 13CSS1. The opening of the contacts 12CSS3 interrupts the above described operating circuit, now open, for the homing relay 13HM, and the concurrent closure of the contacts 12CSS2 completes a holding circuit for the clutch switch slave relay 12CSS. The closure of the contacts 12CSS1 prepares an operating circuit for the release relay 12RLS. The closure of the contacts 11CSS2 provides a source of operating and holding ground for the chain of perforation counting relays to permit these relays to be sequentially operated and held operated when the perforations 12001, 12002, and 12003 are subsequently sensed at the end of the transmission of the information from the magnetic tape 12000 to the recording facilities.

The opening of the contacts 9CSS1 disconnects one source of holding ground from the conductor 1057, but ground is maintained thereon by the closed contacts 9TD1. The closure of the contacts 11CSS1 provides a shunt around the closed contacts 11CS1 in the holding circuit for the playback relay 11PB. The opening of the contacts 13CSS1 interrupts the circuit controlled by the trunk circuit 126 for applying ground to the clutch magnet 1120 in the trunk recorder 127, and the closure of the contacts 13CSS2 interconnects the operating winding of the clutch magnet 1120 with a conductor 1350 which is common to all of the trunk circuits to which the switch 200*a* has access and which terminates in the playback control circuit 200.

As set forth above, the closure of the contacts 12PB2 applies ground through the closed contacts 12CS3 to the playback conductor 1354. In response to the application of ground to this conductor, the playback control circuit 200 connects the winding of an erase relay in series with a common erase conductor 1063 which is connected through the closed contacts 9CS9 with the winding of the erase head 1110, the other terminal of the winding of this erase being connected to grounded battery. Subsequently, the readout control circuit 210 applies ground to this series path so that the winding of the erase head 1110 is energized, thereby to energize this head to erase recorded items of information from the magnetic tape 12000 as this tape is moved past the erase gap of the head 1110 following the transmission of the mark and space pulses by the space pulse head 810 and the mark pulse head 800.

The readout control circuit 210 also applies ground over the clutch conductor 1350 to cause the selective energization of the clutch magnet 1120, thereby causing the magnetic tape 12000 to be moved adjacent the mark and space heads 800 and 810 thereby to transmit mark and space pulse information to the recording facilities. Upon the receipt of a COE signal in the readout control circuit 210, ground is removed from the conductor 1350, thereby to release the clutch magnet and to terminate movement of the magnetic tape 12000 until such time as the items of information previously stored in the readout facilities are either recorded by the recorder 220 or are removed from the registers, as in the case of calls for which insufficient information is provided to print a ticket. This intermittent operation continues until such time as all of the items of information which have been recorded on the tape 12000 have been transmitted to the recording facilities and have been erased from the magnetic tape 12000 by the erase head 1110.

Accordingly, in seizing the trunk circuit 126 during a routine playback operation, the control circuit 200 seizes the trunk circuit 126 and operates it to busy itself and to advance the magnetic tape 12000 in the trunk recorder 127 to the home position thereof. Concurrently therewith, the space pulse head 810 and the mark pulse head 800 are cut through to amplifying means in the playback control circuit 200. After the tape has been returned to its home position, the trunk circuit 126 transfers control over the clutch magnet 1120 to the readout control circuit 210 so that this circuit controls subsequent movement of the magnetic tape 12000. As an incident to moving the tape 12000 to its home position, the motor speed control circuit 700 provides a high speed drive which is reduced to a low speed suitable for transducing operations after the tape has attained its home position. Further, in response to seizure of the trunk circuit 126, the homing relay 13HM' in the next succeeding trunk circuit is operated to advance the magnetic tape in the trunk recorder associated with this next succeeding trunk circuit to its home position, thereby reducing the holding time when this trunk circuit is subsequently seized by the switch 200*a* of the playback control circuit 200.

2. RELEASE OF THE TRUNK CIRCUIT 126 FOLLOWING A ROUTINE PLAYBACK OPERATION

Following the transmission of the last item of information from the magnetic tape 12000 in the trunk recorder 127, which last item may be recorded at any place in the length of the magnetic tape 12000 depending upon the amount of information stored thereon, time responsive means in the readout control circuit 210 are rendered effective to cause the operation of time responsive means in the playback control circuit 200, thereby to indicate that the trunk circuit 126 and its associated trunk recorder 127 are to be released. In response to the receipt of this signal, the stepping switch 200*a* of the playback control circuit 200 is advanced to seize the next idle trunk circuit, and the trunk circuit 126, upon release, returns the magnetic tape 12000 to its home position. When the magnetic tape 12000 is returned to this position, a preliminary COE signal is recorded thereon by the trunk circuit 126 following which a space out operation is performed. After the completion of these operations, the trunk circuit 126 is restored to a normal condition to permit this circuit to be seized and used in recording items of information pertaining to toll calls.

More specifically, following the transmission of the COE signal following the last group of items of information recorded on the magnetic tape 12000, this tape is advanced under the control of the readout control circuit 210 for a predetermined time interval during which the failure to receive any mark or space pulse information in the readout control circuit 210 causes this circuit to inform the playback control circuit 200 that the trunk circuit 126 and its associated trunk recorder 127 are to be dismissed. In response to the receipt of this information, the playback control circuit 200 advances the stepping switch 200*a* to the contacts forming the next stepping position and initiates a search for the next idle trunk circuit to which this switch has access. In advancing the switch 200*a*, ground is removed from the conductor 1355 by the playback control circuit 200. The removal of ground therefrom interrupts the operating circuit extending through the closed contacts 13CS2 for the homing relay 13 HM' in the next succeeding trunk circuit. However, if this relay has not previously been released in response to the advancement of the magnetic tape in the trunk recorder associated with this trunk circuit to its effective beginning point, the removal of ground from the conductor 1355 will not release this relay because of the holding circuit completed therefor by the closure of the contacts similar to the contacts 12HM2.

Following the removal of ground from the conductor 1355, the playback control circuit 200 removes ground from the conductor 1353, thereby releasing the clutch switch relay 12CS. This relay, in releasing, opens the contacts 9CS1, 9CS2, 9CS5, 9CS6, 9CS9, 10CS1, 11CS1, 12CS2, 12CS3, 12CS5, 13CS1, and 13CS2 and closes the contacts 9CS3, 9CS4, 9CS7, 9CS8, 10CS2, 12CS1, 12CS4, and 13CS3. The opening of the contacts 9CS1 disconnects one side of the winding of the space pulse head 810 from the conductor 1058 extending to the amplifying means in the playback control circuit 200, and the concurrent closure of the contacts 9CS8 connects this side of the winding with a pulsing circuit provided therefor in the trunk circuit 126. The opening of the contacts 9CS2 disconnects the other side of the winding of the space pulse head 810 from the conductor 1059 and the concurrent closure of the contacts 9CS3 connects this side of the winding with resistance battery. The opening of the contacts 9CS5 disconnects one side of the operating winding of the mark pulse head 800 from the conductor 1061, and the concurrent closure of the contacts 9CS4 connects this side of the winding to the pulsing circuit provided in the trunk circuit 126. The opening of the contacts 9CS6 disconnects the other side of the energizing winding of the mark pulse head 800 from the conductor 1062 and the concurrent closure of the contacts 9CS7 connects this side of the winding to resistance battery.

The opening of the contact 9CS9 opens the circuit extending from the operating winding of the erase head 1110 to the conductor 1063. Since the last items of information recorded on the magnetic tape 12000 have been transmitted, there is no need to maintain the erase head 1110 energized. The opening of the contacts 13CS1 opens a partially prepared circuit for the alarm relay 13ALM. The opening of the contacts 13CS2 opens the above described circuit for operating the homing relay 13HM', and the closure of the contacts 13CS3 completes a circuit for applying ground to the terminal 1377, thereby to indicate that the trunk circuit 126 is idle. The opening of the contacts 10CS1 removes holding ground from the conductor 1057 and the closure of the contacts 10CS2 prepares a seizure path for the trunk circuit 126. The opening of the contacts 11CS1 opens one holding circuit for the relay 11PB.

The opening of the contacts 12CS3 removes the ground applied to the conductor 1354, thereby causing the playback control circuit 200 to open the path extending to the clutch conductor 1350 to prevent the clutch magnet 1120 in the trunk recorder 127 from being energized under the control of the readout control circuit 210. The closure of the contacts 12CS4 prepares an operating circuit for the homing relay 13HM, and the opening of the contacts 12CS5 concurrently therewith interrupts the operating circuit for the clutch switch slave relay 12CSS. However, this relay is slow-to-release and, accordingly, does not release at this time.

The opening of the contacts 12CS2 removes the ground applied to the sleeve conductor of the trunk circuit, and the concurrent closure of the contacts 12CS1 completes an operating circuit for the release relay 12RLS which extends from closed and grounded contacts 12CS1 through the closed contacts 12CSS1, 12PB1, and 12ALM1.

The operation of the release relay 12RLS closes a plurality of contacts 10RLS1, 11RLS1, 11RLS2, 12RLS1, and 12RLS4 and opens a plurality of contacts 12RLS2 and 12RLS3. The closure of the contacts 12RLS1 provides a holding circuit for the release relay 12RLS which extends through the closed contacts 1210, 12TD1, and 12RLS1. The closure of the contacts 11RLS2 provides a source of ground for the perforation counting relays. The closure of the contacts 10RLS1 prepares a path for applying ground to the clutch magnet 1120 in the trunk recorder 127.

The closure of the contacts 11RLS1 applies ground to the terminal 1152 which is connected to the terminal 731 in the motor speed control circuit 700, thereby causing the operation of the motor high speed relay 7MHS. In the event that the motor low speed relay 7MLS has not been previously operated by one of the other of the plurality of trunk circuits to which the driving motor 710 is common, the operation of the motor high speed relay 7MHS operates as described above to cause the common drive shaft to be rotated at a high speed. It is desirable to cause high speed operation of the motor 710 at this time inasmuch as the transmission of the information from the magnetic tape 12000 to the recording facilities has been completed, and the holding time of the trunk circuit 126 is reduced by continuously advancing the tape 12000 to its home position as quickly as possible. However, in the event that the motor low speed relay 7MLS is operated by another of the trunk circuits which may be engaged in transmitting information to the recording facilities, the speed of rotation of the motor 710 is not varied in response to the operation of the release relay 12RLS in the trunk circuit 126.

The opening of the contacts 12RLS2 interrupts one of the plurality of operating and holding paths for the homing relay 13HM. The opening of the contacts 12RLS3 interrupts, at an additional point, the operating circuit for the end-of-call relay 11EC, and the concurrent closure of the contacts 12RLS4 completes an obvious operating circuit for the second release delay relay 12RDT, thereby causing the operation of this relay. The operation of the relay 12RDT closes the plurality of contacts 5RDT1, 5RDT3, 10RDT2, 12RDT1, 12RDT2, and 13RDT2 and opens the plurality of contacts 5RDT2, 10RDT1, 12RDT3, and 13RDT1.

The opening of the contacts 12RDT3 removes the ground potential previously applied to the terminal 1377 by the closure of the contacts 13CS3, thereby to indicate to the supervisory circuit that the trunk circuit 126 is busy. The concurrent closure of the contacts 12RDT2 provides a source of main ground for the trunk circuit 126. The closure of the contacts 12RDT1 prepares a circuit for operating the end-of-call relay 11EC. The closure of the contacts 5RDT1 applies busy ground to the sleeve conductor of the trunk circuit, thereby to indicate that the trunk circuit 126 is busy, this ground being applied thereto substantially immediately following the opening of the contacts 12CS2 to remove busy ground therefrom so as to substantially continuously maintain the trunk circuit 126 in a busy condition.

The opening of the contacts 10RDT1 interrupts one path for applying ground to the clutch magnet 1120 in the trunk recorder 127, and the concurrent closure of the contacts 10RDT2 prepares another circuit for applying ground to the clutch magnet 1120. The opening of the contacts 5RDT2 and 13RDT1, and the closure of the contacts 5RDT3 and 13RDT2 perform no useful function at this time.

As described above, the release of the clutch switch relay 12CS interrupted the operating path for the clutch switch slave relay 12CSS, and this relay now releases to open the plurality of contacts 8CSS1, 11CSS1, 12CSS1, 12CSS2, and 13CSS2, and to close the plurality of contacts 9CSS1, 12CSS3, and 13CSS1. The opening of the contacts 12CSS2 and 11CSS2 and the closure of the contacts 12CSS3 and 11CSS2 merely aid in restoring the trunk circuit 126 to a normal condition. The opening of the contacts 12CSS1 interrupts the operating circuit for the release delay 12RLS, but this relay is maintained operated by virtue of the above described holding path therefor completed through the closed contacts 12RLS1.

The opening of the contacts 11CSS1 interrupts the holding circuit for the playback relay 11PB so that this relay releases to close the plurality of contacts 12PB3 and 13PB1 and to open the plurality of contacts 11PB1, 11PB2, 12PB1, and 12PB2. The operations of the contacts 11PB1, 12PBL, 12PB2, 12PB3, and 13PB1 performs no useful function at this time other than to restore the trunk circuit 126 to a normal condition. However, the opening of the contacts 11PB2 removes ground from the terminal 1151 which is connected to the terminal 732 in the motor speed control circuit 700. In the event that ground is not applied to the terminal 732 from other sources, the motor low speed relay 7MLS releases to permit the motor 710 to be driven at a high speed under the control of the ground previously applied to the terminal 731 by the closure of the contacts 11RLS1.

Referring to the previously described release of the clutch switch slave relay 12CSS, the opening of the contacts 13CSS2 disconnects the clutch magnet 1120 of the trunk recorder 127 from the conductor 1350. The concurrent closure of the contacts 13CSS1 completes a path for energizing the clutch magnet 1120, which path extends from grounded and closed contacts 10EC1 through the closed contacts 10RDT2, 10RLS1, and 13CSS1. The operation of the clutch magnet 1120 interposes the idler roller between the common drive roll and the drive capstan of the trunk recorder 127 so that the magnetic tape 12000 is advanced. The tape 12000 is advanced at a low speed, as described hereinabove, if one of the trunk circuits to which the drive motor 710 is common has applied ground to the terminal 732, thereby causing the operation of the motor low speed relay 7MLS. However, in the event that this relay is not operated, the operation of the motor high speed relay 7MHS in response to the closure of the contacts 11RLS causes the motor 710 to be rotated at a high speed and, accordingly, causes the tape 12000 to be advanced toward its home position at a high speed.

Continuing movement of the magnetic tape 12000 moves the perforation 12001 between the grounded roller 1130 and the tape sensing finger 1131 so that the tape contact relay 11TC is operated to cause the closure of the contacts 11TC1 and 12TC1. The closure of the contacts 12TC1 is of no effect inasmuch as an operating circuit for the homing relay 13HM is interrupted by the opening of the contacts 12RLS2. However, the closure of the contacts 11TC1 operates the relay 11TA through its first step. As the perforation 12001 moves beyond the roller 1130, the tape contact relay 11TC is released to open the contacts 12TC1 and 11TC1, the opening of the contacts 11TC1 permitting the relay 11TA to operate fully. However, the operation of this relay produces no useful function at this time except insofar as the operation thereof in closing the contacts 11TA3 prepares an operating path for the second perforation counting relay 11TB.

The perforation 12002 is next moved into a position interposed between the grounded roller 1130 and the tape sensing finger 1131 and subsequently moved out of this interposed position to cause the operation and release of the tape contact relay 11TC, thereby resulting in the partial and then full operation of the relay 11TB. The operation of this relay produces no useful function at this time except insofar as the closure of the contacts 11TB3 prepares a path for causing the operation of the third perforation counting relay 11TD in response to the next operation of the tape contact relay 11TC.

The third perforation 12003 in the magnetic tape 12000 defines the effective beginning or home position, and, accordingly, it is desirable to interrupt movement of the magnetic tape 12000 in such a position that the portion of the magnetic tape closely following the perforation 12003 is stopped in position beneath the mark and space pulse heads 800 and 810. Accordingly, when the third perforation 12003 moves into a position interposed between the grounded roller 1130 and the tape sensing finger 1131, the tape contact relay 11TC is operated and released to cause the operation of the relay 11TD. The operation of this relay first closes the preliminary make type contacts 11TD1 to provide a holding circuit for maintaining this relay operated and then closes the plurality of contacts 11TD3 and 11TD4 and opens the plurality of contacts 10TD1, 11TD2, 12TD1, 12TD2 and 12TD3.

However, the operation of these contacts performs no useful function at this time, except for the opening of the contacts 12TD1 which opens the holding circuit for the release relay 12RLS. The release of this relay closes the contacts 12RLS2 and 12RLS3 and opens the contacts 10RLS1, 11RLS1, 11RLS2, 12RLS1, and 12RLS4. The closure of the contacts 12RLS2 prepares an operating path for the homing relay 13HM.

The opening of the contacts 10RLS1 interrupts the operating circuit for the clutch magnet 1120 so that the magnetic tape 12000 is no longer continuously advanced. The opening of the contacts 11RLS1 removes ground from the terminal 731 in the motor speed control circuit 700, thereby to release the motor high speed relay 7MHS in the event that this relay is not held operated by the relay 7MLS or by any other trunk circuit. The opening of the contacts 12RLS1 opens, at an additional point, the holding circuit for the release relay 12RLS. The opening of the contacts 11RLS2 removes holding ground from the operated perforation counting relays 11TA, 11TB, and 11TD which, in restoring, merely aid in returning the trunk circuit 126 to a normal condition.

The opening of the contacts 12RLS4 interrupts the operating circuit for the second release delay relay 12RDT, but, since this relay is slow-to-release, the contacts controlled thereby are not operated at this time. The concurrent closure of the contacts 12RLS3 completes an energizing path for the end-of-call relay 11EC extending from the closed and grounded contacts 12RLS3 through the closed contacts 12RD2, 12RDT1, 12CC2, 12PU2, and 11IC1. The operation of the end-of-call relay 11EC closes the plurality of contacts 5EC1, 9EC1, 9EC2 and 9EC3 and opens the plurality of contacts 9EC4 and 10EC1. The closure of the contacts 5EC1 provides an additional source of busy ground for the sleeve conductor of the trunk circuit 126. The opening of the contacts 10EC1 performs no useful function at this time.

The simultaneous closure of the contacts 9EC1 and 9EC2 causes the simultaneous operation of the space pulse relay 8SP and the mark pulse relay 9MK, respectively, whereby simultaneous mark and space pulses are recorded on the magnetic tape 12000, thereby to provide a preliminary COE signal. The simultaneous operation of these two relays causes the concurrent operation of the second space pulse relay 12SPS and the second mark pulse relay 12 MKS, thereby to terminate the energization of the mark pulse head 800 and the space pulse head 810 in the manner described above.

The opening of the contacts 9EC4 removes ground from the pulsing path controlled by the contacts 9MKS1 and 9SPS1 of the space pulse relay 8SP and the mark pulse relay 9MK so that the operation of these two relays does not energize the advance magnet 820. The closure of the contacts 9EC3 completes the operating path for the pulse-assist trunk relay 9PAT, which operates and releases, in the manner described above, to intermittently pulse the advance magnet 820, whereby the magnetic tape 12000 is spaced out so that the preliminary COE signal is displaced from the space pulse head 810 and the mark pulse head 800.

As set forth above, the opening of the contacts 12RLS4 opens the operating circuit for the second release delay relay 12RDT so that, following a suitable time interval, this relay releases to open the operating circuit for the end-of-call relay 11EC by opening the contacts 12RDT1. The release of the end-of-call relay 11EC causes the sequential release of the space pulse relay 8SP, the mark pulse relay 9MK, the second space pulse relay 12SPS and the second mark pulse relay 12MKS and also terminates the intermittent operation of the pulse assist trunk relay 9PAT. The remaining contact operations caused by the release of the second release delay relay 12RDT merely restore the trunk circuit 126 to a normal condition, the opening of the contacts 5RDT1 removing the last source of busy ground from the sleeve conductor.

Accordingly, in response to the completion of the transmission of the items of information recorded on the magnetic tape 12000 of the trunk recorder 127, the readout control circuit 210 and the playback control circuit 200 release the trunk circuit 126 and the playback control circuit 200 seizes the next idle trunk circuit to which the switch 200*a* has access. In response to being released, the trunk circuit 126 locally controls the clutch magnet 1120 in the trunk recorder 127 so that the magnetic tape 12000 is returned to its home position and the mark and space pulse heads are disconnected from the amplifying means provided in the playback control circuit 200 and are connected to pulsing circuits provided in the trunk circuit 126. In response to moving the magnetic tape 12000 to its home position, preferably at a high speed, a preliminary COE signal is recorded on the tape following which the tape is spaced out so that the COE signal is displaced from the mark pulse head 800 and the space pulse head 810. Thereafter, the trunk circuit 126 is restored to a normal condition to permit this component to be seized and utilized in recording items of information pertaining to subsequently extended calls.

*Operation of the trunk circuit* 126 *during an emergency playback operation*

An emergency playback operation is initiated when, during the recording of items of information pertaining to a call, the effective end of the magnetic tape 12000 in the trunk recorder 127 is approached, thereby indicating that additional items of information cannot be recorded on this magnetic tape without encountering the danger of recording additional information on top of previously recorded information. Therefore, when this condition exists and when the trunk circuit 126 is either released by the subscriber at the end of the call or the trunk circuit 126 forcibly releases the connection upon sensing the second perforation in the magnetic tape 12000, the trunk circuit 126 records a COE signal on the tape and, thereafter, causes the magnetic tape 12000 to be returned to the effective beginning thereof. Coincident with returning the tape 12000 to the effective beginning thereof, the trunk 126 causes the playback control circuit 200 to search for and seize the trunk circuit 126 and thereafter causes the readout control circuit 210 to control the transmission of the items of information stored on the tape 12000, during which transmission the tape is erased so that, following the ticketing of all of the items of information stored in the trunk recorder 127, this trunk recorder and its associated trunk circuit 126 are returned to a normal condition in which they are capable of being seized and utilized in recording items of information pertaining to subsequently extended toll connections. Coincident with the seizure of the trunk circuit 126 by the playback control circuit 200, ground is momentarily removed from the sleeve conductor of the switch train to release the extended connection and, thereafter, ground is reapplied to this conductor to provide a guard against the seizure of the trunk circuit 126 during the emergency playback operation.

As described above, during the recording of the items of information pertaining to a call and following the receipt of answering supervisory signals, the relays 5CB, 10PT, 10RD, 8SRS, 5LD, 7SR, 12RSTS, 12RDT, a selected one of the dialed party digit register relays, and perhaps the relay 5CB together with one or more of the party identification relays together with the timer clutch 1100 are operated. If the clock and calendar information has been completely transmitted to the trunk recorder 127, the calendar-complete relay 9CC has been operated and released, and, if adequate identification information has been received by the seized identifier sender 131, the identification-complete relay 10IC is also operated. Assuming that all of the items of information pertaining to a call have been recorded on the tape 12000 in the trunk recorder 127 with the exception of the duration information and that the effective end of this magnetic tape is approached during the interval that the extended connection is maintained and during which interval the intermittently closed contacts 1011 controlled by the timer cam 1010 periodically record duration mark pulses on the tape 12000, the above described relays in the trunk circuit 126 will be in an operated condition. Accordingly, when the approach of the effective end of the magnetic tape 12000 is signaled by the movement of the first perforation 12001 into a position interposed between the grounded roller 1130 and the tape sensing contact 1131, the tape contact relay 11TC is operated to close the contacts 11TC1 and 12TC1. The closure of the contacts 12TC1 completes an operating circuit for the homing relay 13 HM which extends from closed and grounded contacts 13ALM2 through the closed contacts 12TD3 or 12CS4, 12PB3, 12TC1, and 12RLS2 to the operating winding of the homing relay 13HM. The simultaneous closure of the contact 11TC1 completes an operating circuit for the first perforation counting relay 11TA so that this relay closes its preliminary make type contacts 11TA1, thereby to prepare a circuit for fully operating this relay and for maintaining this relay operated.

The operation of the homing relay 13HM closes the plurality of contacts 5HM1, 10HM2, 11HM1, 12HM2, 13HM1, and 13HM3 and opens the plurality of contacts 12HM1, 13HM2, and 10HM1. The closure of the contacts 12HM2 completes a shunt around the closed contacts 12PB3 and 12TC1 in the above described operating circuit for the homing relay 13HM, thereby to maintain this relay operated when the tape contact relay 11TC is released. The closure of the contacts 5HM1 prepares a circuit for applying guarding ground to the sleeve lead of the extended switch train when the release delay relay 10RD is released. The closure of the contacts 11HM1 provides a source of operating and holding ground for the three perforation counting relays 11TA, 11TB, and 11TD. The opening of the contacts 13HM2 interrupts, at an additional point, the above described circuit extending to the terminal 1377, and the concurrent closure of the contacts 13HM3 prepares a circuit for applying ground to the terminal 1152 to which is connected the motor speed control circuit 700. The closure of the contacts 13HM1 prepares a circuit for applying ground to an emergency start conductor 1352.

The closure of the contacts 10HM2 prepares a circuit for applying ground to the clutch magnet 1120 in the trunk recorder 127, and the opening of the contacts 10HM1 places an open circuit on the conductor 1057 extending to the playback control circuit 200, thereby to indicate that the trunk circuit 126 is to be seized during the emergency playback operation. However, the conductor 1057 is now grounded at the closed and grounded contacts 10RDS4 to prevent seizure of this trunk circuit by the playback control circuit 200 while the circuit 126 is engaged in recording the items of information pertaining to a toll call. The opening of the contacts 12HM1 interrupts an operating circuit for the clutch switch slave relay 12CSS.

Continuing movement of the magnetic tape 12000 due to the recording of duration information moves the first perforation therein out of its interposed position between the roller 1130 and the tape sensing contacts 1131 so that the tape contact relay 11TC is released to open the contacts 11TC1 and 12TC1. The opening of the contacts 12TC1 interrupts the above described operating circuit for the homing relay 13HM, but relay is maintained operated through the parallel path previously completed by the closure of the contacts 12HM2 upon operation of the homing relay. The opening of the contacts 11TC1 removes the ground shunt from the two-step first perforation counting relay 11TA so that this relay fully operates through a path including the closed contacts 11TA1 and 11HM1. In fully operating, the relay 11TA closes the contacts 11TA3 and opens the contacts 11TA2, thereby preparing a path for causing the operation of the second perforation counting relay 11TB and interrupting the operating circuit for the relay 11TA, respectively.

Accordingly, the sensing of the first perforation 12001 in the magnetic tape 12000 causes the operation of the first perforation counting relay 11TA and the concurrent operation of the homing relay 13HM. The operation of the homing relay prepares circuits so that, when the extended connection is released either forcibly in response to sensing the second perforation 12002 or voluntarily at the end of the call, the switch train extending to the trunk circuit 126 is "winked off" (forceful release), the magnetic tape 12000 is returned to its home position, and the switching device 200*a* associated with the playback control circuit 200 is advanced over the contacts thereof until the contacts individual to the trunk circuit 126 are engaged, thereby causing the selective seizure of only the trunk circuit in an emergency playback condition.

The first perforation 12001 in the tape 12000 is separated from the second perforation 12002 by a physical space which is adequate to receive approximately ninety-nine mark pulses and, since as assumed above, the trunk circuit 126 is engaged in recording duration information at the time that the first perforation 12001 is sensed to cause the operation of the homing relay 13HM and the first perforation counting relay 11TA, the call would have to be maintained for approximately ninety-nine additional minutes before the second perforation 12002 would be moved into a position interposed between the tape sensing contacts 1131 and the grounded roller 1130. Assuming, however, that the call is voluntarily terminated during this ninety-nine minute interval, the calling bridge relay 5CB is released, thereby to cause the operation described above in the subtitle "4. Release of the trunk circuit 126 when the call cannot be completed," and in the subtitle "9. Recording the duration information."

1. VOLUNTARY RELEASE OF THE CONNECTION

As described in these subtitles, the release of the calling bridge relay 5CB causes the release of the relays 10PT, 10RD, 8SRS, 5LD, 7SR, 12RDS, 12RDT, 10IC, the selectively operated party identification and dialed party digit register relays, and the timer clutch 1100 to perform the function of restoring the trunk circuit 126 to a normal condition. These operations include the operation of the space pulse relay 8SP and of the end-of-call relay 11EC, thereby to record a space signal and a COE signal on the tape 12000 following the last duration impulse and to provide a space out operation in which the COE signal is advanced beyond the space pulse head 810 and the mark pulse head 800. In addition, since the trunk circuit 126 is to be busied during a playback operation to prevent its seizure following the release thereof by the calling subscriber, the momentary removal of ground from the sleeve conductor due to the opening of the contacts 5RD3 controlled by the release delay relay 10RD permits the release of the operated switch equipment and the following closure of the contacts 5RD2 completes a path so that ground is applied to the sleeve conductor to guard the trunk circuit 126 against further seizure by the closed contacts 5HM1 which are previously closed by the operation of the homing relay 13HM in response to the sensing of the first perforation 12001 in the magnetic tape 12000.

Further, since the magnetic tape 12000 is to be advanced to the effective beginning thereof as an incident to the establishment of an emergency playback condition in the trunk circuit 126, the release of the second release delay relay 12RDT2 to close the contacts 10RDT1 completes a circuit for applying ground to the clutch magnet 1120 of the trunk recorder 127, thereby to engage the drive capstan of this trunk recorder with the common drive shaft. In order to provide rotation of the common drive shaft, the closure of the contacts 12RDT3 upon release of the second release delay relay 12RDT completes a circuit prepared by the prior operation of the homing relay 13HM which extends through the closed contacts 13HM3 and 11TD3 to the terminal 1152. As described above, the terminal 1152 is connected to the terminal 731 in the motor speed control circuit 700, and the application of ground thereto causes the operation of the motor high speed relay 7MHS and, accordingly, operation of the motor 710 at a high speed.

Accordingly, in response to the sensing of the first perforation 12001 in the magnetic tape 12000 coupled with the release of the trunk circuit 126 during the interval provided for recording information on the tape between the perforations 12001 and 12002, all of the relays in the trunk circuit 126 are released with the first perforation counting relay 11TA and the homing relay 13HM, which relays are maintained operated. The operation of these relays causes the operation of the motor 710 at its high speed and energizes the clutch magnet 1120 so that the magnetic tape 12000 is advanced. During the release of the trunk circuit 126, a space pulse and a COE signal are recorded on the tape 12000 and ground is momentarily removed from the sleeve conductor to permit the switch train extended to the trunk circuit 126 to be released following which the contacts 5HM1 controlled by the operated homing relay 13HM apply ground to this conductor to prevent the seizure of the trunk circuit 126 until the tape 12000 is cleared during the transmission of the stored items of information to the recording facilities during the emergency playback operation.

Continuing movement of the magnetic tape under the control of the clutch magnet 1120 moves the second tape perforation 12002 into a position interposed between the grounded roller 1130 and the tape sensing finger 1131, thereby causing the operation of the tape contact relay 11TC to close the contacts 11TC1 and 12TC1. The closure of the contacts 12TC1 performs no useful function at this time. However, the closure of the contacts 11TC1 completes an operating circuit for the second perforation counting relay 11TB, thereby partially operating this relay to close the contacts 11TB1.

Continuing movement of the magnetic tape 12000 moves the perforation 12002 from between the roller 1130 and the sensing finger 1131, thereby permitting the tape contact relay 11TC to release and to open the contacts 11TC1 and 12TC1. The opening of the contacts 11TC1 permits the second perforation counting relay 11TB to operate fully and, in doing so, to open the contacts 5TB1 and 11TB2 and to close the contacts 11TB3. The opening of the contacts 5TB1 interrupts one of a pair of paths for applying ground to the upper operating winding of the calling bridge relay 5CB but, since the calling loop circuit has been previously opened at the calling substation, the opening of the contacts 5TB1 performs no useful function. The opening of the contacts 11TB2 interrupts the previously opened operating path for the second perforation counting relay 11TB and the closure of the contacts 11TB3 prepares an operating path for the third perforation counting relay 11TD.

The continuing movement of the magnetic tape 12000 under the control of the clutch magnet 1120 next causes the third perforation 12003 to be moved into an interposed position between the grounded roller 1130 and the tape sensing finger 1131, thereby to cause the third operation of the tape contact relay 11TC to close the contacts 11TC1. The closure of the contacts 11TC1 completes an operating path for the third perforation counting relay 11TD so that the preliminary make contacts 11TD1 are closed to prepare an operating and holding path for this relay. When the perforation 12003 is moved beyond the grounded roller 1130, the tape contact relay 11TC is released to open the contacts 11TC1. The opening of the contacts 11TC1 permits the third perforation counting relay 11TD to operate fully and, in doing so, to open the contacts 9TD1, 10TD1, 11TD2, 11TD3, 12TD1, 12TD2, and 12TD3 and to close the contacts 11TD4.

The opening of the contacts 10TD1 removes ground from the operating winding of the clutch magnet 1120 so that the magnetic tape 12000 is no longer advanced. The opening of the contacts 11TD3 removes ground from the terminal 1152 and, accordingly, from the terminal 731, thereby to deenergize the drive motor 710 in the motor speed control circuit 700. The opening of the contacts 11TD2 interrupts, at an additional point, the previously opened operating circuit for the third perforation counting relay 11TD, but this relay remains operated over the holding circuit provided by the closed contacts 11TD1. The closure of the contacts 11TD4 prepares an operating circuit for the playback relay 11PB.

The opening of the contacts 9TD1 performs no useful function and the opening of the contacts 12TD2 interrupts, at an additional point, an operating circuit for the clutch switch slave relay 12CSS. The opening of the contacts 12TD1 interrupts an already open holding circuit for the release relay 12RLS, and the opening of the contacts 12TD3 interrupts one holding circuit for the homing relay 13HM.

Referring now to the above described release of all of the operated relays in the trunk circuit 126 at the termination of the call, with the exception of the operated homing relay 13HM and the first perforation counting relay 11TA, the release of the release delay slave relay 12RDS closes the pair of contacts 13RDS1 to apply ground through the closed contacts 13HM1 and 1320 to the emergency start conductor 1352. The conductor 1352 is common to all of the trunk circuits to which the switch 200*a* has access and is terminated in the playback control circuit 200. The application of ground to this conductor operates an emergency start relay in the playback control circuit 200, thereby to indicate that one of the trunk circuits to which the switching device 200*a* has access is associated with a trunk recorder requiring an emergency playback operation.

The operation of the emergency start relay in the playback control circuit 200 applies ground to the conductor 1056 which is common to all of the trunk circuits to which the playback control circuit 200 has access. In the trunk circuits which are in a normal condition, the ground applied to the conductor 1056 is transmitted through the associated trunk circuit to the conductor 1057. Since the switch 200*a* tests over the conductors 1057 individual to each of the plurality of trunk circuits for an open circuit condition thereon in order to seize the associated trunk circuit, the application of ground through the conductor 1056 causes all of the trunk circuits in a normal condition to test busy to the switch 200*a*. However, in view of the operation of the homing relay 13HM to open the contacts 10HM1, the ground from the common conductor 1056 is not applied to the conductor 1057 in the trunk circuit 126 and, accordingly, this trunk circuit is marked in the contact bank of the switch 200*a* as being the trunk circuit requiring an emergency playback operation.

In addition, the operation of the emergency start relay in the playback control circuit 200 transmits information to the readout control circuit 210 to advise this circuit that an emergency playback or readout operation is required. The operation of this emergency start relay further marks the playback control circuit 200 as being the circuit, in the plurality of such circuits to which the switch 210*a* has access, which has access to the filled trunk recorder. Accordingly, in response to the receipt of this information, the readout control circuit 210 advances the switch 210*a* to search for and seize only the playback control circuit 200. Thereafter, the playback control circuit 200 advances the switch 200*a* to search for and seize the trunk circuit 126.

When the switch 200*a* moves into engagement with the contacts individual to the trunk circuit 126, ground is applied to the conductor 1353 to operate the clutch switch relay 12CS. The operation of the clutch switch relay CS opens the contacts 12CS1, 13CS3, 12CS4, 9CS3, 9CS4, 9CS7, 9CS8, and 10CS2, and closes the contacts 13CS1, 12CS2, 13CS2, 12CS3, 12CS5, 9CS1, 9CS2, 9CS5, 9CS6, 11CS1, 10CS1, and 9CS9. The operation of the contacts 9CS1 to 9CS9, inclusive, 12CS1, 13CS1, 12CS3, and 13CS3 performs the same functions described above in the title, "Operation of the trunk circuit 126 during a routine playback operation," in preparing a circuit for energizing the erase head 1110, in preparing paths which interconnect the space pulse head 810 and the mark pulse head 800 with the amplifying means in the playback control circuit 200, and in providing various signals for supervisory circuits.

The closure of the contacts 10CS1 provides holding ground on the conductor 1057 for use in the playback control circuit 200, and the simultaneous opening of the contacts 10CS2 interrupts the previously described circuit for causing the seizure of the trunk circuit 126. The closure of the contacts 12CS2 applies ground to the sleeve conductor of the trunk circuit 126, thereby to prevent this circuit from being seized during an emergency playback operation, ground also being supplied thereto by the closed contacts 5HM1. The closure of the contacts 11CS1 completes an energizing circuit for the playback relay 11PB through the closed contacts 11TD4, and the closure of the contacts 13CS2 prepares the above described circuit for causing the selective operation of the homing relay 13HM' in the next succeeding trunk circuit. However, when the playback control circuit 200 is placed in operation as a result of an emergency playback condition, ground is not applied to the advance conductor 1355 by this circuit and, accordingly, the closure of the contacts 13CS2 provides no useful function at this time.

The opening of the contacts 12CS4 interrupts another holding circuit for the homing relay 13HM so that this relay releases. It should be noted that the operation of the trunk circuit 126 during an emergency playback operation has been described on the assumption that the magnetic tape 12000 is returned to its home position, as evidenced by the sensing of the third perforation 12003, prior to the time that the trunk circuit 126 is seized by the readout control circuit 210 and the playback control circuit 200. Since, as described above, the readout control circuit 210 and the playback control circuit 200 are placed in operation to search for and seize the trunk circuit 126 by the release of the release delay slave relay 12RDS following the sensing of the first tape perforation 12001, it is possible that the trunk circuit 126 will be seized by the switch 200*a* of the playback control circuit 200 prior to the time that the magnetic tape 12000 is returned to its home position under the control of the clutch magnet 1120. Accordingly, in this event the clutch switch relay 12CS will be operated prior to the operation of the third perforation counting relay 11TD. However, the operation of the clutch switch relay 12CS prior to the operation of the third perforation counting relay 11TD does not materially change the operation of the trunk circuit 126 inasmuch as the homing relay 13HM is maintained operated over a path including contacts controlled by both the relay 11TD and the clutch switch relay 12CS and, accordingly, remains operated until the last one of these two relays is operated, thereby to indicate both that the magnetic tape 12000 has been returned to its home position and that the trunk circuit 126 has been seized by the playback control circuit 200.

The release of the homing relay 13HM opens the plurality of contacts 5HM1, 12HM2, 13HM1, 11HM1, 10HM2, and 13HM3 and closes the plurality of contacts 12HM1, 13HM2, and 10HM1. The opening of the contacts 12HM2 interrupts, at an additional point, the previously interrupted holding circuit for the homing relay 13HM, and the closure of the contacts 12HM1 prepares an operating circuit for the clutch switch slave relay 12CSS. The opening of the contacts 5HM1 removes guarding ground from the sleeve conductor of the trunk circuit 126, but ground is maintained thereon by the closed contacts 12CS2. The operation of the contacts 13HM2, 10HM1, 10HM2, and 13HM3 merely aids in restoring the trunk circuit 126 to a normal condition, as described above. The opening of the contacts 13HM1 removes ground from the emergency start conductor 1352, and the opening of the contacts 11HM1 removes holding ground for the three operated perforation counting relays 11TA, 11TB, and 11TD, thereby releasing these relays.

The release of the perforation counting relays 11TA, 11TB, and 11TD restores these relays to a normal condition so that they are capable of being sequentially operated under the control of the perforations 12001, 12002, and 12003 to indicate the end of a playback operation. In addition, the release of the third perforation counting relay 11TD to close the contacts 12TD2, when considered in conjunction with the operation of the playback relay 11PB to close the contacts 12PB2, completes an energizing path for the clutch switch slave relay 12CSS, thereby causing this relay to operate. The operation of the playback relay 11PB, in response to the operation of the clutch switch relay 12CS, the subsequent operation of the clutch switch slave relay 12CSS, under the control of the playback relay 11PB, and the release of the perforation counting relays conditions the trunk circuit 126 for a playback operation as described above under the title, "Operation of the trunk circuit 126 during a routine playback operation." As set forth in detail therein, the selective control over the clutch magnet 1120 is transferred from the trunk circuit 126 through the playback control circuit 200 to the readout control circuit 210 so that the tape is intermittently advanced to transmit the stored mark and space pulses.

At this time in the emergency playback operation, only the clutch switch slave relay 12CSS, the clutch switch relay 12CS, and the playback relay 11PB are operated. These same components are operated at this time during a routine playback operation, and, accordingly, following the completion of the transmission of all of the items of information stored on the magnetic tape 12000, the trunk circuit 126 is released, as described in the subtitle "2.

Release of the trunk circuit 126 following a routine playback operation." In this operation, the magnetic tape 12000 is again returned to its home position under the control of the tape perforations 12001, 12002, and 12003, following which a COE signal is recorded on the tape and a space out operation is performed. Following the performance of these operations, the trunk circuit 126 is returned to a normal condition in which it is capable of being seized and utilized in recording the items of information pertaining to subsequently placed calls.

Accordingly, in an emergency playback operation, the trunk circuit 126 is informed by sensing the perforations 12001, 12002, and 12003 on the magnetic tape 12000 that this tape is incapable of storing additional items of information. In response to the receipt of this information, the tape 1200 is returned to its home position and the trunk circuit drops off the extended switch train by momentarily removing ground from the switch conductor. Guarding ground is thereafter returned to the sleeve conductor to prevent further seizure of the trunk circuit. The trunk circuit, in response to the release of the connection, applies ground to an emergency start conductor 1352 extending to the playback control circuit, thereby causing the playback control circuit to place the readout control circuit 210 in operation to search for and seize only the playback control circuit 200 which is associated with the trunk circuit having a trunk recorder requiring an emergency playback operation. The trunk circuit 126 further marks the contact banks of the switch 200*a* so that the playback control circuit 200 then searches for and seizes only the trunk circuit 126 having the filled trunk recorder 127 associated therewith. Following the seizure of the trunk circuit 126 and its associated trunk recorder 127, the transmission of items of information pertaining to toll calls from the trunk recorder 127 to the readout and recording facilities is initiated. Following the complete transmission of all of the items of information stored on this tape, the tape is returned to its normal effective beginning, a COE signal is recorded thereon, and the trunk circuit 126 is restored to a normal condition.

2. FORCED RELEASE OF THE CONNECTION

In the above description of an emergency playback operation of the trunk circuit 126, it is assumed that the extension was voluntarily released in the time interval between the sensing of the first perforation 12001 and the sensing of the second perforation 12002 so that the trunk circuit 126 was no longer in use in controlling the recording of items of information on the tape in the trunk recorder 127 at the time that the trunk circuit 126 and the trunk recorder 127 are seized by the playback control circuit 200. However, in the event that the call is continued until the end of the magnetic tape 12000 is approached, as indicated by the perforations 12002 and 12003, the continuation of the recording of items of information on the tape 12000 would result in superimposing items of mark and space impulses on similar impulses which were previously recorded at the beginning of the tape. Accordingly, the trunk circuit 126 includes means for causing a forcible release of the extended connection in response to the sensing of the second tape perforation 12002, thereby to insure that items of information will not be superimposed on the magnetic tape 12000 and to insure that the trunk recorder 127 and the trunk circuit 126 are capable of being seized by the playback control circuit 200 and utilized in transmitting the stored items of information to the recording facilities following seizure.

More specifically, as described above in the title, "Operation of the trunk circuit 126 during an emergency playback operation," in addition to the relays in the trunk circuit 126 which are normally operated during the recording of items of information pertaining to a toll call, the first perforation counting relay 11TA and the homing relay 13HM are operated when the first perforation 12001 is moved between the grounded roller 1130 and the tape sensing contact 1131. Assuming that approximately ninety-nine pulses, including both mark and space pulses, are recorded on the tape 12000 following the sensing of the first perforation 12001, the second perforation 12002 is moved into a position interposed between the grounded roller 1130 and the tape sensing contact 1131, thereby to cause the operation of the tape contact relay 11TC during the period in which the call is maintained. The operation of the tape contact relay 11TC closes the contacts 11TC1 and 12TC1. The closure of the contacts 12TC1 is of no significance at present inasmuch as the homing relay 13HM is operated at this time. However, the closure of the contacts 11TC1 completes the energizing circuit for the second perforation counting relay 11TB, thereby causing this relay to close its contacts 11TB1. As the perforation 12002 moves out of engagement with the grounded roller 1130, the tape contact relay 11TC is released, thereby to open the contacts 11TC1 and 12TC1 and, accordingly, to cause the second perforation counting relay 11TB to operate fully.

In operating fully, the relay 11TB opens the contacts 5TB1 and 11TB2 and closes the contacts 11TB3. The operation of the contacts 11TB2 and 11TB3 prepares the operating path for the third perforation counting relay 11TD, as described above. However, the opening of the contacts 5TB1 removes the sole remaining source of ground for the calling loop circuit, assuming that the identification-complete relay 10IC has been previously operated to open the contacts 5IC1.

The removal of ground from the calling line loop releases the calling bridge relay 5CB and causes the sequential restoration of the operated relays in the trunk circuit 126 to their normal condition. The sequential release of the relays in the trunk circuit 126 includes the release of the release delay relay 10RD to open the contacts 5RD3 and to close the contacts 5RD2, thereby momentarily removing ground from the sleeve conductor of the extended switch train and permitting the switch train to return to a normal condition, thus releasing the connection between the trunk circuit 126 and the calling substation. The release of the remaining relays controlled by the calling bridge relay 5CB performs the same functions as described above under the title, "Operation of the trunk circuit 126 during an emergency playback operation." These operations include the recording of a COE signal on the magnetic tape 12000 which, in the case of the forced release, is recorded on the magnetic tape 12000 following the second tape perforation 12002 and preceding the third tape perforation 12003.

The release of these relays also results in the closure of the contacts 10RDT1 to complete a previously prepared circuit for applying ground to the clutch magnet 1120 in the trunk recorder 127, and in the closure of the contacts 12RDT3 to apply ground to the terminal 1152, thereby to cause operation of the motor 710 at a high speed for advancing the magnetic tape 12000 so that the third perforation 12003 is sensed to cause the operation of the third perforation counting relay 11TD. Concurrently with returning the magnetic tape 12000 to its home position, the closure of the contacts 13RDS1, in response to the release of the trunk circuit 126, applies ground to the emergency start conductor 1352, thereby to cause the readout control circuit 210 and the playback control circuit 200 to sequentially search for and seize the trunk circuit 126 with which is associated the filled trunk recorder 127. The seizure of the trunk circuit 126 by the playback control circuit 200 operates in the same manner described above under the subtitle "1. Voluntary release of the connection," to transfer control over the movement of the magnetic tape 12000 from the trunk circuit 126 to the readout control circuit 210 and to associate the mark pulse head 800 and the space pulse 810 with the amplifying means in the playback control circuit 200.

As described above, during the transmission of the mark and space information from the trunk recorder 127 to the recording facilities, only the clutch switch slave relay 12CSS, the clutch switch relay 12CS, and the playback relay 11PB are operated, the remaining relay components in the trunk circuit 126 having been released incident to the establishment of the emergency playback condition. Since the emergency playback condition was established incident to an involuntary release of the extended connection, the items of information pertaining to the last call are stored on the magnetic tape 12000 up to and including a point located between the second and third tape perforations 12002 and 12003. Accordingly, the trunk circuit 126 is not released by the circuit 200 due to operation of the time responsive means in the readout control circuit 210 but rather is released in response to sensing the perforations 12001, 12002, and 12003.

During the transmission of the items of information pertaining to the last call recorded on the tape, the tape contact relay 11TC is operated and released under the control of the first tape perforation 12001 to operate the first perforation counting relay 11TA. The first perforation counting relay 11TA operates fully and is maintained operated over the holding circuit provided by the closed contacts 11TA1 and 11CSS2. The operation of the first perforation counting relay 11TA, in closing the contacts 11TA3, prepares a path for operating the second perforation counting relay 11TB.

When the second perforation 12002 is next moved past the grounded roller 1130 and the tape sensing contact 1131, the second perforation counting relay 11TD is operated to prepare a path for operating the third perforation counting relay 11TD. Following the sensing of the second perforation 12002, the last COE signal on the magnetic tape 12000 is transmitted to the readout control circuit 210 to cause the removal of ground from the clutch conductor 1350, thereby interrupting movement of the magnetic tape 12000. Following the printing of the items of information pertaining to the last call, the readout control circuit 210 again applies ground to the conductor 1350 to again initiate continuous forward movement of the magnetic tape 12000. This movement of the tape causes the operation of the third perforation counting relay 11TD under the control of the third perforation 12003 which, as described in subtitle "2. Release of the trunk circuit 126 following a routine playback operation," causes the restoration of the trunk circuit 126 and its associated trunk recorder 127 to a normal condition. Since the erase head 1110 is maintained energized by the playback control circuit 200 until the perforation 12003 is sensed to cause the release of the trunk circuit 126, all of the items pertaining to the last call are erased.

Accordingly, when the toll call is maintained by the subscriber until such time as the second perforation 12002 is sensed by the finger 1131, the call is forcibly terminated by the operation of the second perforation counting relay 11TB, thereby to insure that the trunk circuit 126 is returned to a proper condition for initiating an emergency playback operation by the time that the third perforation 12003 is moved into a sensing position. In this manner, the superimposition of the items of information pertaining to the first and last calls is positively prevented.

*Alarm facilities in the trunk circuit 126*

The trunk circuit 126 is provided with alarm means in the form of a slow-to-release alarm relay 13ALM for preventing use of this trunk circuit in the event that any one of a number of abnormal conditions are encountered during a playback operation. For instance, if, upon initiation of a playback operation, the magnetic tape 12000 in the trunk recorder 127 is not advanced to its home position within a predetermined time interval following the seizure of the trunk circuit 126 by the playback control circuit 200, an alarm condition is indicated in the trunk circuit 126 at a supervisory position, and this trunk circuit is also busied to prevent its seizure by switching equipment, such as the selector 142. Similar results are produced in the trunk circuit 126 in the event that the erase head 1110 is not energized within a predetermined time interval following movement of the magnetic tape 12000 to its home position or if ground is removed from the erase conductor 1063 during a playback operation.

More specifically, as described above, upon seizure of the trunk circuit 126 by the playback control circuit 200, ground is applied to the conductor 1353 to cause the operation of the clutch switch relay 12CS, the operation of which operates the homing relay 13HM. The operation of the homing relay 13HM, in closing the contact pair 10HM2, applies ground to the clutch magnet 1120, thereby to advance the magnetic tape 12000 to its home position as defined by the sequential sensing of the perforations 12001, 12002, and 12003 and the accompanying sequential operation of the relays 11TA, 11TB, and 11TD. As an incident to the operation of the relay 11TD, the playback relay 11PB is operated to apply ground through the conductor 1354 to the playback control circuit 200.

The playback control circuit 200 is provided with time responsive means so that, if, within an interval such as eighty seconds, the magnetic tape 12000 has not been returned to its home position, as signaled by the application of ground to the conductor 1354, the playback control circuit applies ground to an alarm conductor 1351. Since the contacts 13CS1 are closed due to the prior operation of the clutch switch relay 12CS, the application of ground to the conductor 1351 causes the operation of the alarm relay 13ALM to close a plurality of contacts 5ALM1, 10ALM1, 13ALM1, and 13ALM3 and to open a plurality of contacts 12ALM1 and 13ALM2. The closure of the contacts 13ALM1 prepares a holding path for the slow-to-release alarm relay 13ALM, which path is completed when the contacts 12CS1 are closed. The closure of the contacts 5ALM1 applies ground to the sleeve conductor of the extended switch train to prevent seizure of the trunk circuit 126.

The closure of the contacts 10ALM1 applies resistance battery to a conductor 1060 which terminates in the playback control circuit 200 and which is common to all of the trunk circuits to which the switch 200*a* has access. The application of resistance battery to this conductor indicates to the playback control circuit 200 that one of the trunk circuits to which it has access is in an alarm condition.

The opening of the contacts 12ALM1 opens the operating path for the release relay 12RLS. The closure of the contacts 13ALM3 energizes an alarm lamp 1340, thus causing the illumination thereof as an indication that the trunk circuit 126 is in an alarm condition. The closure of the contacts 13ALM3 also applies ground to a terminal 1379 which is connected to a delayed alarm in a supervisory circuit to indicate the alarm condition in the trunk circuit 126. The opening of the contacts 13ALM2 removes the source of playback main holding ground from the trunk circuit 126 so that, if any of the relays 13HM, 11TA, or 11TB have been operated, these relays will immediately release to aid in restoring the trunk circuit 126 to a normal condition.

Concurrently with causing the application of ground to the alarm conductor 1351, the playback control circuit 200 advances the switch 200*a* to search for and seize the next idle trunk circuit. In moving to the contacts individual to the next idle trunk circuit, ground is removed from the conductor 1353, thereby releasing the clutch switch relay 12CS. As described above, the operating circuit for the alarm relay 13ALM extends through the contacts 13CS1 which are closed by the clutch switch relay 12CS. Accordingly, when this relay releases, the operating circuit for the relay 13ALM is opened. However, the closure of the contacts 13ALM1 completes a holding circuit for the alarm relay, and, since this relay is slow-to-release, the contacts 12CS1 close to apply ground to this holding circuit prior to the time that the alarm relay 13ALM releases. In restoring its other contacts to a normal condition, the clutch switch relay 12CS restores the trunk circuit 126 to a condition which is normal, except for the continuing operation of the alarm relay 13ALM, the operation of which applies busy ground to the sleeve conductor of the trunk circuit 126, thereby preventing its seizure, and illuminates the lamp 1340 to indicate that the trunk circuit 126 is in an alarm condition. In addition, the playback control circuit 200 is informed, by the closure of the contacts 10ALM1, that one of the trunk circuits to which the switch 200*a* has access is in an alarm condition.

The trunk circuit 126 is maintained in this condition until the alarm relay 13ALM is released by the manual operation of an alarm release key which includes a pair of normally closed contacts 1310 in the holding circuit for the alarm relay 13ALM. Upon operation of this key to open the contacts 1310, the alarm relay 13ALM is released and the trunk circuit 126 is restored to a normal condition in which it is capable of being seized for either a playback operation or for recording the items of information pertaining to a call extended therethrough.

As indicated above, the alarm relay 13ALM is capable of signaling a second improper operating condition resulting from the failure to energize the erase head 1110 within a predetermined time interval following the movement of the tape 12000 to its home position. More specifically, as set forth above, when the tape 12000 is moved to its home position, the relays 12CS, 12CSS, 11TA, 11TB, 11TD, and 11PB are operated. The operation of the clutch switch slave relay 12CSS transfers control over the clutch magnet 1120 to the readout control circuit 210 through the conductor 1350. If, within a selected time interval such as one second following the operation of the playback relay 11PB and the clutch switch slave relay 12CSS, the clutch magnet 1120 has not been energized to move the magnetic tape 12000 to transmit the preliminary COE signal recorded thereon, and if this signal has not been properly transmitted through the signaling link to the readout control circuit 210, the time responsive means in the playback control circuit 200 are again operated to apply ground to the alarm conductor 1351, thereby to operate the alarm relay 13ALM.

As explained above, the operation of this relay applies busy ground to the sleeve conductor of the trunk circuit 126, causes the illumination of the alarm lamp 1340, and applies resistance battery to the conductor 1060. Further, the operation of the alarm relay releases all of the operated relays in the trunk circuit 126, with the exception of the clutch switch relay 12CS and the playback relay 11PB which are held up on ground provided from other sources. Following the application of ground to the conductor 1351, the playback control circuit 200 removes ground from the conductor 1353, thereby causing the sequential release of the clutch switch relay 12CS and the playback relay 11PB. Restoring these two relays to normal returns the trunk circuit 126 to a normal condition except for the alarm conditions established by the continuing operation of the alarm relay 13ALM.

Further, if, during the transmission of mark and space pulse information from the trunk recorder 127 to the recording facilities, the erase signal disappears so that the erase head 1110 in the trunk recorder 127 is no longer energized, the playback control circuit 200 applies ground to the alarm conductor 1351, thereby causing the operation of the alarm relay 13ALM, the release of any operated relays in the trunk circuit 126 except for those controlled by the clutch switch relay 12CS, and the subsequent release of the clutch switch relay 12CS, together with any relays controlled thereby. These operations are performed in the manner described above, and, accordingly, in response to the disappearance of the erase signal on the conductor 1063, the trunk circuit 126 is placed in the alarm condition described above.

Therefore, the trunk circuit 126 includes alarm means which, in response to any one of three abnormal operating conditions, busies the trunk circuit 126 by the application of ground to the sleeve conductor thereof, applies resistance ground to the playback control circuit 200 to indicate that one of the trunk circuits to which the switch 200*a* has access is in an alarm condition, and further illuminates the lamp 1340 to visibly indicate that the trunk circuit 126 is in an alarm condition.

*Auxiliary circuits in the trunk circuit* 126

In addition to the above described means whereby the trunk circuit 126 automatically controls the recording and transmission of items of information pertaining to toll calls, a number of manually operated means are provided for simulating certain conditions of the trunk circuit and for providing certain supervisory functions in this trunk circuit.

More specifically, a busy key of a manually operated, locking type is provided which includes a plurality of normally closed contacts 521, 1020, 1320, 1322, and 1324 and a plurality of normally open contacts 520, 1021, and 1323. Operation of the busy key in closing the contacts 520 connects ground to the incoming sleeve conductor to the trunk circuit 126, thereby to guard this trunk circuit against seizure. In closing the contacts 1021, ground is applied to the conductor 1057 to prevent seizure of the trunk circuit 126 by the playback control circuit 200, and the closure of the contacts 1323, in trunk circuits other than the trunk circuit 126 which are not connected to the first contacts in the contact banks of the stepping switch 200*a*, provides a shunt around the homing relay 13HM to permit the ground applied to the advance conductor 1355 to be applied to the homing relay in the next succeeding trunk circuit. The opening of the contacts 1320 opens the path for applying ground to the emergency start conductor 1352, and the opening of the contacts 1324 opens a circuit for applying ground to the terminal 1377, which is connected to the all trunks busy signaling lead of the supervisory circuit. Accordingly, manual operation of the busy key effectively prevents seizure of the trunk circuit 126 by any of the switching components having access thereto and effectively bypasses this circuit insofar as the operation of the trunk circuit 126 is interlocked with the function of any of the remaining trunk circuits.

In addition, the trunk circuit is provided with a plug busy switch including a plurality of normally open contacts 510 and 1032 and a pair of normally closed contacts 1031. The plug busy switch is automatically operated upon removal of the equipment plate on which the trunk circuit 126 is mounted from a relay rack so that the sleeve conductor is grounded by the closure of the contacts 510 and the conductor 1057 is connected directly to ground to prevent seizure of the trunk circuit 126 by the switch 200*a*. The opening of the contacts 1031 opens the emergency start test circuit by which the trunk circuit 126 is marked for seizure during an emergency playback operation. These contacts are restored to a normal condition, as shown in the drawings, in response to replacing the trunk circuit plate in the mounting means therefor.

In order to simulate an emergency playback condition in the trunk circuit 126, an emergency playback key of a nonlocking type is provided including a pair of normally open contacts 1220. In response to manual closure of the contacts 1220, an operating circuit is completed extending to the operating winding of the homing relay 13HM from the normally closed and grounded contacts 13ALM2. The completion of this circuit operates the homing relay 13HM and, since the release delay slave relay 12RDS is normally released, the operation of the homing relay to close the contacts 13HM1 applies ground to the emergency start conductor 1352, thereby simulating to the playback control circuit 200 and the readout control circuit 210 that the trunk circuit 126 is in an emergency playback condition.

As described above, the trunk circuit also includes a nonlocking release key including a plurality of contacts 1210 and 1310 which are normally closed and which can be manually opened to restore these components, and, accordingly, the trunk circuit 126 to normal.

The circuit 126 also includes the plurality of monitoring jacks 500, 840, 850, and 920 into which plugs connected to monitoring apparatus may be inserted to check the signals supplied to the tip and ring conductors and to check the operation of the advance magnet 820, the space pulse relay 8SP, and the mark pulse relay 9MK, respectively.

In summary, therefore, the trunk circuit 126, in response to seizure, stores a dialed party digit on the magnetic tape 12000 of the trunk recorder 127 and also stores this digit in a group of dialed party digit register relays therein. This dialed party digit, when transmitted from stations having conventional dialing devices, forms the units digit of the directory number of parties on terminal per line multiparty lines and is utilized to control the selection of a party matrix on terminal per station multiparty lines. Following the storage of this information, the trunk circuit is rendered effective to control the transmission of subsequently dialed digits for extending the connection to the called substation and, concurrently therewith, records the values of the digits forming the directory number of the called substation on the magnetic tape 12000. Incident to this recording operation, the trunk circuit 126 counts the number of dialed connection extending digits so as to prevent the storage of excessive digits in the trunk recorder 127 by rendering the trunk circuit 126 nonresponsive to digits in excess of a predetermined number.

Further, prior to dialing the digits utilized in extending the connection, the trunk circuit 126 performs a test to determine whether or not the calling substation is provided with a modified or a conventional dialing device, and, in the event that the substation is provided with a modified dialing device, circuits are conditioned to perform a calling station identification operation during the dialing of certain of the digits forming the directory number of the called substation by selectively operating a group of party identification relays.

Following the receipt of answering supervisory signals, the trunk circuit 126 associates the common clock and calendar circuit 133 with the recorder 127 to transmit a series of groups of mark and space pulses to the trunk recorder 127 forming a designation of a time and date of completing the call. In response to the completion of the storage of this information, the trunk circuit 126 places the identifier sender allotter 129 in operation so as to associate an idle identifier sender 131 with both a common identifier circuit 130 and the trunk circuit 126. Following the seizure and association of the identifier sender 131, the trunk circuit 126 applies an identification potential to the HS conductor of the extended switch train so as to selectively energize the identification matrix 128 to provide a group of signals representing the digits forming the directory number of the calling subscriber. This information operates the seized identifier sender 131 to transmit four groups of mark signals to the trunk recorder 127 to provide a recorded indication of the directory number of the calling subscriber.

Following the storage of this information, the trunk circuit 126 renders a timer individual to this trunk circuit effective to record duration impulses on the magnetic tape 12000, thereby to provide a record of the duration of the connection. In response to the release of the connection, the trunk circuit 126 records a COE signal on the tape 12000 and thereafter spaces out the tape to separate the items of information pertaining to this call from those of the next call placed through the trunk circuit 126. The trunk circuit is then restored to a normal condition in which it is capable of being seized and utilized in recording items of information pertaining to subsequently extended connections.

During a routine playback operation, the trunk circuit 126 is seized by the playback control circuit 200 so that the magnetic tape 12000 in the trunk recorder 127 is returned to its home position and, following which, control over the movement of the tape is transferred to the readout control circuit 210. Thereafter, the magnetic tape 12000 is intermittently advanced to transmit the stored items of information to the recording facilities, thereby to control the production of individual toll tickets pertaining to each of the calls and including all of the items pertinent thereto. Simultaneously with transmission, the stored items are erased to condition the tape 12000 for receiving additional items. Following the transmission of these items of information, the trunk circuit 126 returns the magnetic tape 12000 to its home position and records a COE signal thereon. In addition, the trunk circuit 126 includes alarm facilities which are controlled by timing means in the playback control circuit 200 for indicating an alarm condition in the event that the magnetic tape 12000 is not returned to the effective beginning thereof within a predetermined interval following the initiation of a playback operation, in the event that the preliminary COE signal recorded on the tape 12000 is not transmitted and received by the recording facilities within a predetermined time interval following movement of the magnetic tape to the effective beginning thereof, or in the event that the erase head 1110 is not energized during the playback operation.

Further, the trunk circuit 126 includes facilities for initiating an emergency playback operation in response to movement of the magnetic tape 12000 toward the effective end thereof, thereby indicating that additional items of information cannot be stored thereon without distorting information which has previously been recorded. In the emergency playback operation, the magnetic tape 12000 is returned to its home position, and a signal is transmitted from the trunk circuit 126 to the playback control circuit 200 to cause the readout control circuit 210 and the playback control circuit 200 to seize the trunk circuit 126. If a call is not voluntarily terminated following the establishment of a preliminary condition indicating the necessity of an emergency playback operation, the trunk circuit 126 causes the forceful release of the connection to insure that the information stored on the magnetic tape 12000 cannot be distorted by superimposed recordings of items of information pertaining to different calls. Following the termination of an emergency playback operation, the trunk circuit 126 and its associated trunk recorder 127 are restored to a normal condition in which they are capable of being seized and utilized in recording items of information pertaining to succeeding connections which are extended through this circuit.

CLOCK AND CALENDAR CIRCUIT 133

The clock and calendar circuit 133 (Figs. 14–19) is common to a plurality of trunk circuits, similar to the trunk circuits 126 and 135, and is adapted, upon seizure by one of these trunk circuits following the receipt of answering supervisory signals, to provide seven groups of mark pulses separated by space pulses representing the date and time at which the toll call was completed. To accomplish this, the clock and calendar circuit 133 comprises six rotary switches representing month, date, hours, ten minutes, unit minutes, and day which are continuously advanced under the control of impulses applied at one minute intervals to the unit minutes rotary switch to provide a continuous indication of correct date and time. The wipers of the rotary switches selectively mark a plurality of marking conductors in accordance with the values of the digits forming the numerical designation of time and date, and these marking conductors extend to a steering relay circuit 1950 also forming a portion of the clock and calendar circuit 133.

The steering circuit 1950 comprises a steering relay chain which sequentially renders the wipers of the various rotary switches effective in sequence to mark a selected conductor in accordance with the value of the digit representing the portion of date and time information indicated by the grounded wiper. These marking conductors selectively control the sequential operation of a counting relay chain 1900 which is driven by a pulse generator 1600 comprising a transistor multivibrator so that the counting chain 1900 counts up to the value of the digit represented by the position of the selectively energized wiper of the rotary switch and, following which, the counting operation of the chain is terminated. Concurrently with advancing the counting relay chain, mark pulses are transmitted to the mark pulse head of the associated trunk recorder, the number of impulses transmitted generally being one greater than the value of the digit, i.e. one pulse represents "0." The sequential operation of the relays in the steering circuit 1950, which is also under the control of the pulse generator 1600, applies a space pulse to the space pulse recording head of the associated trunk recorder at the end of each of the seven groups of mark pulses, thereby to separate successive items of information from each other in the same manner that the interposed space pulses recorded by the trunk circuit 126 described above separate various items of digital information representing the designations of the calling and called subscribers.

In addition, the clock and calendar circuit 133 includes a lamp display arrangement which is capable of selectively energizing a single lamp to indicate the value of the various items of date and time information, thereby affording a means for visually checking the accuracy of the setting of the plurality of rotary switches. In addition, a manually operated advance key is associated with the display means to provide means for correcting the settings of the rotary switches in the event that an erroneous indication of date and time is provided thereby. Further, the circuit 133 includes a calendar guard arrangement which prevents the rotary switches from making certain advances during the time that the scanning circuit is effective to transmit mark pulse and space pulse information to the associated trunk recorder. It is desirable to prevent certain resetting operations of the rotary switches during this interval inasmuch as this could result in a change in the marking of the conductor controlling the sequential operation of the counting relay chain 1900 and thereby cause the transmission of erroneous date or time information to the trunk recorder.

It is often desirable, for instance, in making traffic studies, to be able to easily separate toll calls which are placed during business hours from those which are placed on Sundays, holidays, or when night rates are in effect. Accordingly, the clock and calendar circuit 133 includes means for modifying the value of the tens hour digit of the time designation during business hours. More specifically, the circuit 133 registers hour information on a twenty-four hour basis in which the digital designation "12" represents noon and the digital designation "24" represents midnight. In order to provide an indication of the calls which are placed during business hours, the value of the tens digit during business hours is increased by an increment of two so that noon on a business day would be represented by an indication "32" as contrasted with the representation "12" at noon on a holiday or Sunday.

*Registration of date and time information*

More specifically, referring to Figs. 14 to 19, inclusive, of the drawings, the date and time registering portion of the clock and calendar circuit 133 shown therein includes a units minutes stepping switch operated by a motor magnet 14MU, a tens minutes rotary switch actuated by a motor magnet 14MT, an hours rotary switch actuated by a motor magnet 14HR, a day of week rotary switch actuated by a motor magnet 15DA, a date rotary switch actuated by a motor magnet 14DT, and a months rotary switch actuated by a motor magnet 14MO. These rotary switches are continuously adjusted so that the wipers controlled thereby are positioned in engagement with contacts in the contact banks associated therewith so as to provide a continuous indication of date and time. Certain of the wipers of the rotary switches are utilized to mark conductors for controlling the operation of the scanning portion of the clock and calendar circuit, and the remainder of the wipers thereon are utilized for controlling the selective energization of associated rotary switches.

In order to advance the units minutes rotary switch at one minute intervals, a continuously energized motor 1402 is provided for continuously rotating a cam 1400. The cam 1400 is provided with a protuberance which momentarily closes a pair of contacts 1401 at one minute intervals, the closure of the contacts 1401 applying ground to the operating winding of the units minutes motor magnet 14MU through a circuit including a pair of normally closed contacts 14MUK1 of a units minutes display key. Energization of the motor magnet 14MU conditions a plurality of wipers 14MU1, 14MU2, and 17MU1 for advancing a single step in the three contact banks of the units minutes rotary switch associated therewith when the magnet 14MU is released. These contact banks each include twenty contacts forming twenty separate stepping positions.

Figure 17:
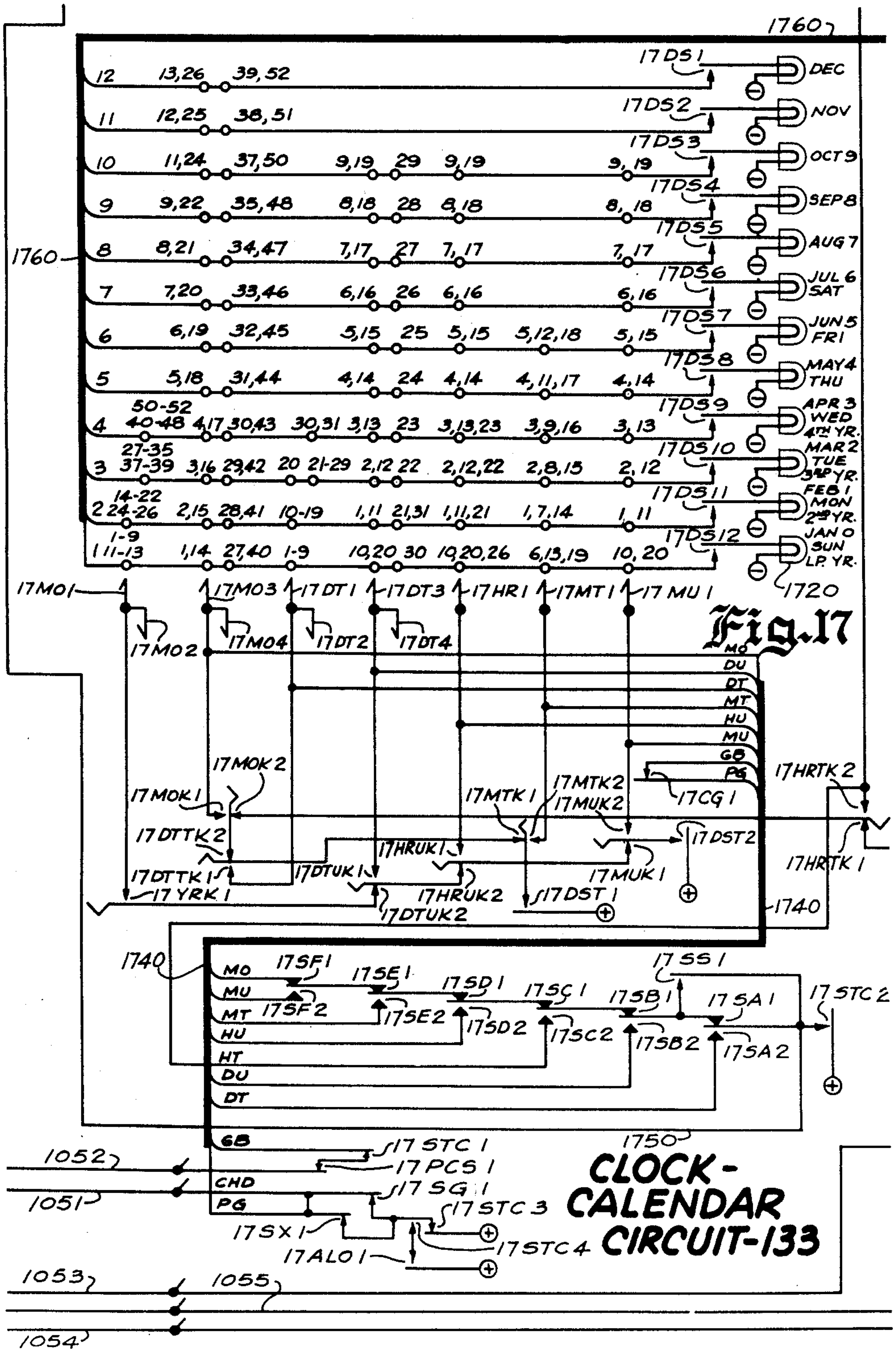
Figure 18:
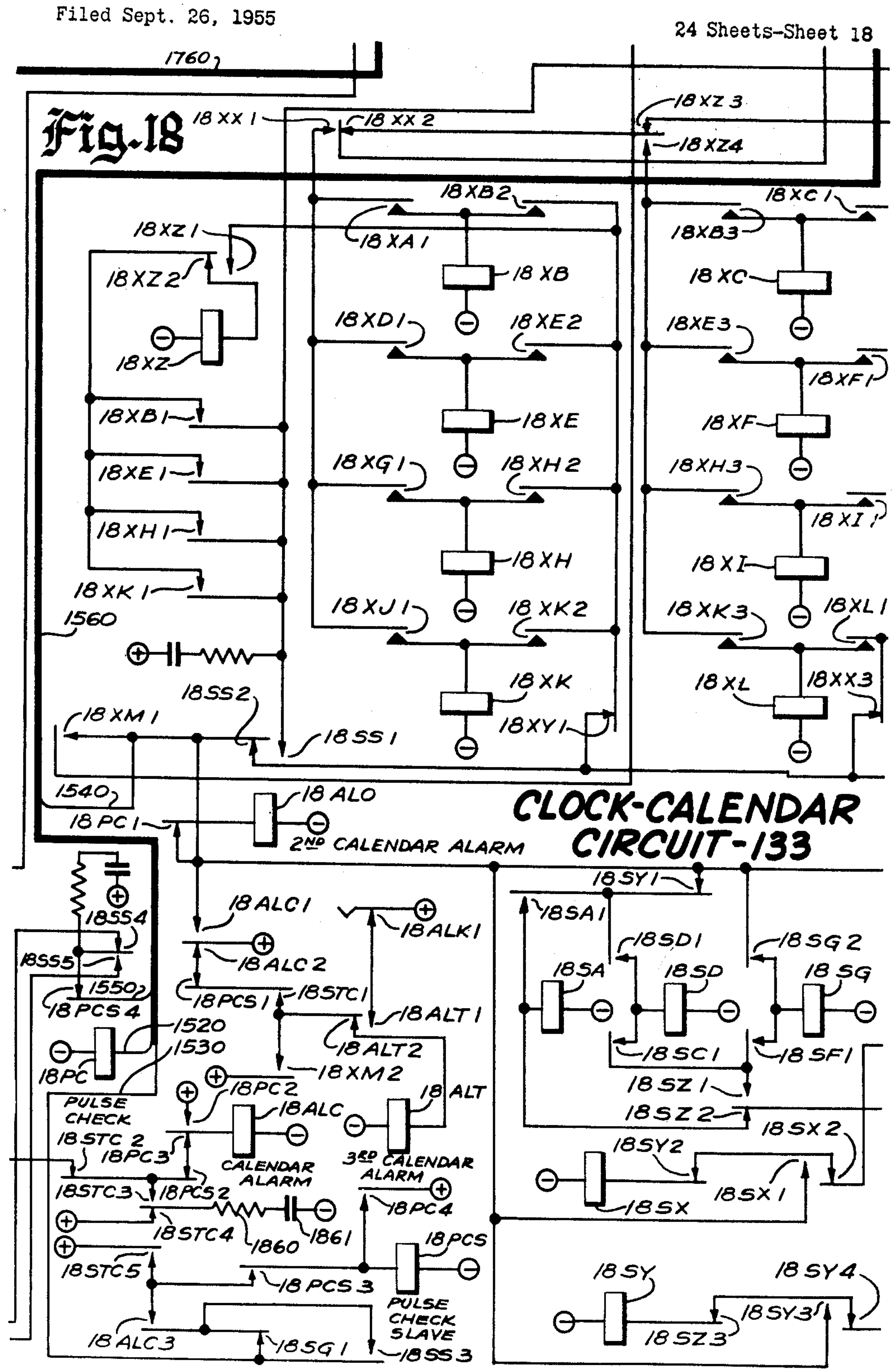
Figure 19:
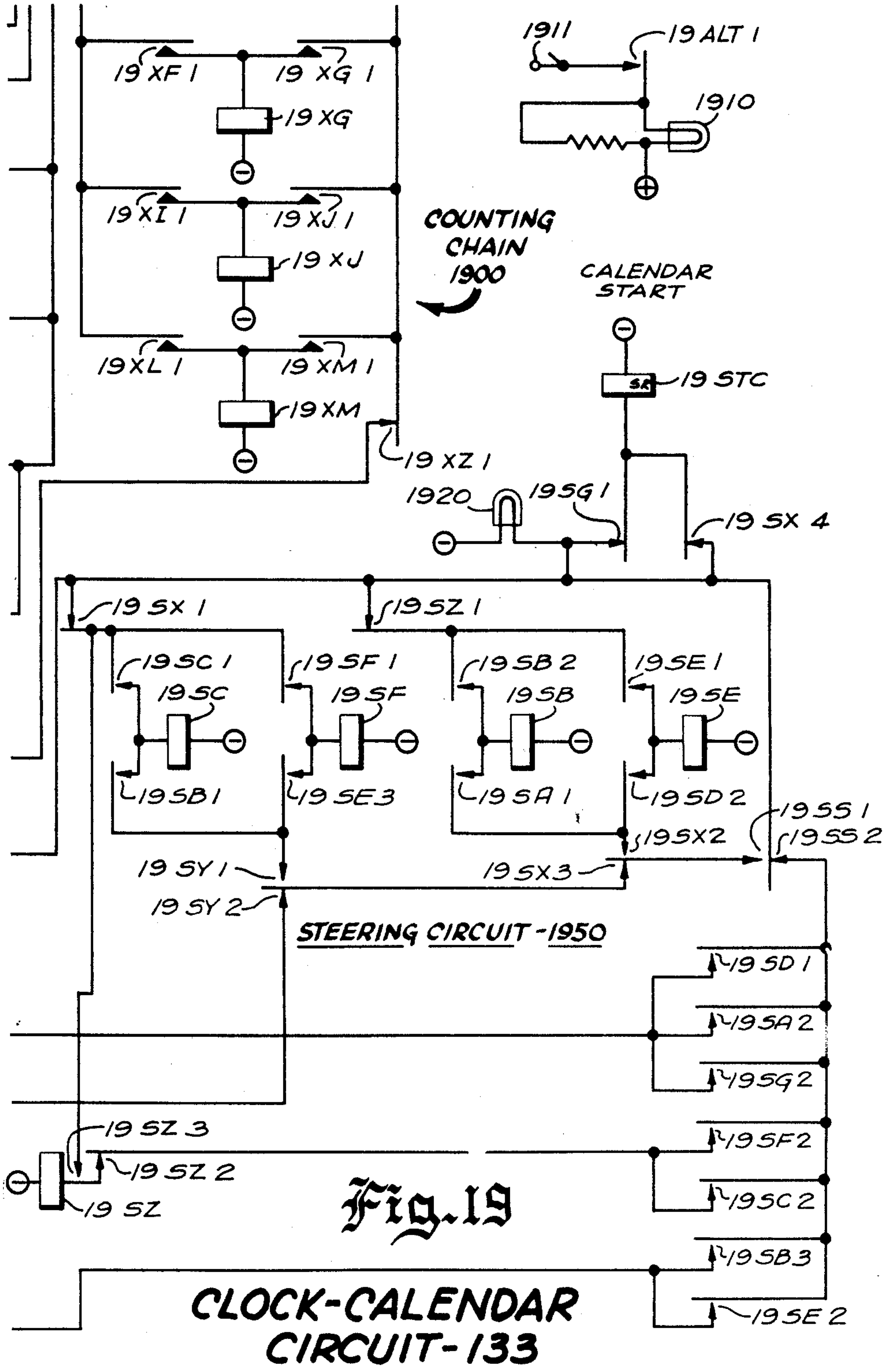

In order to indicate the value of the units minutes digit, the wiper 17MU1 selectively engages the contacts in the contact bank associated therewith which, as shown in Fig. 17, are connected so that the contacts 1 to 10 and 11 to 20, inclusive, represent the digits "1" to "9" and "0" respectively. These contacts are connected to marking conductors which extend through a cable 1760 to control the operation of the counting chain 1900. As indicated by the numerical designations appearing adjacent the cable 1760 in Fig. 17, the first contact, for instance, is connected to a marking conductor designated by the digit "2." The digit "2" refers to the number of mark pulses which are produced in response to the application of ground to the first contact in the bank. As indicated above, most of the digits are represented by a number of mark pulses which is one greater than the value of the digit, thereby permitting the cipher or "0" represented by the tenth and twentieth contacts in the contact bank engaged by the wiper 17MU1 to be represented by a single mark pulse, as indicated by the digit "1" appearing immediately adjacent the conductor to which these two contacts are strapped.

In order to provide a means for advancing the tens minutes rotary switch at the end of each ten minute interval, the wiper 14MU1 of the units minutes rotary switch engages the ninth and nineteenth contacts therein during the interval representing the ninth minute. At the beginning of the tenth minute interval, the ground is applied by the closure of the contacts 1401 to the wiper 14MU and the engaged ninth or nineteenth contact. This ground is extended to the motor magnet 14MT of the tens minutes rotary switch through a circuit including a pair of normally closed contacts 14MTK1 on a tens minutes key, a wiper 14MT2 of the tens minutes rotary switch, and one of the contacts 1-9 or 11-19 engaged thereby. In this manner, the tens minutes rotary switch is operated and released to advance a plurality of wipers 14MT2, 14MT3, 14MT4, and 17MT1 a single step at the end of each ten minute interval. The wiper 14MT2, in addition to preparing an operating circuit for the motor magnet 14MT by engaging the contacts 1-9 and 11-19 also engages the contacts in the tenth and twentieth stepping positions of the twenty point rotary switch forming the tens minutes register to provide a means for operating this switch to skip over the tenth and twentieth stepping positions. More specifically, the contacts 10 and 20 are connected directly to ground through interrupter contacts 14MT1 controlled by the motor magnet 14MT so that when the wiper 14MT2 is, for instance, positioned in engagement with the contact 10, the motor magnet 14MT is operated and released to immediately advance the wipers controlled thereby into engagement with the eleventh contact in the contact banks associated therewith. In a similar manner, engagement of the wiper 14MT2 with the twentieth contact causes the tens minutes rotary switch to be advanced to the contacts forming the first stepping position.

In order to provide a means for manifesting the value of the tens minutes digit, the wiper 17MT1 is adapted to engage the numerically designated contacts in Fig. 17 which are directly connected to the marking conductors identified by the digital designations appearing immediately adjacent the cable 1760. For example, the contacts 2, 8, and 15 manifest the digit "2" and are connected to the marking conductor designated by the digit "3," which digit represents the number of mark pulses to be produced as a representation of the digit "2."

The hours rotary switch actuated by the motor magnet 14HR includes four wipers 14HR1, 14HR3, 14HR4, and 17HR1 which are adapted to engage twenty six point contact banks and also includes a pair of interrupter contacts 14HR2 which is operated in response to energization of the motor magnet 14HR. In order to actuate the hours rotary switch at the end of each sixty minute interval, the wiper 14HR3 engages contacts 1–23 and 26 which are directly connected to contacts 5, 12, and 18 in the contact bank engaged by the wiper 14MT3 of the tens minutes rotary switch. The contacts 5, 12, and 18 are engaged by the wiper 14MT3 during an interval corresponding to fifty minutes of elapsed time, and this wiper is directly connected to the contacts 9 and 19 which are engaged by the wiper 14MU1 of the units minutes rotary switch at the end of each successive nine minute interval of elapsed time. Accordingly, when the contacts 1401 are closed and when the wipers 14MU1, 14MU3, and 14HR3 are in the above described positions, ground is applied through these wipers and through a pair of normally closed contacts 14HRUK2 of a units hours key to cause the energization of the motor magnet 14HR of the hours rotary switch. Since only twenty-four points of the twenty-six point tens minutes rotary switch are used to represent the twenty-four hours of a day, the contacts 24 and 25 engaged by the wiper 14HR3 are strapped to ground through a pair of interrupter contacts 14HR2 controlled by the motor magnet 14HR. In this manner, the hours rotary switch is advanced a single step at the end of each sixty minute interval of elapsed time.

Figure 14:
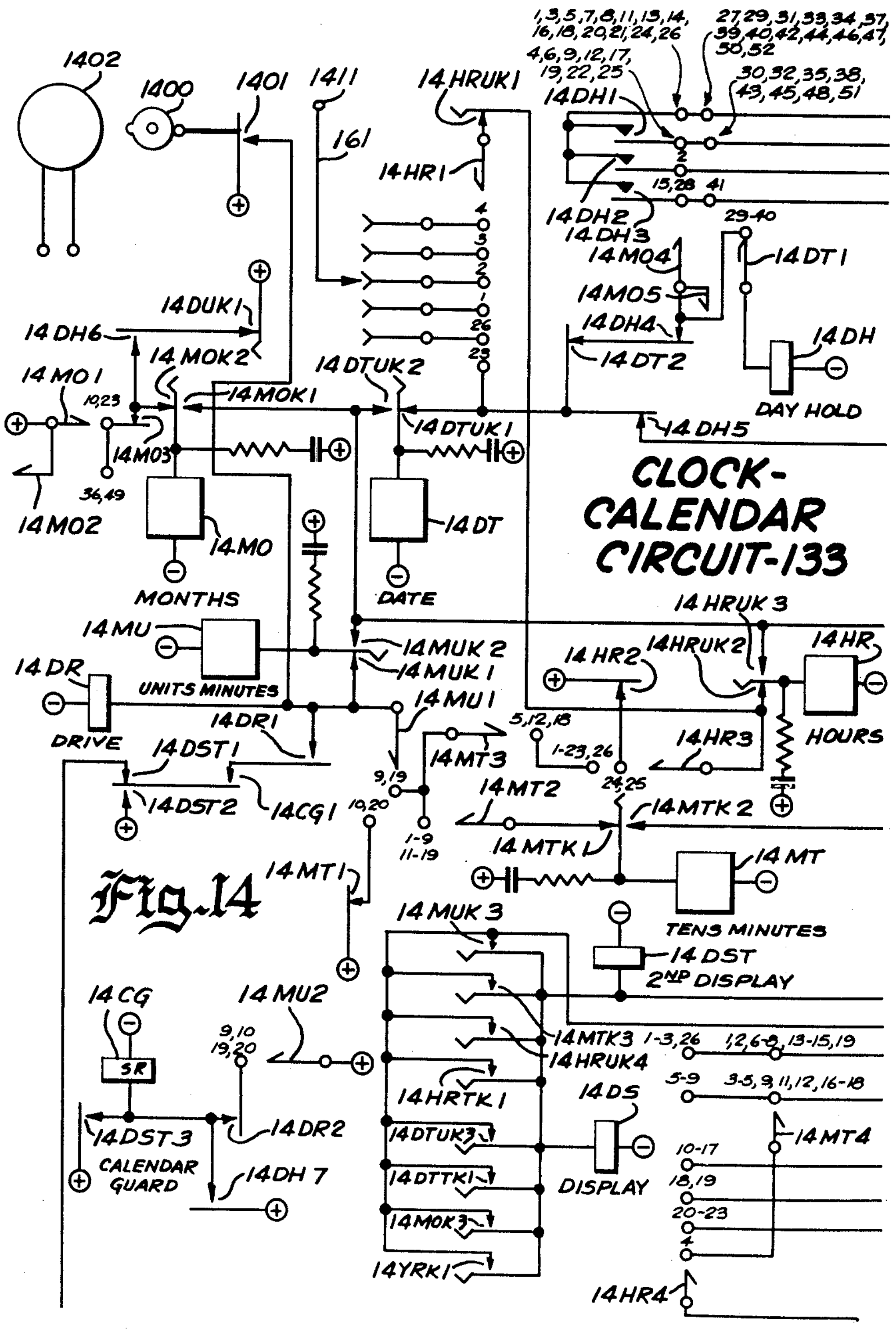

In order to establish marking conditions indicative of the value of the units digit of the hour on a twenty-four hour basis, the wiper 17HR1 is advanced over the contacts shown adjacent thereto, and, in order to establish marking conditions indicating the value of the tens digit of the hour, the wiper 14HR4 is advanced over the numerically designated contacts shown in juxtaposition thereto in Fig. 14 of the drawings.

The date rotary switch actuated by the motor magnet 14DT is an eight level, forty point switch which selectively indicates the value of both the tens and the units digits of the designation of the day of the month. In order to advance the date rotary switch at the end of each twenty-four hour interval of elapsed time, the wiper 14HR1 of the hours rotary switch is connected to the wiper 14HR3 so that the ground pulse provided by the contacts 1401 is applied to the wiper 14HR1 through a pair of normally closed contacts 14HRUK1 on a units hours key at the end of each sixty minute interval. The wiper 14HR1 is moved into engagement with the twenty-third contact in the contact bank associated therewith at the end of each twenty-four hour interval, and, accordingly, when a ground impulse is received from the contacts 1401 representing the termination of the sixty minute interval forming the last hour of the day, this ground is applied through a pair of normally closed contacts 14DTUK1 to operate and release the motor magnet 14DT, thereby advancing a plurality of wipers 14DT1, 15DT1, 15DT2, 17DT1, 17DT2, 17DT3, and 17DT4 a single step. The operation of the motor magnet 14DT also causes the operation of a pair of interrupter contacts 14DT2.

In order to designate the value of the units digit of the day, the wipers 17DT3 and 17DT4 are moved over the contacts shown adjacent thereto in Fig. 17 of the drawings, thereby selectively marking the conductors extending through the cable 1760 to the counting circuit 1900. In order to provide marking conditions representing the value of the tens digit of the day, the wipers 17DT1 and 17DT2 are advanced over the contacts shown adjacent thereto in Fig. 17 of the drawings.

The day of week rotary switch actuated by the motor magnet 15DA includes four wipers adapted to engage twenty-six point contact banks of which five stepping positions thereof are not utilized, thus providing twenty-one effective stepping positions representing three seven day intervals. In order to actuate the day of week rotary switch at the end of each day, the ground provided to the twenty-third contact in the contact bank engaged by the wiper 14HR1 of the hours rotary switch is applied through a path including a pair of normally closed contacts 14DH5 to the contacts designated in Fig. 15 of the drawings which are engaged by a wiper 15DA1 of the day of week rotary switch. When ground is applied to the wiper 15DA1, it is extended to the operating winding of the motor magnet 15DA through a pair of normally closed contacts 15DAK2 of a days key to operate and release the motor magnet 15DA, thereby to advance a plurality of wipers 15DA1, 15DA3, 15DA4, and 15DA5 controlled thereby. The contacts 6, 11, 16, 21, and 26 engaged by the wiper 15DA1 are strapped to ground through a pair of interrupter contacts 15DA2 to advance the day of week rotary switch over these points.

The day of week rotary switch does not provide marking information for controlling the counting chain 1900 in the clock and calendar circuit 133 inasmuch as it is not necessary to provide this item of information in indicating the date and time on which a toll call was completed. However, the information relating to the day of the week is utilized in controlling the operation of means for varying the value of the tens hours digital designation on holidays and Sundays as contrasted with normal business days.

The months rotary switch includes five pairs of wipers 14MO1, 14MO2, 14MO4, 14MO5, 15MO1, 15MO2, 17MO1, 17MO2, 17MO3, and 17MO4 adapted to engage fifty-two point contact banks and includes also a pair of interrupter contacts 14MO3 which are opened in response to energization of the motor magnet 14MO. The months rotary switch is advanced at the end of each month to a setting corresponding to the designation of the next succeeding month, and, since the end of any selected month is determined both by the number of days in the current month and the time elapsed in the current month, the months rotary switch is selectively controlled by wipers forming a portion of both the months rotary switch and the date rotary switch.

More specifically, the wiper 15DT2 of the date rotary switch is strapped to ground and is advanced over the contacts associated therewith so that, following the end of the twenty-eighth day of the month and in response to operation and release of the motor magnet 14DT at the beginning of the twenty-ninth day of the month, the wiper 15DT2 is moved into engagement with the twenty-ninth contact in the contact bank associated therewith. If the current month is February in a year other than leap year, the wipers 14MO4 and 14MO5 of the months rotary switch are in engagement with the contacts 15, 28, or 41. Accordingly, the ground connected to the twenty-ninth contact by the wiper 15DT2 is extended through either of the wipers 14MO4 or 14MO5 to the operating winding of a day hold relay 14DH through a path which also includes the wiper 14DT1 of the date rotary switch and any of the contacts 29 to 40 associated therewith.

The operation of the day hold relay 14DH closes a plurality of contacts 14DH1, 14DH2, 14DH3, 14DH4, 14DH6, and 14DH7 and opens the contacts 14DH5. The closure of the contacts 14DH6 applies ground to the operating winding of the motor magnet 14MO of the months rotary switch through a circuit including a plurality of normally closed contacts 14DUK1 and 14MOK2. Operation of the months rotary switch prepares the wipers controlled thereby for movement into engagement with the contacts representing the next succeeding month which, in the assumed instance above, is the month of March represented by the contacts 16, 29, or 42.

In addition to operating the months rotary switch in preparation for advancing to a position corresponding to the next following month, the operation of the day hold relay 14DH also serves to return the date rotary switch actuated by the motor magnet 14DT to a setting corresponding to the first day of this succeeding month. More specifically, the closure of the contacts 14DH4 extends the ground applied to the wipers 14MO4 or 14MO5 through the interrupter contacts 14DT2 and the contacts 14DTUK1 to the operating winding of the motor magnet 14DT of the date rotary switch. Operation of the motor magnet 14DT opens the contacts 14DT2 and thereby terminates energization of this motor magnet. The step of advancement caused by the release of the motor magnet 14DT advances the wiper 15DT2 into engagement with the thirtieth contact. However, the closure of the contacts 14DH1, 14DH2, and 14DH3, upon operation of the day hold relay 14DH, completes a path through the closed contacts 14DH2 from the thirtieth contact in the bank engaged by the wiper 15DT2 so that ground remains applied to the day hold relay 14DH to maintain this relay operated and, accordingly, to apply ground through the closed contacts 14DH4 to the motor magnet 14DT. In this manner, the wipers of the date rotary switch are intermittently advanced over the contacts 30 to 40, inclusive, until they are moved into engagement with the contacts forming the first stepping position thereof, which position represents the first day of the month. The opening of the contacts 14DH5 prevents operation of the day of week rotary switch during the resetting of the date rotary switch by opening the ground path extending to the contacts engaged by the wiper 15DA1.

When the wipers 15DT2 and 14DT1 are moved out of engagement with the fortieth contacts and into engagement with the first contacts, the holding circuit for the day hold relay 14DH is interrupted, thereby releasing this relay to open the contacts 14DH1, 14DH2, 14DH3, 14DH4, 14DR6, and 14DH7 and to close the contacts 14DH5. The release of the day hold relay terminates the stepping operation of the date rotary switch with the wipers thereof in engagement with the contacts forming the first stepping position representing the first day of the month. The opening of the contacts 14DH6 releases the motor magnet 14MO of the months rotary switch so that the wipers 14MO1, 14MO2, 14MO4, 14MO5, 15MO1, 15MO2, 17MO1, 17MO2, 17MO3, and 17MO4 are moved into engagement with the contacts 16, 29, or 42, representing the month of March in other than a leap year.

The wipers 17MO3 and 17MO4 provide an indication of the current month for controlling the operation of the counting chain 1900. These contacts are connected to the marking conductors in such a manner that the contacts representing the month of January, i.e. 1, 14, 27, and 40, are connected to a marking conductor which causes the counting chain 1900 to produce a single pulse whereas the contacts 13, 26, 39, and 52, which represent the month of December, are connected to a conductor which causes the counting chain 1900 to provide a group of twelve mark pulses. Since the months rotary switch includes contact banks having fifty-two points and since these contact banks are strapped to provide four twelve month yearly cycles, four of the stepping positions are not utilized. Accordingly, in order to advance the months rotary switch through these stepping positions, the wipers 14MO1 and 14MO2 which are strapped to ground engage the contacts 10, 23, 36, and 49 which are connected to the operating winding of the motor magnet 14MO through the interrupter contacts 14MO3 of the months rotary switch. Accordingly, when the wipers 14MO1 and 14MO2 are moved into engagement with any of these contacts, the months rotary switch is immediately advanced to its next succeeding stepping position.

In order to provide an indication of the year within the four year cycle provided by the four twelve month cycles of the months rotary switch, the wipers 17MO1 and 17MO2 engage contacts connected to the conductors designated by the digits "1," "2," "3," and "4" in Fig. 17 of the drawings. This information is not utilized by the scanning portion of the clock and calendar circuit but is utilized to provide a visible lamp display of the year cycle in which the wipers of this switch are set. More specifically, the contacts 1–9 and 11–13 represent a leap year cycle in which is included a month of February having twenty-nine days, whereas the remainder of the positions on the months rotary switch are divided into three twelve month yearly cycles corresponding to years in which the month of February is provided with twenty-eight days.

In a manner similar to that described above, when, following the termination of the twenty-ninth day of the month, the wiper 15DT2 is moved into engagement with the thirtieth contact, and, if the wipers of the months rotary switch are in engagement with the second contact in the contact banks associated therewith representing February of a leap year, the above described circuits are completed for operating the day hold relay 14DH, for advancing the months rotary switch to a setting corresponding to March of leap year, and for advancing the date rotary switch to a position corresponding to the first day of the month of March in a leap year.

In a similar manner, when, following the termination of the thirtieth day of a month, the grounded wiper 15DT2 is moved into engagement with the thirty-first contact in the contact bank associated therewith, and, if the months rotary switch is in a setting corresponding to a month having thirty days, a circuit is completed from ground through the wiper 15DT2, the engaged thirty-first contact, the designated contacts shown in Fig. 14 which are strapped to the engaged thirty-first contact, the wipers 14MO4 or 14MO5, and the wiper 14DT1 to the operating winding of the day hold relay 14DH. As described above, the operation of this relay advances the months rotary switch to a position corresponding to the next succeeding month and returns the date rotary switch to a position corresponding to the first day in this next succeeding month.

In a similar manner, when, following the expiration of the thirty-first day of a month, the grounded wiper 15DT2 is moved into engagement with the thirty-second contact in the bank associated therewith, a circuit is completed through the contacts designated in Fig. 14 of the drawings which are engaged by the wipers 14MO4 or 14MO5 to again cause the operation of the day hold relay and movement of the months and date rotary switch to positions corresponding to the first day of the next succeeding month. Accordingly, in this manner, the operation of the months rotary switch and the date rotary switch are interlocked so that when the date rotary switch moves into a position corresponding to the termination of the number of days in the month represented by the current setting of the months rotary switch, the months rotary switch is advanced to a setting corresponding to the next succeeding month and the date rotary switch is advanced to a setting corresponding to the first day in this next succeeding month.

As indicated above, the clock and calendar circuit 133 includes means for providing a distinctive indication in the registered time for calls which are placed during business hours, thereby permitting calls placed during those hours to be readily separated from calls placed at night or on Sundays or holidays. More specifically, calls placed at night, on Sundays, or on selected holidays are provided with a time indication on a conventional twenty-four hour basis in which the time indications range from "0001" which represents one minute after midnight to "2400" which represents midnight. As a basis for distinguishing the calls placed during business hours, the tens digit of the time notation is varied to include one of the digits "3" or "4." For instance, 5:00 a.m. on a holiday or Sunday is represented by the numerical notation "0500," whereas 5:00 a.m. on a business day is represented as "3500." In a similar manner 10:00 a.m. on a date on which business rates do not apply would be represented as "1000," whereas 10:00 a.m. in a time interval during which business rates are applicable would be represented as "4000." Accordingly, the clock and calendar circuit 133 modifies the digital designation of times when toll calls are placed during business hours by increasing the value of the tens hours digit by a factor of three, the time designation remaining unmodified on those days and during those periods of the day in which business rates are not applicable.

Assuming that business rates are to be applicable on calls placed between 4:30 a.m. and 6:00 p.m., except on Sundays and holidays, the time designations during this period preceding 10:00 a.m. will include a tens digit "3," whereas those calls placed between 10:00 a.m. and 6:00 p.m. will include a tens digit "4." As set forth above, the wiper 14HR4 of the hours rotary switch is provided for marking information relating to the value of the tens digit of the time designation. As shown in Fig. 14 of the drawings, when the wiper 14HR4 is in engagement with the contact 4 representing 4:00 a.m., a path is completed to a wiper 14MT4 of the tens minutes rotary switch. When this wiper is in engagement with the contacts 3–5, 9, 11, 12, and 16–18, which contacts represent the tens minutes digits "3," "4," and "5," a marking circuit is completed through the normally closed contacts 15DS1 and 15HY4, a jack 1584, and a plug 1585 to the marking conductor designated by the numerical character "4," this conductor being connected to the similarly designated conductor in Fig. 17 of the drawings by the cable 1760. The application of a marking potential to the "4" designated conductor causes the counting chain 1900 to transmit four mark pulses to an associated trunk recorder, which four pulses represent the digit "3." Therefore, when the wiper 14HR4 engages the contact 4 representing 4:00 a.m. and the wiper 14MT4 engages any one of the contacts representing tens digits "3," "4," or "5," thus representing the time between 4:30 a.m. and 5:00 a.m., the "4" designated marking conductor is rendered effective to control the production of mark pulses representing the tens hours digit of the time.

In the event that the wiper 14MT4 is in engagement with the contacts 1, 2, 6–8, 13–15, or 19, a marking path is extended from the wiper 14HR4 in engagement with the fourth contact through the wiper 14MT4, to the "1" designated marking conductor, thereby causing the counting chain 1900 to transmit a single mark impulse representing the tens hours digit, which impulse represents "0." In a similar manner, when the wiper 14HR4 engages the contacts 1–3 or 26 representing the time interval between midnight and 4:00 a.m., ground is applied to the "1" designated marking conductor to cause the transmission of only a single mark pulse to an associated trunk recorder so that a zero is printed as the tens hours digit.

In the interval between 5:00 a.m. and 9:00 a.m., the wiper 14HR4 engages the contacts 5–9, and thus prepares a marking path, as described above, extending to the "4" designated conductor to cause the transmission of four mark pulses representing the digit "3." When the wiper 14HR4 engages the contacts 10–17 representing the interval from 10:00 a.m. to 5:59 p.m., a marking path is completed extending through a plurality of normally closed contacts 15DS3 and 15HY3, a plug 1581, and a jack 1583 to the marking conductor designated by the character "5." The establishment of a marking condition on this conductor causes the counting chain 1900 to transmit five mark pulses to an associated trunk recorder, and these five impulses, when transmitted to the recording facilities, cause the printing of the digit "4" thereby to designate the hours 10:00 a.m. to 6:00 p.m. on days during which business rates are to be applied to the calls.

Since business rates are not applicable in the interval between 6:00 p.m. and midnight, the wiper 14HR4 engages the contacts 18 and 19 representing the hours 6:00 p.m. and 7:00 p.m. to prepare a marking path extending to the conductor designated as "2," thereby to cause the transmission of two mark pulses to an associated trunk recorder and the printing of the digit "1" as the tens hours digit during these time intervals. In a like manner, in the hours between 8:00 p.m. and midnight, the wiper 14HR4 engages the contacts 20–23 to prepare a marking path which extends to the conductor designated as "3" to cause the transmission of three mark pulses and, accordingly, the printing of the digit "2." In this manner, the wipers 14HR4 and 14MT4 provide selective marking conditions between midnight and 4:30 a.m. and between 6:00 p.m. and midnight so that the printed time designation relating to calls placed during these intervals is in the form provided by a conventional twenty-four hour notation system in which the value of the tens hours digit is either "0," "1," or "2." However, in the interval between 4:30 a.m. and 6:00 p.m. during which business rates are applicable, the wipers 14HR4 and 14MT4 establish marking conditions which cause the printing of the digits "3" or "4" as the tens hours digits of the time notation.

In addition, it is often desirable to obviate the use of the digits "3" and "4" representing business hours on holidays and on Sundays inasmuch as the rate structure on these days will often correspond to the rate structure at night or other than during business hours. To accomplish this, the register portion of the clock and calendar circuit 133 includes means for preventing the preparation of marking paths extending to the "4" and "5" designated marking conductors on certain selected holidays and also on Sundays.

The day of week rotary switch prevents the establishment of business hour marking conditions by moving the wiper 15DA3 into engagement with the contacts 1, 9, and 18 at the beginning of each Sunday, thereby to apply ground to a pair of normally open contacts 15DR3. These contacts are controlled by a drive relay 14DR which is energized at one minute intervals under the control of the cam operated contacts 1401. Accordingly, when the contacts 1401 are closed in the first one minute interval following movement of the wiper 15DA3 into engagement with the Sunday representing contacts 1, 9, or 18, the drive relay 14DR is operated to close a plurality of contacts 14DR1, 14DR2, 15DR1, and 15DR3 and to open a plurality of contacts 15DR2 and 15DR4.

The closure of the contacts 15DR3 completes an operating circuit from ground at the wiper 15DA3 for a holiday relay 15HY which in operating closes a plurality of contacts 15HY1, 15HY3, and 15HY5 and opens a plurality of contacts 15HY2 and 15HY4. The closure of the contacts 15HY1 applies ground to the now open contacts 15DR4 so that, when the drive relay 14DR is released by the opening of the cam controlled contacts 1401, the closure of the contacts 15DR4 completes a holding path for the holiday relay 15HY prior to the opening of the contacts 15DR3 to interrupt the operating circuit for this relay.

The opening of the contacts 15HY2 and 15HY4 together with the simultaneous closure of the contacts 15HY3 and 15HY5 opens the paths extending to the marking conductors designated "4" and "5" and connects the conductors which previously extended thereto to the marking conductors designated as "1" and "2," respectively. Accordingly, for the duration of the operation of the holiday relay 15HY, the wipers 14HR4 and 14MT4 are incapable of establishing marking conditions which vary the values of the tens hours digits from that of the conventional twenty-four hour notational arrangement.

Since the drive relay 14DR is operated in response to each closure of the contacts 1401, the contacts 15DR3 and 15DR4 are intermittently opened and closed at one minute intervals. However, due to the provision of ground from the wiper 15DA3 to the contacts 15DR3, the operation of the drive relay 14DR does not result in the release of the holiday relay 15HY until such time as the wiper 15DA3 is moved into engagement with contacts representing Monday. At that time, the first operation of the drive relay 14DR permits the holiday relay 15HY to release, thereby opening the holding circuit completed at the contacts 15HY1 and restoring the contacts 15HY2 and 15HY4 to a normal closed condition in which the wipers 14HR4 and 14MT4 are again capable of establishing marking conditions on the "4" and "5" designated conductors.

In addition, means are provided for preventing the establishment of business hour time notations on selected holidays such as January 1, Thanksgiving Day, and Christmas Day. More specifically, to prevent a modification of the tens hours designation on Christmas, following the end of the twenty-fourth day of December, the wipers 15MO1 and 15MO2 of the months rotary switch are moved into engagement with the contacts 13, 26, 39, or 52, and the grounded wiper 15DT2 of the date rotary switch is advanced into engagement with the twenty-fifth contact in the contact bank associated therewith. When the drive relay 14DR is operated in the first one minute interval following the termination of the twenty-fourth day of December, the contacts 15DR1 are closed so that ground is applied from the wiper 15DT2 through the twenty-fifth contact and the closed contacts 15DR1 to operate a twenty-fifth relay 15TF.

Operation of the relay 15TF closes a plurality of contacts 15TF1, 15TF2, and 15TF3. The closure of the contacts 15TF2 provides a holding path for the twenty-fifth relay 15TF which extends through the contacts 15DR2 which, upon release of the drive relay 14DR, are again closed prior to the opening of the contacts 15DR1 since these contacts form a make-before-break arrangement. The closure of the contacts 15TF1 applies ground to the contacts 13, 26, 39, and 52, one of which is selectively engaged by one of the wipers 15MO1 or 15MO2 during the month of December. Accordingly, this ground is applied to the normally open contacts 15DR3 so that, during the period in which the drive relay 14DR is operated to cause the operation of the twenty-fifth relay 15TF, the holiday relay HY is again operated to close the contacts 15HY1, 15HY3, and 15HY5 and to open the contacts 15HY2 and 15HY4. The closure of the contacts 15HY1, as described above, provides a holding circuit for the holiday relay to maintain this relay operated until ground is removed from the wipers 15MO1 or 15MO2. The operation of the contacts 15HY2 to 15HY5, inclusive, as described above, prevents the establishment of marking conditions representing the business hours tens digits "3" and "4."

At the end of the twenty-fifth day of December, the wiper 15DT2 is moved out of engagement with the twenty-fifth contact, and, accordingly, when the drive relay 14DR is next operated to open the contacts 15DR2, the twenty-fifth relay 15TF is released to open the contacts 15TF1, 15TF2, and 15TF3. The opening of the contacts 15TF2 returns the holding circuit for the twenty-fifth relay 15TF to a normal condition whereas the opening of the contacts 15TF1 removes ground from either of the wipers 15MO1 and 15MO2 so that the opening of the contacts 15DR4 concurrently with the opening of the contacts 15DR2 permits the holiday relay 15HY to release and, accordingly, to restore the circuits controlled thereby which condition the clock and calendar circuit 133 for establishing marking conditions representing tens hours digits "3" and "4."

In order to provide for obviating the business hour notation on the first of January, the grounded wiper 15DT1 of the date rotary switch is moved into engagement with the contact 1 representing the first day of the month and the wipers 15MO1 and 15MO2 of the months rotary switch are moved into engagement with one of the contacts 1, 14, 27, or 40 representing the month of January. At this time, a path is completed from ground through the wiper 15DT1 and one of the wipers 15MO1 or 15MO2 to the normally open contacts 15DR3. When these contacts are closed in response to the operation of the drive relay 14DR, a circuit is completed for causing the operation of the holiday relay 15HY which, as described hereinabove, effectively prevents the establishment of marking conditions representing tens hours digits "3" or "4." The holiday relay 15HY is maintained operated, as described above, until such time as the grounded wiper 15DT1 is moved out of engagement with the contact 1 at the end of the first of January. At this time the holiday relay 15HY is restored to normal to again condition the clock and calendar circuit 133 for providing modified notations representing business hours.

The clock and calendar circuit 133 also operates to prevent the modification of the tens hours digits on Thanksgiving Day, which day, if maintained on the fourth Thursday in November, falls on a date between the twenty-second and twenty-eighth of November. Accordingly, at this time the wipers 15MO1 and 15MO2 of the months rotary switch are in engagement with one of the contacts 12, 25, 38, or 51, which contacts represent the month of November. Assuming that the fourth Thursday in November falls on the twenty-second to twenty-fourth or twenty-sixth to twenty-eighth of November, the wiper 15DT2 is moved into engagement with one of these contacts, thereby to extend ground to three contacts 5, 14, and 23 which are adapted to be engaged by the wiper 15DA4 of the day of week rotary switch. The contacts 5, 14, and 23 represent Thursday, and, accordingly, on these days, the wiper 15DA4 engages one of these contacts. Accordingly, when a Thursday in the month of November falls upon the twenty-second, twenty-third, twenty-fourth, twenty-sixth, twenty-seventh, or twenty-eighth, a circuit is completed for applying ground through the wiper 15DT2, 14DA4 and either of the wipers 15MO1 or 15MO2 to the normally open contacts 15DR3. When these contacts are closed upon operation of the drive relay 14DR, the holiday relay 15HY is again operated to render the establishment of marking conditions representing the tens hours digits "3" and "4" impossible. At the end of the day, the grounded wiper 15DT2 and also the wiper 15DA4 are moved out of engagement with the interconnected contacts so as to open the operating path for the holiday relay 15HY and, accordingly, this relay releases so that the tens hours digit during business hours may be modified.

In the event that Thanksgiving Day falls on the twenty-fifth of November, the grounded wiper 15DT2 is moved into engagement with the twenty-fifth contact, thereby causing the operation of the twenty-fifth relay 15TF, as described above, so as to close the contacts 15TF1, 15TF2, and 15TF3. The closure of the contacts 15TF2 again provides a holding circuit for the relay 15TF and the closure of the contacts 15TF1 produces no useful function inasmuch as these contacts are connected to the contacts engaged by the wipers 15MO1 and 15MO2 which represent the month of December. However, the closure of the contacts 15TF3 applies ground through the wiper 15DA4 and one of the wipers 15MO1 and 15MO2 for again causing the operation of the holiday relay 15HY. The operation of the holiday relay 15HY, as described above, prevents an alteration in the value of the tens hours digit during the normal business hours of the day. When the wiper 15DT2 is moved out of engagement with the twenty-fifth contact and the drive relay 15DR is again operated, the twenty-fifth relay 15TF is released, and, in opening the contacts 15TF3 together with movement of the wiper 15DA4 to a contact which is not representative of Thursday, the operating path for the holiday relay 15HY is interrupted, thereby permitting this relay to release and to restore the circuit to a normal condition. Movement of the grounded wiper 15DT2 from the twenty-fifth contact to the twenty-sixth contact does not again cause the operation of the holiday relay 15HY inasmuch as the wiper 15DA4 is no longer in engagement with one of the contacts 5, 14, or 23 representing Thursday.

Accordingly, in this manner, the clock and calendar circuit 133 provides means for normally modifying the tens hours digit of the time notation when a toll call is placed to either of the digits "3" or "4" during business hours which, as described above, may extend from 4:30 a.m. to 6:00 p.m. However, this circuit also includes means for rendering the tens hours digit modifying means ineffective on Sundays and on selected holidays so that, during these periods of time, the time indication provided by the clock and calendar circuit is on the basis of a conventional twenty-four hour notation. The tens hours modifying means can also be rendered ineffective by removing the plugs 1583 and 1585 from the jacks 1581 and 1584, respectively, and by inserting a pair of plugs 1582 and 1586 therein.

In order to check the accuracy of the continuous time and date information provided by the clock and calendar circuit 133, means are provided for affording a visible display of the plurality of items of information which are registered therein. More specifically, to check the setting of the units minutes rotary switch, a units minutes key is manually operated to close a plurality of contacts 14MUK2, 14MUK3, and 17MUK2 and to open a plurality of contacts 14MUK1 and 17MUK1. The opening of the contacts 14MUK1 disconnects the motor magnet 14MU of the units minutes rotary switch from the source of ground pulses provided by the contacts 1401, and the closure of the contacts 14MUK2 interconnects the motor magnet 14MU with a pair of contacts 14ADK1 controlled by a manually operated advance key. The closure of the contacts 17MUK2 prepares a path for applying ground to the wiper 17MU1 of the units minutes rotary switch, and the simultaneous opening of the contacts 17MUK1 interrupts a ground path extending to various of the other wipers shown in Fig. 17 of the drawings.

The closure of the contacts 14MUK3 completes the energizing circuits for a display relay 14DS and a second display relay 14DST, which circuits extend from grounded and closed contacts 15STC1 through the closed contacts 14MUK3. The operation of the display relay 14DS opens a plurality of contacts 15DS1 and 15DS3 and closes a plurality of contacts 15DS2, 15DS4, and 17DS1 to 17DS12, inclusive. The operation of the contacts 15DS1 to 15DS4, inclusive, performs no useful function at this time, but the closure of the contacts 17DS1 to 17DS12, inclusive, interconnects a plurality of lamps 1720 with the numerically designated marking conductors associated therewith. These lamps are adapted to manifest, by selective illumination, the items of information indicated in the legend shown adjacent thereto in Fig. 17 of the drawings.

The operation of the second display relay 14DST opens a pair of contacts 14DST1 and closes a plurality of contacts 14DST2, 14DST3, 15DST1, 17DST1, and 17DST2. The closure of the contacts 17DST1, in preparing a circuit for applying ground to the wiper 15DA5 of the day of week rotary switch, performs no useful function at this time, but the closure of the contacts 17DST2 applies ground through the closed contacts 17MUK2 of the operated units minutes key to the wiper 17MU1 of the units minutes rotary switch, thereby to cause the selective energization of the lamp 1720 which is connected to the marking conductor to which the wiper 17MU is connected. Illumination of the lamp 1720 provides a visible indication of the value of the units minutes digit indicated by the position of the wiper 17MU1.

In the event that the time manifested by the selective illumination of one of the lamps 1720 does not correspond with the correct time, an advance key is provided for adjusting the setting of the units minutes rotary switch. More specifically, the advance key includes a pair of normally open contacts 15ADK1 which, when operated, completes a circuit from the grounded and closed contacts 15DST1 through the closed contacts 14MUK2 to the motor magnet 14MU of the units minutes rotary switch. By intermittently closing the contacts 15ADK1, the units minutes rotary switch is stepped until such time as the wiper 17MU1 is moved into engagement with contacts representing the correct time, as indicated by the illumination of a selected one of the lamps 1720. The visible display of the units minutes digit is terminated by releasing the manually operated units minutes key to close the contacts 14MUK1 and 17MUK1 and to open the contacts 14MUK2, 14MUK3, and 17MUK2. The opening of the contacts 14MUK3 releases the display relay 14DS and the second display relay 14DST, and the other operations of the contacts forming the minutes units key merely restores the clock and calendar circuit 133 to a normal condition.

In a similar manner, a tens minutes key is provided for causing the selective energization of one of the lamps 1720 in accordance with the position of the wiper 17MT1. The minutes tens key includes a plurality of contacts 14MTK1, 14MTK2, 14MTK3, 17MTK1, and 17MTK2 which operate in the same manner as described above in conjunction with the operation of the units minutes key to cause the selective energization of a single one of the lamps 1720 and the operation of the display relay 14DS and the second display relay 14DST. Further, the closure of the contacts 14MTK2 prepares a path extending to the motor magnet 14MT from the contacts 15ADK1 to provide means for adjusting the setting of the tens minutes rotary switch as described above.

To cause the selective illumination of one of the lamps 1720 in accordance with the position of the wiper 17HR1 which represents the value of the units hours digit, a units hours key is provided having a plurality of contacts 14HRUK1 to 14HRUK4, inclusive, and 17HRUK1 and 17HRUK2. These contacts perform the same functions described above in causing the selective illumination of one of the lamps 1720, in disconnecting the motor magnet 17HR from the source of operating pulses therefor, in operating the display relays 14DS and 14DST, and in preparing circuits for permitting the motor magnet 14HR to be operated under the control of the manually actuated advance key controlling the contacts 15ADK1. However, in addition, the hours units key includes the contacts 14HRUK1 which are opened to prevent the application of ground to the wiper 14HR1 in the event that a ground pulse is transmitted by the closure of the contacts 1401 during the time that the lamp display is being utilized. By preventing the application of ground to the wiper 14HR1, an operation of the date register 14DT during the display period is prevented.

A tens hours key is provided for controlling the visible display of the value of the tens hours digit, and this key includes only three pairs of contacts 17HRTK1, 17HRTK2, and 14HRTK1. The contacts 17HRTK2 prepare a path for applying ground to the wiper 14HR4, thereby to ground a marking conductor in accordance with the value of the tens hours digit. The contacts 14HRTK1 complete the energizing circuit for the display relays 14DS and 14DST so that these relays operate to perform the same functions described above. However, in addition, the opening of the contacts 15DS1 and 15DS3 together with the accompanying closure of the contacts 15DS2 and 15DS4 prevents the application of marking ground to the "4" and "5" conductors. This is done inasmuch as the illumination of the lamps representing the tens hours digits "3" and "4" would not have any significance in checking the accuracy of the indication provided by the hours rotary switch. The path normally extending through the closed contacts 15DS1 to the "4" marking conductor, upon closure of the contacts 15DS2, is extended to the "1" marking conductor, and, in a similar manner, the path normally extending to the "5" marking conductor is directed to the "2" marking conductor. Further, in order to correct the setting of the wiper 14HR4 which indicates the value of the tens hours digit, the hours units key is operated to prepare a path extending to the motor magnet 14HR. Thereafter, the advance key is intermittently operated to close the contacts 15ADK1 to advance the wipers of the hours rotary switch through sufficient steps to correct the tens hours setting thereof.

In similar manners, a date units key including a plurality of contacts 14DTUK1, 14DTUK2, 14DTUK3, 17DTUK1, and 17DTUK2 and a date tens key comprising a plurality of contacts 14DTTK1, 17DTTK1, and 17DTTK2 are operated to provide a visible display of the units digit of the calendar date and the tens digit of the calendar date. A years key including a single pair of contacts 17YRK1 is provided for selectively illuminating one of the lowermost four lamps 1720 in Fig. 17, thereby to indicate, by the application of ground to the wipers 17MO1 and 17MO2, whether the months rotary switch is in a leap year cycle or in one of the other three yearly cycles provided by the forty-eight effective stepping positions of this switch. A days key including a plurality of contacts 15DAK1 to 15DAK4, inclusive, is provided for causing the selective illumination of the lamps 1720 in accordance with the day of the week, and, as described above, these contacts also complete circuits for permitting the setting of the day of week rotary switch to be corrected, for operating the display relays 14DS and 14DST, and for applying ground to the wiper 15DA5.

To prevent the rotary switches in the clock and calendar circuit 133 from indicating incorrect time in the event that a ground pulse is provided by the contacts 1401 during the time that a display operation is taking place, a calender guard relay 14CG is provided. In response to the operation of the second display relay 14DST during a display operation, the contacts 14DST3 are closed to complete an obvious operating path for the calendar guard relay 14CG.

The operation of this relay closes a pair of contacts 14CG1 and opens a pair of contacts 17CG1. The closure of the contacts 14CG1, together with the preceding closure of the contacts 14DST2, extends ground to the normally open contacts 14DR1 controlled by the drive relay 14DR. If a ground pulse is applied by the closure of the contacts 1401 to the operating winding of the drive relay 14DR during a lamp display operation, thereby resulting in the operation of the drive relay to close the contacts 14DR, a holding path is completed at the closed contacts 14DR1 for maintaining the drive relay 14DR operated. In addition, this holding ground is applied to the motor magnets of any of the rotary switches which are prepared for operation.

More specifically, the closure of the contacts 14DR1 provides ground for maintaining any one of the plurality of motor magnets 14MU, 14MT, 14HR, 14DT, and 15DA, to which an operating circuit has been prepared, in an operated condition until these contacts are again opened. Since the rotary switches step on the release of the motor magnets, the register switches cannot be advanced when a display operation is taking place. However, it should be noted that the operation of the display key associated with only the above identified magnets opens this holding circuit to permit the selected rotary switch to be manually advanced under the control of the contacts 15ADK1.

Following the termination of the display operation, the second display relay 14DST is released, thereby to open the contacts 14DST2 to remove the source of holding ground for the drive relay 14DR and any of the motor magnets which were held operated thereby. Accordingly, at this time, the drive relay is released and the operated motor magnets are released so that the wipers controlled thereby are moved into engagement with the contacts forming the next successive stepping position. In this manner, the rotary switches in the clock and calendar circuit 133 are prevented from being set during a lamp display operation inasmuch as a pulse transmitted by the contacts 1401 to operate the drive relay 14DR provides a source of holding ground for maintaining the motor magnets at these rotary switches operated until the termination of the lamp display operation and thereafter the motor magnets are released to advance the wipers to indications of correct time and date. In addition, the opening of the contacts 14DST3 releases the calendar guard relay 14CG.

It is also desirable to prevent the operation of the rotary switches in the clock and calendar circuit 133 during a readout operation in which groups of mark pulses are transmitted by the scanning circuit portion of the clock and calendar circuit 133 to an associated trunk recorder inasmuch as a resetting of the rotary switches during this interval might cause faulty transmission of the mark pulses to the associated trunk recorder. The calendar guard relay 14CG also performs this control operation.

More specifically, when the units minutes rotary switch is in a setting corresponding to the units minutes digit "9," this switch is adapted to be returned to a setting representing a units digit "0," and a path is prepared for causing the operation of the tens minutes rotary switch and possibly also the hours rotary switch and the date rotary switch through the circuits described above. In order to prevent operation of these rotary switches, if the clock and calendar circuit 133 is engaged in transmitting information to an associated trunk recorder, the movement of the units rotary switch into the ninth or nineteenth contacts thereof moves the wiper 14MU2, which is strapped to ground, into engagement with the ninth and nineteenth contacts associated therewith, thereby to prepare an operating path for the calendar guard relay 14CG. When the cam controlled contacts 1401 are next closed, representing the end of the ninth minute interval, the drive relay 14DR is operated to close the contacts 14DR1 and 14DR2, among others. The closure of the contacts 14DR1 prepares a holding path for the drive relay 14DR, and the closure of the contacts 14DR2 completes the prepared operating path for the calendar guard relay 14CG so that this relay operates to close the contacts 14CG1 and to open the contacts 17CG1.

If the clock and calendar circuit 133 is engaged in a pulse transmitting operation, ground is applied to a conductor 1750 by the closed and grounded contacts 17STC2 controlled by a calendar start relay 19STC. The application of ground to the conductor 1750 completes the prepared holding path for the drive relay 14DR, this path extending through the closed contacts 14DST1, 14CG1, and 14DR1. This ground, in addition to maintaining the drive relay 14DR operated, also provides a source of ground for maintaining the units minutes motor magnet 14MU operated and also the motor magnets 14MT, 14HR, 15DA, and 14DT in the event that the above described operating paths therefor are completed at the time that the contacts 1401 are opened.

Ground is maintained on the conductor 1750 until the termination of the transmission of the date and time information to the associated trunk recorder. At this time, ground is removed from the conductor 1750 by the opening of the contacts 17STC2, and, at this time, the drive relay 14DR and any of the operated motor magnets 14MU, 14MT, 14HR, 15DA, and 14DT are released, thereby to advance the wipers controlled thereby to their next stepping position and thereby correcting the time indications provided thereby in accordance with the impulse transmitted by the closure of the contacts 1401 during the pulse transmitting operation of the clock and calendar circuit 133.

In addition, the calendar guard relay 14CG prevents the seizure of the clock and calendar circuit by a trunk circuit, similar to the trunk circuit 126, when a lamp display operation is taking place, when any of the rotary switch advancements controlled by the units minutes rotary switch in a setting representing a units digit "9" are being performed, or when the months and date rotary switches are being reset to a position representing the first day of the month. More specifically, as described above, the closure of the contacts 14DST3 incident to a lamp display operation causes the operation of the calendar guard relay 14CG. Operation of this relay opens the contacts 17CG1, thereby to disconnect a normally grounded conductor PG from a conductor GB, the conductor GB being connected to the conductor 1052 through two pairs of normally closed contacts 17STC1 and 17PCS1. The conductor 1052, as described above, is a common conductor extending to the operating windings of the pickup relays in the trunk circuit similar to the trunk circuit 126. The removal of ground from the conductor 1052 prevents the operation of the pickup relays in any of the trunk circuits and, accordingly, prevents any trunk circuit from seizing the clock and calendar circuit 133 during the time that the calendar guard relay 14CG is operated. Upon release of this relay, ground is again applied to the conductor 1052, thereby causing the operation of the pickup relay in the trunk circuit which is ready to receive date and time information.

Further, as described above, the calendar guard relay 14CG is operated under the control of the grounded wiper 14MU2 when the units minutes rotary switch is actuated to prepare the wipers thereof for movement into engagement with the contacts representing "0." The operation of the calendar guard relay at this time, as described above, also prevents seizure of the clock and calendar circuit 133 by any of the trunk circuits by opening the contacts 17CG1.

In order to prevent seizure of this circuit during the interval in which the date rotary switch is being returned to a setting representing the first day of the month and in which the months rotary switch is being advanced, the day hold relay 14DH is operated. Operation of this relay closes the pair of contacts 14DH7 to complete an obvious energizing circuit for the calendar guard relay 14CG. Operation of this relay to open the contacts 17CG1 prevents seizure of the clock and calendar circuit 133 until such time as the day hold relay 14DH is released, thereby indicating that the date rotary switch and the months rotary switch have been advanced to a setting indicating the first day of the next succeeding month. The calendar guard relay 14CG, which is slow-to-release, releases a predetermined time interval following the release of the day hold relay, thereby to permit the clock and calendar circuit 133 to be seized by a trunk circuit which is awaiting date and time information.

*Transmission of date and time information*

The steering circuit 1950 and the counting chain 1900 jointly operate to transmit seven groups of mark pulses, separated by space pulses, to an associated trunk recorder in accordance with the time and date settings of the register portion of the clock and calendar circuit 133. The counting chain 1900, which is driven by the pulse generator 1600, includes a plurality of "X" designated relays which are sequentially operated to close test paths until such time as the conductor which is selectively marked under the control of the rotary switches is encountered. During operation of the counting chain 1900, a mark pulse is transmitted for each operation of one of the counting relays so that, for instance, when the "5" designated marking conductor is encountered following the operation of five relays in the counting chain 1900, five mark pulses will have been transmitted to an associated trunk recorder. In response to termination of a single cycle of operation of the counting chain 1900, the steering circuit 1950, which is also pulsed by the pulse generator 1600, is operated so that one of a plurality of "S" designated relays therein is operated. Operation of this relay removes the marking ground applied to one of the wipers shown in Fig. 17 of the drawings and extends ground to a different wiper thereof. Incident to the operation of the steering circuit 1950 at the end of the transmission of each group of mark pulses, a space pulse is transmitted to the associated trunk recorder, thereby to separate the various items of date and time information. Following the termination of all of the necessary date and time information, the clock and calendar circuit 133 removes ground from the holding circuit provided for the pickup relay in the associated trunk circuit, thereby dismissing the trunk circuit and restoring the pulse transmitting portion of the clock and calendar circuit 133 to a normal condition.

In order to provide pulses for operating the counting chain 1900 and the steering circuit 1950 and for controlling the application of mark and space pulses to an associated trunk recorder, the pulse generator 1600 is provided. This generator comprises a free running transistorized multivibrator 1601 which supplies pulses to an output amplifier 1602, the output of which includes a pulsing relay 16PG which is intermittently operated in accordance with the output signals supplied by the multivibrator 1601. This multivibrator is designed to generate a square wave having a frequency of approximately twenty pulses per second, and, since the multivibrator differs in some respects from conventional multivibrators, a short description thereof is set forth below.

The multivibrator 1601 includes a pair of NPN junction type transistors 1610 and 1620 which are cross connected by a pair of coupling condensers 1614 and 1624 so as to be alternately rendered conductive, the operating and biasing potentials for these transistors being supplied by a plurality of voltage divider networks extending between ground and station battery. Assuming that the transistor 1610 is conducting and that the transistor 1620 has just started to conduct, the voltage at the collector electrode of the transistor 1620 immediately drops in value to drop the voltage at the base electrode of the transistor 1610 to a value sufficiently low to interrupt conduction between the base electrode and the collector electrode thereof. At this time, charging of the condenser 1624 is initiated since the voltage at the lower end of a charging resistor 1625 is greater than the collector potential of the transistor 1620. This charging of the condenser 1624 continues until the potential at the junction of the condenser 1624 and the resistor 1625 becomes positive enough to cause conduction in the transistor 1610. When conduction thus commences in the transistor 1610, the voltage at the collector electrode thereof immediately drops to a relatively low value. This low value potential is coupled through the condenser 1614 to reduce the potential on the base electrode of the transistor 1620, thereby to substantially terminate conduction therein.

In order to adjust the make and break periods of the pulsing output relay 16PG, which is driven by the output signals from the multivibrator 1601, a center tapped resistor 1670 is provided. When the adjustable tap on the resistor 1670 is moved, the resistance in the charging path of one of the condensers including also either the resistor 1625 or a resistor 1615 is increased while the resistance in the charging circuit of the other capacitor decreases. Accordingly, the charging time of one of the condensers is increased, and the charging time of the other condenser is decreased, so that one of the transistors 1610 or 1620 conducts for a longer period of time during each cycle of operation than does the other transistor. In this manner, the on and off or make and break periods of the contacts controlled by the relay 16PG can be adjusted.

An additional potentiometer 1675 is provided for adjusting the frequency of operation of the multivibrator 1601. Adjustment of the potentiometer 1675 varies the resistance in the charging paths of the condensers 1614 and 1624 an equal amount, as contrasted with the operation of the resistor 1670, so that, with suitable adjustment of the time constants of the charging circuits, the frequency of operation of the multivibrator 1601 is adjusted to a selected value which, as set forth above, may be twenty pulses per second.

Transistors are somewhat different in operation than vacuum tubes in that, during the period when the transistor is cut off, a flow of current in the base circuit thereof is maintained. This base current may vary between different transistors of the same type and, accordingly, in order to compensate for this variation in base current, a pair of rectifiers 1630 and 1640 is provided. These rectifiers are respectively connected between the condenser 1614 and the base electrode of the transistor 1620 and between the condenser 1624 and the base electrode of the transistor 1610. Therefore, when the potential between either of the condensers 1614 or 1624 and its associated base electrode is negative, the associated rectifier is rendered nonconductive to prevent the flow of current in the base electrode circuit of the associated transistor.

The output of the multivibrator 1601 is continuously applied to the output amplifier 1602 through a rectifier 1665 which is connected to the emitter electrode of a transistor 1650. The rectifier 1665 is so poled that a train of negative pulses is applied to the emitter electrode to periodically cut off conduction in the transistor 1650. Further, since the multivibrator 1601 is continuously effective and since output pulses from the pulse generator 1600 are only desired during pulse transmitting operations of the clock and calendar circuit 133, the transistor 1650 normally is not effective to operate and release the pulse generator relay 16PG which is in the collector circuit thereof.

In order to render the output amplifier 1602 effective, ground is applied to a conductor 1530 by the clock and calendar circuit 133, thereby reducing the negative potential supplied to the emitter electrode of the transistor 1650 by grounding one leg of a voltage divider including a pair of resistances 1692 and 1693. In addition, grounding the conductor 1530 connects the collector electrode of the transistor 1650 to ground through the operating winding of the relay 16PG. Accordingly, following the application of ground to the conductor 1530, operation of the transistor 1650 intermittently operates and releases the pulse generator relay 16PG, thereby to open and close a plurality of contacts 15PG1 to 15PG4 controlled thereby.

Since the transistor 1650 is intermittently rendered conductive and nonconductive under the control of the output voltage supplied from the multivibrator 1601, a rectifier 1655 is connected between the emitter and base electrodes of the transistor 1650 to conduct current toward the base electrode thereof during the intervals in which the resistor is not conducting, thereby to provide a balanced load for the multivibrator 1601. Further, since the operating winding of the relay 16PG is intermittently energized, a rectifier 1660 is shunted around the operating winding of this relay to eliminate inductive surge voltages which may arise from pulsing the operating winding of this relay.

To initiate seizure of the clock and calendar circuit 133 following the receipt of answering supervisory signals, the trunk circuit 126, as described above, interconnects the operating winding of the pickup relay 10PU with the common conductor 1052 by closing the contacts 10SRS2. This conductor, if the calendar guard relay 14CG is released, receives ground from a path extending from the grounded and closed contacts 17STC3 through the normally closed contacts 17SX1 or 17SG1, 17CG1, 17STC1, and 17PCS1. The provision of ground on the conductor 1052 operates the pickup relay 10PU in the trunk circuit 126 to complete a holding circuit for this relay which extends through the common conductor 1051 and one of the pairs of normally closed contacts 17SX1 or 17SG1 to ground at the contacts 17STC3.

The operation of the pickup relay 10PU also applies ground to the calendar start lead 1053, and this ground is extended through a plurality of normally closed contacts 18STC2, 18PCS2, and 18PC3 to operate a calendar alarm relay 18ALC. The operation of this relay closes a plurality of contacts 18ALC1 and 18ALC3 and opens a pair of contacts 18ALC2. The closure of the contacts 18ALC3 prepares a path for applying ground to the conductor 1530 which extends to the pulse generator 1600 through a cable 1560. The opening of the contacts 18ALC2 opens a point in one operating circuit for a third calendar alarm relay 18ALT. The closure of the contacts 18ALC1 completes an obvious energizing path for a second calendar alarm relay 18ALO which extends through a pair of normally closed contacts 18PC1. The closure of the contacts 18ALC1 also provides main holding ground for both the counting chain 1900 and the steering circuit 1950.

The operation of the second calendar alarm relay 18ALO closes a pair of normally open contacts 17ALO1, thereby to provide an alternative source of holding ground for the conductor 1051.

The provision of main holding ground by the closure of the contacts 18ALC1 illuminates a lamp 1920 to visibly indicate the seizure of the circuit 133 and also completes an operating path for a calendar start relay 19STC, which path extends through either of two pairs of normally closed contacts 19SG1 or 19SX4. The operation of the calendar start relay 19STC opens a plurality of contacts 15STC1, 17STC1, 17STC3, 18STC2, and 18STC4, and closes a plurality of contacts 17STC2, 17STC4, 18STC1, 18STC3, and 18STC5. The contacts 18STC3 and 18STC4 are of the preliminary operate type so that the contacts 18STC3 are closed and the contacts 18STC4 are opened prior to the remaining contact operations caused by the energization of the calendar start relay 19STC. The closure of the contacts 18STC3 completes a holding circuit for the calendar alarm relay 18ALC which includes a resistor 1860 in series with a condenser 1861. The normally closed contacts 18STC4, which are strapped directly to ground, provide a charging circuit for the condenser 1861 so that this condenser is fully charged at the time that the contacts 18STC3 are closed. The closure of the contacts 18STC3 permits the condenser 1861 to discharge through the resistor 1860 and the relatively high resistance winding of the calendar alarm relay 18ALC to maintain the calendar alarm relay 18ALC operated for a predetermined period of time. This time interval, which may be approximately eight seconds, is long enough to complete the transmission of date and time information to the associated trunk circuit 126 and its trunk recorder 127 if the circuit 133 is in proper operating condition.

Following the closure of the contacts 18STC3, the contacts 18STC2 are opened, thereby interrupting the previously described operating circuit for the calendar alarm relay 18ALC which, however, remains operated due to the discharge of the condenser 1861 through the winding thereof. The opening of the contacts 17STC1 interrupts the path for applying ground to the conductor 1052, and the removal of ground therefrom prevents the pickup relays in additional trunk circuits from becoming operated, and, accordingly, prevents seizure of the clock and calendar circuit 133 by more than one of the plurality of trunk circuits having access thereto. The contacts 17STC4 and 17STC3 form a make-before-break contact arrangement so that the closure of the contacts 17STC4 to connect the closed and grounded contacts 17ALO1 to the conductor 1051 prior to the opening of the contacts 17STC3 to open the circuit described above maintains the relay 10PO operated.

The opening of the contacts 15STC1 removes the ground source utilized in operating the display relays 14DS and 14DST, thereby preventing a lamp display operation during the period in which pulse information is being transmitted to the trunk recorder 126. The closure of the contacts 18STC5 completes the previously prepared circuit for applying ground to the conductor 1530, thereby to initiate operation of the pulse generator relay 16PG. The closure of the contacts 18STC1 prepares an operating circuit for the third calendar alarm relay 18ALT, which circuit is interrupted at the open contacts 18ALC2.

The closure of the contacts 17STC2 applies ground through a plurality of normally closed contacts 17SA1, 17SB1, 17SC1, 17SD1, 17SE1, and 17SF1 controlled by relays forming the steering circuit 1950 to a conductor MO which extends through a cable 1740 to the wipers 17MO3 and 17MO4 of the months rotary switch. As described above, these wipers are selectively positioned in engagement with the contacts associated therewith in accordance with the numerical designation of the current month, and the ground applied thereto conditions the counting chain 1900 to provide a series of mark pulses representing the value of the digital designation of this month.

Figure 15:
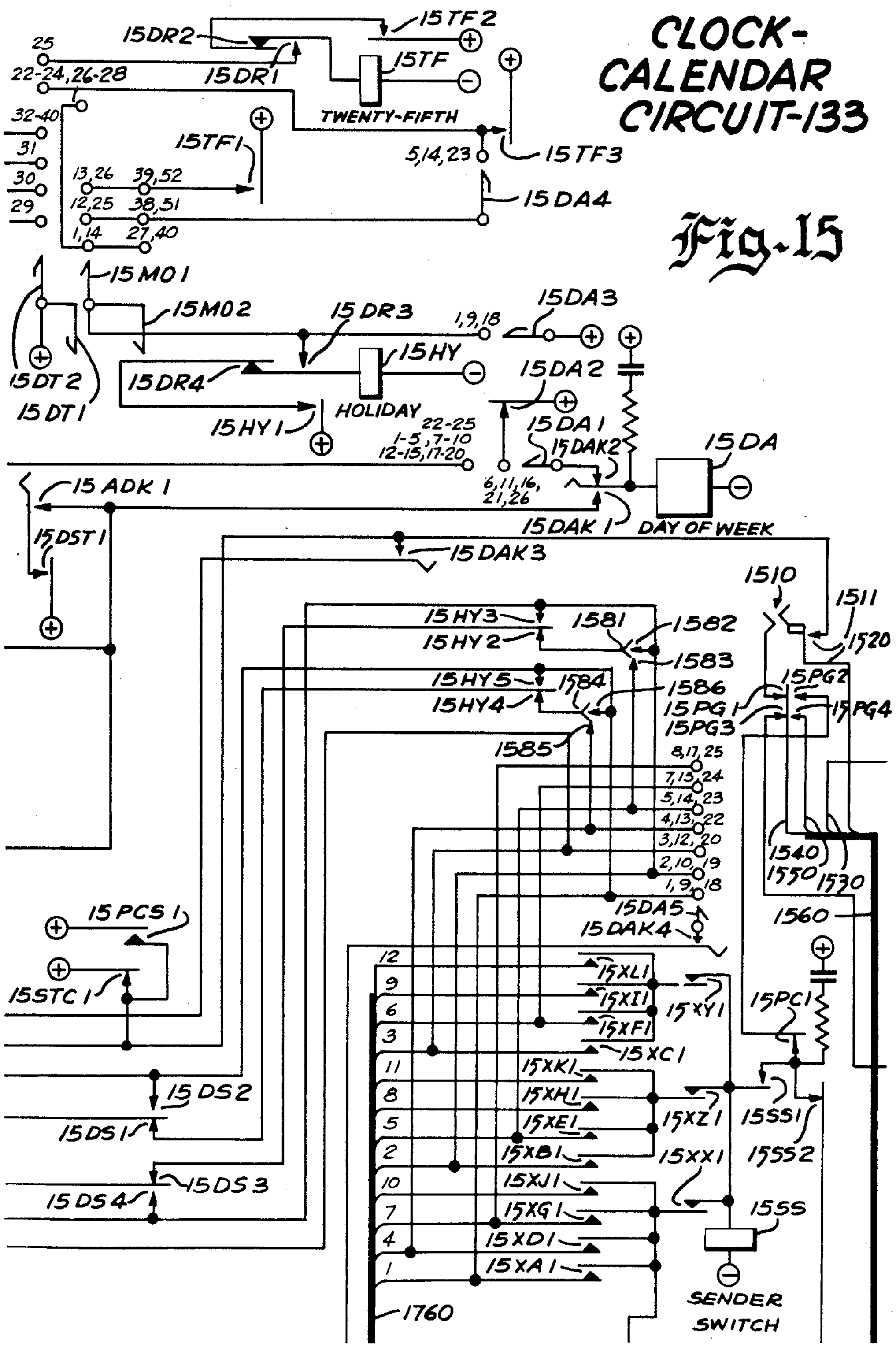
Figure 16:
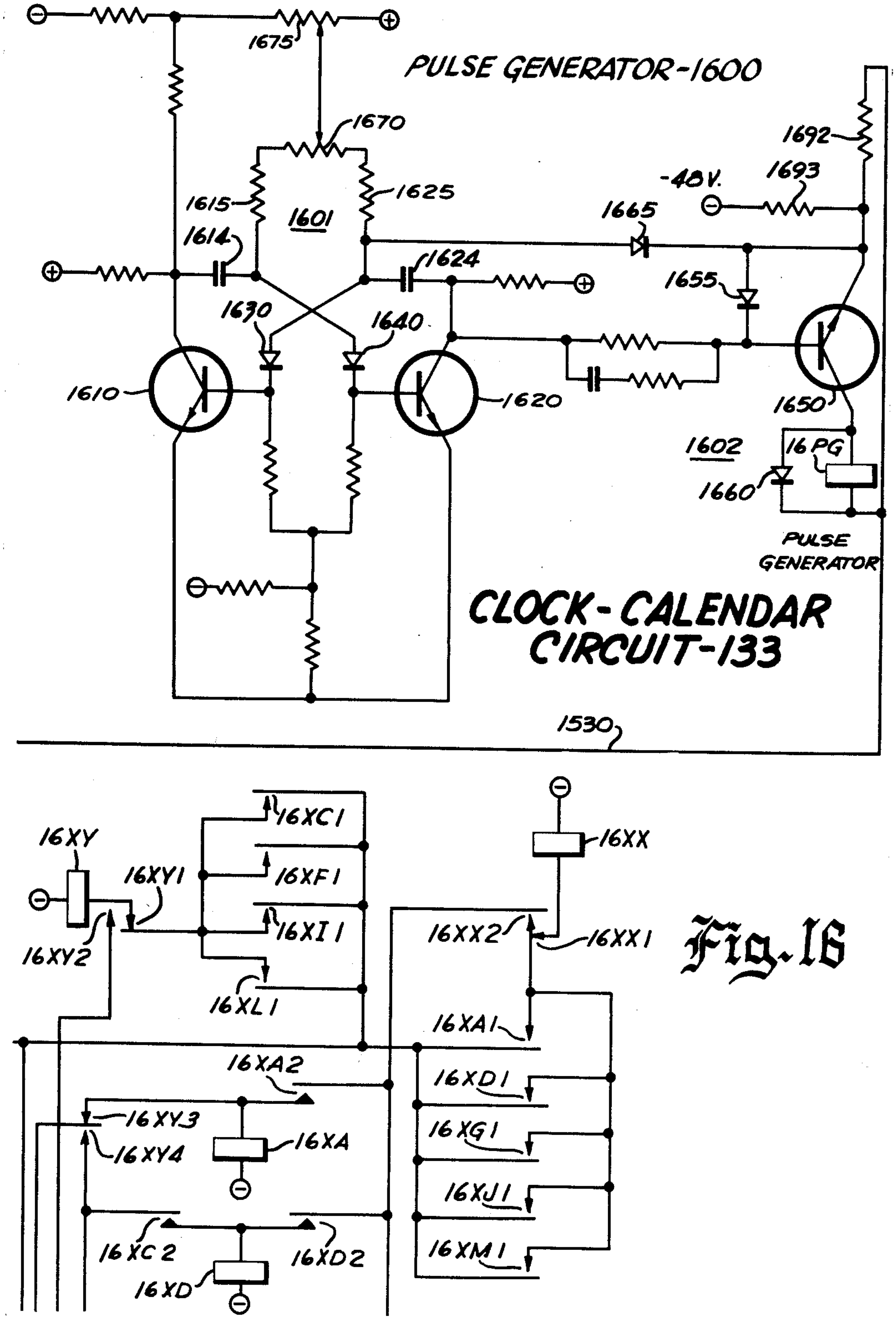

Assuming that the above described call from substation A to substation C was completed, as indicated by the receipt of answering supervisory signals, at 5:31 p.m. on December 24, 1955, the wiper 17MO4 is in engagement with the fifty-second contact, thus applying ground to the marking conductor designated "12" in Figs. 17 and 15 of the drawings. As described above, the relay 16PG is now operative so that the contacts 15PG1, 15PG2, 15PG3, and 15PG4 are continuously and intermittently opened and closed. Further, when the contacts 18ALC1 are closed, ground is applied to a conductor 1540 which extends through a cable 1560 to be connected to the transfer spring common to the above identified contacts of the pulse generator relay 16PG.

In order to initiate sequential operation of the counting chain 1900, when the contacts 15PG2 are first closed following the seizure of the clock and calendar circuit 133, ground is applied from the transfer spring through a path including the normally closed contacts 15PC1, 15SS2, 18XX2, 18XZ3, and 16XY3 to cause the operation of a first counting relay 16XA in the counting chain 1900. Operation of the relay 16XA closes a plurality of contacts 15XA1, 16XA1, 16XA2, and 18XA1. The closure of the contacts 16XA2 completes a holding circuit extending to the main ground provided by the closure of the contacts 18ALC1 through a plurality of normally closed contacts 19XZ1 and 18SS2, thereby to provide a circuit for maintaining this relay operated when the contacts 15PG2 are opened.

The closure of the contacts 18XA1 closes one point in an operating circuit for a second counting relay 18XB. The closure of the contacts 15XA1 prepares a test circuit interconnection the "1" marking conductor and a sender switch relay 15SS. The closure of the contacts 16XA1 prepares an operating path for a relay 16XX, which path extends to the now open contacts 15PG3 controlled by the pulse generator relay 16PG.

The closure of the contacts 15PG4 concurrently with the closure of the contacts 15PG2 extends ground over a conductor 1550, forming a part of the cable 1560, and through a plurality of normally closed contacts 18PCS4 and 18SS4 to the mark pulse conductor 1055. The application of ground to the conductor 1055 operates the relays 9MK and 12MKS in the trunk circuit 126 to energize the mark pulse head 800 in the trunk recorder 127, thereby to record a pulse on the magnetic tape 12000 thereof immediately following the space pulse indicating the end of the group of impulses representing the units digit of the called station number, as shown in Fig. 23A of the drawings.

The release of the pulse generator relay 16PG closes the contacts 15PG1 and 15PG3 and opens the contacts 15PG2 and 15PG4. Opening the contacts 15PG2 interrupts the operating circuit for the first counting relay 16XA, but this relay is maintained operated through the above described holding circuit. Opening the contacts 15PG4 removes ground from the mark pulse conductor 1055 to release the relay 9MK in the trunk circuit 126, thereby terminating the recording of the first mark pulse of the months designation on the magnetic tape 12000. Closure of the contacts 15PG1 does not serve any useful function at this time, but the closure of the contacts 15PG3 applies ground to the operating path for the relay 16XX prepared by the prior closure of the contacts 16XA1 so that this relay is operated.

Operation of the relay 16XX closes a plurality of contacts 15XX1, 16XX2, and 18XX1 and opens a plurality of contacts 16XX1, 18XX2, and 18XX3. The contacts 16XX2 and 16XX1 form a make-before-break contact arrangement so that the prior closure of the contacts 16XX2 completes the same holding circuit for the relay 16XX, as described above, for the relay 16XA. The opening of the contacts 16XX1 opens the previously described operating circuit for the relay 16XX. The opening of the contacts 18XX3 serves no useful function at this time. The opening of the contacts 18XX2 interrupts, at a second point, the above described operating path for the relay 16XA, and the concurrent closure of the contacts 18XX1 prepares an operating path for the relay 18XB. The closure of the contacts 15XX1 completes the path previously prepared by the closure of the contacts 15XA1 for connecting the operating winding of the sender switch relay 15SS with the "1" designated marking conductor. However, the sender switch relay 15SS is not operated at this time inasmuch as ground is applied to the "12" designated marking conductor under the control of the wiper 17MO4, as described above.

When the pulse generator relay 16PG is next operated, the contacts 15PG1 and 15PG3 are opened, the opening of the contacts 15PG3 interrupting, at a second point, the above described operating circuit for the relay 16XX which, however, remains operated over the holding circuit completed through the closed contacts 16XX2. Concurrently, therewith, the contacts 15PG2 and 15PG4 are again closed, the closure of the contacts 15PG4 providing ground on the mark pulse conductor 1055 over the path described above to cause the recording of a second mark pulse on the magnetic tape 12000.

The closure of the contacts 15PG2 completes the above described and prepared operating circuit for the second counting relay 18XB, this path extending through the closed contacts 15PC1, 15SS2, 18XX1, and 18XA1. Operation of the second counting relay 18XB closes a plurality of normally open contacts 15XB1, 18XB1, 18XB2, and 18XB3. The closure of the contacts 18XB2 completes a holding path for the relay 18XB which extends to main ground through a pair of normally closed contacts 18XY1. The closure of the contacts 18XB3 prepares a portion of an operating circuit for a third counting relay 18XC. The closure of the contacts 18XB1 prepares a portion of an operating circuit for a relay 18XZ, which path extends to the open contacts 15PG3. The closure of the contacts 15XB1 prepares a portion of a test circuit for interconnecting the "2" designated marking conductor with the operating winding of the sender switch relay 15SS.

When the pulse generator relay 16PG next releases, the contacts 15PG2 and 15PG4 are opened and the contacts 15PG1 and 15PG3 are closed. The opening of the contacts 15PG4 terminates the application of ground to the mark pulse conductor 1055, thereby terminating the energization of the mark pulse head 800 in the trunk recorder 127. The opening of the contacts 15PG2 opens the above described operating circuit for the second counting relay 18XB, but this relay is maintained operated by the holding circuit extending through the contacts 18XB2. The closure of the contacts 15PG3 applies ground through the path previously prepared by the closure of the contacts 18XB1 to cause the operation of the relay 18XZ, this circuit including a pair of normally closed contacts 18XZ2.

Operation of the relay 18XZ opens a plurality of normally closed contacts 18XZ2, 18XZ3, and 19XZ1 and closes a plurality of normally open contracts 15XZ1, 18XZ1, and 18XZ4. The contacts 18XZ1 and 18XZ2 form a make-before-break contact arrangement so that the prior closure of the contacts 18XZ1 completes a holding circuit for the relay 18XZ which extends to main ground through the contacts 18XY1, the opening of the contacts 18XZ2 interrupting the above described operating circuit for the relay 18XZ. The opening of the contacts 18XZ3 performs no useful function at this time, but the concurrent closure of the contacts 18XZ4 prepares another point in the operating circuit for the third counting relay 18XC.

The closure of the contacts 15XZ1 completes the above prepared circuit for interconnecting the operating winding of the sender switch relay 15SS with the "2" designated marking conductor, but the sender switch relay 15SS is not operated at this time since ground is applied to the "12" designated marking conductor.

The opening of the contacts 19XZ1 interrupts the holding circuits extending from main ground to the operating windings of the relays 16XA and 16XX so that these relays release to return to a normal condition. The release of the relay 16XX to close the contacts 18XX2 and to open the contacts 18XX1 completes a circuit for connecting the operating winding of the third counting relay 18XC to the open contacts 15PG2. The remainder of the contact operations produced by releasing the relays 16XA and 16XX merely aids in restoring the counting chain 1900 to a normal condition.

When the pulse generator relay 16PG is again operated, the contacts 15PG3 are opened to interrupt, at a second point, the above described operating circuit for the relay 18XZ. Concurrently, therewith, contacts 15PG2 and 15PG4 are closed, the closure of the contacts 15PG4 serving to again apply ground to the mark pulse conductor 1055, thereby to record the third mark pulse in the group of mark pulses on the tape 12000 representing the months designation. The closure of the contacts 15PG2 completes the above prepared circuit for operating the third counting relay 18XC so that this relay operates to close a plurality of contacts 16XC1, 16XC2, 15XC1, and 18XC1.

The closure of the contacts 18XC1 completes a holding path for the relay 18XC extending to main ground through the normally closed contacts 18XX3. The closure of the contacts 16XC2 prepares a portion of an operating path for a fourth counting relay 16XD. The closure of the contacts 16XC1 prepares a portion of an operating path for a relay 16XY, and the closure of the contacts 15XZ1 prepares a portion of a test path for interconnecting the operating winding of the sender switch relay 15SS with the "3" designated marking conductor.

Release of the pulse generator relay 16PG opens the contacts 15PG4 to terminate the application of ground to the mark pulse conductor 1055 and opens the contacts 15PG2 to interrupt the above described operating circuit for the third counting relay 18XC, this relay remaining operated over the holding circuit provided at the closed contacts 18XC1. Concurrently therewith, the closure of the contacts 15PG3 completes the above prepared operating circuit extending through the closed contacts 16XC1 and 16XY1 for operating the relay 16XY.

The operation of the relay 16XY closes a plurality of contacts 15XY1, 16XY2, and 16XY4 and opens a plurality of contacts 16XY1, 16XY3, and 18XY1. The contacts 16XY1 and 16XY2 form a make-before-break contact arrangement so that the closure of the contacts 16XY2 completes a holding circuit extending to main ground through the closed contacts 18XX3 prior to the opening of the contacts 16XY1 to interrupt the above described operating circuit. The closure of the contacts 16XY4, together with the concurrent opening of the contacts 16XY3, prepares another portion of the operating circuit for the fourth counting relay 16XD.

The closure of the contacts 15XY1 interconnects the operating winding of the sender switch relay 15SS with the "3" designated marking conductor through a path including the previously closed contacts 15XC1, but the sender switch relay 15SS is not operated at this time since ground is not present on the "3" designated conductor.

The opening of the contacts 18XY1 interrupts the above described holding circuit for the counting relay 18XB and the relay 18XZ so that these two relays are released. The closure of the contacts 18XZ3, due to the release of the relay 18XZ, prepares another portion of the operating circuit for the fourth counting relay 16XD. The remaining contact operations caused by the release of the relays 18XZ and 18XB merely serve to aid in restoring the counting chain 1900 to a normal condition.

The next eight cycles of operation of the pulse generator relay 16PG to open and close the contacts associated therewith causes the operation and release of the following relays: 16XD, 16XX, 18XE, 18XZ, 18XF, 16XY, 19XG, 16XX, 18XH, 18XZ, 18XI, 16XY, 19XJ, and 16XX. These eight cycles of operation also cause the operation of a twelfth counting relay 18XK and the relay 18XZ, but not the release thereof. During this sequential operation of the relays forming the counting chain 1900, eight additional mark pulses are applied to the magnetic tape 12000 in the trunk recorder 127 so that, at the end of this eleventh cycle of operation of the pulse generator relay 16PG, eleven mark pulses are recorded on the magnetic tape 12000. In addition, the sequential operation of the relays 16XB, 18XZ, 18XF, 19XG, 18XH, 18XI, 19XJ, and 18XK causes the sequential interconnection of the operating winding of the sender switch relay 15SS with the marking conductors designated by the digits "4" to "11," inclusive, but this relay is not operated inasmuch as marking ground is not present on any of these conductors.

When the pulse generator relay 16PG is operated for the twelfth time, the contacts 15PG3 are opened and the contacts 15PG2 and 15PG4 are closed for the twelfth time so that the contacts 15PG4 apply ground to the mark pulse conductor 1055, thereby to record the twelfth mark pulse on the magnetic tape 12000. The closure of the contacts 15PG2 completes an operating circuit for the twelfth counting relay 18XL, this path extending through the closed contacts 15PC1, 15SS2, 18XX2, 18XZ4, and 18XK3. The operation of the twelfth counting relay 18XL closes a plurality of contacts 15XL1, 16XL1, 18XL1, and 19XL1. The closure of the contacts 18XL1 completes a holding circuit for the relay 18XL extending to the closed contacts 18XX3. The closure of the contacts 19XL1 prepares a portion of an operating circuit for a thirteenth counting relay 19XM. The closure of the contacts 16XL1 prepares a portion of an operating circuit for the relay 16XY.

When the pulse generator relay 16PG releases to open the contacts 15PG2 and 15PG4, ground is removed from the mark pulse conductor 1055 and the operating circuit for the twelfth counting relay 18XL is opened, this relay remaining operated through the holding circuit provided by the closed contacts 18XL1. Concurrently, therewith, the contacts 15PG3 are closed to operate the relay 16XY. Operation of the relay 16XY opens the contacts 16XY1, 16XY3, and 18XY1 and closes the contacts 15XY1, 16XY2, and 16XY4. The opening of the contacts 18XY1 interrupts the holding circuit for the relays 18XK and 18XZ, thereby releasing these relays to partially return the counting chain 1900 to a normal condition. The closure of the contacts 16XY2 completes a holding circuit for the relay 16XY and the opening of the contacts 16XY1 interrupts the operating circuit for this relay. The operation of the contacts 16XY3 and 16XY4 produces no useful function at this time.

The closure of the contacts 15XY1 terminates this cycle of counting operation of the counting chain 1900 by interconnecting the operating winding of the sender switch relay 15SS with the grounded marking conductor designated as "12" through a path including the closed contacts 15XL1 and 15XY1. Operation of the sender switch relay 15SS opens a plurality of contacts 15SS2, 18SS2, 18SS4, and 19SS2, and closes a plurality of contacts 15SS1, 17SS1, 18SS1, 18SS3, 18SS5, and 19SS1.

The closure of the contacts 18SS3 completes an alternative path for grounding the conductor 1530, and the opening of the contacts 15SS2 interrupts the path extending to the contacts 15PG2 for pulsing the counting chain 1900. The closure of the contacts 15SS1 prepares a path extending from the operating winding of the sender switch relay 15SS to the open contacts 15PG2.

The contacts 18SS1 and 18SS2 form a make-before-break contact arrangement which transfers the main holding ground for the counting chain 1900 from the grounded and closed contacts 18ALC1 to the closed contacts 15PG3. The opening of the contacts 18SS4 disconnects the mark pulse conductor 1055 from the contacts 15PG4 and the closure of the contacts 18SS5 interconnects the space pulse conductor 1054 with these contacts. The closure of the contacts 17SS1 provides a shunt around the contacts 17SA1 for applying ground through the wipers 17MO3 and 17MO4 of the months rotary switch, thereby maintaining ground on the operating winding of the sender switch relay 15SS.

The closure of the contacts 19SS1 initiates operation of the steering circuit 1950 by completing an operating circuit for a first steering relay 18SA which extends from closed and grounded contacts 18ALC1 through a plurality of closed contacts 19SS1, 19SX3, 19SY2, and 18SZ2. Operation of the first steering relay 18SA closes a plurality of contacts 18SA1, 19SA1, 19SA2 and opens a pair of contacts 17SA1. The closure of the contacts 18SA1 completes a holding circuit for the first steering relay 18SA. The closure of the contacts 19SA1 prepares an operating circuit for a second steering relay 19SB, and the closure of the contacts 19SA2 prepares an operating circuit for a relay 18SX.

The opening of the contacts 17SA1 opens the above described circuit for applying ground to the wiper 17MO3 and 17MO4, but the preceding closure of the contacts 17SS1 provides a shunt around these contacts. The closure of the contacts 17SA2 applies ground to a conductor DT which extends through the cable 1740 and is connected to the wipers 17DT1 and 17DT2, thereby to apply ground to the contacts representing the value of the tens days digit. In the illustrative example set forth above, the call from the substation A to the substation C was assumed to have been placed on December 24, and, accordingly, the wiper 17DT2 is in engagement with the twenty-fourth contact which is connected to the "3" designated marking conductor.

When the pulse generator relay 16PG is again operated, the contacts 15PG4 and 15PG2 are closed following the opening of the contacts 15PG3. Opening the contacts 15PG3 removes holding ground from the operated relays 18XL and 16XY, this holding ground extending through the closed contacts 18SS1. The release of these two relays aids in restoring the counting chain 1900 to a normal condition. Incident to the release of these relays, the contacts 15XL1 and 15XY1 are opened, thereby interrupting the operating path for the sender switch relay 15SS. However, this relay does not release inasmuch as the closure of the contacts 15PG2 applies ground through the closed contacts 15PC1 and 15SS1 to maintain the sender switch relay 15SS operated.

The closure of the contacts of the contacts 15PG4 completes a circuit for applying ground to the space pulse conductor 1054 which extends from the closed and grounded contacts 18ALC1 through the conductor 1540, the closed contacts 15PG4, the conductor 1550, and the closed contacts 18PCS4 and 18SS5. The application of ground to the space pulse conductor 1054 causes the sequential operation of the relays 8SP and 12SPS in the trunk circuit 126 to energize the space pulse head 810 in the trunk recorder 127, thereby causing the recording of a space pulse immediately following the last of the group of twelve mark pulses forming the recorded designation of the month, i.e. December (Fig. 23A).

When the pulse generator relay 16PG next releases, the contacts 15PG2 and 15PG4 are opened and the contacts 15PG3 are closed. The opening of the contacts 15PG4 removes ground from the space pulse conductor 1054, thereby terminating the recording of the space pulse following the month designation. The opening of the contacts 15PG2 removes holding ground from the operating winding of the sender switch relay 15SS, thereby permitting this relay to release and in doing so to open the plurality of contacts 15SS1, 17SS1, 18SS1, 18SS3, 18SS5, and 19SS1 and to close the contacts 15SS2, 18SS2, 18SS4, and 19SS2. The opening of the contacts 15SS1 interrupts, at a second place, the holding circuit for the sender switch relay 15SS, and the closure of the contacts 15SS2 reestablishes the pulsing path for the counting chain 1900. The opening of the contacts 18SS1, together with the closure of the contacts 18SS2, provides the counting chain 1900 with holding ground from the closed and grounded contacts 18ALC1. The opening of the contacts 18SS3 opens one path for applying ground to the conductor 1530. The closure of the contacts 18SS4 connects the mark pulse conductor 1055 with the open contacts 15PG4, and the concurrent opening of the contacts 18SS5 disconnects the space pulse conductor 1054 therefrom. The opening of the contacts 17SS1 removes the ground shunt around the contacts 17SA1 and 17SA2 controlled by the first steering relay 18SA and, accordingly, removes ground from the wipers 17MO3 and 17MO4 of the months rotary switch.

The opening of the contacts 19SS1 interrupts the previously described circuit for operating the first steering relay 18SA, but this relay remains operated due to the holding circuit provided by the closed contacts 18SA1 and 18SY1. The closure of the contacts 19SS2 completes the previously prepared circuit for operating the relay 18SX, which circuit extends from the main holding ground provided by the closed and grounded contacts 18ALC1 through the closed contacts 19SS2, 19SA1, 18SX2, and 18SY2. The operation of the relay 18SX closes a plurality of contacts 18SX1 and 19SX2 and opens a plurality of contacts 17SX1, 18SX2, 19SX1, 19SX3, and 19SX4. The contacts 18SX1 and 18SX2 form a make-before-break contact arrangement so that the closure of the contacts 8SX1 completes a holding circuit for the relay 18SX prior to the opening of the contacts 18SX2 to interrupt the above described operating circuit.

The opening of the contacts 17SX1 performs no useful function at this time, and the opening of the contacts 19SX4 opens one operating circuit for the calendar start relay 19STC, but this relay is maintained operated by the closed contacts 19SG1. The opening of the contacts 19SX3 interrupts, at an additional point, the above described operating circuit for the first steering relay 18SA, and the concurrent closure of the contacts 19SX2 prepares another portion of the operating path for the second steering relay 19SB. The opening of the contacts 19SX1 performs no useful function at this time.

Accordingly, in response to the cyclic operation of a number of counting relays in the counting chain 1900, which is equal to the numerical designation of the conductors selectively marked under the control of the rotary switches and the steering circuit 1950, cyclic counting operation of the counting chain 1900 is terminated, thereby to terminate the transmission of mark impulses over the mark pulse conductor 1055 to the associated trunk recorder. In response to the termination of a cycle of operation, the counting chain 1900 is restored to a normal condition, and the sender switch relay 15SS prepares a circuit for applying a single space pulse to the space pulse conductor 1054, thereby to indicate the end of the group of mark pulses representing the months numerical notation. Concurrently with terminating operation of the counting chain 1900, the steering circuit 1950 is operated through a single step so that ground is removed from the months wipers 17MO3 and 17MO4 and marking ground is applied to the wipers 17DT1 and 17DT2, thereby to ground a selected one of the marking conductors in accordance with the value of the tens days digit.

As described above, the operation of the first steering relay 18SA causes the application of marking ground to the "3" designated marking conductor. The pulse generator 1600 thereafter causes the sequential operation of the pulse generator relay 16PG so that the counting chain 1900 is operated, as described above, to transmit three mark pulses to the mark pulse conductor 1055 representing the value of the tens days digit. The counting operation of the circuit 1900 is terminated by the closure of the contacts 15XC1 and 15XY1 to complete an operating circuit for the sender switch relay 15SS. As described above, the operation of the sender switch relay applies a ground pulse to the space pulse conductor 1054 following the group of three mark pulses representing the value of the tens days digit and also restores the operated relays in the counting chain 1900.

Further, in operating, the sender switch relay 15SS closes the contacts 19SS1 to complete the prepared circuit for operating the second steering relay 19SB. Operation of the second steering relay 19SB closes a plurality of contacts 17SB2, 19SB1, 19SB2, and 19SB3, and opens a pair of contacts 17SB1. Closure of the contacts 19SB2 completes a holding circuit for the second steering relay 19SB which extends to main ground through a pair of closed contacts 19SZ1.

The closure of the contacts 17SB2 and the opening of the contacts 17SB1 prepare a circuit for applying ground through a conductor DU and the cable 1740 to the wipers 17DT3 and 17DT4 which are positioned in engagement with the contacts representing the value of the units days digit. The closure of the contacts 19SB3 prepares an operating circuit for a relay 18SY, and the closure of the contacts 19SB1 prepares a portion of an operating circuit for a third steering relay 19SC.

When the sender switch relay 15SS is released by the release of the pulse generator relay 16PG, the contacts 19SS2 are closed to complete an operating circuit for the relay 18SY which extends from main ground through the closed contacts 19SB3, 18SY4, and 18SZ3. Operation of the relay 18SY closes a plurality of contacts 18SY3 and 19SY1 and opens a plurality of contacts 18SY1, 18SY2, 18SY4, and 19SY2. The contacts 18SY3 and 18SY4 form a make-before-break contact arrangement so that the closure of the contacts 18SY3 prior to the opening of the contacts 18SY4 to open the operating circuit for the relay 18SY completes a holding circuit therefor extending to main ground. The opening of the contacts 18SY2 and the closure of the contacts 19SY1 prepares a portion of an operating circuit for the third steering relay 19SC.

The opening of the contacts 18SY1 interrupts the holding circuit for the first steering relay 18SA so that this relay releases. In releasing, the relay 18SA closes the contacts 17SA1 to complete a circuit for applying ground to a marking conductor in accordance with the value of the days units digit. This circuit extends from the closed and grounded contacts 17STC2 through the closed contacts 17SA1, 17SB2, the conductor DU, and the wiper 17DT4 to the contact 24. Since, as assumed above, the call was extended from the calling substation A on the twenty-fourth of December, the application of ground to the contact 24 applies marking ground to the "5" designated conductor. The remaining contact operations caused by the release of the first steering relay 18SA merely serves to partially restore the steering circuit 1950 to a normal condition.

The opening of the contacts 18SY2 interrupts the holding circuit for the relay 18SX so that this relay releases. The release of this relay closes the contacts 19SX3, thereby to prepare an additional portion of the above described operating circuit for the third steering relay 19SC. The remaining contact operations caused by the release of the relay 18SX merely aids in restoring the steering circuit 1950 to a normal condition.

In order to provide a record of the value of the days units digits, the counting relays XA to XE in the counting circuit 1900 are sequentially operated to transmit five ground pulses to the conductor 1055, thereby to provide five recorded mark pulses representing the units days unit "4." In response to the closure of the contacts 15XE1 and the subsequent closure of the contacts 15XZ2, the sender switch relay 15SS is again operated.

The operation of the sender switch relay 15SS, in addition to terminating the counting operation of the chain 1900, closes the pair of contacts 19SS1 to complete the above described operating circuit for the third steering relay 19SC, thereby causing this relay to operate to close a plurality of contacts 17SC2, 18SC1, 19SC1, and 19SC2 and to open the pair of contacts 17SC1. The closure of the contacts 19SC1 prepares a holding circuit for the third steering relay 19SC which extends through the normally closed contacts 19SX1 to the main ground conductor. The closure of the contacts 18SC1 prepares a portion of an operating circuit for a fourth steering relay 18SD. The closure of the contacts 19SC2 prepares an operating circuit for a relay 19SZ. The opening of the contacts 17SC1 and the closure of the contacts 17SC2 prepares a circuit for applying ground to a tens hours conductor HT.

In addition, the above described operation of the sender switch relay 15SS also applies ground to the space pulse conductor 1054, thereby to record a space pulse on the tape 12000 (Fig. 23A) following the group of five mark pulses representing the value of the units days digit. When the sender switch relay 15SS is released, thereby to close the contacts 19SS2, the relay 19SZ is operated over a circuit including the closed contacts 19SC2 to open a plurality of contacts 19SZ1, 19SZ2, 18SZ2, and 18SZ3 and to close a plurality of contacts 18SZ1 and 19SZ3. The contacts 19SZ3 and 19SZ2 form a make-before-break contact arrangement so that the closure of the contacts 19SZ3 prior to the opening of the contacts 19SZ2 completes a holding circuit for the relay 19SZ which extends through the normally closed contacts 19SX1 to the main ground conductor.

The operations of the contacts 18SZ1 and 18SZ2 prepare an additional portion of the operating circuit for the fourth steering relay 18SD. The opening of the contacts 18SZ3 interrupts the holding circuit for the relay 18SY so that this relay releases to aid in partially restoring the steering circuit 1950 to a normal condition. The opening of the contacts 19SZ1 interrupts the holding circuit for the second steering relay 19SB so that this relay releases to aid in restoring the steering circuit 1950 to a normal condition and, in closing the contacts 17SB1, to complete the circuit for applying marking ground to the wiper representing the value of the tens hours digit.

More specifically, the closure of the contacts 17SB1 extends ground through the tens hours digit conductor HT to the wiper 14HR4 which is positioned in engagement with the seventeenth contact, inasmuch as, as assumed above, the call between the substations A and C was placed at 5:31 p.m. Since December 24 of 1955 is not a holiday or Sunday, the business hour modifying means are effective and the ground applied from the wiper 14HR4 to the seventeenth contact is extended through the normally closed contacts 15DS3 and 15HY2, the plug 1581 and the jack 1583 to the "5" designated conductor. The application of ground to this marking conductor, which was previously grounded under the control of the operated steering relay 19SB, does not again cause the operation of the sender switch relay 15SS at this time inasmuch as the relays 18XE and 15XZ in the counting circuit 1900 have been released. The application of ground to the "5" marking conductor, in causing the recording facilities to print the digit "4" as the tens hours digit, indicates that the call was placed during business hours on a day other than a holiday or Sunday.

In a manner similar to that described above, the steering circuit 1950 operates to release the relays 19SC and 19SZ and to operate and release the relays 18SD, 18SX, 19SE, and 18SY and to then operate the relays 19SF and 19SZ in the above described order, thereby to cause the sequential application of marking ground to the hours units minutes wiper 17MU1. In response to the application of marking ground to the contacts associated with these wipers, the counting chain 1900 cyclically and successively operates, as described in detail above, to transmit five mark pulses representing the tens hours digit, ten mark pulses representing the units hours digit, four mark pulses representing the tens minutes digit, and two mark pulses representing the units minutes digit, all but the last of these groups of mark pulses being followed by a space pulse, as shown in Fig. 23A. These mark pulses, when utilized by the recording facilities, cause the printing of the time notation "4731" thus indicating that the call was placed, as assumed above, at 5:31 p.m. on a normal business day.

As set forth above, the transmission of the seventh group of mark pulses to the associated trunk recorder 127 to represent the value of the units minutes digit is controlled by the operated relays 19SF and 19SZ in the steering circuit 1950. Accordingly, when, following the operation of the relays 18SB and 18XZ in the counting chain 1900, the sender switch relay 15SS is again operated to terminate the transmission of the group of mark pulses representing the units minutes digit, the contacts 19SS1 are closed to complete an operating circuit for a seventh steering relay 18SG, which circuit is prepared by the closed contacts 18SF1 and 18SZ1 controlled by the operated relays 19SF and 19SZ in the steering circuit 1950. The operation of the seventh steering relay 18SG closes a plurality of contacts 18SG2 and 19SG2 and opens a plurality of contacts 17SG1, 18SG1, and 19SG1. The closure of the contacts 18SG2 completes a holding circuit for the seventh steering relay 18SG which extends to the main ground conductor.

The closure of the contacts 19SG2 prepares an operating circuit for the relay 18SX. The opening of the contacts 19SG1 interrupts one of the pair of parallel paths for maintaining the slow-to-release calender start relay 19STC operated, but this relay remains energized through the closed contacts 19SX4. The opening of the contacts 18SG1 interrupts one of the plurality of paths for applying ground to the conductor 1530, but ground is applied thereto through the closed contacts 18SS3. The opening of the contacts 17SG1 opens one of the parallel paths for applying ground to the hold conductor 1051, but, due to the parallel path provided by the closed contacts 17SX1, ground is not removed from this conductor at this time.

When the pulse generator relay 16PG is next operated to close the contacts 15PG2 and 15PG4 and to open the contacts 15PG3, the relays 18XZ and 18XB are released and ground is applied to the space pulse conductor 1054, thereby to record a space pulse on the magnetic tape 12000 immediately following the group of mark pulses representing the value of the units minutes digit. The closure of the contacts 15PG2 provides holding ground for maintaining the slender switch relay 15SS operated. When the pulse generator relay 16PG releases to open the contacts 15PG2 and 15PG4 and to close the contacts 15PG3, the ground applied to the space pulse conductor 1054 is terminated, and the holding circuit for the sender switch relay 15SS is interrupted, thereby permitting this relay to release. In releasing, the relay 15SS opens the contacts 18SS3 to remove ground from the conductor 1530, thereby to terminate operation of the pulse generator relay 16PG. The release of the relay 15SS also closes the contacts 19SS2 to complete an operating circuit for the relay 18SX extending through the closed contacts 19SG2.

The operation of the relay 18SX opens the contacts 17SX1, 18SX2, 19SX1, 19SX3, and 19SX4 and closes the contacts 18SX1 and 19SX2. As described above, the operation of the contacts 18SX1 and 18SX2 completes a holding circuit for the relay 18SX extending to the main ground conductor. The operation of the contacts 19SX2 and 19SX3 performs no useful function at this time. However, the opening of the contacts 17SX1 removes ground from the holding conductor 1051, thereby to permit the pickup relay 10PU in the associated trunk circuit 126 to be released. The release of the relay 10PU, as described above, terminates the operation of the trunk recorder 127 under the control of the common clock and calender circuit 133 and prepares this circuit for causing the operation of the allotter 129 to search for, seize, and associate an idle identifier sender 131 with the trunk circuit 126.

The opening of the contacts 19SX1 interrupts the holding circuit for the relays 19SF and 19SZ, thereby permitting these relays to release, and, in doing so, to partially restore the steering circuit 1950 to a normal condition.

The opening of the contacts 19SX4 interrupts the last remaining holding path for the slow-to-release calendar start relay 19STC so that, following a suitable time delay, this relay releases to close the contacts 15STC1, 17STC1, 17STC3, 18STC1, 18STC2, and 18STC4 and to open the contacts 17STC2, 17STC4, and 18STC3. The opening of the contacts 18STC3 interrupts the holding circuit for the calendar alarm relay 18ALC, and the closure of the contacts 18STC4 completes the charging parth for the condenser 1861 through the series resistor 1860.

The closure of the contacts 15STC1 provides a source of ground for the circuit controlling the lamp display relays 14DS and 14DST so that they are again conditioned for operation. The opening of the contacts 17STC2 removes the source of ground for the plurality of rotary switch wipers shown in Fig. 17 and thus prevents the application of ground to any of the marking conductors. The closure of the contacts 17STC3 and the opening of the contacts 17STC4 opens the ground path provided by the closed contacts 17ALO1 and prepares a path for operating the pickup relays. The closure of the contacts 17STC1 completes the path extending to the common pickup conductor 1052.

The opening of the contacts 18STC5 opens an additional point in the path for grounding the conductor 1530, and the opening of the contacts 18STC1 opens a point in the partially prepared operating circuit for the third calendar alarm relay 18ALT.

As described above, the opening of the contacts 18STC3 opens the holding circuit for the calendar alarm relay 18ALC. Accordingly, the calendar alarm relay 18ALC, in response to the release of the calendar start relay 19STC, releases to open the contacts 18ALC1 and 18ALC3 and to close the contacts 18ALC2. The opening of the contacts 18ALC3 opens an additional point in the circuit for applying ground to the conductor 1530, and the closure of the contacts 18ALC2 prepares a portion of an operating circuit for the third calendar alarm relay. However, due to the prior release of the calendar start relay 19STC, the contacts 18STC1 in this circuit are opened.

The opening of the contacts 18ALC1 removes main ground from the counting chain 1900 and the steering circuit 1950 to release the relays 18ALO, 18SX, and 18SG. In releasing, these relays close the contacts 17SX1 and 17SG1 to prepare ground paths for the conductors 1051 and 1052 in addition to restoring the clock and calendar circuit 133 to a normal condition. In this manner, the clock and calendar circuit 133 provides seven groups of mark pulses to the trunk recorder 127 to provide a record of the date and time at which the toll call was placed.

*Alarm facilities in the clock and calendar circuit* 133

In order to provide a means for indicating when the clock and calendar circuit 133, for one reason or another, fails to complete the transmission of the required seven groups of mark pulses within a predetermined time interval, the third calendar alarm relay 18ALT is provided. More specifically, the condenser 1861, in discharging through the relatively high resistance winding of the calendar alarm relay 18ALC, provides a time interval within which the transmission of the date and time information must be completed. In the event that this data has not been completely transmitted, as indicated by the failure of the calendar start relay 19STC to be released within the holding time interval of the calendar alarm relay 18ALC, this relay releases to open the contacts 18ALC3 and 18ALC1 and to close the contacts 18ALC2. Since the calendar start relay 19STC has not been released within this time interval, thereby to indicate the termination of the transmission of the required information, the closure of the contacts 18ALC2 completes an operating path for the third calendar alarm relay 18ALT so that this relay operates to close a plurality of contacts 18ALT1 and 19ALT1 and to open a pair of contacts 18ALT2. The contacts 18ALT1 and 18ALT2 form a make-before-break contact arrangement so that the closure of the contacts 18ALT1 prior to the opening of the contacts 18ALT2 completes a holding path for the third calendar alarm relay 18ALT which extends to ground through a pair of normally closed contacts 18ALK1 on an alarm release key. The closure of the contacts 19ALT1 energizes an alarm lamp 1910, thereby to provide a visible indication that the clock and calendar circuit 133 has failed to provide a complete complement of date and time information within the allotted time interval. The closure of the contacts 19ALT1 also applies ground to a terminal 1911 to indicate the alarm condition to the supervisory circuit. This alarm indication is maintained until such time as the alarm release key is manually operated to open the contacts 18ALK1, thereby interrupting the holding circuit for the third calendar alarm relay. However, even though an alarm indication is provided, the clock and calendar circuit 133 remains capable of being seized and utilized to provide date and time information.

The third calendar alarm relay 18ALT is also utilized to provide a visible indication that, during a cycle of operation, the counting chain 1900 fails to find a grounded marking conductor so that a test circuit can be completed to operate the sender switch relay 15SS and to terminate transmission of any particular group of mark pulses. More specifically, if, during operation of the counting chain 1900, the successive operations of the relays 16XA, 18XB, 18XC, 16XD, 18XC, 18XF, 19XG, 18XH, 18XI, 19XA, 18XK, and 18XL fails to cause the operation of the sender switch relay 15SS, thereby to terminate the cyclic operation of the counting chain 1900, a thirteenth counting relay or overrun relay 19XM is operated to close a plurality of contacts 16XM1, 18XM1, 18XM2, and 19XM1.

The closure of the contacts 19XM1 completes a holding path for the overrun relay 19XM which extends to main ground through the normally closed contacts 19XZ1. The closure of the contacts 16XM1 prepares an operating path for the relay 16XX. The closure of the contacts 18XM2 completes an obvious operating path for the third calendar alarm relay 18ALT so that this relay is operated, as described above, to both complete its holding circuit and to illuminate the alarm lamp 1910. The closure of the contacts 18XM1 prepares a path for artificially operating the sender switch relay 15SS.

When the pulse generator relay 16PG next releases to close the contacts 15PG3 and to open the contacts 15PG2 and 15PG4 to terminate the recording of the thirteenth mark pulse on the magnetic tape of an associated trunk recorder, a path is completed through the closed contacts 16XM1 for operating the relay 16XX. The operation of the relay 16XX closes the contacts 15XX1, 16XX2, and 18XX1 and opens the contacts 16XX1, 18XX2, and 18XX3. The contacts 16XX1 and 16XX2 complete a holding path for the relay 16XX which extends to ground through the closed contacts 19XZ1. The opening of the contacts 18XX3 interrupts the holding circuit for the relays 16XY and 18XL, which are in an operated condition at this time, so that these relays release. The operations of the contacts 18XX1 and 18XX2 serve no useful function at this time.

However, the closure of the contacts 15XX1 completes a path for artificially operating the sender switch relay 15SS. More specifically, the prior operation of the overrun relay 19XM to close the contacts 18XM1 prepares a path from the closed and grounded contacts 18ALC1 to the contacts 15XX1, which, when closed, complete an operating circuit for the sender switch relay 15SS. The operation of this relay, as described above, records a space pulse following the group of thirteen mark pulses representing the item of information on which the counting chain 1900 failed to detect ground on one of the marking conductors. The operation of this relay also causes the counting chain 1900 to be restored to a normal condition and advances the steering circuit 1950 a single step so that the wiper designating the next item of information which is to be transmitted is supplied with marking ground.

Accordingly, in response to the failure of the clock and calendar circuit 133 to transmit all of the necessary date and time information within a selected time interval or in response to the counting chain 1900 failing to detect marking ground during one cycle of operation thereof, the third calendar alarm relay 18ALT is operated to provide a visible indication of this alarm condition. Further, when marking ground is not found during a cycle of operation of the chain 1900, this chain is automatically reset and a space pulse is transmitted to the associated trunk recorder to insure a proper playback of the items pertaining to the call to which the date and time information relates.

*Operation of the clock and calendar circuit* 133 *to check the pulse output from the generator* 1600

To provide means for checking the pulses supplied by the pulse generator 1600, the clock and calendar circuit 133 includes means for interconnecting the pulse generator 1600 with an external testing apparatus and means for preventing seizure of the circuit 133 during these testing operations.

More specifically, to initiate a checking operation, a plug connected to external test equipment is inserted into a pulse check jack 1510, thereby to close a pair of contacts 1511. The closure of the contacts 1511 completes an operating circuit for a pulse check relay 18PC which extends from the closed and grounded contacts 15STC1 through the contacts 1511, a conductor 1520, and the cable 1560 to the operating winding of the pulse check relay 18PC.

Operation of the pulse check relay 18PC opens a plurality of contacts 15PC1, 18PC1, and 18PC3 and closes a plurality of contacts 18PC2 and 18PC4. The opening of the contacts 15PC1 disconnects the contacts 15PG2 from the pulsing path extending through the normally closed contacts 15PG2 from the pulsing path extending through the normally closed contacts 15SS2 to the counting chain 1900. The opening of the contacts 18PC1 interrupts the above described operating circuit for the second calendar alarm relay 18ALO. The opening of the contacts 18PC3 opens the above described operating circuit for the calendar alarm relay 18ALC, and the concurrent closure of the contacts 18PC2 completes an operating circuit for this relay. The closure of the contacts 18PC4 completes an obvious operating circuit for a pulse check slave relay 18PCS.

The operation of the relay 18PCS opens a plurality of contacts 17PCS1, 18PCS1, 18PCS2, and 18PCS4 and closes a plurality of contacts 15PCS1 and 18PCS3. The closure of the contacts 15PCS1 provides an additional source of ground for maintaining the pulse check relay 18PC operated. The closure of the contacts 18PCS3 prepares a holding circuit for the pulse check slave relay 18PCS. The opening of the contacts 18PCS1 interrupts the above described operating circuit for the third calendar alarm relay 18ALT. The opening of the contacts 17PCS1 disconnects the common conductor 1052 from the source of ground provided therefor in the clock and calendar circuit 133 and, accordingly, prevents seizure of this circuit during the time that the jack contacts 1511 are closed. The opening of the contacts 18PCS4 disconnects the conductor 1550 from either the mark pulse conductor 1055 or the space pulse conductor 1054, thereby to prevent transmission of mark and pulse information to the trunk circuit during a pulse checking operation. The opening of the contacts 18PCS2 opens an additional point in the operating circuit for the calendar alarm relay 18ALC.

As described above, the operation of the pulse check relay to close the contacts 18PC2 completes the energizing circuit for the calendar alarm relay 18ALC so that this relay operates to close the contacts 18ALC1 and 18ALC3 and to open the contacts 18ALC2. The opening of the contacts 18ALC2 interrupts, at an additional point, the energizing circuit for the third calendar alarm relay 18ALT, and the closure of the contacts 18ALC3 prepares the circuit for applying ground to the conductor 1530. The closure of the contacts 18ALC1 completes the operating circuit for the calendar start relay 19STC and applies ground to the conductor 1540, thereby to provide ground on the swinger forming a portion of the contacts 15PG1, 15PG2, 15PG3, and 15PG4 controlled by the pulse generator relay 16PG.

Operation of the calendar start relay 19STC closes the contacts 18STC5 to complete the circuit for applying ground through the closed contacts 18ALC3 and 18SG1, the conductor 1530, and the cable 1560 to the output transistor 1650 of the pulse generator 1600. The application of ground to the transistor 1650 renders this transistor responsive to the output signals provided by the multivibrator 1601 so that the pulse generator relay 16PG opens and closes the contacts 15PG1 to transmit impulses through the plug 1510 to the external test means. To terminate the pulse checking operation, the plug is removed from the jack 1510, thereby opening the contacts 1511 to interrupt the operating circuit for the pulse check relay 18PC. This relay releases to close the contacts 15PC1, 18PC1, and 18PC3 and to open the contacts 18PC2 and 18PC4. The closure of the contacts 15PC1 prepares the operating path extending from the contacts 15PG2 to the counting chain 1900. The opening of the contacts 18PG4 interrupts the operating circuit for the pulse check slave relay 18PCS, but this relay remains operated because of the holding circuit provided by the closed contacts 18STC5 and 18PCS3. The closure of the contacts 18PC1 prepares the operating circuit for the second calendar alarm relay 18ALO, and the operation of the contacts 18PC2 and 18PC3 interrupts the operating circuit for the calendar alarm relay 18ALC, thereby to permit this relay to release to open the contacts 18ALC1 and 18ALC3 and to close the contacts 18ALC2.

The closure of the contacts 18ALC2 does not result in the operation of the third calendar alarm relay 18ALT since the contacts 18PCS1 are open. The opening of the contacts 18ALC3 interrupts the circuit for applying enabling ground to the pulse generator 1600, thereby to terminate intermittent operation and release of the pulse generator relay 16PG. The opening of the contacts 18ALC1 interrupts the operating circuit for the calendar start relay 19STC, in addition to removing ground from the swinger forming a portion of the contacts controlled by the pulse generator relay 16PG.

After a suitable time delay, the calendar start relay 19STC releases and, in doing so, opens the contacts 18STC5 to open the holding circuit for the pulse check slave relay 18PCS, thereby permitting this relay to release. The release of the pulse check slave relay 18PCS returns the clock and calendar circuit 133 to a normal condition, and, in closing the contacts 17PCS1, completes the path for applying ground to the conductor 1052, thereby permitting the clock and calendar circuit 133 to be seized by a trunk circuit.

In general, therefore, the clock and calendar circuit 133 is seized by a trunk circuit following the receipt of answering supervisory signals and is placed in operation to transmit seven groups of mark pulses followed by space pulses representing the date and time at which the toll call is completed. The steering circuit 1950 selectively renders the wipers of the plurality of rotary register switches effective to apply ground to the marking conductors to which the counting chain 1900 has access. The relays in the counting chain 1900 are sequentially operated by the pulse generator 1600 until a test path to a grounded conductor is completed, thereby terminating the cycle of counting operation during which mark pulses are simultaneously transmitted to the associated trunk recorder. The steering circuit 1950 controls the recording of a space pulse on the tape at the end of each cycle of operation of the counting chain 1900. Following the complete transmission of the necessary items of information, the clock and calendar circuit 133 is released and restored to a normal condition in which it is capable of being seized by subsequent trunk circuits having access thereto.

In addition to providing date and time information for storage in conjunction with each toll call, the clock and calendar circuit 133 can be utilized to provide a start ground signal at a selected hour for initiating a routine readout operation of the readout control circuit 210. A conductor 161 may be strapped to a selected one of the contacts engaged by the wiper 14HR1 of the hours rotary switch so that a short ground pulse is applied to a terminal 1411 at any one of a number of hourly intervals, the terminal 1411 being connected to a routine start lead in the readout control circuit 210. As shown, the conductor 161 can be strapped to the contacts 26 and 1, 2, 3, or 4 representing midnight and the hours 1:00 a.m. to 4:00 a.m., respectively, during which traffic is at a relatively low level.

TYPICAL TAPE RECORD

Fig. 23A of the drawings shows a typical tape record in which the items of information pertaining to the first call recorded on the magnetic tape 12000 in the trunk recorder 127 are schematically indicated. As assumed above, this first call is extended from the substation A designated by the directory number Olympic 3–0901 to a called subscriber located in the Cleveland area having the directory number Belmont 4–1712. The call is assumed to have been placed at 5:31 p.m. on December 24, and this call is assumed to have had a duration of more than fifty-one minutes but less than fifty-two.

Referring now more specifically to a fragment 12000*a* of the endless loop of magnetic tape 12000, as shown in Fig. 23A of the drawings, a preliminary COE signal is recorded on the tape immediately following the perforation 12003 which defines the home position or effective beginning of the endless loop of tape 12000. The preliminary COE signal is spaced out from the first group of mark pulses which represents the value of the dialed party digit, i.e. "2." The next seven groups of mark pulses, each of which is followed by a space pulse, comprise three groups of mark pulses representing the three called office code digits, i.e. digits "2," "3," and "4" and four groups of mark pulses representing the thousands, hundreds, tens, and units digits of the directory number of the called subscriber, i.e. "1," "7," "1," and "2."

The next seven groups of mark pulses, each of which are separated by interposed space pulses, represent the date and time of filing the call and, more specifically, the ninth group of mark pulses recorded on the tape segment 12000*a* includes twelve pulses representing the month of December. The next two groups of mark pulses numbering three and five represent the tens days digit "2" and the units days digit "4." The next two or twelfth and thirteenth groups of mark pulses represent the values of the tens hours digit and the units hours digit and comprise five and eight mark pulses, respectively. The five mark pulses representing the value of the tens hours digit have a digital significance of "4" to indicate that the call was placed during business hours as contrasted with the digital notation "1" corresponding thereto which would be represented by a group of two mark pulses if the call had been placed at a time other than when business rates were applicable. The group of eight mark pulses representing the digit "7," when considered in conjunction with the tens hours digit, indicates that the call was placed during the seventeenth hour, and this notation corresponds to the placing of a call following in the interval between five and six p.m.

The fourteenth and fifteenth groups of mark pulses, numbering four and two, respectively, and having a digital significance of "3" and "1," as indicated by the figures in parentheses in Fig. 23A, represent the minutes notation of the filing time of the call, i.e. thirty-one minutes following the hour designated by the preceding two groups of mark pulses.

The sixteenth, seventeenth, eighteenth, and nineteenth groups of mark pulses represent the values of the thousands, hundreds, tens, and units digits of the directory number of the calling substation A, i.e. "0," "9," "0," and "1." The last or twentieth group of mark pulses includes fifty-one discrete mark pulses representing an elapsed time interval of more than fifty-one minutes and less than fifty-two minutes during which the connection was maintained. However, in Fig. 23A, the duration impulses are shown in a fragmentary manner. The final signal recorded on the tape segment 12000*a* comprises the COE signal which indicates to the readout amplifier circuit 6600 that all of the items of information pertaining to the call have been transmitted.

Figs. 23B, 23C, and 23D illustrate fragments of a magnetic tape on which are recorded the items of information pertaining to the above described calls placed from the substations F, H, and I, respectively. These calls are assumed to have been placed under the same conditions as the call extended from the substation A and, accordingly, only those portions of the items of information which differ from the items of information schematically shown in Fig. 23A are shown on the tape segments in Figs. 23B, 23C, and 23D.

RECORDING THE STORED DATA

The items of information pertaining to the plurality of toll calls stored in the plurality of trunk recorders, similar to the trunk recorder 127, which relate to the toll calls extended from the Hudson office are recorded in permanent form by the recorder 220 (Fig. 20) under the control of the register circuits and control circuits shown in Fig. 20 of the drawings in the manner set forth in detail in the copending application of F. A. Morris and M. A. Clement, Serial No. 536,573, filed September 26, 1955, which is assigned to the same assignee as the present invention. As set forth in the preceding general description of the present toll ticketing system, the items stored on the magnetic tapes (Figs. 23A–D) of the trunk recorder are transmitted to the data registering means associated with the readout control circuit 210 and are subsequently utilized to control the operation of the recorder 220 to provide permanent records thereof. Figs. 24A–D show one type of record which can be produced by the recorder 220 under the control of the data stored on the sample tape segments shown in Figs. 23A–D of the drawings, respectively.

The data pertaining to the toll calls extended from the remote Russell office (Fig. 20) is collected and stored in trunk recorders, similar to the trunk recorder 127, in the manner described above by equipment which is substantially identical to that shown in Figs. 3 to 19, inclusive, of the drawings. This stored data is subsequently transmitted over the carrier link provided by the equipment 215 and 225 to control the operation of the recorder 220, as shown and described in detail in the copending Morris and Clement application identified above.

In summary, the automatic toll ticketing system of the present invention includes new and improved means for providing a continuous representation of date and time. The date and time information is modified in various manners to indicate the different calendar and time periods, such as holidays and Sundays or day and night, in which selected rate structures are applicable. In addition, the date and time means includes display means which are interlocked with pulse transmitting means controlled by the date and time means so that only one of these two means can be rendered effective at any one time. The pulse transmitting means, which is operable through successive cycles to transmit individual items of information, is provided with control means for insuring correct sequential transmission of the date and time information even though improper operation of the pulse transmitting means may occur in one or more of the individual cycles of operation thereof.

Although the operation of the automatic telephone system of the present invention is described above in conjunction with particular means for selecting, storing, and recording data pertaining to toll calls, it should be understood that many other modifications and embodiments may be provided by those skilled in the art which will fall within the spirit and scope of the principles of the present invention.

What is claimed and desired to be secured by Letters Patent of the United States is:

1. A date and time registering means comprising a plurality of switching means periodically operated at predetermined time intervals to provide digit marking conditions representative of correct date and time, and means controlled by said switching means during selected chronometric intervals to modify the marking conditions representing correct time and date to provide marking conditions representing said selected intervals.

2. A date and time register means comprising a standard timing means, switching means operated by said standard timing means to provide marking conditions representing instant date and time, and means controlled by said switching means for varying the marking conditions representing instant date and time on holidays.

3. A date and time registering means comprising a standard timing means, switching means operated by said standard timing means to provide digit marking conditions representing correct time, and circuit means controlled by said switching means for modifying the marking conditions representing correct time during a selected time interval of the day.

4. A date and time registering means comprising a standard timing means, first circuit means operated by said timing means to provide manifestations of correct date and time, and second circuit means controlled by said first circuit means for modifying the manifestations provided by said first circuit during selected chronometric intervals to manifestations of incorrect date and time bearing a known relation to correct date and time.

5. In a telephone system, means for establishing a telephonic connection, register means for storing items of information pertaining to a call placed over said connection including the time of the call, means providing signals representative of time, means for associating said register means and said signal providing means to cause time representing signals to be stored in said register means in conjunction with each call, and means for modifying the signals normally provided by said time signal providing means during selected chronometric intervals.

6. In a telephone system, means for establishing a telephonic connection, register means for storing items of information pertaining to a call completed over said connection and including the time of the call, time signaling means providing signals representative of time, means for connecting said register means to said time signaling means to cause time representing signals to be stored in said register means in conjunction with each call, and means for modifying the time representing signals normally provided by said time signaling means on selected days of the year.

7. In a telephone system, means for establishing a telephonic connection, register means for storing items of information pertaining to a call completed over said connection and including the time of the call, a plurality of stepping switch registers continuously adjustable to positions representing instant time, signal transferring means for associating said stepping switch register means and said register means to cause said register means to store data pertaining to instant time in accordance with the adjusted positions of the stepping switch register means in conjunction with each call, and means controlled by the adjusted positions of the stepping switch registers and effective at selected chronological intervals to transmit signals to said register means which are different than those normally transmitted under the control of said stepping switch registers.

8. A date and time register comprising a standard timing means, first circuit means controlled by said timing means for providing manifestations representing instant time, second circuit means controlled by said first circuit means for modifying said manifestations during selected time intervals, display means controlled by said first circuit means for providing an indication of said instant time manifestations, and means associated with said display means for rendering said second circuit means inoperative to modify said manifestations during operation of said display means.

9. A date and time register comprising a standard timing means, first circuit means controlled by said timing means for providing manifestations representing the digits of instant date and time, second circuit means for modifying said manifestations, and third circuit means controlled by said first circuit means and operable to conditions representing the various days of a week for controlling the operation of said second circuit means.

10. A date and time register comprising a standard timing means, first circuit means controlled by said timing means for providing manifestations representing instant date and time, said first circuit means including month and day circuit means for providing manifestations representing the day and the month of the instant date, and second circuit means controlled by said month and day circuit means for modifying the manifestations representing instant time during selected intervals.

11. The register set forth in claim 10 including third circuit means operable under the control of said timing means to different conditions representing the day of the week and means controlled by said third circuit means and said month and day circuit means for operating said second circuit means.

12. In an automatic toll ticketing system, a register for storing data pertaining to the date and time of a toll call, circuit means providing a continuous manifestation of instant date and time and operative to supply signals representative thereof to said register, means for associating said circuit means with said register to operate said register in accordance with said signals, display means controlled by said circuit means for providing a visual display of said manifestation, and means controlled by said display means for preventing the association of said register with said circuit means.

13. In a telephone system, a register for storing information pertaining to the date and time of a toll call, a standard timing means, a plurality of switching means including wipers and continuously operative under the control of said timing means to advance said wipers into positions representing date and time information, signal transmitting means controlled by said wipers for supplying signals to said register in accordance with said date and time information, display means controlled by said wipers for providing a visible display of said date and time information, and means for rendering said wipers effective to control the operation of either said signal transmitting means or said display means.

14. A date and time register means comprising a standard timing means supplying pulses at fixed time intervals, circuit means operable in steps under the control of said pulses to provide continuous manifestations of instant date and time, display means controlled by said manifestations to provide a visual display of instant date and time, and means controlled by said display means for preventing operation of said circuit means during a visual display of said date and time information.

15. A date and time register means comprising a standard timing means supplying pulses at fixed time intervals, circuit means operable in steps under the control of said pulses to provide continuous manifestations of instant date and time, display means controlled by said manifestations to provide a visual display of instant date and time, and means controlled by said display means and operated by said timing means to effectively store a pulse supplied to said circuit means during a visual display of said date and time information thereby to operate said circuit means following the completion of the display.

16. A date and time register comprising a standard timing means for supplying pulses at fixed time intervals, circuit means operable in steps under the control of said pulses for providing a continuous manifestation of date and time, display means controlled by said manifestation for producing a visual display of said instant date and time, means for manually operating said circuit means to vary the manifestations provided thereby, and means controlled by said display means for rendering said manual operating means effective to operate said circuit means.

17. In a telephone system, a signal responsive register for storing items of information pertaining to the date and time of a toll call, means for providing manifestations of a plurality of separate items of date and time information, signaling means controlled by said manifestations for transmitting a number of pulses representing each of said separate items to said register, said signaling means including means for transmitting a control signal following the signals representing each of said items, and means controlled by said signaling means for transmitting a control signal to said register when the number of pulses transmitted by said signaling means exceeds the number representative of any one of said items.

18. In a telephone system, a signal responsive register for storing items of information pertaining to the date and time of a toll call, means for providing a plurality of distinct manifestations of separate items of date and time information, signaling means controlled by said manifestations for transmitting pulses to said register to store date and time information therein, said signaling means being operable through successive cycles to transmit a number of pulses in each cycle representing one of said separate items, steering means controlled by said signaling means for sequentially rendering said signaling means responsive to control by each of said distinct manifestations so that each manifestation terminates a cycle of operation of said signaling means, and control means operated in response to the failure of said signaling means to terminate a cycle of operation under the control of one of said manifestations for operating said steering means to render said signaling means responsive to control by another of said manifestations.

19. The combination set forth in claim 18 in which the control means including means for terminating the cycle of operation of said signaling means which was not terminated under the control of said one of said manifestations.

20. The combination set forth in claim 18 in which said signaling means includes means for transmitting a control signal to said register at the end of each cycle of operation and in which said control means includes means for operating said signaling means to transmit a control signal in response to the failure of said signaling means to terminate a cycle of operation.

21. In a telephone system, a register for storing data pertaining to the date and time of a call, circuit means for continuously providing manifestations of instant date and time, signaling means controlled by said manifestations for supplying signals to said register in accordance with instant date and time, switching means for connecting said register with said signaling means, and timing means controlled by said switching means for disconnecting said signaling means and said register means after the expiration of a predetermined period of time following the connection thereof.

22. The combination set forth in claim 21 in which the timing means includes means operated in accordance with the disconnection of said register for rendering said signaling means inoperative to supply signals to said register.

23. In a telephone system, a register for storing data pertaining to the date and time of a call, circuit means for continuously providing manifestations of instant date and time, signaling means controlled by said manifestations for supplying signals to said register in accordance with instant date and time, pulse generating means for operating said signaling means, means for associating said register with said signaling means to store date and time information in said register, first means operated in response to the association of said register with said signaling means for initiating operation of said pulse generating means, and second means for initiating operation of said pulse generating means and for preventing association of said register with said signaling means.

24. In a telephone system including calling subscriber substations, means for establishing telephone connections from said substations, a data register for storing items of information pertaining to a telephone call placed over an established connection from one of said calling substations, and a data collecting circuit connected to said data register for supplying data for storage in said data register including the designation of said one calling substation and a selectively modified digital time indication designating the rate structure applicable to the call placed from said one calling subscriber substation.

25. In a telephone system including calling subscriber substations, means for establishing telephone connections from said substations, a data register for storing items of information pertaining to a telephone call placed over one of said connections from one of said calling subscriber substations, a first data collecting circuit connected to said data register and controlled at least in part by said establishing means for storing in said register the designation of said one calling substation and at least a part of the factors necessary to determine the monetary charge to be assessed for the call from said one calling substation, and a second data collecting circuit connected to said register for storing a selectively modified digital time indication in said register to indicate whether a first or a second rate structure is to be used in establishing a monetary charge in accordance with the said factors stored in said register.

26. In a telephone system including calling subscribers, means for extending telephone connections, register means for storing data pertaining to a call placed over one of said connections, means connected to said register means and to said extending means for collecting and storing in said register at least a portion of the data from which the monetary charge for said call can be determined and assessed to a particular one of said calling subscribers, and time controlled means for automatically supplying data to said register incident to the storage of the data pertaining to each call for indicating the rate structure applicable during the time period in which the said call was placed.

27. A time registering means comprising a standard timing means, circuit means operated by said standard timing means to settings representing the digits of correct time, signaling means controlled by said circuit means for providing digital signals under the control of said settings representing correct time, and means for operating said signaling means during a selected chronometric interval to provide digital signals in which the signal representing at least one of the digits of correct time has an incorrect value bearing a known relation to the correct value of said one digit.

28. In a telephone system including calling lines, means for extending a connection from a calling line, register means for storing data pertaining to a call placed over said extended connection, control circuit means controllable from said extended connection for automatically collecting data pertaining to said call and for storing said data in said register means, and means included in said control circuit means for storing the time of placing said call in said register means in one form when said call is placed during certain chronometric intervals and for storing the time of placing said call in said register in a second form different than said first form when said call is placed during other chronometric intervals.

29. In a data handling system in which data pertaining to time is utilized, a time signal source normally operable to supply digital signals representing correct time, and control means connected to said time signal source and automatically operable during selected chronometric intervals for controlling said time signal source to supply digital signals which represent incorrect time and which bear a known relation to correct time.

30. The data handling system set forth in claim 29 in which said control means includes means automatically operable on holidays to control said time signal source to supply said incorrect time.

31. The data handling system set forth in claim 29 in which said control means includes means automatically operable on Sundays to control said time signal source to supply said incorrect time.

32. The data handling system set forth in claim 29 in which said control means includes means automatically operable during selected hours only of the day to control said time signal source to supply said incorrect time.

33. In a telephone system including calling lines, means for extending a connection from a calling line, register means for storing data pertaining to a call placed over said extended connection, control circuit means controllable from said extended connection for automatically collecting data pertaining to said call and for storing said data in said register means, means included in said control circuit means for storing the time of placing said call in said register means in one form when said call is placed during certain chronometric intervals and for storing the time of placing said call in said register in a second form different than said first form when said call is placed during other chronometric intervals, data recording means for providing a record of the data stored in said register means including said time of placing the call, and means for rendering said register means effective to control said data recording means.

References Cited in the file of this patent

UNITED STATES PATENTS

| | | |
|---|---|---|
| 1,200,265 | Stowell et al. | Oct. 3, 1916 |
| 1,719,000 | Crook | July 2, 1929 |
| 2,437,118 | Ostline | Mar. 2, 1948 |
| 2,513,112 | Shepherd | June 27, 1950 |
| 2,522,000 | Shepherd | Sept. 12, 1950 |
| 2,553,644 | Fehr | May 22, 1951 |
| 2,697,133 | Lomax | Dec. 14, 1954 |
| 2,724,741 | Lomax | Nov. 22, 1955 |
| 2,767,246 | Retallack | Oct. 16, 1956 |
| 2,794,070 | Ostline | May 28, 1957 |
| 2,818,322 | Blakely | Dec. 31, 1957 |